United States Patent
Sugino et al.

[11] Patent Number: 6,147,973
[45] Date of Patent: Nov. 14, 2000

[54] SIGNAL DISCRIMINATION APPARATUS, A METHOD FOR DISCRIMINATING A SIGNAL, AND A SIGNAL TRANSMITTING APPARATUS FOR VOICEBAND SIGNALS

[75] Inventors: Yukimasa Sugino; Yushi Naito; Hideaki Ebisawa; Nobuyoshi Horie, all of Tokyo, Japan

[73] Assignee: Mitsubishi Denki Kabushiki Kaisha, Tokyo, Japan

[21] Appl. No.: 08/820,983

[22] Filed: Mar. 19, 1997

[30] Foreign Application Priority Data

Mar. 19, 1996 [JP] Japan .................................. 8-063116
Oct. 30, 1996 [JP] Japan .................................. 8-288195

[51] Int. Cl.[7] .................................................. H04M 11/06
[52] U.S. Cl. ........................................ 370/252; 379/93.09
[58] Field of Search .................................. 370/352, 353; 379/93.09, 93.11, 93.01, 93.14, 93.15, 100.15, 100.16; 375/222

[56] References Cited

U.S. PATENT DOCUMENTS

| | | |
|---|---|---|
| 4,916,607 | 4/1990 | Teraichi et al. . |
| 4,979,214 | 12/1990 | Hamilton . |
| 5,117,453 | 5/1992 | Piasecki et al. . |
| 5,295,223 | 3/1994 | Saito . |
| 5,315,704 | 5/1994 | Shinta et al. . |
| 5,493,609 | 2/1996 | Winseck, Jr. et al. .................. 375/222 |
| 5,517,557 | 5/1996 | Tanaka ................................. 379/93.09 |
| 5,787,116 | 7/1998 | Lan et al. .............................. 375/222 |
| 5,887,842 | 3/1999 | Azami ................................... 379/93.09 |
| 5,892,816 | 4/1999 | Sih et al. ........................... 379/100.17 |
| 5,956,155 | 9/1999 | Nakamura et al. .................. 379/93.09 |

FOREIGN PATENT DOCUMENTS 7111548  4/1995  Japan .

OTHER PUBLICATIONS

"Alles Auf Einer Leitung"; Funkschau 22/1993; and 5 pages of translation.

*Primary Examiner*—Huy D. Vu

[57] ABSTRACT

A reset signal generating part outputs reset signals RV and RD to a signal discriminating part, based on an output from a 2100 Hz detecting part which detects whether or not a tone of 2100 Hz exists in an input signal. When the 2100 Hz tone is detected, the signal discriminating part firstly resets a discrimination state at "speech" and secondly sets the discrimination state at "data" based on the reset signal. Therefore, a signal discrimination apparatus, wherein it is possible to reset the discrimination state at "speech" at the beginning of a facsimile call even when no call control information is received, can be provided.

32 Claims, 60 Drawing Sheets

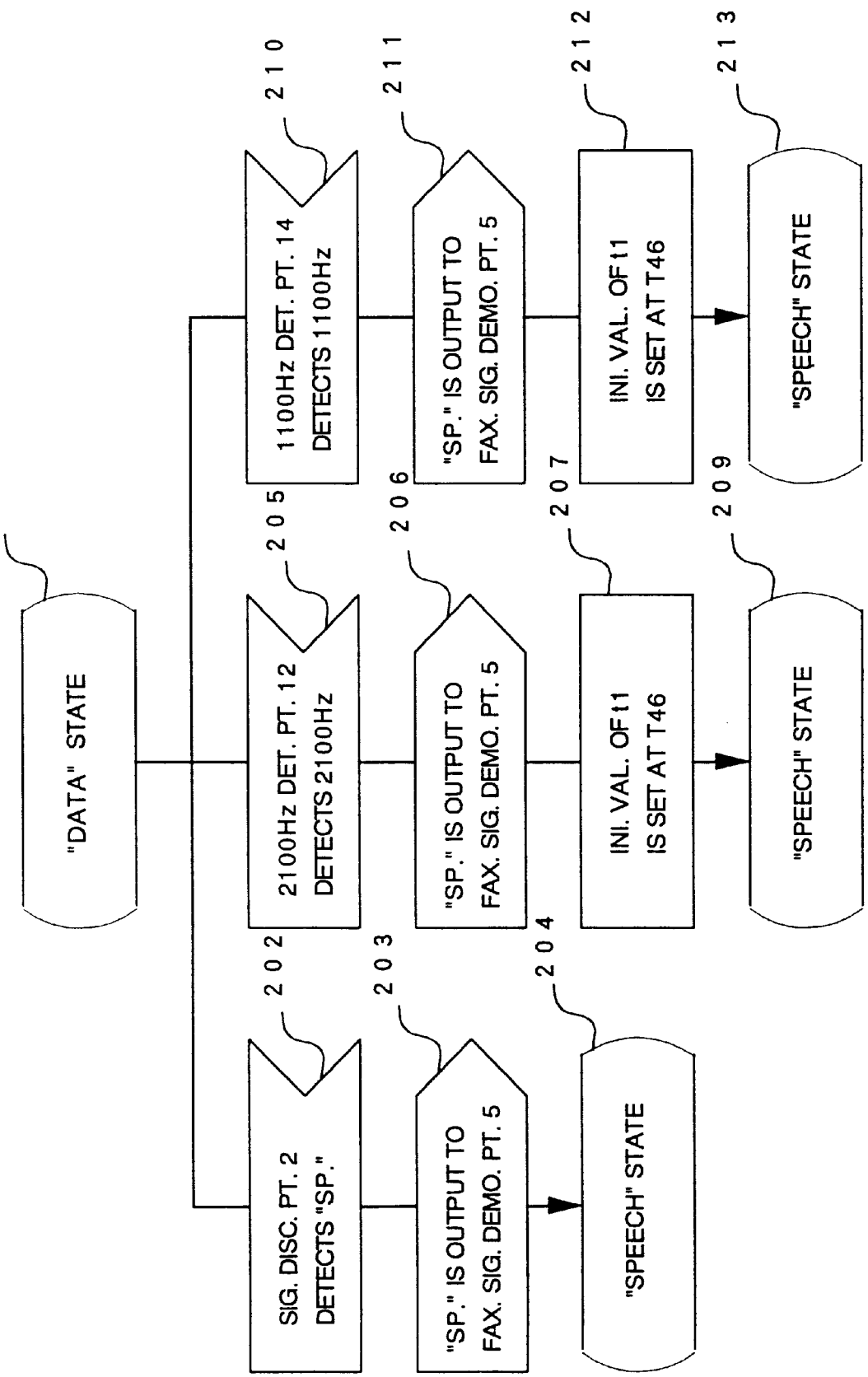

Fig.53

| | DETECT. IN OWN APPA. | | RECE. FM.OPP. APPA. | | | |
|---|---|---|---|---|---|---|
| | 1100Hz DETECT. | 2100Hz DETECT. | 1100Hz DETECT. | 2100Hz DETECT. | SIG. ID. INFO. DA.→SP. | SIG. ID. INFO. SP.→DA. |
| EMBODIMENT 1 | | R→S | | | | |
| ″ 2 | R→S | | | | | |
| ″ 3 | R | R→S | | | | |
| ″ 4 | R→S | R→S | | | | |
| ″ 5 | R→S | S | | | | |
| ″ 6 | | R→S | | R→S | | |
| ″ 7 | | R→S | | | R | S |
| ″ 8 | | R→S | | | | R→S |
| ″ 9 | R→S | | R→S | | | |
| ″ 10 | R→S | | | | R | S |
| ″ 11 | R→S | | | | | R→S |
| ″ 12 | R | R→S | | S | | |
| ″ 13 | R | R→S | | | | S |
| ″ 14 | R | S | R | | | S |
| ″ 15 | R | S | R | S | | |
| ″ 16 | R | S | | | R | S |
| ″ 17 | R→S | S | R | | | |
| ″ 18 | R→S | R→S | | | | |
| ″ 19 | R→S | R→S | R→S | R→S | | |
| ″ 20 | R→S | R→S | | | R | S |
| ″ 21 | R→S | R→S | | | | R→S |
| ″ 22 | DISABLE ← | | | ○ | | |
| ″ 23 | DISABLE ← | | | | | ○ |
| ″ 24 | | ○→ | R DISABLE | | | |
| ″ 25 | R→S | R→S | | | | |
| ″ 26 | | R→S | | R→S | | |
| ″ 27 | | R→S | | | | R→S |

Fig.54
| SYMBOL | NAME |
|---|---|
|  | STATE SYMBOL |
| 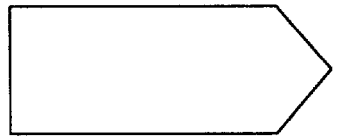 | OUTPUT SYMBOL |
| 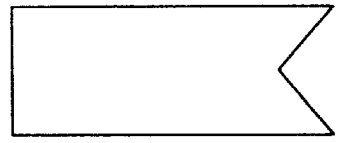 | INPUT SYMBOL |
|  | TASK SYMBOL |

SIGNAL DISCRIMINATION APPARATUS, A METHOD FOR DISCRIMINATING A SIGNAL, AND A SIGNAL TRANSMITTING APPARATUS FOR VOICEBAND SIGNALS

BACKGROUND OF THE INVENTION

1. Field of the Invention

The present invention relates to a signal discrimination apparatus which identifies types of signals transmitted in a telephone communication line, e.g., determining whether a speech signal or a voiceband data signal is transmitted. In addition, the present invention relates to a signal transmitting apparatus for voiceband signals, wherein the signal discrimination apparatus is applied.

2. Description of the Related Art

A Digital Circuit Multiplication Equipment (called a DCME, hereinafter) is an example of a voiceband signal transmitting apparatus in which a signal discrimination apparatus is applied.

FIG. 55 shows an example configuration of the DCME. Reference numbers starting with a letter S such as S1, S2, . . . , in the drawings of this specification indicate signal lines. However, when indicating contents of signals transmitted in the signal lines is more helpful to understand the description than indicating the signal lines themselves, the contents of the signals transmitted in the signal lines are designated with the reference numbers starting with the letter S. Namely, in the following description, there are cases that the reference numbers starting with the letter S designate signal lines and are indicate contents of signals transmitted in the signal lines. Accordingly, the indications of contents can be differently stated depending upon how the signals are transmitted. There is a case of signals being stated in singular or plural.

In FIG. 55, an input signal S16, an activity detecting part 1, a signal discriminating part 2, a transmission controlling part 3, an encoding part 4, a facsimile signal demodulating part 5, a frame assembling part 6, a 2100 Hz detecting part 12, and a 1100 Hz detecting part 14 are shown. The input signal S16 of M channels is input into the DCME. The activity detecting part 1 judges whether each channel of the input signal S16 of M channels is active or silent, and outputs the judgement result as an activity detection result S1. The signal discriminating part 2 judges whether each channel of the input signal S16 of M channels is a speech signal or voiceband data signal, and outputs the judgement result as a signal discrimination result S2. The transmission controlling part 3 controls the encoding part 4, facsimile signal demodulating part 5 and the frame assembling part 6 based on the activity detection result S1 and the signal discrimination result S2, and outputs control information S3 to an opposite side apparatus (not shown, an apparatus having the same configuration as the apparatus of FIG. 55). The encoding part 4 includes encoders to the number of m, and encodes signals of m channels out of the input signal S16 of M channels based on designation of the transmission controlling part 3 in a low bit rate encoding fashion. The facsimile signal demodulating part 5 includes modems to the number of n, and demodulates signals of n channels out of the input signal S16 of M channels based on designation of the transmission controlling part 3. The frame assembling part 6 assigns encoded signals S4 of m channels and demodulated signals S5 of n channels to bits in a specified frame of the DCME, based on designation of the transmission controlling part 3. Then, the frame assembling part 6 outputs a generated DCME frame to the opposite side apparatus. The 2100 Hz detecting part 12 detects whether or not a tone of 2100 Hz exists in each channel of the input signal S16, and outputs a detection result S12. The 1100 Hz detecting part 14 detects whether or not a tone of 1100 Hz exists in each channel of the input signal S16, and outputs a detection result S14. Transmitting functions of the DCME are realized by the activity detecting part 1, signal discriminating part 2, transmission controlling part 3, encoding part 4, facsimile signal demodulating part 5, frame assembling part 6, 2100 Hz detecting part 12 and 1100 Hz detecting part 14.

In FIG. 55, a receiving controller 7, a frame disassembling part 8, a decoding part 9, a facsimile signal modulating part 10 and a pseudo background noise generating part 11 are also shown. The receiving controller 7 controls the decoding part 9, the facsimile signal modulating part 10, the pseudo background noise generating part 11 and the frame disassembling part 8 based on control information S20 received from the opposite side apparatus. The frame disassembling part 8 disassembles a DCME frame S19 received from the opposite side apparatus into an encoded signal S8 and a demodulated signal S21 depending upon designation of the receiving controller 7. Then, the frame disassembling part 8 outputs the encoded signal S8 and the demodulated signal S21 to the decoding part 9 and the facsimile signal modulating part 10. The decoding part 9 includes decoders to the number of m, and decodes the encoded signals S8 of m channels based on designation of the receiving controller 7. The facsimile signal modulating part 10 includes modems to the number of n, and modulates demodulated facsimile signals S21 of n channels based on designation of the receiving controller 7. The pseudo background noise generating part 11 generates a pseudo background noise based on designation of the receiving controller 7. Receiving functions of the DCME are realized by the receiving controller 7, frame disassembling part 8, decoding part 9, facsimile signal modulating part 10 and the pseudo background noise generating part 11.

Transmitting operation of the DCME will now be explained with reference to FIG. 55. It is known that there exists about 60 to 70% silent time out of the entire calling time in conversational speech signals such as a telephone communication, because one listens to another's speech without speaking. Therefore, it is possible to increase efficiency of transmission by connecting a communication line of m (m<M) channels with signals of active speech channel out of input signals S16 of M channels and transmitting them. In the DCME, the activity detecting part 1 judges whether active or silent for each channel of the input signal S16 of M channels. The detection result S1 is transmitted to the transmission controlling part 3. The transmission controlling part 3 sends control information, relating to assignment of input channels to the encoders, to the encoding part 4 via a signal line S26, based on the detection result S1. The control information relating to the assignment tells that channels, wherein activity is recognized, in the input signal S16 of M channels should be assigned to the encoders to the number of m (m<M) inside the encoding part 4 at a first priority.

The encoding part 4 encodes the input signals assigned to the encoders to the number of m in a low bit rate encoding fashion, and outputs the encoded signals S4. The encoding algorithm used in the encoding part 4 is for instance, an Adaptive Differential Pulse Code Modulation (called an ADPCM hereinafter) method prescribed in ITU-T (International Telecommunication Union—Telecommunication Standardization Sector) Recommendation G. 726. In the ADPCM method, it is possible to encode an input signal at a bit rate of 64 kbit/s resulting in a bit rate of 40 kbit/s, 32 kbit/s, 24 kbit/s or 16 kbit/s. In the case of applying the ADPCM method in the encoding part 4, it is desirable to select one of the above encoding bit rates based on the kind of input signal to be a speech signal or a voiceband data signal. When an input signal is a speech signal, it is better to select a lower encoding bit rate, within the range of maintaining good speech quality for communication, for efficiently utilizing the line. In this case, the encoding bit rate can be 32 kbit/s or lower. When an input signal is a voiceband data signal, it is necessary to select a higher encoding bit rate of 40 kbit/s in order not to generate a transmission error. Therefore, the signal discriminating part 2 which judges input signals to be speech signals or voiceband data signals is necessary for appropriately setting an encoding bit rate of the encoding part 4.

In the DCME shown in FIG. 55, the signal discriminating part 2 judges each channel of the input signal S16 to be a speech signal ("speech") or a voiceband data signal ("data"), and outputs the judgement result to the transmission controlling part 3. The transmission controlling part 3 sends control information relating to an encoding bit rate of the encoders, to the encoding part 4 via the signal line S26 based on the judgement result. The control information tells that the encoding bit rate of an encoder in the encoding part 4, to which a channel judged to be "data" out of the input signal S16 is assigned, should be at 40 kbit/s, and the encoding bit rate of an encoder in the encoding part 4, to which a channel judged to be "speech" out of the input signal S16 is assigned, should be at 32 kbit/s, 24 kbit/s or 16 kbit/s.

For instance, signals used for personal computer communication or facsimile communication are the voiceband data signals input into the DCME. It is possible to further increase the efficiency in utilizing the communication line, for example, by demodulating facsimile signals in the facsimile signal demodulating part 5 and transmitting them.

In the case of a facsimile signal input into the DCME being transmitted by demodulation, firstly the facsimile signal is input into a channel out of the input signal S16 of M channels and the signal discriminating part 2 judges a signal type for the channel. When the judgement result made by the signal discriminating part 2 is changed from "speech" to "data", the transmission controlling part 3 sends control information relating to an assignment of a modem to the input channel, to the facsimile signal demodulating part 5 via a signal line S18. The control information indicates that the facsimile signal demodulating part 5 should assign the input signal of the above channel to one modem out of modems to the number of n in the facsimile signal demodulating part 5.

Then, the signal of the above channel Is encoded at an encoding bit rate of 40 kbit/s in the encoding part 4 and transmitted to the opposite side apparatus. Simultaneously, in the facsimile signal demodulating part 5, the modem to which the facsimile signal of the above channel is assigned keeps monitoring presence of a signal modulated at a data rate of 300 bit/s, by the ITU-T Recommendation V. 21 Channel No. 2 modulation system used in the ITU-T Recommendation T. 30 protocol. When the signal modulated at the data rate of 300 bit/s is detected, it is recognized that the modulated signal is a facsimile call to be transmitted by demodulation. Then, the facsimile signal demodulating part 5 demodulates the facsimile signal input into the above channel, by the above modem. The facsimile signal demodulating part 5 outputs a demodulated signal S5 to the frame assembling part 6, and outputs control information, which indicates a beginning of transmission by demodulation of the facsimile call, to the transmission controlling part 3 via a signal line S17.

If the facsimile signal demodulating part 5 has not detected a signal modulated at 300 bit/s within a specific time since assigning the input channel to the modem was made based on the control information S18 from the transmission controlling part 3, the facsimile signal demodulating part 5 judges that the facsimile call can not be transmitted by demodulation. Then, the facsimile signal demodulating part 5 releases the assignment of the input channel to the modem. In addition, when a judgement result S2 of the signal discriminating part 2 changes to "speech" from "data", the transmission controlling part 3 judges that the facsimile call can not be transmitted by demodulation, and commands the facsimile signal demodulating part 5 to release the assignment of the input channel to the modem, through the signal line S18.

When the transmission controlling part 3 receives control information from the facsimile signal demodulating part 5 indicating that transmission by demodulation of the facsimile call is started, the transmission controlling part 3 commands the encoding part 4 to release the assignment of the input signal of the above channel to the encoder in the encoding part 4, through the signal line S26. At this moment, transmission of the facsimile call is switched to demodulation by the facsimile signal demodulating part 5, from the ADPCM encoding at 40 kbit/s.

The transmission controlling part 3 sends control information to the frame assembling part 6 through a signal line S27. This control information relates to assigning an encoded signal S4 of each channel output from the encoding part 4 to bits in a specified DCME frame, and relates to assigning a demodulated signal S5 of each channel output from the facsimile signal demodulating part 5 to the bits in the specified DCME frame. Based on the control information, the frame assembling part 6 assigns the encoded signal S4 of each channel and the demodulated signal S5 of each channel to the bits in the DCME frame. Then, the frame assembling part 6 sends data of the generated DCME frame to the opposite side apparatus through a signal line S6.

The transmission controlling part 3 sends control information relating to assigning an input signal of M channels to an encoder, relating to an encoding bit rate of ADPCM encoding, and relating to assigning an encoded signal and a demodulated signal to bits in the DCME frame, to the opposite side apparatus through the signal line S3.

The signal discriminating part 2 inputs the output S12 from the 2100 Hz detecting part 12, the output S14 from the 1100 Hz detecting part 14, and an output S24 from the receiving controller 7. Then, the signal discriminating part 2 resets its judgement result at "speech" or "data" based on these signals.

The 2100 Hz detecting part 12 detects whether or not a tone signal of 2100 Hz exists in the input signal S16, by performing a process such as a frequency analysis for the input signal S16. In the case of the tone signal of 2100 Hz existing, the 2100 Hz detecting part 12 outputs "1", and in the case of the tone signal of 2100 Hz not existing, the 2100 Hz detecting part 12 outputs "0", to the signal line S12 as a 2100 Hz detection result. The signal discriminating part 2 inputs the 2100 Hz detection result S12 and sets the judgement result S2 at "data" when the 2100 Hz tone is detected.

The 1100 Hz detecting part 14 detects whether or not a tone signal of 1100 Hz exists in the input signal S16, by performing a process such as a frequency analysis for the input signal S16. In the case of the tone signal of 1100 Hz existing, the 1100 Hz detecting part 14 outputs "1", and in the case of the tone signal of 1100 Hz not existing, the 1100 Hz detecting part 14 outputs "0", to the signal line S14 as a 1100 Hz detection result. The signal discriminating part 2 inputs the 1100 Hz detection result S14, and sets its judgement result S2 at "speech" when the 1100 Hz tone is detected.

The signal discriminating part 2 inputs the S24, showing a discrimination state of a receiving signal, from the receiving controller 7. When the signal discriminating part 2 detects a leading edge from "0" (speech) to "1" (data) of the discrimination state S24 of the receiving signal, the judgement result S2 is set at "data".

Receiving operation of the DCME will now be explained with reference to FIG. 55. The receiving controller 7 receives various control information output from a transmission controlling part in the opposite side apparatus, through a signal line S20. Depending upon the various control information, the receiving controller 7 outputs control information to the frame disassembling part 8, decoding part 9, facsimile signal modulating part 10 and the pseudo background noise generating part 11.

In addition, the receiving controller 7 judges whether the discrimination state of the receiving signal is "speech" or "data" based on the control information relating to the encoding bit rate of ADPCM encoding, received through the signal line S20. When the receiving controller 7 judges the state to be "speech", the output S24 is set at "0", and when the receiving controller 7 judges the state to be "data", the output S24 is set at "1". This output S24 is sent to the signal discriminating part 2 as stated above, and used for setting the judgement result S2 at "data".

The frame disassembling part 8 receives two kinds of control information from the receiving controller 7 through a signal line S25. One kind of control information relates to a bit assignment in the DCME frame received from the opposite side apparatus, for encoded data to be sent to the decoding part 9. The other kind of control information relates to a bit assignment in the DCME frame for demodulated data to be sent to the facsimile signal modulating part 10. Depending upon the two kinds of control information, the frame disassembling part 8 disassembles the DCME frame received from the opposite side apparatus through a signal line S19, and outputs an encoded signal S8 to the decoding part 9 and a demodulated signal S21 to the facsimile signal modulating part 10.

The decoding part 9 receives two kinds of control information from the receiving controller 7 through a signal line S23. One kind of control information relates to an encoding bit rate of each channel. The other kind of control information relates to an assignment of decoders to the number of m in the decoding part 9, to outputs of M channels from the DCME. Depending upon the two kinds of control information, the decoding part 9 assigns the encoded signal S8 received from the frame disassembling part 8 to one of the decoders to the number of m in the decoding part 9, decodes the assigned signal at an appropriate encoding bit rate, assigns the decoded signal of each channel to one of outputs of M channels of the DCME, and outputs the assigned signal to a signal line S9.

The facsimile signal modulating part 10 receives control information from the receiving controller 7 through a signal line S22. The control information relates to an assignment of modems to the number of n in the facsimile signal modulating part 10, to one of outputs of M channels from the DCME. Depending upon the control information, the facsimile signal modulating part 10 assigns the demodulated signal S21 received from the frame disassembling part 8 to one of the modems to the number of n in the facsimile signal modulating part 10, modulates the assigned signal at an appropriate data rate, assigns the modulated signal of each channel to one of outputs of M channels from the DCME, and outputs the assigned signal to a signal line S10.

The pseudo background noise generating part 11 receives control information from the receiving controller 7 through a signal line S7. Based on the control information, the pseudo background noise generating part 11 generates pseudo background noise for disconnected channels, not connected to the outputs of the decoding part 9 nor to the outputs of facsimile signal modulating part 10, out of the outputs of M channels from the DCME. Then, the pseudo background noise generating part 11 outputs the generated pseudo background noise to the disconnected channels through a signal line S11.

FIG. 56 shows an example of a signal discrimination apparatus used for the DCME. FIG. 56 shows a block diagram of a speech/data discrimination apparatus disclosed in Unexamined Japanese Patent Application 3-250961. A linear converter 101, a power judging part 102, a zero-crossing number judging part 103 and an AND circuit 104 are shown in FIG. 56. The linear converter converts an input PCM (Pulse Code Modulation) signal, being non-linearly quantized by an A-law and such, to a linearly quantized PCM signal.

Operation in FIG. 56 will now be described. A non-linearly quantized PCM signal S16 is converted to a linearly quantized PCM signal S101 in the linear converter 101. The linearly quantized PCM signal S101 is input into the power judging part 102 and the zero-crossing number judging part 103.

The power judging part 102 calculates a power ratio between blocks for the input linearly quantized PCM signal S101. Since signal level fluctuation of a voiceband data signal is smaller than that of a speech signal, a power ratio between blocks for the voiceband data signal is smaller than that for the speech signal. Based on this feature, the power judging part 102 judges whether an input signal is "speech" or "data". In the case of judging the input signal to be "speech", the power judging part 102 outputs "0", and in the case of judging it to be "data", the power judging part 102 outputs "1", to a signal line S102.

The zero-crossing number judging part 103 calculates a zero-crossing number (times of a signal crossing a zero level in a specific time) using the input linearly quantized PCM signal S101. Fluctuation of the zero-crossing number of the voiceband data signal is smaller than that of the speech signal, and a zero-crossing number distribution of the voiceband data signal is restricted within a specific range depending upon the modulation system of a modem. Based on this feature, the zero-crossing number judging part 103 judges whether the input signal is "speech" or "data". In the case of judging the input signal to be "speech", the zero-crossing number judging part 103 outputs "0", and in the case of judging it to be "data", the zero-crossing number judging part 103 outputs "1", to a signal line S103.

The AND circuit 104 calculates AND of an output S102 from the power judging part 102 and an output S103 from the zero-crossing number judging part 103. Then, the AND circuit 104 judges whether the input signal is a speech signal or a voiceband data signal, and outputs the judgement result to a signal line S2.

Namely, when a voiceband data signal is input into the speech/data discrimination apparatus, each of the power judging part 102 and the zero-crossing number judging part 103 judges the input signal to be "data", and sets each of the outputs S102 and S103 at "1". Calculating AND of the output S102 from the power judging part 102 and the output S103 from the zero-crossing number judging part 103, the output S2 of the speech/data discrimination apparatus becomes "1" ("data"). When a speech signal is input into the speech/data discrimination apparatus, one of the power judging part 102 and the zero-crossing number judging part 103 judges the input signal to be "speech", and outputs "0" as the output S102 or S103. Calculating AND of the output S102 from the power judging part 102 and the output S103 from the zero-crossing number judging part 103, the output S2 of the speech/data discrimination apparatus becomes "0" ("speech").

Operation of transmission of a facsimile signal by demodulation, in the case of the signal discrimination apparatus shown in FIG. 56 being provided as the signal discriminating part 2 in the DCME of FIG. 55, will now be explained.

FIG. 57 shows one example of the DCME being applied. In FIG. 57, a transmitting facsimile terminal is connected to one of input/output signal lines of M channels of a DCME located at a place, and a receiving facsimile terminal is connected to one of input/output signal lines of M channels of another DCME located at another place. An image data is transmitted from the transmitting facsimile terminal to the receiving facsimile terminal.

In the DCME to which the transmitting facsimile terminal is connected (called a transmitting DCME, hereinafter), an image data signal from the transmitting facsimile terminal is either encoded at 40 kbit/s or demodulated. Then, the transmitting DCME sends the encoded or demodulated signal to the opposite side DCME, that is the DCME to which the receiving facsimile terminal is connected (called a receiving DCME, hereinafter). The receiving DCME receives the encoded or demodulated signal from the transmitting DCME, decodes or modulates the receiving signal, and outputs the decoded or modulated signal to the receiving facsimile terminal.

FIG. 58 illustrates a signal state at each part inside the transmitting DCME and the receiving DCME in the case of a facsimile signal being input into the DCME. In FIG. 58, it is supposed that each initial state of outputs S2 of the signal discriminating parts 2 inside the transmitting DCME and the receiving DCME is "speech". Signals, transmitted and received between the transmitting facsimile terminal and the receiving facsimile terminal, in the beginning after a call connection, will be described with reference to FIG. 58.

First, the transmitting facsimile terminal outputs a tone of 1100 Hz, called a CNG, to show a non-speech terminal. The receiving facsimile terminal outputs a tone of 2100 Hz, called a CED. After the CED tone, the receiving facsimile terminal outputs a signal called a DIS in order to inform all the functions which belong to the receiving facsimile terminal, for the transmitting facsimile terminal. This DIS signal is modulated at a data rate of 300 bit/s by a method prescribed in Channel No. 2 of ITU-T Recommendation V. 21. The transmitting facsimile terminal receives the DIS signal, selects a function out of the functions designated by the DIS signal, and outputs a signal called a DCS in order to inform the selected function for the receiving facsimile terminal. This DCS signal is also modulated at a data rate of 300 bit/s by the method prescribed in Channel No. 2 of ITU-T Recommendation V. 21.

In the receiving DCME, when a CED tone (2100 Hz) is output from the receiving facsimile terminal, the output S12 of the 2100 Hz detecting part 12 is changed to "1" (detected) from "0" (not detected) by detecting the CED tone. The leading edge of the 2100 Hz detection result S12 from "0" (not detected) to "1" (detected) causes the judgement result S2 of the signal discriminating part 2 to set at a "data" state.

On changing to "data" from "speech" of the judgement result S2 of the signal discriminating part 2, assigning a modem is performed in the facsimile signal demodulating part 5 at the receiving DCME. Since then, this modem keeps monitoring the presence of the DIS signal modulated at a data rate of 300 bit/s by the method of V. 21 Channel No. 2.

When the receiving facsimile terminal outputs a DIS signal to the receiving DCME, the facsimile signal demodulating part 5 in the receiving DCME recognizes that a call from the transmission side is a facsimile call which can be transmitted by demodulation. Since then, transmission of the facsimile call is switched to a transmission by demodulation from the transmission by ADPCM encoding at 40 kbit/s.

In the transmitting DCME, when the receiving controller 7 recognizes a discrimination state change to "data" from "speech" of a receiving signal, based on control information relating to an encoding bit rate of ADPCM encoding received through the signal line S20, the receiving controller 7 changes the output S24 to "data" from "speech". The above discrimination state change of the receiving signal to "data" from "speech" results from the CED tone (2100 Hz) output from the receiving facsimile terminal. The signal discriminating part 2 sets its output S2 at "data" based on the output S24 from the receiving controller 7.

On changing to "data" from "speech" of the judgement result S2 of the signal discriminating part 2, assigning a modem is performed in the facsimile signal demodulating part 5 at the transmitting DCME. Since then, this modem keeps monitoring the presence of the DCS signal modulated at a data rate of 300 bit/s by the method of V. 21 Channel No. 2.

When the transmitting facsimile terminal outputs a DCS signal to the transmitting DCME, the facsimile signal demodulating part 5 in the transmitting DCME recognizes that a call from the receiving side is a facsimile call which can be transmitted by demodulation. Since then, transmission of the facsimile call is switched to a transmission by demodulation from the transmission by ADPCM encoding at 40 kbit/s.

FIG. 59 shows another example of operation in the case of a facsimile signal being input into the DCME shown in FIG. 55. FIG. 59 shows a signal state of each part on supposition that each initial state of the outputs S2 of the signal discriminating parts 2 in the transmitting DCME and receiving DCME is "data".

In the receiving DCME, when a CED tone (2100 Hz) is output from the receiving facsimile terminal, the output S12 of the 2100 Hz detecting part 12 is changed to "1" (detected) from "0" (not detected) by detecting the CED tone. However, since the initial state of the judgement result S2 of the signal discriminating part 2 is "data", the judgement result S2 of the signal discriminating part 2 is not effected by the leading edge to "1" (detected) from "0" (not detected) of the 2100 Hz detection result S12. Namely, the judgement result S2 of the signal discriminating part 2 keeps "data" state.

Since the judgement result S2 of the signal discriminating part 2 does not change to "data" from "speech", assigning a modem is not performed in the facsimile signal demodulating part 5 at the receiving DCME. Accordingly, this facsimile call can not be transmitted by demodulation but can be transmitted by ADPCM encoding.

In the transmitting DCME, when a CNG tone (1100 Hz) is output from the transmitting facsimile terminal, the output S14 of the 1100 Hz detecting part 14 is changed to "1" (detected) from "0" (not detected) by detecting the CNG tone. The judgement result S2 of the signal discriminating part 2 is reset at "speech" from "data" based on the above change.

After then, even when a CED tone (2100 Hz) is output from the receiving facsimile terminal, the discrimination state S24 of the receiving signal keeps a state of "data" in the transmitting DCME. Since there is no change to "data" from "speech", the output S2 of the signal discriminating part 2 maintains "speech" state without being effected to be "data" by the output S24 of the receiving controller 7.

Then, when the transmitting facsimile terminal outputs a DCS signal to the transmitting DCME, the signal discriminating part 2 in the transmitting DCME judges the DCS signal to be "data". However, there exists a delay-time between the instant of DCS signal being input and the instant of the DCS signal being judged to be "data". In addition, since the discrimination state of the DCS signal at the first moment of being input is "speech", assigning a modem is not performed in the facsimile signal demodulating part 5. Therefore, this facsimile signal can not be transmitted by demodulation but can be transmitted by ADPCM encoding.

Namely, the following requirements are needed for the operation of the signal discriminating part 2 so that the facsimile signal can be transmitted by demodulation through the DCME. One requirement for the operation is that the judgement result S2 should change to "data" from "speech" before a signal modulated at a data rate of 300 bit/s is input. The other requirement for the operation is that the judgement result S2 should be "data" at the beginning of inputting the signal modulated at the data rate of 300 bit/s.

For the purpose of making the change to "data" from "speech" of the judgement result S2 before the signal modulated at the data rate of 300 bit/s is input, it is necessary that the signal discrimination state should be reset at "speech" at the disconnection of a previous call or at the connection of a new call. One method of resetting the judgement result S2 of the signal discriminating part 2 at "speech" is that the facsimile signal demodulating part 5 monitors a protocol for receiving/transmitting facsimile signals, detects an end of a procedure for receiving/transmitting facsimile signals, and outputs a reset signal which tells the signal discriminating part 2 to compulsorily reset its discrimination state at "speech".

However, the above method has the following problem. When a signal, except a facsimile call, such as a modem signal used for personal computer communication is input into the DCME, the facsimile signal demodulating part 5 judges that the call can not be transmitted by demodulation, since the facsimile signal demodulating part 5 does not detect a signal modulated at the data rate of 300 bit/s within a specific time. Therefore, the facsimile signal demodulating part 5 releases the modem assignment. As the facsimile signal demodulating part 5 does not output and is not going to output the reset signal which tells the signal discriminating part 2 to compulsorily reset its discrimination state at "speech", the discrimination state still keeps "data" even when the call for personal computer communication is finished. In the case of another facsimile call being established at this moment, there exists a problem that the facsimile call can not be transmitted by demodulation, because the change to "data" from "speech" of the signal discrimination state does not occur and the modem assignment is not performed for the facsimile call.

There is another method of resetting the judgement result S2 of the signal discrimination state at "speech" at the disconnection of a previous call or at the connection of a new call. The method is that, using a signal discrimination apparatus as shown in FIG. 60, the signal discrimination state can be reset at "data" at the disconnection of a previous call or at the connection of a new call by receiving call control information from the outside. In FIG. 60, the linear converter 101, the power judging part 102, and the zero-crossing number judging part 103 are the same as those shown in FIG. 56. SS and SR are signalling signals in a channel associated signalling system. SS is a signalling signal from a local exchange located at the near side (same side as the present apparatus) and SR is from a remote exchange located at the opposite side (same side as the opposite apparatus). A reset signal generating part 106 inputs the SS and the SR, and generates a reset signal. A discrimination result outputting part 105 judges whether an input signal is "speech" or "data" based on each output from the power judging part 102, zero-crossing number judging part 103 and the reset signal generating part 106.

Now, operation of the signal discrimination apparatus will be stated. The operations of the linear converter 101, power judging part 102 and the zero-crossing number judging part 103 are the same as those described with reference to FIG. 56.

The reset signal generating part 106 inputs the signalling signal SS from the local exchange and the signalling signal SR from the remote exchange. Then, the reset signal generating part 106 detects a call connection based on the state of the signalling signals SS and SR. When the call connection is detected, the reset signal generating part 106 outputs a reset signal as S106.

The reset signal S106 is input into the power judging part 102, zero-crossing number judging part 103 and the discrimination result outputting part 105.

When the reset signal generating part 106 does not output a reset signal to the signal line S106, the discrimination result outputting part 105 applies a judgement result based on an output S102 from the power judging part 102 and an output S103 from the zero-crossing number judging part 103. Namely, the discrimination result outputting part 105 calculates AND of the output S102 from the power judging part 102 and the output S103 from the zero-crossing number judging part 103, and outputs a judgement result of the input signal being "speech" or "data", to the signal line S2.

When the reset signal generating part 106 outputs a reset signal to the signal line S106, the discrimination result outputting part 105 resets its output S2 at "0" ("speech") regardless of the output S102 from the power judging part 102 and the output S103 from the zero-crossing number judging part 103.

While the reset signal generating part 106 outputs a reset signal to the signal line S106, the power judging part 102 and the zero-crossing number judging part 103 reset their internal states in order that the outputs S102 and S103 can be "0" ("speech").

By applying the above configuration, it is possible to make an initial state of an output for signal discrimination at the beginning of call be "speech", because the reset signal generating part 106 detects a call connection based on the state of the signalling signal and resets the discrimination state at "speech" at the moment of detecting the call connection.

However, the signal discrimination apparatus shown in FIG. 60 is provided on condition that the signalling signal SS from a local exchange and the signalling signal SR from a remote exchange are supplied as call control information. Accordingly, there is a problem that the signal discrimination apparatus can not be used in a system where such call control information is not provided.

The present invention is contrived so as to solve the above problems. It is an object of the present invention to provide a signal discrimination apparatus in which a discrimination state can be reset at "speech" at the beginning of a facsimile call even when call control information can not be obtained.

In addition, it is another object of the present invention to provide a signal transmitting apparatus for voiceband signals, wherein a facsimile signal can be transmitted by demodulation even when call control information can not be obtained.

SUMMARY OF THE INVENTION

A signal discrimination apparatus according to one aspect of the present invention includes:

a signal discriminating part for inputting an input signal, identifying a kind of the input signal to be one of "speech" and "data", and outputting a result of the identifying as a discrimination state;

a detecting part for detecting whether the input signal includes a specific tone, and outputting a detection result; and a reset signal generating part for outputting a reset signal to the signal discriminating part based on the detection result;

wherein when the detecting part detects the specific tone, the signal discriminating part firstly resets the discrimination state at "speech" and secondly sets the discrimination state at "data" based on the reset signal.

A signal discrimination apparatus according to another aspect of the present invention includes:

a signal discriminating part for inputting an input signal, identifying a kind of the input signal to be one of "speech" and "data", and outputting a result of the identifying as a discrimination state;

a first detecting part for detecting whether the input signal includes a first tone, and outputting first tone detection information;

a second detecting part for detecting whether the input signal includes a second tone, and outputting second tone detection information; and a reset signal generating part for outputting a reset signal to the signal discriminating part based on the first tone detection information and the second tone detection information;

wherein, based on the reset signal, the signal discriminating part firstly resets the discrimination state at "speech" and secondly sets the discrimination state at "data".

A signal transmitting apparatus for voiceband signals, according to one aspect of the present invention includes:

a signal discriminating part for inputting an input signal, identifying a kind of the input signal to be one of "speech" and "data", and outputting a result of the identifying as a discrimination state;

a detecting part for detecting whether the input signal includes a specific tone, and outputting a detection result as tone detection information;

a reset signal generating part for outputting a reset signal to the signal discriminating part based on at least the detection result output from the detecting part; and a facsimile signal demodulating part for demodulating a facsimile signal in a case of the input signal being the facsimile signal;

wherein at least one of tone detection information detected by the detecting part and signal discrimination information is transmitted to an opposite side apparatus and received from the opposite side apparatus, wherein, based on tone detection information and at least one piece of information from the opposite side apparatus, the signal discriminating part firstly resets the discrimination state at "speech" and secondly sets the discrimination state at "data", and wherein operation of the facsimile signal demodulating part is controlled based on the discrimination state output from the signal discriminating part.

A signal transmitting apparatus for voiceband signals, according to another aspect of the present invention includes:

a signal discriminating part for inputting an input signal, identifying a kind of the input signal to be one of "speech" and "data", and outputting a result of the identifying as a discrimination state;

a first detecting part for detecting whether the input signal includes a first tone, and outputting first tone detection information;

a second detecting part for detecting whether the input signal includes a second tone, and outputting second tone detection information;

a reset signal generating part for outputting a reset signal to the signal discriminating part based on at least one of the first tone detection information and the second tone detection information; and a facsimile signal demodulating part for demodulating a facsimile signal in a case of the input signal being the facsimile signal;

wherein at least one of first tone detection information output from the first detecting part, second tone detection information output from the second detecting part and signal discrimination information output from the signal discriminating part is transmitted to an opposite side apparatus and received from the opposite side apparatus, wherein, based on first tone detection information from the first detecting part, second tone detection information from the second detecting part, and at least one piece of information from the opposite side apparatus, the signal discriminating part firstly resets the discrimination state at "speech" and secondly sets the discrimination state at "data", and wherein operation of the facsimile signal demodulating part is controlled based on the discrimination state output from the signal discriminating part.

A signal transmitting apparatus for voiceband signals, according to another aspect of the present invention includes:

a signal discriminating part for inputting an input signal, identifying a kind of the input signal to be one of "speech" and "data", and outputting a result of the identifying as a discrimination state;

a first detecting part for detecting whether the input signal includes a first tone, and outputting first tone detection information;

a second detecting part for detecting whether the input signal includes a second tone, and outputting second tone detection information;

a reset signal generating part for outputting a reset signal to the signal discriminating part based on the first tone detection information and the second tone detection information; and a facsimile signal demodulating part for demodulating a facsimile signal in a case of the input signal being the facsimile signal;

wherein when the first detecting part detects the first tone, the signal discriminating part firstly resets the discrimination state at "speech" and secondly sets the discrimination state at "data", and when the second detecting part detects the second tone, the signal discriminating part firstly resets the discrimination state at "speech" and secondly sets the discrimination state at "data", and wherein operation of the facsimile signal demodulating part is controlled based on the discrimination state output from the signal discriminating part.

A method for discriminating a signal, according to one aspect of the present invention includes the steps of:

inputting a voiceband signal as an input signal;

discriminating a kind of the input signal to be one of "speech" and "data";

detecting a specific frequency tone in the input signal;

discriminating a kind of the input signal to be "speech", regardless of a result of the step of discriminating a kind of the input signal to be one of "speech" and "data", when the specific frequency tone is detected in the input signal;

setting a timer at an initial value when the specific frequency tone is detected in the input signal; and discriminating the input signal to be "data" when a specific time has passed after the timer is set at the initial value.

A method for discriminating a signal, according to another aspect of the present invention includes the steps of:

inputting a voiceband signal as an input signal;

discriminating a kind of the input signal to be one of "speech" and "data";

detecting a specific frequency tone in the input signal;

discriminating a kind of the input signal to be "speech", regardless of a result of the step of discriminating a kind of the input signal to be one of "speech" and "data", when the specific frequency tone is detected in the input signal;

setting a timer at a first initial value when the specific frequency tone is detected in the input signal;

outputting tone detection information to an opposite side apparatus when the specific frequency tone is detected in the input signal;

discriminating the input signal to be "speech" when tone detection information is received from the opposite side apparatus;

setting the timer at a second initial value being one of equivalent to the first initial value and different from the first initial value, when tone detection information is received from the opposite side apparatus; and discriminating the input signal to be "data" when a specific time has passed after the timer is set at one of the first initial value and the second initial value.

A method for discriminating a signal, according to another aspect of the present invention includes the steps of:

inputting a voiceband signal as an input signal;

discriminating a kind of the input signal to be one of "speech" and "data";

detecting a specific frequency tone in the input signal;

discriminating a kind of the input signal to be "speech", regardless of a result of the step of discriminating a kind of the input signal to be one of "speech" and "data", when the specific frequency tone is detected in the input signal;

setting a first timer at a first initial value when the specific frequency tone is detected in the input signal;

discriminating the input signal to be "data" when a specific time has passed after the first timer is set at the first initial value;

outputting information of a change to "data" from "speech" of discrimination state to an opposite side apparatus when the change to "data" from "speech" of discrimination state is detected;

discriminating the input signal to be "speech" when information of a change to "data" from "speech" of discrimination state is received from the opposite side apparatus;

setting a second timer at a second initial value being one of equivalent to the first initial value and different from the first initial value, when information of a change to "data" from "speech" of discrimination state is received from the opposite side apparatus; and discriminating the input signal to be "data" when a specific time has passed after the second timer is set at the second initial value.

Other objects, features, and advantages of the invention will be apparent from the following description when taken in conjunction with the accompanying drawings.

BRIEF DESCRIPTION OF THE DRAWINGS

In the drawings:

FIG. 43 is a flowchart illustrating operation of the signal transmitting apparatus for voiceband signals according to Embodiment 25 of the present invention;

FIG. 53 is a chart showing features of Embodiments 1 through 27 of the present invention;

FIG. 54 is a chart explaining symbols of SDL (Functional Specification and Description Language);

DETAILED DESCRIPTION OF THE PREFERRED EMBODIMENTS

Figure 1:
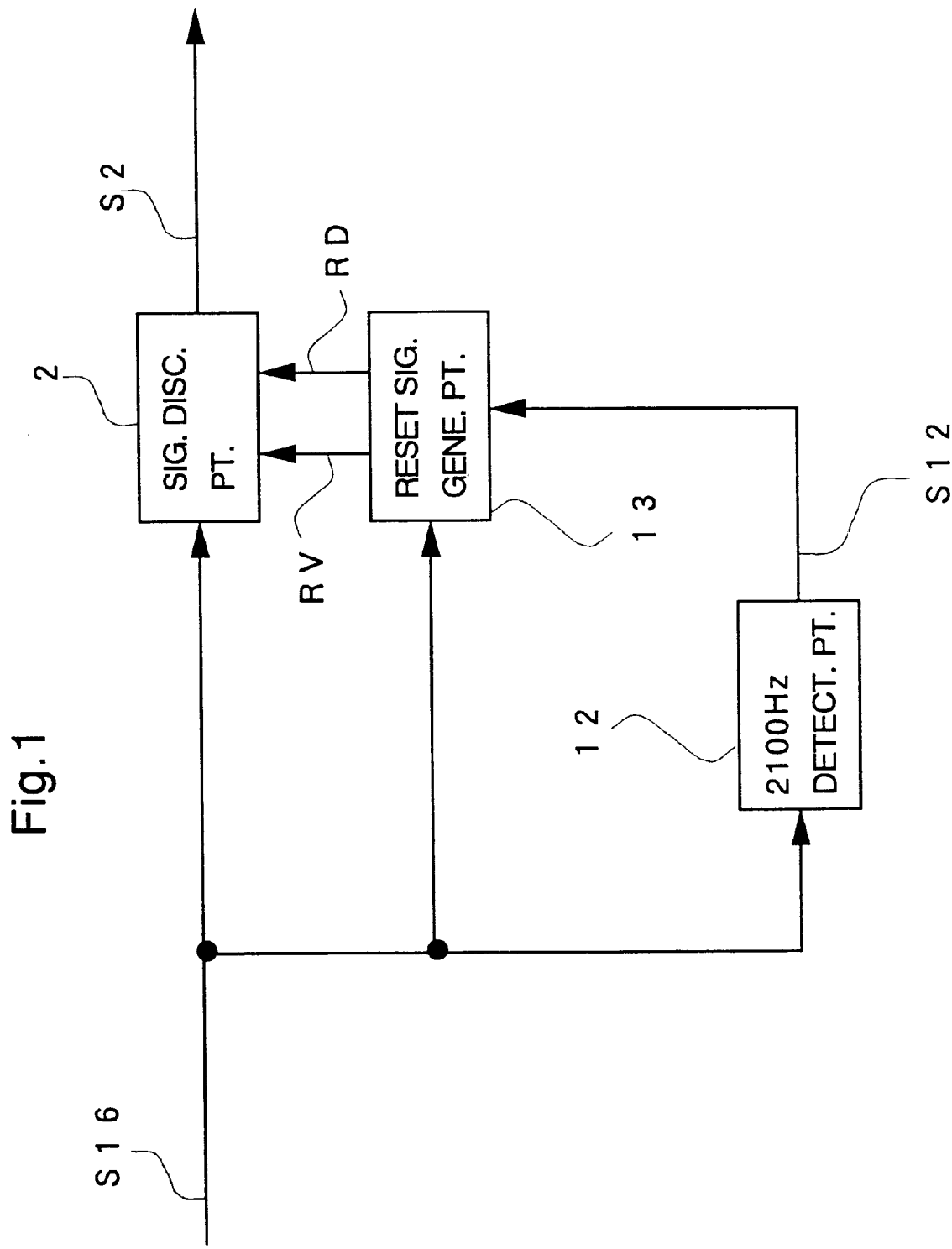
FIG. 1 is a block diagram showing a signal discrimination apparatus according to Embodiment 1 of the present invention.

As stated above, reference numbers starting with the letter S in the drawings of this specification indicate signal lines. However, when indicating contents of signals transmitted in the signal lines is more helpful to understand the description than indicating the signal lines themselves, the contents of the signals transmitted in the signal lines are designated with reference numbers starting with the letter S. Namely, in the following description, there are cases that the reference numbers starting with the letter S designate signal lines and designate contents of signals transmitted in the signal lines. Accordingly, the indications of contents of signals can be differently stated depending upon how the signals are transmitted. There is a case of signals being stated in singular and plural.

Embodiments of the present invention will now be explained. As features of each embodiment are shown in a table of FIG. 53, it is recommended to see FIG. 53 to understand each embodiment. In FIG. 53, R indicates to reset a signal discrimination state at "speech" and S indicates to set a signal discrimination state at "data". The arrow from R to S indicates to set a signal discrimination state at "data" after the signal discrimination state having been reset at "speech". Embodiments 1 through 5 explain the cases that a signal discrimination state is set or reset based on detections of 1100 Hz tone and 2100 Hz tone in an own apparatus. Embodiments 6 through 21 explain the cases that a signal discrimination state in an own apparatus is set or reset based on detection results detected in the own apparatus and an opposite apparatus. Embodiments 22 through 24 explain improved examples.

In the following embodiments, the case that the first tone designates 1100 Hz and the second tone designates 2100 Hz is described. However, the present invention is not restricted to the cases of the 1100 Hz tone and the 2100 Hz tone. The present invention can be applied in the case that a signal discrimination state is reset or set by using another frequency band tone. Namely, the 1100 Hz tone or 2100 Hz tone Is Just an example for the first or second tone.

Embodiment 1

FIG. 1 shows a configuration of a signal discrimination apparatus according to one embodiment of the present invention. In FIG. 1, a 2100 Hz detecting part 12 detects whether or not a tone of 2100 Hz exists in an input signal S16, and outputs a detection result S12. A reset signal generating part 13 inputs the detection result S12 output from the 2100 Hz detecting part 12, and outputs a first reset signal RV and a second reset signal RD. The first reset signal RV is for compulsorily resetting a signal discrimination state at "speech" state and the second reset signal RD is for compulsorily setting a signal discrimination state at "data" state. A signal discriminating part 2 identifies the kind of the input signal S16 to be "speech" or "data" based on the input signal S16, the first reset signal RV and the second reset signal RD from the reset signal generating part 13.

Operation will now be described. The 2100 Hz detecting part 12 detects whether or not a tone signal of 2100 Hz exists in the input signal S16, by performing a process such as a frequency analysis for the input signal S1. In the case of the tone signal of 2100 Hz existing, the 2100 Hz detecting part 12 outputs "1", and in the case of the tone signal of 2100 Hz not existing, the 2100 Hz detecting part 12 outputs "0", to a signal line S12 as a 2100 Hz detection result.

The reset signal generating part 13 inputs the 2100 Hz detection result S12, and generates the first reset signal RV and the second reset signal RD based on the detection result S12.

When the reset signal generating part 13 detects a leading edge to "1" from "0" of the 2100 Hz detection result S12, the reset signal generating part 13 sets an output of the first reset signal RV to be "1" and sets an output of the second reset signal RD to be "0". Then, when a specific time T1 has passed since the detection of the leading edge to "1" from "0" of the 2100 Hz detection result S12, the reset signal generating part 13 sets an output of the first reset signal RV to be "0" and sets an output of the second reset signal RD to be "1". Then, when a specific time T2 (T2>T1) has passed since the detection of the leading edge to "1" from "0" of the 2100 Hz detection result S12, the reset signal generating part 13 sets both the outputs of the first reset signal RV and the second reset signal RD to be "0".

In a case except the above cases, the reset signal generating part 13 sets both the outputs of the first reset signal RV and the second reset signal RD to be "0".

The signal discriminating part 2 identifies the kind of the input signal S16 to be "speech" or "data", by performing a process such as a zero-crossing number analysis and a power analysis. The signal discriminating part 2 inputs the first reset signal RV and the second reset signal RD, and resets the discrimination state at "speech" in the case of the first reset signal RV being "1". In the case of the second reset signal RD being "1", the signal discriminating part 2 sets the discrimination state at "data". When both the first reset signal RV and the second reset signal RD are "0", the discrimination state is not reset at "speech" nor "data". In this case, a discrimination result based on the process such as a zero-crossing number analysis and a power analysis is applied. Depending upon the process, in the case the kind of the input signal is judged to be "speech", the signal discriminating part 2 sets its output S2 at "0", and in the case the kind of the input signal is judged to be "data", the signal discriminating part 2 sets its output S2 at "1".

Figure 2:
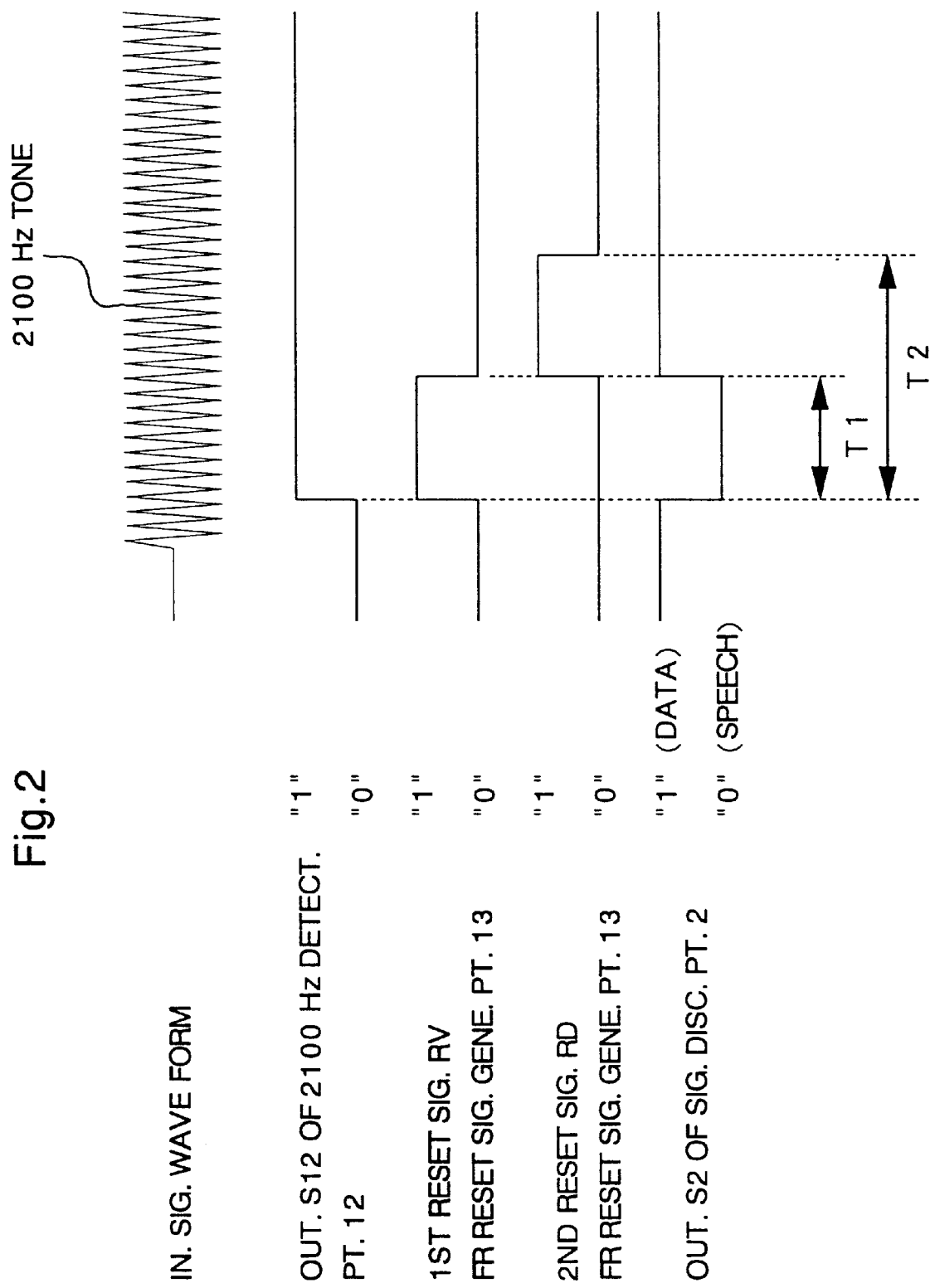
FIG. 2 illustrates operation of the signal discrimination apparatus according to Embodiment 1 of the present invention.

Operation in the case of the present signal discrimination apparatus inputting a tone of 2100 Hz called a CED, which is used in the procedure of a facsimile signal reception and transmission, will now be described with reference to FIG. 2. In FIG. 2, an initial state of an output S2 of the signal discriminating part 2 is supposed to be "data".

When a 2100 Hz tone is input into the signal discrimination apparatus, the 2100 Hz detecting part 12 detects the tone and changes its output S12 to "1" from "0". Until the specific time T1 has completely passed since the leading edge to "1" from "0" of the output of the 2100 Hz detecting part 12, the first reset signal RV output from the reset signal generating part 13 has been set at "1". Therefore, the output S2 of the signal discriminating part 2 has been reset at "0" (speech). Until the specific time T2 has completely passed since the time T1 having passed after the leading edge to "1" from "0" of the output of the 2100 Hz detecting part 12, the second reset signal RD output from the reset signal generating part 13 has been set at "1". Therefore, the output S2 of the signal discriminating part 2 has been set at "1" (data).

By applying the above configuration, the 2100 Hz detecting part 12 detects the tone of 2100 Hz called the CED, which is used in the procedure of a facsimile signal reception and transmission, and the signal discriminating part 2 operates in order to set a discrimination state at "data" after having reset the discrimination state at "speech", based on designation from the reset signal generating part 13. Accordingly, it is possible to reset the discrimination state at "speech" at the beginning of a facsimile call even when no call control information can be obtained.

Embodiment 2

Figure 3:
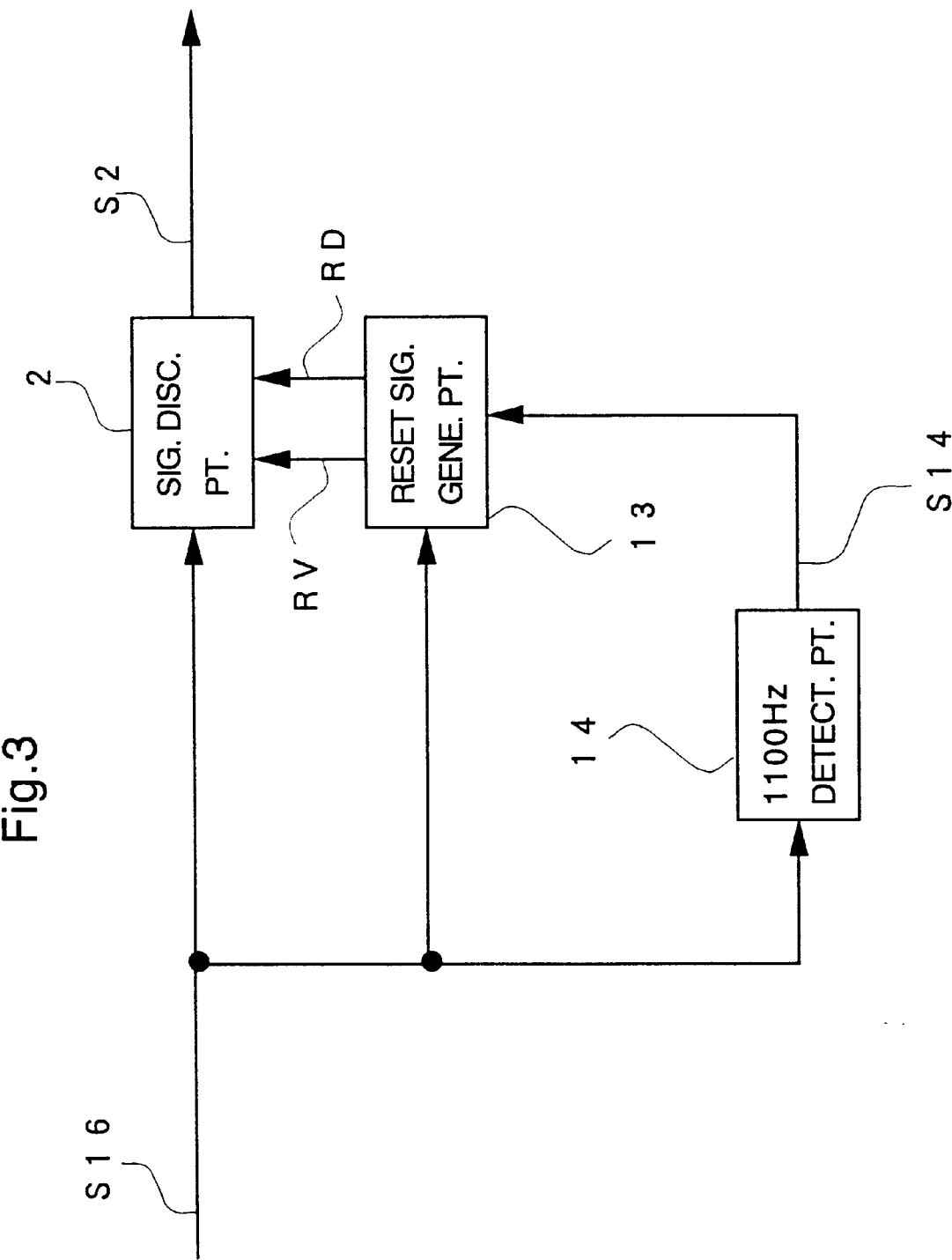
FIG. 3 is a block diagram showing a signal discrimination apparatus according to Embodiment 2 of the present invention.

FIG. 3 shows a configuration of the signal discrimination apparatus according to another embodiment of the present invention. In FIG. 3, a 1100 Hz detecting part 14 detects whether or not a tone of 1100 Hz exists in the input signal S16, and outputs a detection result S14. The reset signal generating part 13 inputs the detection result S14 output from the 1100 Hz detecting part 14, and outputs the first reset signal RV and the second reset signal RD. The first reset signal RV is for compulsorily resetting a signal discrimination state at "speech" state and the second reset signal RD is for compulsorily setting a signal discrimination state at "data" state. The signal discriminating part 2 identifies the kind of the input signal S16 to be "speech" or "data", based on the input signal S16, the first reset signal RV and the second reset signal RD from the reset signal generating part 13.

Operation will now be described. The 1100 Hz detecting part 14 judges whether or not a tone signal of 1100 Hz exists in the input signal S16, by performing a process such as a frequency analysis for the input signal S16. In the case of the tone signal of 1100 Hz existing, the 1100 Hz detecting part 14 outputs "1", and in the case of the tone signal of 1100 Hz not existing, the 1100 Hz detecting part 14 outputs "0", to a signal line S14 as a 1100 Hz detection result.

The reset signal generating part 13 inputs the 1100 Hz detection result S14, and generates the first reset signal RV and the second reset signal RD based on the detection result S14.

When the reset signal generating part 13 detects a leading edge to "1" from "0" of the 1100 Hz detection result S14, the reset signal generating part 13 sets an output of the first reset signal RV to be "1" and sets an output of the second reset signal RD to be "0". Then, when a specific time T3 has passed since the detection of the leading edge to "1" from "0" of the 1100 Hz detection result S14, the reset signal generating part 13 sets an output of the first reset signal RV to be "0" and sets an output of the second reset signal RD to be "1". Then, when a specific time T4 (T4>T3) has passed since the detection of the leading edge to "1" from "0" of the 1100 Hz detection result S14, the reset signal generating part 13 sets both the outputs of the first reset signal RV and the second reset signal RD to be "0".

In a case except the above cases, the reset signal generating part 13 sets both the outputs of the first reset signal RV and the second reset signal RD to be "0". The signal discriminating part 2 identically operates with the one described in Embodiment 1.

Figure 4:
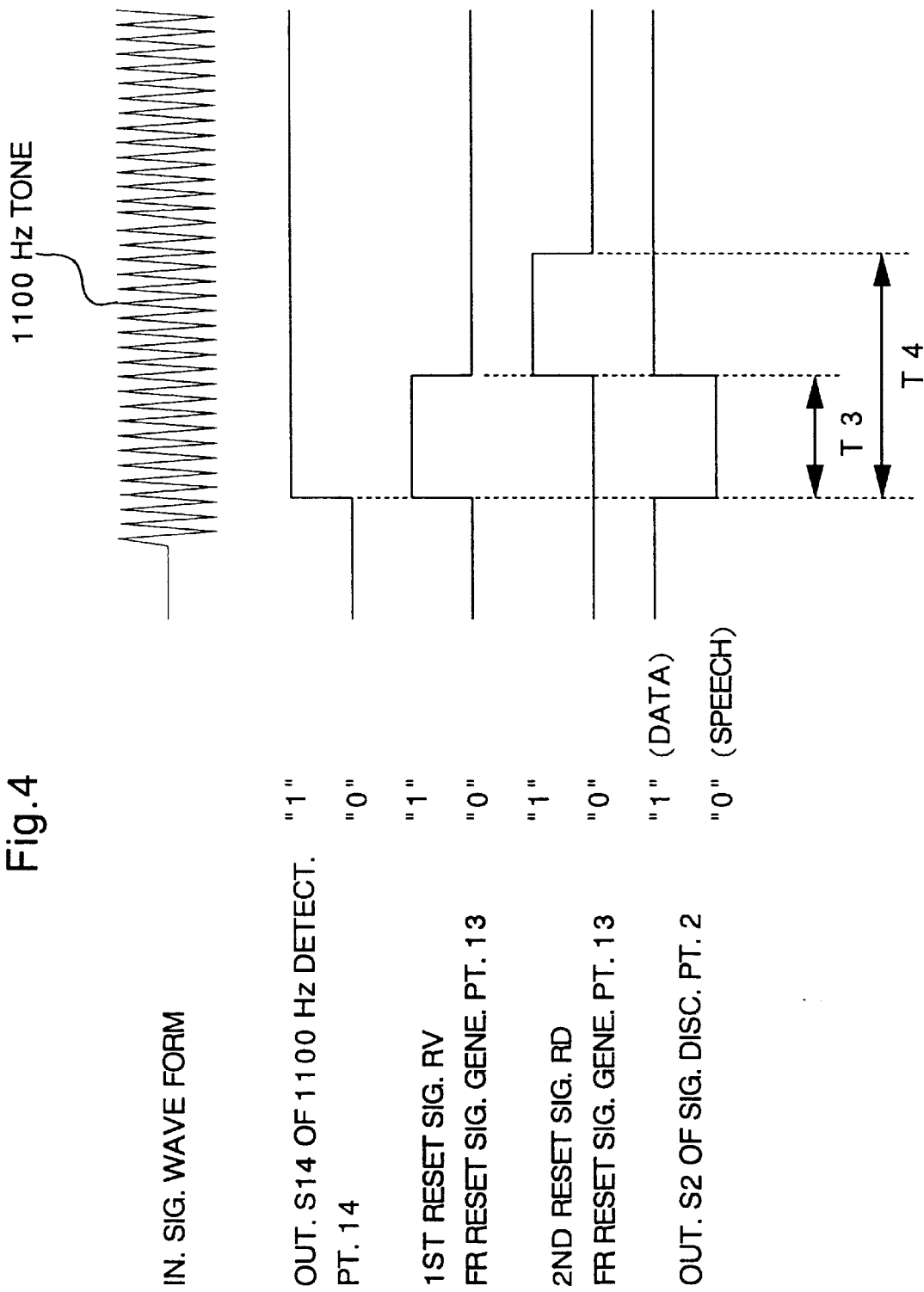
FIG. 4 illustrates operation of the signal discrimination apparatus according to Embodiment 2 of the present invention.

Operation in the case of the present signal discrimination apparatus inputting a tone of 1100 Hz called a CNG, which is used in the procedure of a facsimile signal reception and transmission will now be described with reference to FIG. 4. In FIG. 4, an initial state of an output S2 of the signal discriminating part 2 is supposed to be "data".

When the 1100 Hz tone is input into the signal discrimination apparatus, the 1100 Hz detecting part 14 detects the tone and changes its output S14 to "1" from "0". Until the specific time T3 has completely passed since the leading edge to "1" from "0" of the output of the 1100 Hz detecting part 14, the first reset signal RV output from the reset signal generating part 13 has been set at "1". Therefore, the output S2 of the signal discriminating part 2 has been reset at "0" (speech). Until the specific time T4 has completely passed since the time T3 having passed after the leading edge to "1" from "0" of the output of the 1100 Hz detecting part 14, the second reset signal RD output from the reset signal generating part 13 has been set at "1". Therefore, the output S2 of the signal discriminating part 2 has been set at "1" (data).

By applying the above configuration, the 1100 Hz detecting part 14 detects a tone of 1100 Hz called the CNG, which is used in the procedure of a facsimile signal reception and transmission, and the signal discriminating part 2 operates in order to set a discrimination state at "data" after having reset the discrimination state at "speech", based on designation from the reset signal generating part 13. Accordingly, it is possible to reset the discrimination state at "speech" at the beginning of a facsimile call even when no call control information can be obtained.

Embodiment 3

Figure 5:
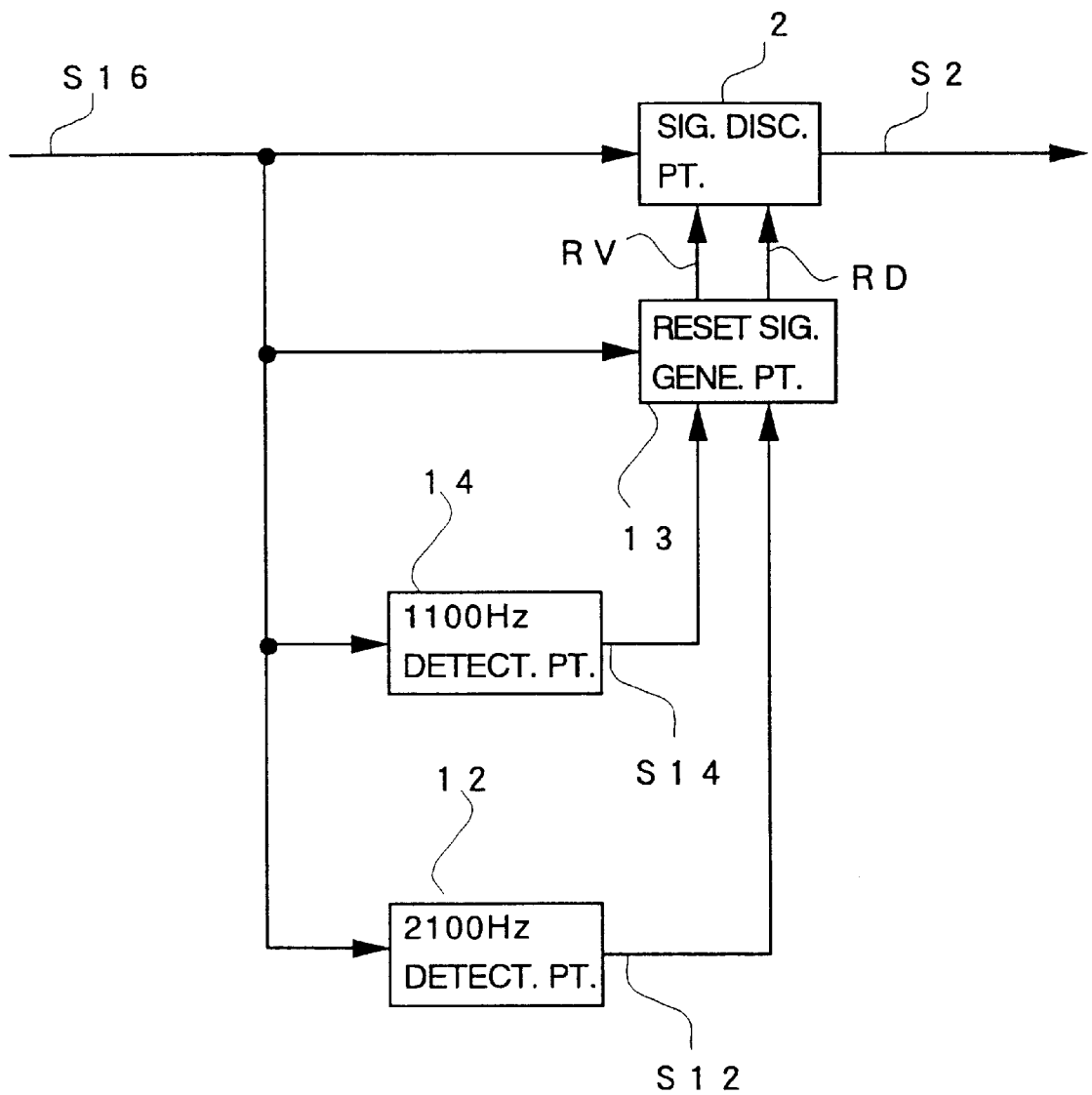
FIG. 5 is a block diagram showing a signal discrimination apparatus according to Embodiment 3, 4 or 5 of the present invention.

FIG. 5 shows a configuration of the signal discrimination apparatus according to another embodiment of the present invention. In FIG. 5, the 1100 Hz detecting part 14 detects whether or not a tone of 1100 Hz exists in the input signal S16, and outputs a detection result S14. The 2100 Hz detecting part 12 detects whether or not a tone of 2100 Hz exists in the input signal S16, and outputs a detection result S12. The reset signal generating part 13 inputs the detection result S14 output from the 1100 Hz detecting part 14 and the detection result S12 output from the 2100 Hz detecting part 12, and outputs the first reset signal RV and the second reset signal RD. The first reset signal RV is for compulsorily resetting a signal discrimination state at "speech" state and the second reset signal RD is for compulsorily setting a signal discrimination state at "data" state. The signal discriminating part 2 identifies the kind of the input signal S16 to be "speech" or "data", based on the input signal S16, the first reset signal RV and the second reset signal RD from the reset signal generating part 13.

Operation will now be described. The 1100 Hz detecting part 14 identically operates with the one described in Embodiment 2. The 2100 Hz detecting part 12 identically operates with the one described in Embodiment 1. The reset signal generating part 13 inputs the 1100 Hz detection result S14 and the 2100 Hz detection result S12, and generates the first reset signal RV and the second reset signal RD based on the detection results S14 and S12.

When the reset signal generating part 13 detects a leading edge to "1" from "0" of the 1100 Hz detection result S14, the reset signal generating part 13 sets an output of the first reset signal RV to be "1" and sets an output of the second reset signal RD to be "0". Then, when a specific time T5 has passed since the detection of the leading edge to "1" from "0" of the 1100 Hz detection result S14, the reset signal generating part 13 sets both outputs of the first reset signal RV and the second reset signal RD to be "0".

Operation in the case of the reset signal generating part 13 detecting a leading edge to "1" from "0" of the 2100 Hz detection result S12 is the same as that in Embodiment 1 explained with reference to FIG. 2.

In a case except the above cases, the reset signal generating part 13 sets both the outputs of the first reset signal RV and the second reset signal RD to be "0". The signal discriminating part 2 identically operates with the one described in Embodiment 1.

Figure 6:
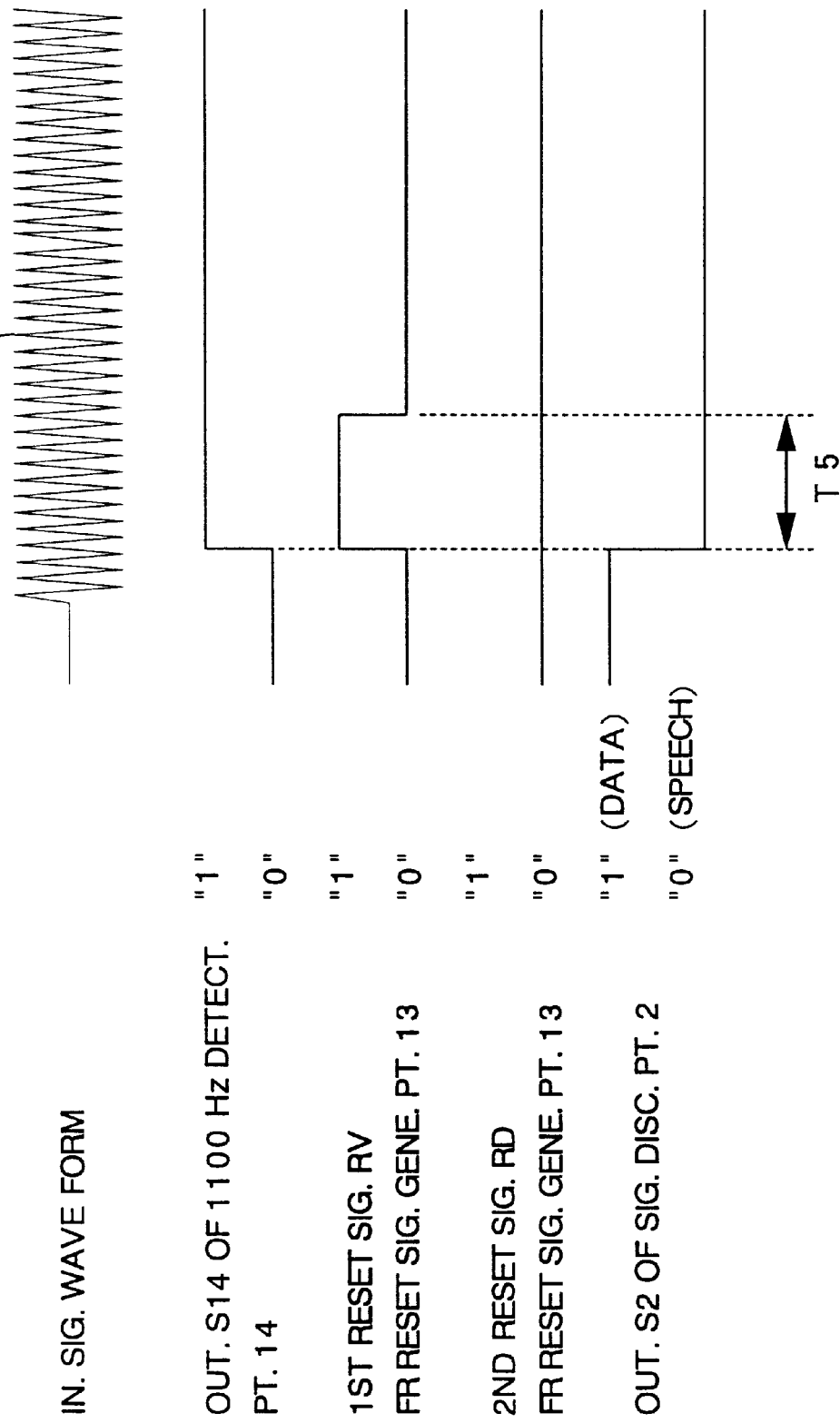
FIG. 6 illustrates operation of the signal discrimination apparatus according to Embodiment 3 of the present invention.

Operation in the case of the present signal discrimination apparatus inputting a tone of 1100 Hz called the CNG, which is used in the procedure of a facsimile signal reception and transmission will now be described with reference to FIG. 6. In FIG. 6, an initial state of an output S2 of the signal discriminating part 2 is supposed to be "data".

When the 1100 Hz tone is input into the signal discrimination apparatus, the 1100 Hz detecting part 14 detects the tone and changes its output S14 to "1" from "0". Until the specific time T5 has completely passed since the leading edge to "1" from "0" of the output of the 1100 Hz detecting part 14, the first reset signal RV output from the reset signal generating part 13 has been set at "1". Therefore, the output S2 of the signal discriminating part 2 has been reset at "0" (speech).

Operation in the case of the present signal discrimination apparatus inputting a tone of 2100 Hz called the CED, which is used in the procedure of a facsimile signal reception and transmission is the same as that in Embodiment 1 explained with reference to FIG. 2.

By applying the above configuration, the signal discriminating part 2 operates in order to reset a discrimination state at "speech", based on designation from the reset signal generating part 13 when the 1100 Hz detecting part 14 detects a tone of 1100 Hz called the CNG, which is used in the procedure of a facsimile signal reception and transmission. In addition, the signal discriminating part 2 operates in order to set a discrimination state at "data" after having reset the discrimination state at "speech", based on designation from the reset signal generating part 13 when the 2100 Hz detecting part 12 detects a tone of 2100 Hz called the CED, which is used in the procedure of a facsimile signal reception and transmission. Accordingly, it is possible to reset the discrimination state at "speech" at the beginning of a facsimile call even when no call control information can be obtained.

Embodiment 4

As have been stated in Embodiment 3, the reset signal generating part 13 outputs the first reset signal RV and the second reset signal RD to the signal discriminating part 2 in order that the signal discriminating part 2 can reset the discrimination state at "speech" when a 1100 Hz tone is detected, and in order that the signal discriminating part 2 can set the discrimination state at "data" after having reset the discrimination state at "speech" when a 2100 Hz tone is detected.

However, with reference to the configuration of FIG. 5, it is acceptable for the reset signal generating part 13 to operate differently from the operation described in Embodiment 3. In FIG. 5, the reset signal generating part 13 inputs the 1100 Hz detection result S14 and the 2100 Hz detection result S12, and generates the first reset signal RV and the second reset signal RD based on the detection results S14 and S12.

When the reset signal generating part 13 detects a leading edge to "1" from "0" of the 1100 Hz detection result S14, the reset signal generating part 13 identically operates with the one described in Embodiment 2.

When the reset signal generating part 13 detects a leading edge to "1" from "0" of the 2100 Hz detection result S12, the reset signal generating part 13 identically operates with the one described in Embodiment 1.

In a case except the above cases, the reset signal generating part 13 sets both outputs of the first reset signal RV and the second reset signal RD to be "0". The 2100 Hz detecting part 12 and the signal discriminating part 2 identically operate with the ones described in Embodiment 1. The 1100 Hz detecting part 14 identically operates with the one described in Embodiment 2.

Operation in the case of the present signal discrimination apparatus inputting a tone of 1100 Hz called the CNG, which is used in the procedure of a facsimile signal reception and transmission, is the same as that described in Embodiment 2 with reference to FIG. 4.

Operation in the case of the present signal discrimination apparatus inputting a tone of 2100 Hz called the CED, used in the procedure of a facsimile signal reception and transmission, is the same as that described in Embodiment 1 with reference to FIG. 2.

By applying the above configuration, the signal discriminating part 2 operates in order to set a discrimination state at "data" after having reset the discrimination state at "speech", based on designation from the reset signal generating part 13, when the 1100 Hz detecting part 14 detects a tone of 1100 Hz called the CNG used in the procedure of a facsimile signal reception and transmission, or when the 2100 Hz detecting part 12 detects a tone of 2100 Hz called the CED used in the procedure of a facsimile signal reception and transmission. Accordingly, it is possible to reset the discrimination state at "speech" at the beginning of a facsimile call even when no call control information can be obtained.

Embodiment 5

As have been stated, in Embodiment 3, the reset signal generating part 13 outputs the first reset signal RV and the second reset signal RD to the signal discriminating part 2 in order that the signal discriminating part 2 can reset the discrimination state at "speech" when a 1100 Hz tone is detected, and in order that the signal discriminating part 2 can set the discrimination state at "data" after having reset the discrimination state at "speech", when a 2100 Hz tone is detected. As also have been stated, in Embodiment 4, the reset signal generating part 13 outputs the first reset signal RV and the second reset signal RD to the signal discriminating part 2 in order that the signal discriminating part 2 can set the discrimination state at "data" after having reset the discrimination state at "speech", when a 1100 Hz tone or a 2100 Hz tone is detected.

However, with reference to the configuration of FIG. 5, it is acceptable for the reset signal generating part 13 to operate differently from the operation described in Embodiments 3 and 4. In FIG. 5, the reset signal generating part 13 inputs the 1100 Hz detection result S14 and the 2100 Hz detection result S12, and generates the first reset signal RV and the second reset signal RD based on the detection results S14 and S12.

When the reset signal generating part 13 detects a leading edge to "1" from "0" of the 1100 Hz detection result S14, the reset signal generating part 13 identically operates with the one described in Embodiment 2.

When the reset signal generating part 13 detects a leading edge to "1" from "0" of the 2100 Hz detection result S12, the reset signal generating part 13 sets an output of the first reset signal RV to be "0" and sets an output of the second reset signal RD to be "1". Then, when a specific time T6 has passed since the detection of the leading edge to "1" from "0" of the 2100 Hz detection result S12, the reset signal generating part 13 sets both the outputs of the first reset signal RV and the second reset signal RD to be "0".

In a case except the above cases, the reset signal generating part 13 sets both the outputs of the first reset signal RV and the second reset signal RD to be "0". The 2100 Hz detecting part 12 and the signal discriminating part 2 identically operate with the ones described in Embodiment 1. The 1100 Hz detecting part 14 identically operates with the one described in Embodiment 2.

Operation in the case of the present signal discrimination apparatus inputting a tone of 1100 Hz called the CNG, used in the procedure of a facsimile signal reception and transmission, is the same as that described in Embodiment 2.

Figure 7:
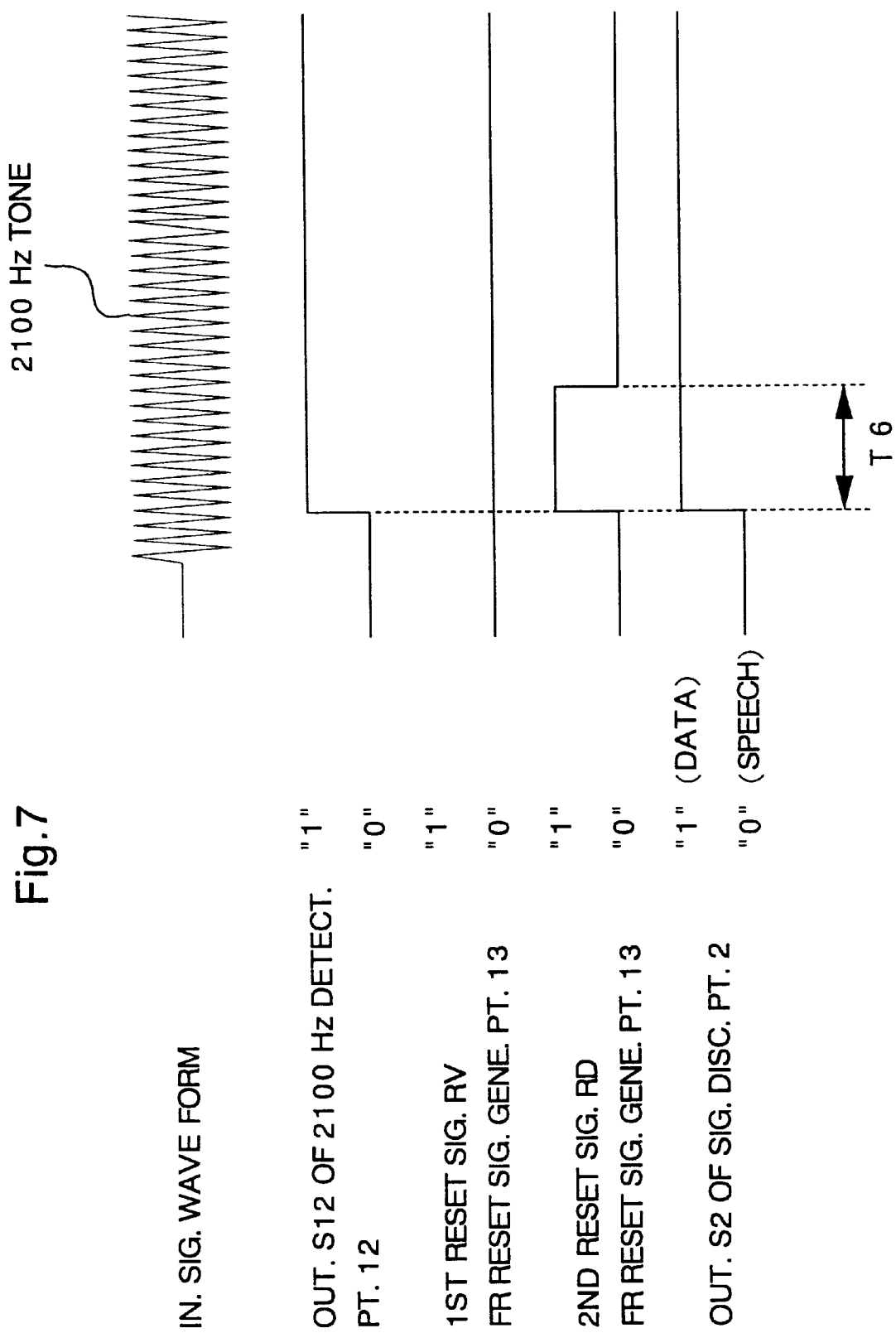
FIG. 7 illustrates operation of the signal discrimination apparatus according to Embodiment 5 of the present invention.

Operation in the case of the present signal discrimination apparatus inputting a tone of 2100 Hz called the CED, used in the procedure of a facsimile signal reception and transmission, will now be stated with reference to FIG. 7. In FIG. 7, an initial state of an output S2 of the signal discriminating part 2 is supposed to be "speech".

When a 2100 Hz tone is input into the signal discrimination apparatus, the 2100 Hz detecting part 12 detects the tone and changes its output S12 to "1" from "0". Until the specific time T6 has completely passed since the leading edge to "1" from "0" of the output of the 2100 Hz detecting part 12, the second reset signal RD output from the reset signal generating part 13 has been set at "1". Therefore, the output S2 of the signal discriminating part 2 has been set at "1" (data).

By applying the above configuration, when the 1100 Hz detecting part 14 detects a tone of 1100 Hz called the CNG, used in the procedure of a facsimile signal reception and transmission, the signal discriminating part 2 operates in order to set a discrimination state at "data" after having reset the discrimination state at "speech", based on designation from the reset signal generating part 13. Accordingly, it is possible to reset the discrimination state at "speech" at the beginning of a facsimile call even when no call control information can be obtained.

Embodiment 6

Figure 8:
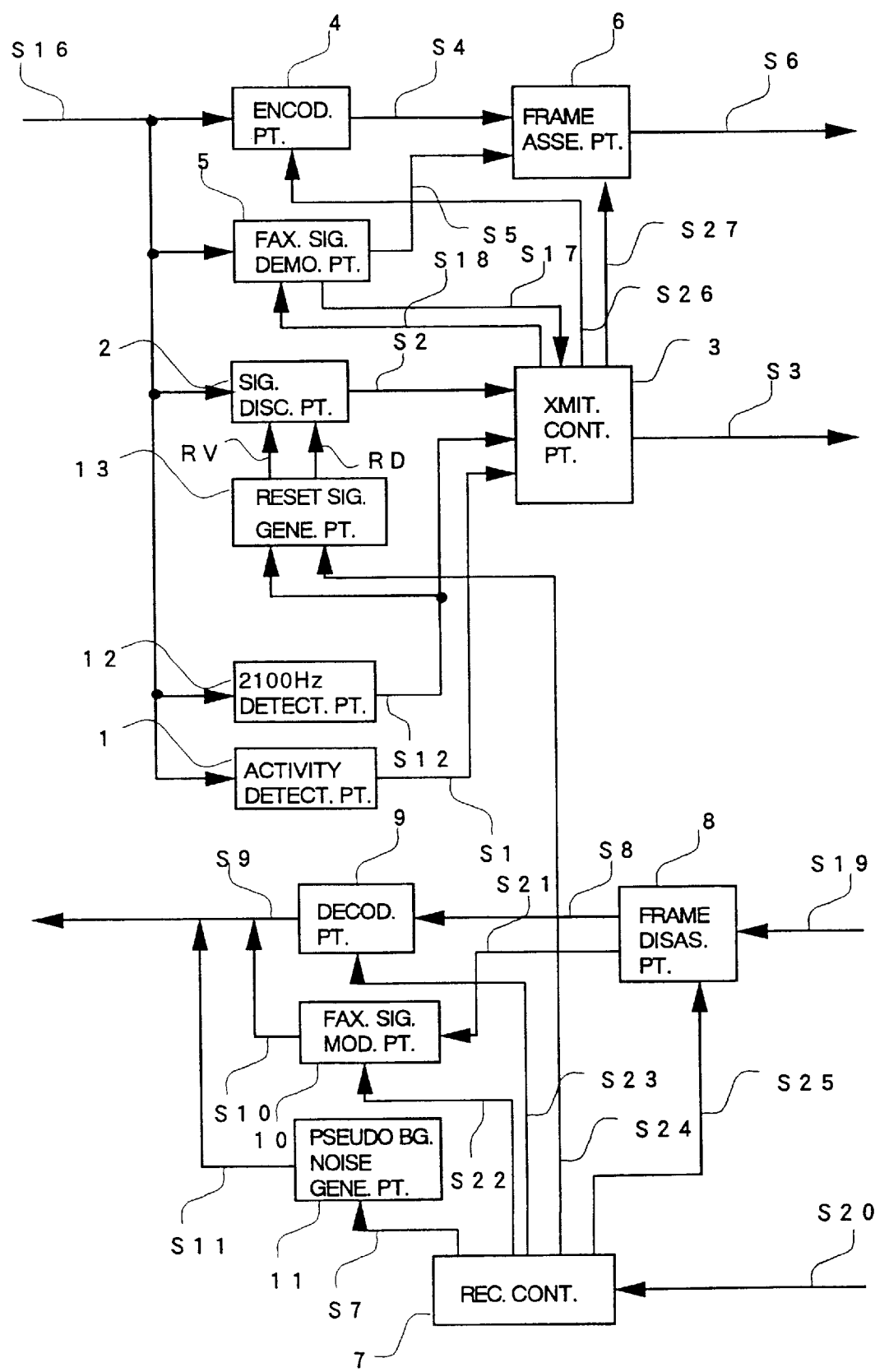
FIG. 8 is a block diagram showing a signal transmitting apparatus for voiceband signals according to Embodiment 6 of the present invention.

FIG. 8 shows a configuration of one embodiment of a signal transmitting apparatus for voiceband signals, according to the present invention. In FIG. 8, the input signal S16 of M channels input into the signal transmitting apparatus for voiceband signals, an activity detecting part 1, the signal discriminating part 2, a transmission controlling part 3, an encoding part 4, a facsimile signal demodulating part 5, a frame assembling part 6, a receiving controller 7, a frame disassembling part 8, a decoding part 9, a facsimile signal modulating part 10, and a pseudo background noise generating part 11 are shown.

In FIG. 8, the 2100 Hz detecting part 12 detects whether or not a tone of 2100 Hz exists in the input signal S16, and outputs a detection result S12. The reset signal generating part 13 outputs the first reset signal RV and the second reset signal RD, based on the 2100 Hz detection result S12 and an output S24 from the receiving controller 7. The first reset signal RV is for compulsorily resetting a judgement result S2 of the signal discriminating part 2 at "speech", and the second reset signal RD is for compulsorily setting a judgement result S2 of the signal discriminating part 2 at "data".

Figure 55:
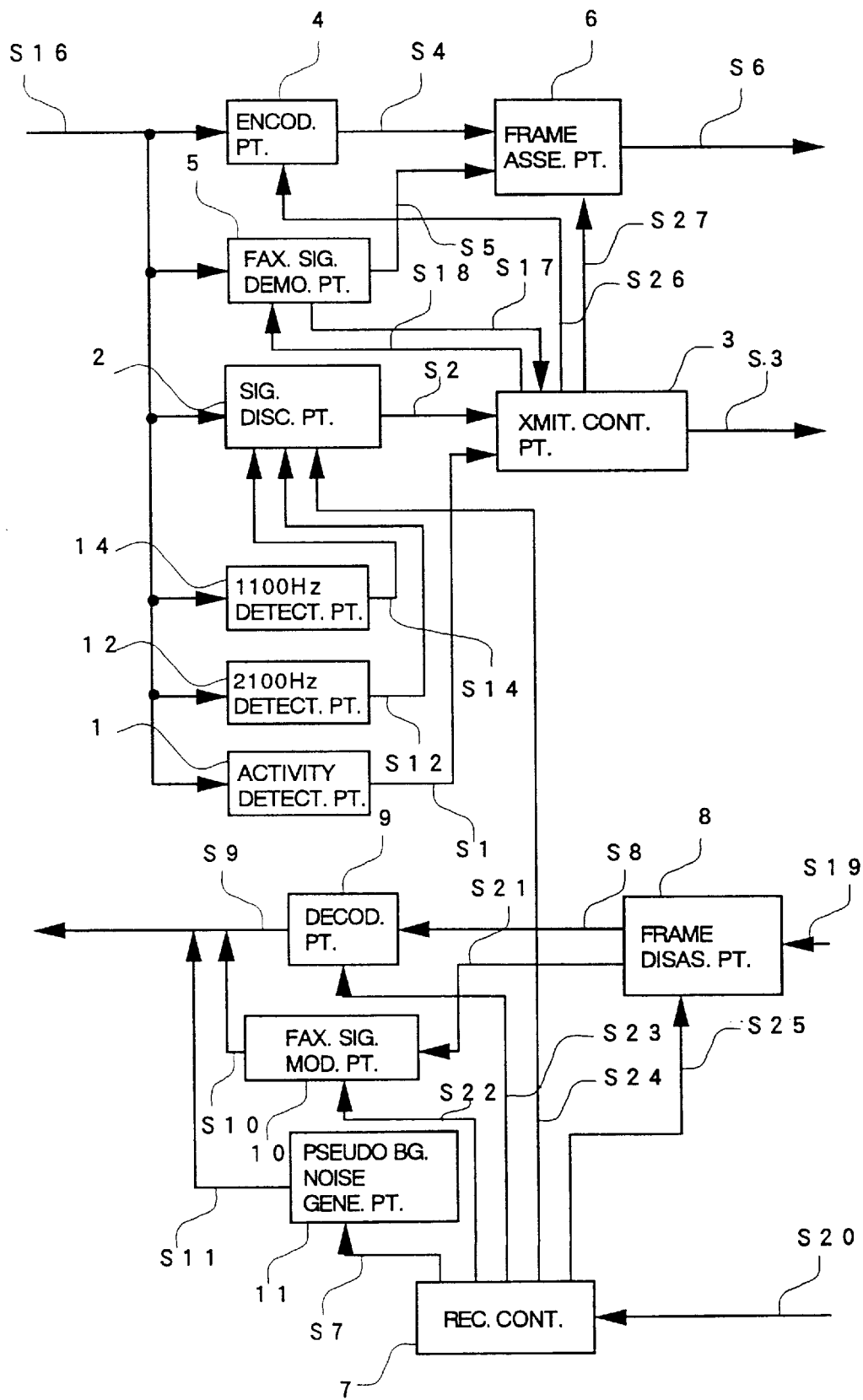
FIG. 55 is a block diagram showing a conventional DCME (Digital Circuit Multiplication Equipment)
Figure 56:
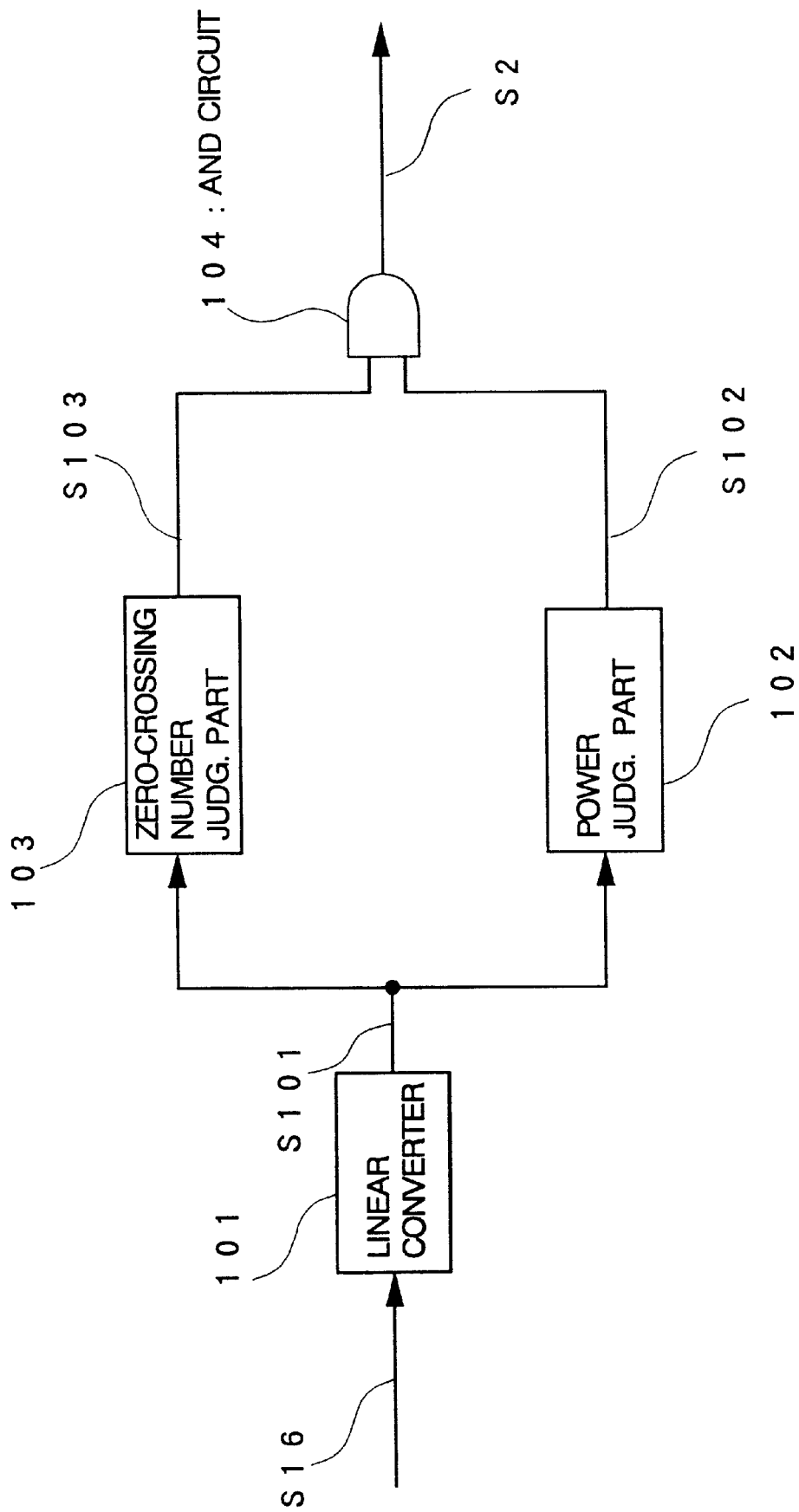
FIG. 56 is a block diagram showing a conventional signal discrimination apparatus.
Figure 57:
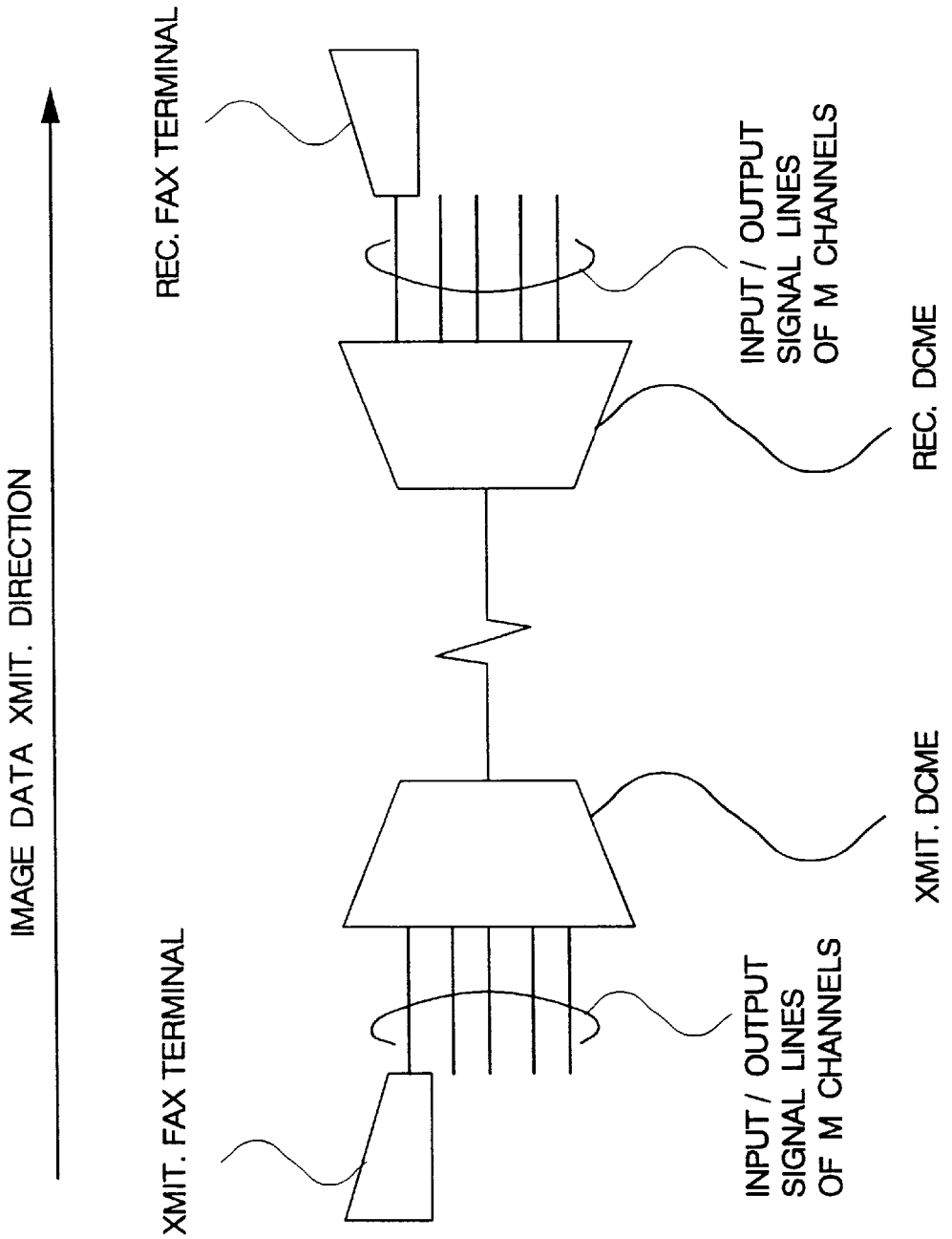
FIG. 57 illustrates how the conventional DCME is applied.
Figure 58:
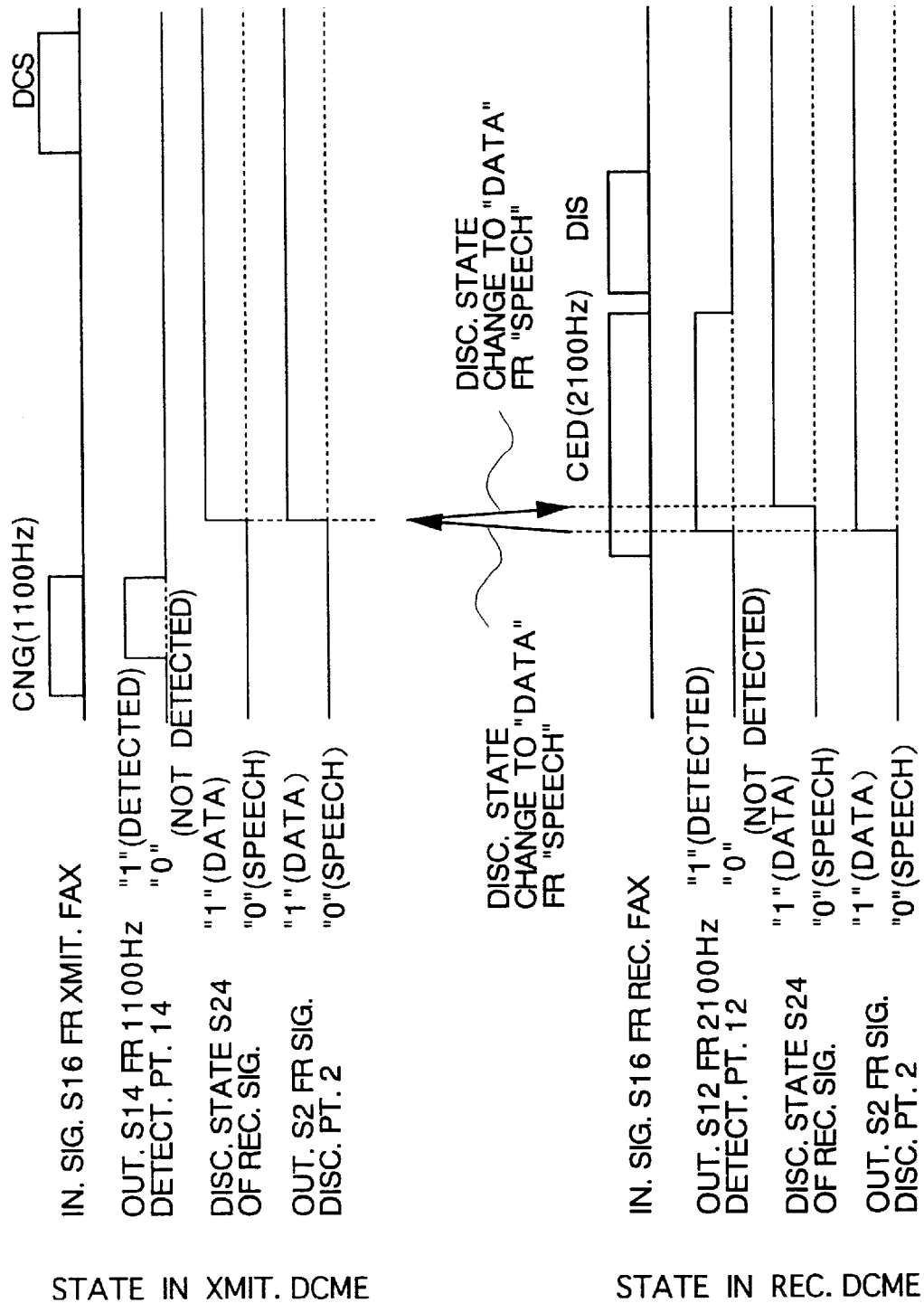
FIG. 58 illustrates operation of the conventional DCME.
Figure 59:
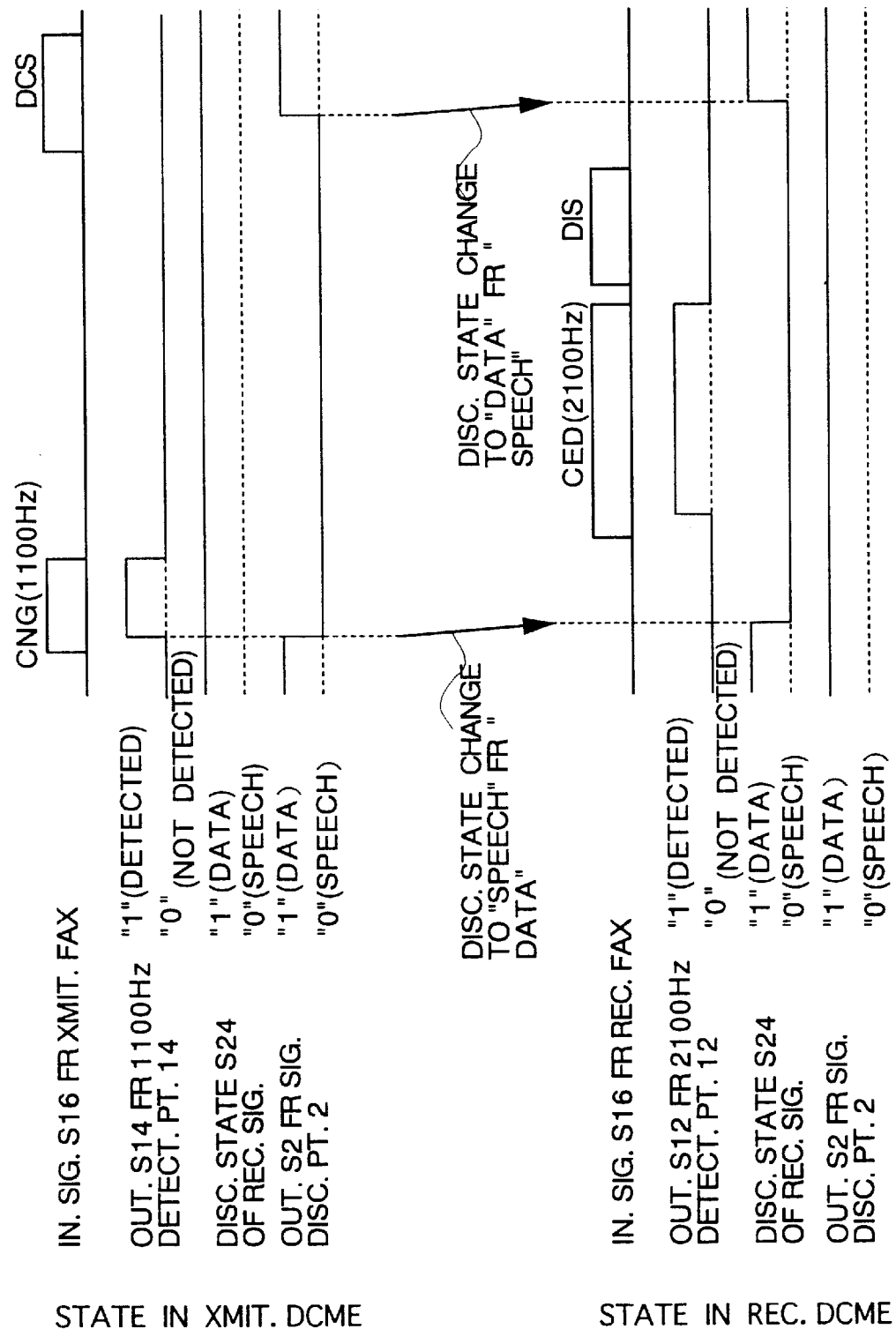
FIG. 59 illustrates operation of the conventional DCME.
Figure 60:
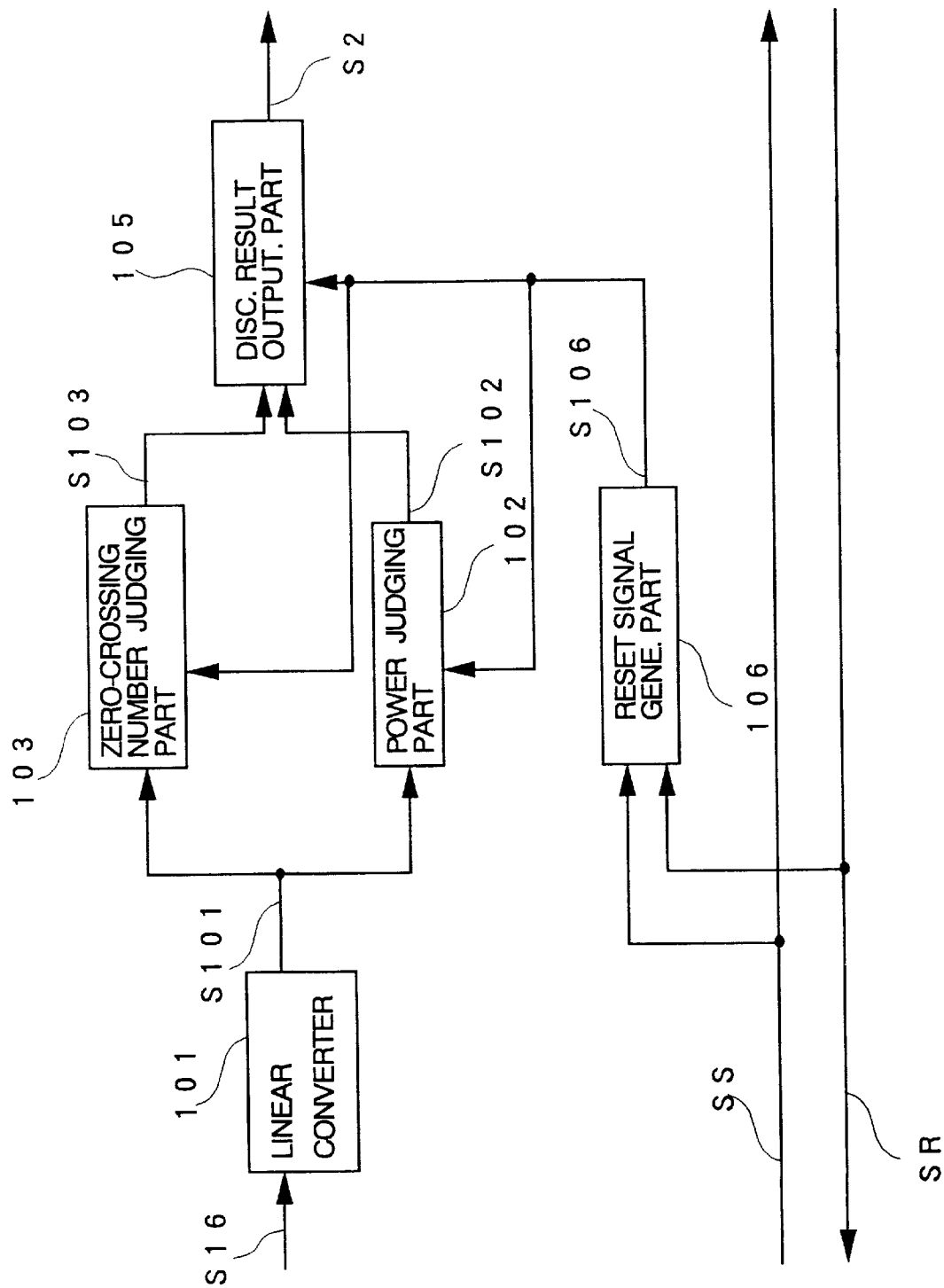
FIG. 60 is a block diagram showing a conventional signal discrimination apparatus.

Operations of the activity detecting part 1, the encoding part 4, the facsimile signal demodulating part 5, the frame assembling part 6, the frame disassembling part 8, the decoding part 9, the facsimile signal modulating part 10, and the pseudo background noise generating part 11 are the same as those described in Related Art with reference to FIG. 55.

The 2100 Hz detecting part 12 identically operates with the one stated in Embodiment 1 with reference to FIG. 1. The 2100 Hz detecting part 12 judges whether or not a tone signal of 2100 Hz exists in the input signal S16, by performing a process such as a frequency analysis for the input signal S16. In the case of the tone signal of 2100 Hz existing, the 2100 Hz detecting part 12 outputs "1", and in the case of the tone signal of 2100 Hz not existing, the 2100 Hz detecting part 12 outputs "0", to the signal line S12 as a 2100 Hz detection result.

The transmission controlling part 3 identically operates with the one stated in Related Art with reference to FIG. 55 except for the following cases. The transmission controlling part 3 inputs the 2100 Hz detection result S12. When a change to "1" from "0" of the 2100 Hz detection result S12 is detected, the transmission controlling part 3 outputs information of 2100 Hz being detected, to an opposite side apparatus through a signal line S3. When a change to "0" from "1" of the 2100 Hz detection result S12 is detected, the transmission controlling part 3 outputs information of 2100 Hz being not detected, to the opposite side apparatus through the signal line S3.

The receiving controller 7 identically operates with the one stated in Related Art with reference to FIG. 55 except for the following cases. The receiving controller 7 sets an output of the signal line S24 at "1" (2100 Hz detected at the receiving side) when the receiving controller 7 receives the information of 2100 Hz being detected, from the opposite side apparatus through a signal line S20, and resets an output of the signal line S24 at "0" (2100 Hz not detected at the receiving side) when the receiving controller 7 receives the information of 2100 Hz being not detected, from the opposite side apparatus through the signal line S20.

The reset signal generating part 13 generates the first reset signal RV and the second reset signal RD based on the 2100 Hz detection result S12 and the output S24 of the receiving controller 7.

When the reset signal generating part 13 detects a leading edge to "1" (detected) from "0" (not detected) of the 2100 Hz detection result S12, the reset signal generating part 13 sets an output of the first reset signal RV to be "1" and sets an output of the second reset signal RD to be "0". Then when the specific time T1 has passed since the detection of the leading edge to "1" from "0" of the 2100 Hz detection result S12, the reset signal generating part 13 sets an output of the first reset signal RV to be "0" and sets an output of the second reset signal RD to be "1". Then, when the specific time T2 (T2>T1) has passed since the detection of the leading edge to "1" from "0" of the 2100 Hz detection result S12, the reset signal generating part 13 sets both the outputs of the first reset signal RV and the second reset signal RD to be "0".

When the reset signal generating part 13 detects a leading edge to "1" (2100 Hz detected at the receiving side) from "0" (2100 Hz not detected at the receiving side) of the output S24 of the receiving controller 7, the reset signal generating part 13 sets an output of the first reset signal RV to be "1" and sets an output of the second reset signal RD to be "0". Then, when a specific time T7 has passed since the detection of the leading edge to "1" from "0" of the output S24 of the receiving controller 7, the reset signal generating part 13 sets an output of the first reset signal RV to be "0" and sets an output of the second reset signal RD to be "1". Then, when a specific time T8 (T8>T7) has passed since the detection of the leading edge to "1" from "0" of the output S24 of the receiving controller 7, the reset signal generating part 13 sets both the outputs of the first reset signal RV and the second reset signal RD to be "0".

In a case except the above cases, the reset signal generating part 13 sets both the outputs of the first reset signal RV and the second reset signal RD to be "0".

The signal discriminating part 2 identifies the kind of the input signal S16 to be "speech" or "data", by performing a process such as a zero-crossing number analysis and a power analysis. The signal discriminating part 2 inputs the first reset signal RV and the second reset signal RD, and resets an internal discrimination state at "speech" in the case of the first reset signal RV being "1", and sets an internal discrimination state at "data" in the case of the second reset signal RD being "1". When both the first reset signal RV and the second reset signal RD are "0", the internal discrimination state is not reset at "speech" nor "data". In this case, a discrimination result based on the process such as a zero-crossing number analysis and a power analysis is applied. Depending upon the process, in the case the kind of the input signal is judged to be "speech", the signal discriminating part 2 sets the discrimination state S2 at "0", and in the case the kind of the input signal is judged to be "data", the signal discriminating part 2 sets the discrimination state S2 at "1".

Figure 9:
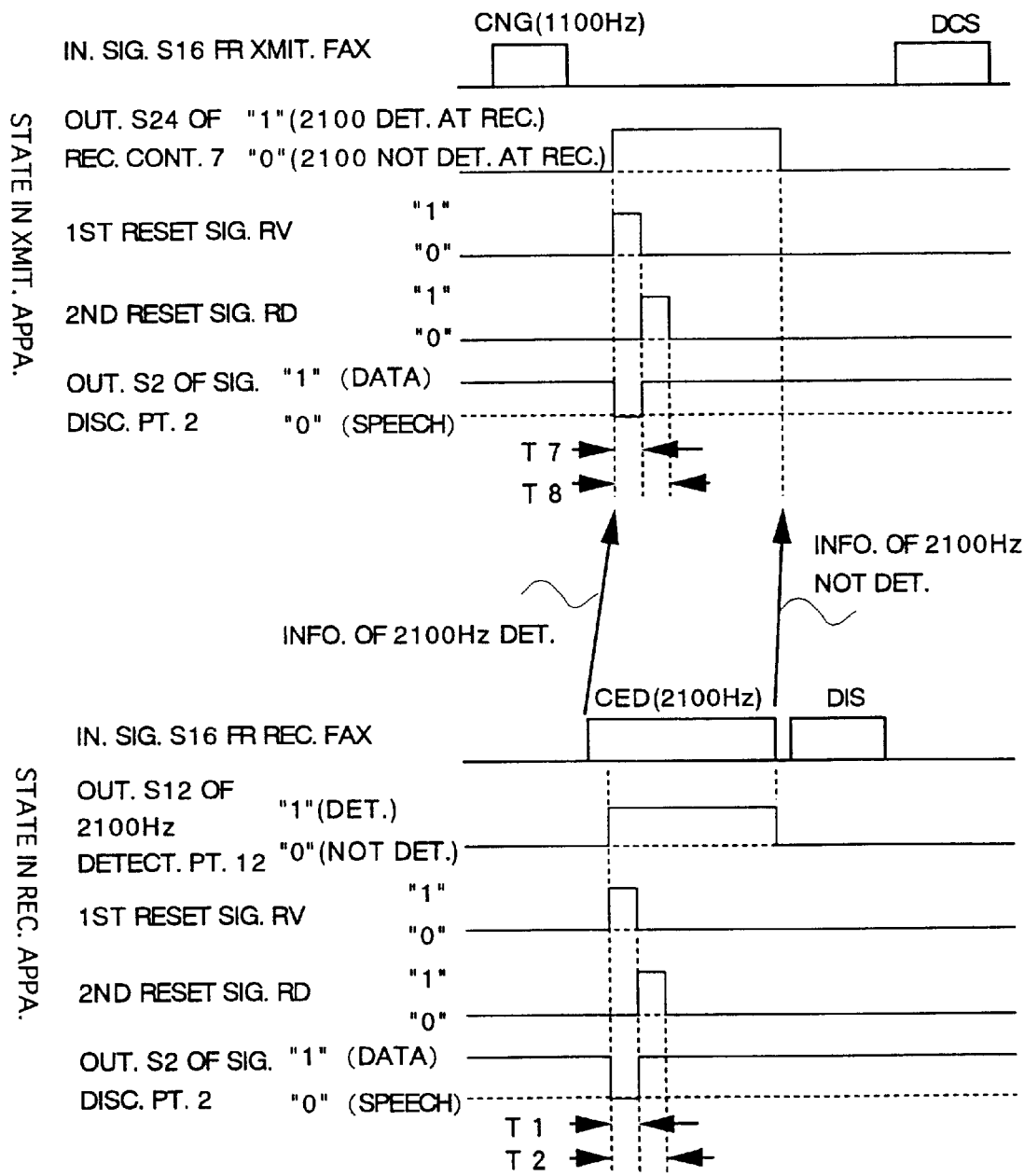
FIG. 9 illustrates operation of the signal transmitting apparatus for voiceband signals according to Embodiment 6 of the present invention.

Operation of discriminating signals in the case of a facsimile signal being input into the present signal transmitting apparatus for voiceband signals, will now be explained with reference to FIG. 9. In FIG. 9, each initial state of the outputs S2 of the signal discriminating parts 2 in the transmitting apparatus and the receiving apparatus is supposed to be "data".

In the signal transmitting apparatus for voiceband signals, to which a receiving facsimile terminal is connected, (called a receiving apparatus, hereinafter), when a 2100 Hz tone is output from the receiving facsimile terminal, the 2100 Hz detecting part 12 detects the tone and changes its output S12 to "1" from "0".

Until the specific time T1 has completely passed since the leading edge to "1" (detected) from "0" (not detected) of the output S12 of the 2100 Hz detecting part 12, the reset signal generating part 13 has set the first reset signal RV to be "1". Therefore, the output S2 of the signal discriminating part 2 has been reset at "0" (speech). Until the specific time T2 has completely passed since the time T1 having passed after the leading edge to "1" from "0" of the output S12 of the 2100 Hz detecting part 12, the reset signal generating part 13 has set the second reset signal RD to be "1". Therefore, the output S2 of the signal discriminating part 2 has been set at "1" (data).

When the output S12 of the 2100 Hz detection part 12 changes to "1" (detected) from "0" (not detected), the transmission controlling part 3 outputs information of 2100 Hz being detected to the opposite side apparatus, that is the signal transmitting apparatus for voiceband signals, to which a transmitting facsimile terminal is connected, (called a transmitting apparatus, hereinafter), through the signal line S3.

In the transmitting apparatus, when the receiving controller 7 receives information of 2100 Hz being detected from the opposite side apparatus, that is the receiving apparatus, through the signal line S20, the receiving controller 7 sets an output of the signal line S24 at "1" (2100 Hz detected at the receiving side).

Until the specific time T7 has completely passed since the output of the signal line S24 changed to "1" (2100 Hz detected at the receiving side) from "0" (2100 Hz not detected at the receiving side), the reset signal generating part 13 has set the first reset signal RV to be "1". Therefore, the output S2 of the signal discriminating part 2 has been reset at "0" (speech). Until the specific time T8 has completely passed since the time T7 having passed after the leading edge to "1" from "0" of the output of the signal line S24, the reset signal generating part 13 has set the second reset signal RD to be "1". Therefore, the output S2 of the signal discriminating part 2 has been set at "1" (data).

By applying the above configuration, in the receiving apparatus, when the 2100 Hz detecting part 12 detects a tone of 2100 Hz, the signal discriminating part 2 operates in order to set its output S2 at "data" after having reset the output S2 at "speech", based on designation from the reset signal generating part 13. Besides, in the transmitting apparatus, when the receiving controller 7 sets an output of the signal line S24 at "1" (2100 Hz detected at the receiving side) by receiving information of 2100 Hz being detected from the receiving apparatus, the signal discriminating part 2 operates in order to set its output S2 at "data" after having reset the output S2 at "speech" based on designation from the reset signal generating part 13. Accordingly, it is possible to set each discrimination state in the transmitting apparatus and in the receiving apparatus at "data" after having reset the discrimination state at "speech", at the beginning of a facsimile call even when no call control information can be obtained. Therefore, channels of input facsimile signals can be assigned to modems in the facsimile signal demodulating part 5. Then, the facsimile signal can be correctly transmitted by demodulation.

Embodiment 7

Figure 10:
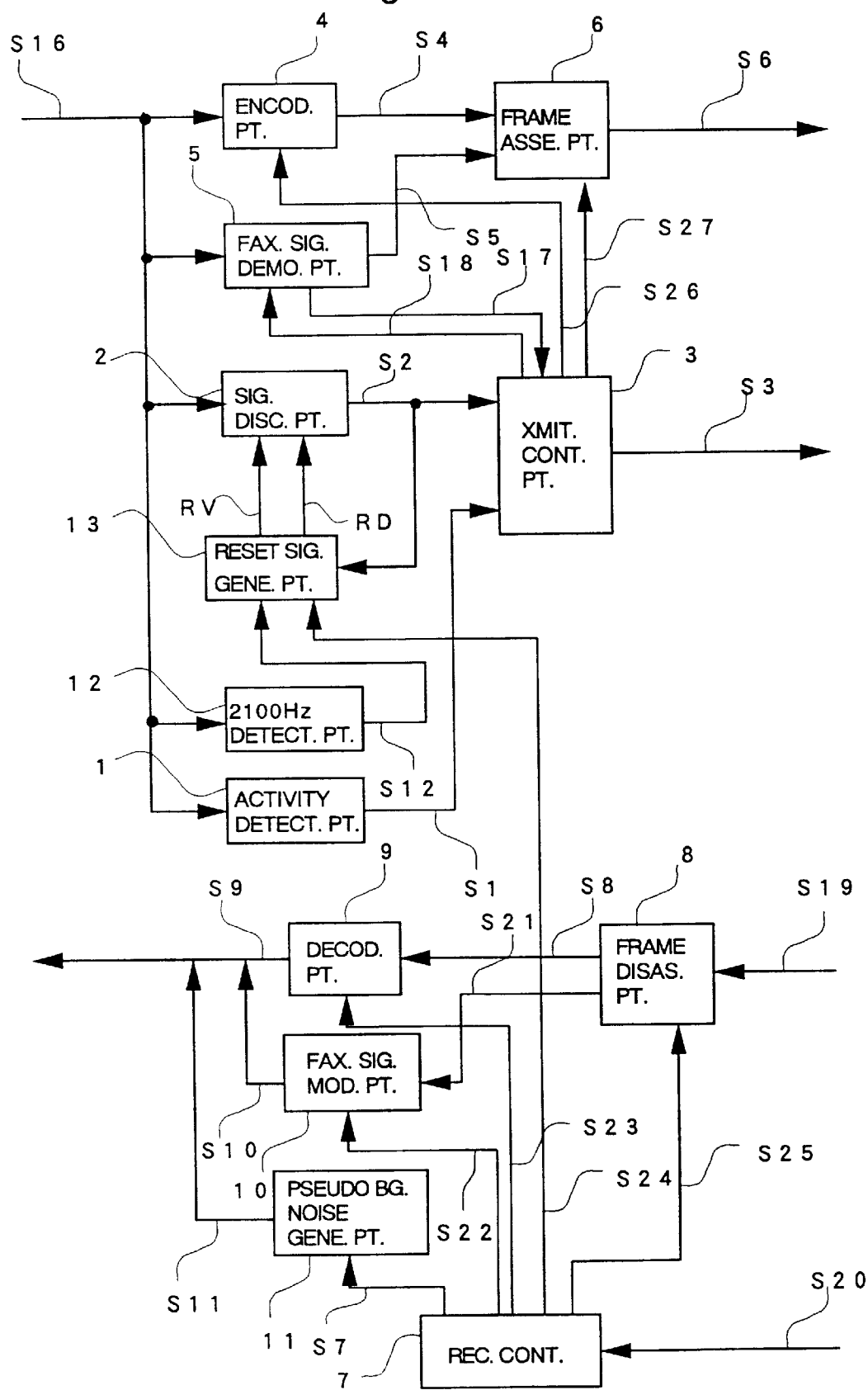
FIG. 10 is a block diagram showing a signal transmitting apparatus for voiceband signals according to Embodiment 7 or 8 of the present invention.

FIG. 10 shows a configuration of another embodiment of the signal transmitting apparatus for voiceband signals, according to the present invention. In FIG. 10, the input signal S16 of M channels input into the signal transmitting apparatus for voiceband signals, the activity detecting part 1, the signal discriminating part 2, the transmission controlling part 3, the encoding part 4, the facsimile signal demodulating part 5, the frame assembling part 6, the receiving controller 7, the frame disassembling part 8, the decoding part 9, the facsimile signal modulating part 10, the pseudo background noise generating part 11, the 2100 Hz detecting part 12 and the reset signal generating part 13 are shown.

Now, operation will be stated. Operations of the activity detecting part 1, the encoding part 4, the facsimile signal demodulating part 5, the frame assembling part 6, the frame disassembling part 8, the decoding part 9, the facsimile signal modulating part 10, and the pseudo background noise generating part 11 are the same as those described in Related Art with reference to FIG. 55.

The 2100 Hz detecting part 12 and the signal discriminating part 2 identically operate with the ones stated in Embodiment 6 with reference to FIG. 8.

The transmission controlling part 3 identically operates with the one stated in Related Art with reference to FIG. 55 except for the following cases. The transmission controlling part 3 inputs the signal discrimination result S2. When information of a change to "0" (speech) from "1" (data) of the signal discrimination result S2 is detected, the transmission controlling part 3 outputs information of speech detection to the opposite side apparatus through the signal line S3. When a change to "1" (data) from "0" (speech) of the signal discrimination result S2 is detected, the transmission controlling part 3 outputs information of data signal detection to the opposite side apparatus through the signal line S3.

The receiving controller 7 identically operates with the one stated in Related Art with reference to FIG. 55 except for the following cases. The receiving controller 7 resets an output of the signal line S24 at "0" (speech at the receiving side) when the receiving controller 7 receives the information of speech signal detection, from the opposite side apparatus through the signal line S20. Besides, when the receiving controller 7 receives the information of data signal detection from the opposite side apparatus through the signal line S20, receiving controller 7 sets an output of the signal line S24 at "1" (data at the receiving side).

The reset signal generating part 13 generates the first reset signal RV and the second reset signal RD based on the 2100 Hz detection result S12 and the output S24 of the receiving controller 7.

When the reset signal generating part 13 detects a leading edge to "1" (detected) from "0" (not detected) of the 2100 Hz detection result S12, the reset signal generating part 13 identically operates with the one stated in Embodiment 6.

When the reset signal generating part 13 detects a trailing edge to "0" (speech at the receiving side) from "1" (data at the receiving side) of the output S24 of the receiving controller 7, the reset signal generating part 13 sets an output of the first reset signal RV to be "1" and sets an output of the second reset signal RD to be "0". Then when a specific time T9 has passed since the detection of the trailing edge to "0" from "1" of the output S24 of the receiving controller 7, the reset signal generating part 13 sets both the outputs of the first reset signal RV and the second reset signal RD to be "0".

However, if the reset signal generating part 13 detects a trailing edge to "0" (speech at the receiving side) from "1" (data at the receiving side) of the output S24 of the receiving controller 7 within a specific time T40 after the detection of the trailing edge to "0" (speech) from "1" (data) of the output S2 of the signal discriminating part 2, the reset signal generating part 13 does not perform the above process. Therefore, the output of the first reset signal RV has been kept to be "0".

When the reset signal generating part 13 detects a leading edge to "1" (data at the receiving side) from "0" (speech at the receiving side) of the output S24 of the receiving controller 7, the reset signal generating part 13 sets an output of the first reset signal RV to be "0" and sets an output of the second reset signal RD to be "1". Then, when a specific time T10 has passed since the detection of the leading edge to "1" from "0" of the output S24 of the receiving controller 7, the reset signal generating part 13 sets both the outputs of the first reset signal RV and the second reset signal RD to be "0".

However, if the reset signal generating part 13 detects a leading edge to "1" (data at the receiving side) from "0" (speech at the receiving side) of the output S24 of the receiving controller 7 within the specific time T40 after the detection of the leading edge to "1" (data) from "0" (speech) of the output S2 of the signal discriminating part 2, the reset signal generating part 13 does not perform the above process. Therefore, the output of the second reset signal RD has been kept to be "0".

In a case except the above cases, the reset signal generating part 13 sets both the outputs of the first reset signal RV and the second reset signal RD to be "0".

Figure 11:
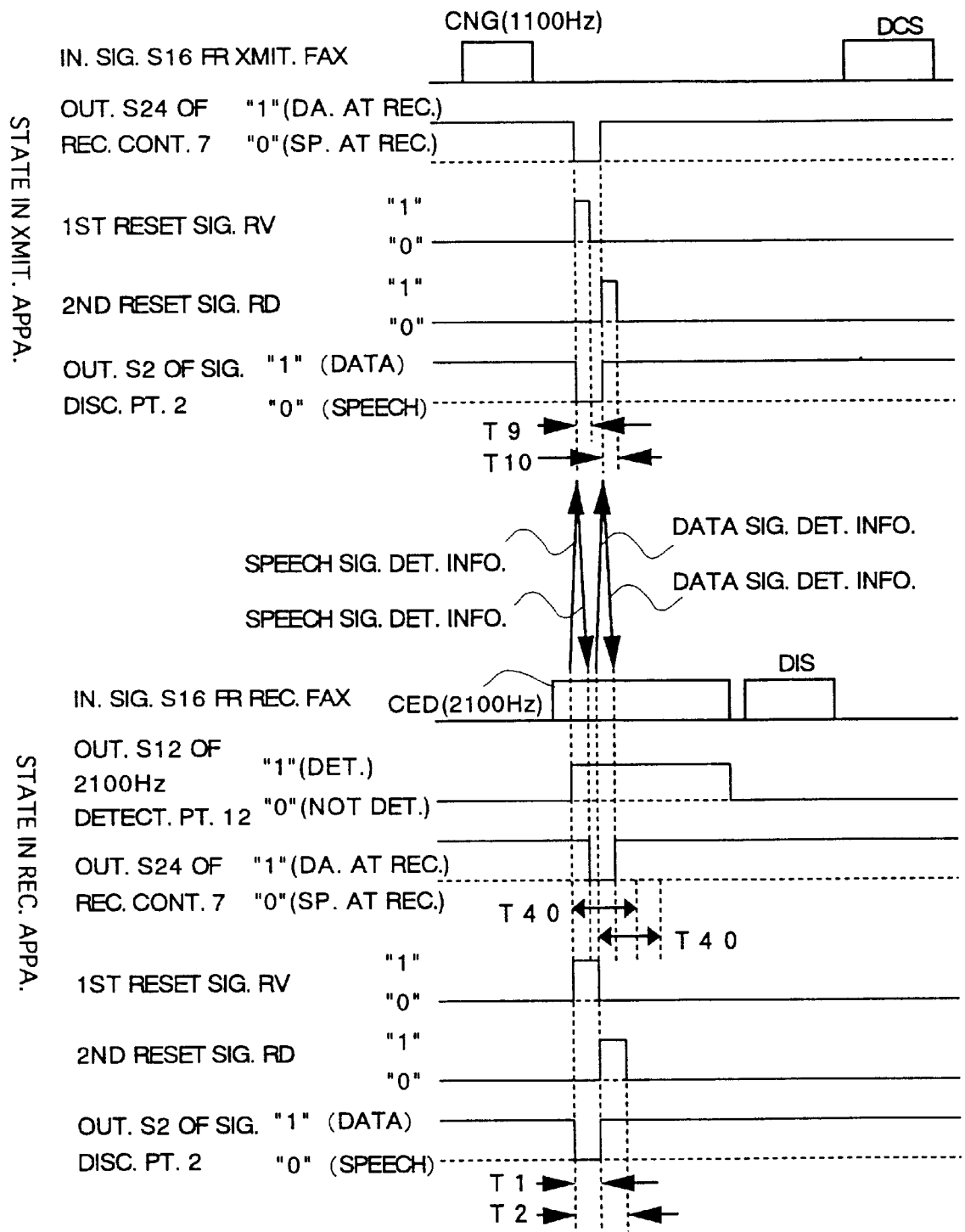
FIG. 11 illustrates operation of the signal transmitting apparatus for voiceband signals according to Embodiment 7 of the present invention.

Operation of discriminating signals in the case of a facsimile signal being input into the present signal transmitting apparatus for voiceband signals, will now be explained with reference to FIG. 11. In FIG. 11, each initial state of the outputs S2 of the signal discriminating parts 2 in the transmitting apparatus and the receiving apparatus is supposed to be "data".

A signal state in the receiving apparatus is the same as the one stated with reference to FIG. 9 in Embodiment 6, whose configuration is shown in FIG. 8.

When the output S2 of the signal discriminating part 2 changes to "0" (speech) from "1" (data), the transmission controlling part 3 in the receiving apparatus outputs information of speech signal detection to the opposite side apparatus, that is the transmitting apparatus, through the signal line S3. Then, when the output S2 of the signal discriminating part 2 changes to "1" (data) from "0" (speech), the transmission controlling part 3 outputs information of data signal detection to the transmitting apparatus, through the signal line S3.

In the transmitting apparatus, when the receiving controller 7 receives information of speech signal detection from the opposite side apparatus, that is the receiving apparatus, through the signal line S20, the receiving controller 7 resets an output of the signal line S24 at "0" (speech at the receiving side). Then, when the receiving controller 7 receives information of data signal detection from the receiving apparatus through the signal line S20, the receiving controller 7 sets an output of the signal line S24 at "1" (data at the receiving side).

Until the specific time T9 has completely passed since the output of the signal line S24 changed to "0" (speech at the receiving side) from "1" (data at the receiving side), the reset signal generating part 13 has set the first reset signal RV to be "1". Therefore, the output S2 of the signal discriminating part 2 has been reset at "0" (speech). Until the specific time T10 has completely passed since the output of the signal line S24 changed to "1" (data at the receiving side) from "0" (speech at the receiving side), the reset signal generating part 13 has set the second reset signal RD to be "1". Therefore, the output S2 of the signal discriminating part 2 has been set at "1" (data).

By applying the above configuration, in the receiving apparatus, when the 2100 Hz detecting part 12 detects a tone of 2100 Hz, the signal discriminating part 2 operates in order to set its output S2 at "data" after having reset the output S2 at "speech", based on designation from the reset signal generating part 13. Besides, when information of speech signal detection is input into the transmitting apparatus from the receiving apparatus, the signal discriminating part 2 resets its output S2 at "speech" based on designation from the reset signal generating part 13. Then, when information of data signal detection is input into the transmitting apparatus from the receiving apparatus, the signal discriminating part 2 operates in order to set its output S2 at "data" based on designation from the reset signal generating part 13. Accordingly, it is possible to set each discrimination state in the transmitting apparatus and in the receiving apparatus at "data" after the discrimination state having been once reset at "speech", at the beginning of a facsimile call even when no call control information can be obtained. Therefore, channels of input facsimile signals can be assigned to modems in the facsimile signal demodulating part 5. Then, the facsimile signal can be correctly transmitted by demodulation.

Embodiment 8

As have been stated, in Embodiment 7, the reset signal generating part 13 outputs the first reset signal RV and the second reset signal RD to the signal discriminating part 2 in order that the signal discriminating part 2 can set the discrimination state at "data" when the reset signal generating part 13 detects a leading edge to "1" (data at the receiving side) from "0" (speech at the receiving side) of the output S24 of the receiving controller 7. In addition, in Embodiment 7, the reset signal generating part 13 outputs the first reset signal RV and the second reset signal RD to the signal discriminating part 2 in order that the signal discriminating part 2 can set the discrimination state at "speech" when the reset signal generating part 13 detects a trailing edge to "0" (speech at the receiving side) from "1" (data at the receiving side) of the output S24 of the receiving controller 7.

However, with reference to the configuration of FIG. 10, it is acceptable for the reset signal generating part 13 to operate differently from the operation described in Embodiment 7.

In the configuration of FIG. 10, when the reset signal generating part 13 detects a leading edge to "1" (data at the receiving side) from "0" (speech at the receiving side) of the output S24 of the receiving controller 7, the reset signal generating part 13 sets an output of the first reset signal RV to be "1" and sets an output of the second reset signal RD to be "0". Then, when a specific time T11 has passed since the detection of the leading edge to "1" from "0" of the output S24 of the receiving controller 7, the reset signal generating part 13 sets an output of the first reset signal RV to be "0" and sets an output of the second reset signal RD to be "1". Then, when a specific time T12 (T12>T11) has passed since the detection of the leading edge to "1" from "0" of the output S24 of the receiving controller 7, the reset signal generating part 13 sets both the outputs of the first reset signal RV and the second reset signal RD to be "0".

However, if the reset signal generating part 13 detects a leading edge to "1" (data at the receiving side) from "0" (speech at the receiving side) of the output S24 of the receiving controller 7 within a specific time T41 after the detection of the leading edge to "1" (data) from "0" (speech) of the output S2 of the signal discriminating part 2, the reset signal generating part 13 does not perform the above process. Therefore, the outputs of the first reset signal RV and the second reset signal RD have been kept to be "0".

When the reset signal generating part 13 detects a leading edge to "1" (detected) from "0" (not detected) of the 2100 Hz detection result S12, the reset signal generating part 13 identically operates with the one in Embodiment 6.

In a case except the above cases, the reset signal generating part 13 sets both the outputs of the first reset signal RV and the second reset signal RD to be "0".

Figure 12:
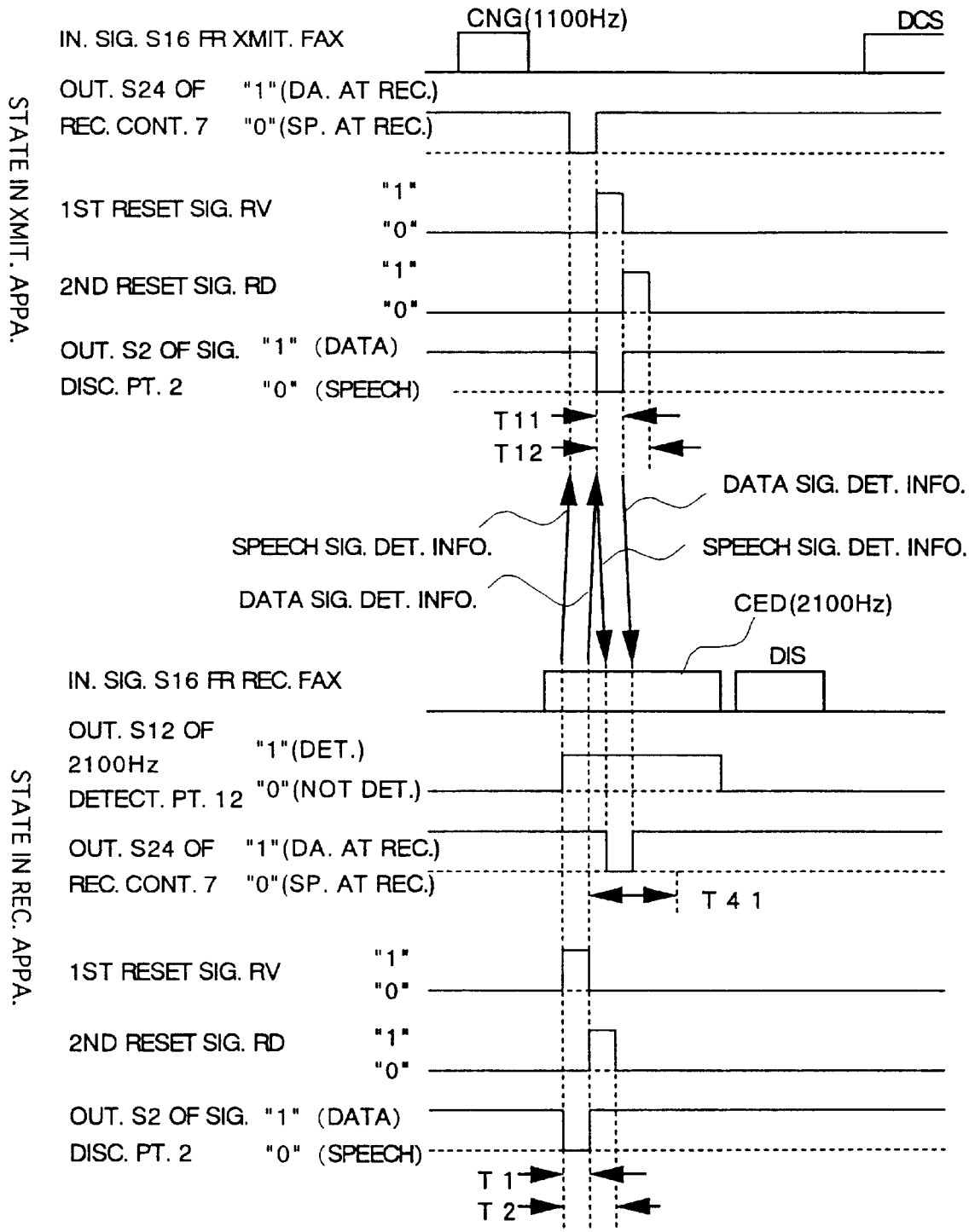
FIG. 12 illustrates operation of the signal transmitting apparatus for voiceband signals according to Embodiment 8 of the present invention.

Operation of discriminating signals in the case of a facsimile signal being input into the present signal transmitting apparatus for voiceband signals, will now be explained with reference to FIG. 12. In FIG. 12, each initial state of the outputs S2 of the signal discriminating parts 2 in the transmitting apparatus and the receiving apparatus is supposed to be "data".

A signal state in the receiving apparatus is the same as the one stated with reference to FIG. 9 in Embodiment 6, whose configuration is shown in FIG. 8.

When the output S2 of the signal discriminating part 2 changes to "0" (speech) from "1" (data), the transmission controlling part 3 in the receiving apparatus outputs information of speech signal detection to the opposite side apparatus, that is the transmitting apparatus, through the signal line S3. Then, when the output S2 of the signal discriminating part 2 changes to "1" from "0", the transmission controlling part 3 outputs information of data signal detection to the transmitting apparatus through the signal line S3.

In the transmitting apparatus, when the receiving controller 7 receives information of speech signal detection from the opposite side apparatus, that is the receiving apparatus, through the signal line S20, the receiving controller 7 resets an output of the signal line S24 at "0" (speech at the receiving side). Then, when the receiving controller 7 receives information of data signal detection from the receiving apparatus through the signal line S20, the receiving controller 7 sets an output of the signal line S24 at "1" (data at the receiving side).

Until the specific time T11 has completely passed since the output of the signal line S24 changed to "1" (data at the receiving side) from "0" (speech at the receiving side), the reset signal generating part 13 has set the first reset signal RV to be "1". Therefore, the output S2 of the signal discriminating part 2 has been reset at "0" (speech). Until the specific time T12 has completely passed since the specific time T11 having passed after the output of the signal line S24 changed to "1" from "0", the reset signal generating part 13 has set the second reset signal RD at "1". Therefore, the output S2 of the signal discriminating part 2 has been set at "1" (data).

By applying the above configuration, in the receiving apparatus, when the 2100 Hz detecting part 12 detects a tone of 2100 Hz, the signal discriminating part 2 operates in order to set its output S2 at "data" after having reset the output S2 at "speech", based on designation from the reset signal generating part 13. Besides, when information of data signal detection is input into the transmitting apparatus from the receiving apparatus, the signal discriminating part 2 operates in order to set its output S2 at "data" after having reset the output S2 at "speech", based on designation from the reset signal generating part 13. Accordingly, it is possible to set each discrimination state in both the transmitting apparatus and the receiving apparatus at "data" after the discrimination state having been once reset at "speech", at the beginning of a facsimile call, even when no call control information can be obtained. Therefore, channels of input facsimile signals can be assigned to modems in the facsimile signal demodulating part 5. Then, the facsimile signal can be correctly transmitted by demodulation.

Embodiment 9

Figure 13:
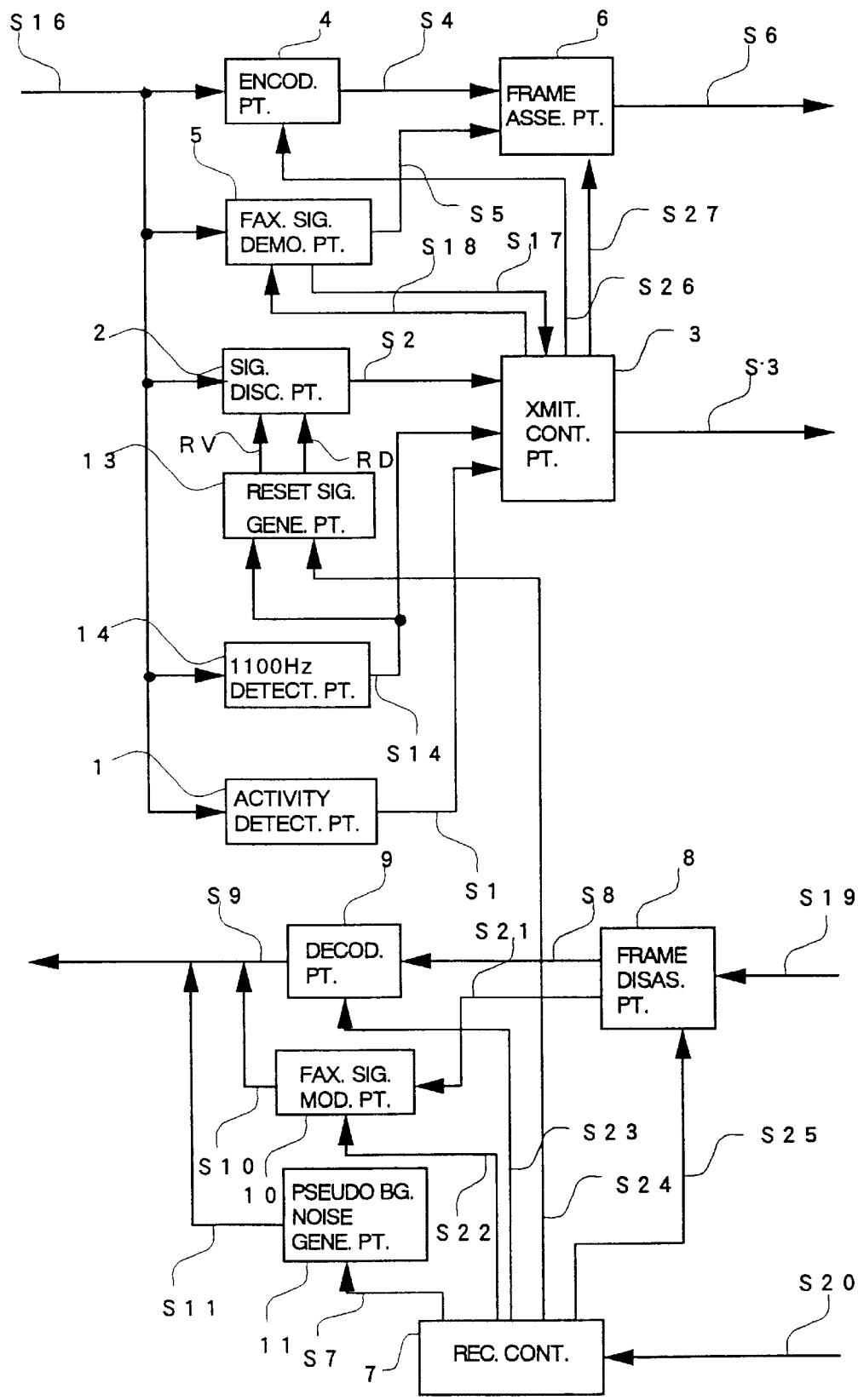
FIG. 13 is a block diagram showing a signal transmitting apparatus for voiceband signals according to Embodiment 9 of the present invention.

FIG. 13 shows a configuration of another embodiment of the signal transmitting apparatus for voiceband signals, according to the present invention. In FIG. 13, the input signal S16 of M channels input into the signal transmitting apparatus for voiceband signals, the activity detecting part 1, the signal discriminating part 2, the transmission controlling part 3, the encoding part 4, the facsimile signal demodulating part 5, the frame assembling part 6, the receiving controller 7, the frame disassembling part 8, the decoding part 9, the facsimile signal modulating part 10 and the pseudo background noise generating part 11 are shown.

In FIG. 13, the 1100 Hz detecting part 14 detects whether or not a tone of 1100 Hz exists in the input signal S16 and outputs a detection result S14. The reset signal generating part 13 outputs the first reset signal RV and the second reset signal RD, based on the 1100 Hz detection result S14 and the output S24 of the receiving controller 7. The first reset signal RV is for compulsorily resetting a judgement result S2 of the signal discriminating part 2 at "speech" state, and the second reset signal RD is for compulsorily setting a judgement result S2 of the signal discriminating part 2 at "data" state.

Now, operation will be stated. Operations of the activity detecting part 1, the encoding part 4, the facsimile signal demodulating part 5, the frame assembling part 6, the frame disassembling part 8, the decoding part 9, the facsimile signal modulating part 10, and the pseudo background noise generating part 11 are the same as those described in Related Art with reference to FIG. 55.

The signal discriminating part 2 identically operates with the one stated in Embodiment 6 with reference to FIG. 8.

The 1100 Hz detecting part 14 identically operates with the one described in Embodiment 2 with reference to FIG. 3. Namely, the 1100 Hz detecting part 14 judges whether or not a tone signal of 1100 Hz exists in the input signal S16, by performing a process such as a frequency analysis for the input signal S16. In the case of the tone signal of 1100 Hz existing, the 1100 Hz detecting part 14 outputs "1", and in the case of the tone signal of 1100 Hz not existing, the 1100 Hz detecting part 14 outputs "0", to the signal line S14 as a 1100 Hz detection result.

The transmission controlling part 3 identically operates with the one stated in Related Art with reference to FIG. 55 except for the following cases. The transmission controlling part 3 inputs a 1100 Hz detection result S14. When a change to "1" from "0" of the 1100 Hz detection result S14 is detected, the transmission controlling part 3 outputs information of 1100 Hz being detected, to the opposite side apparatus through the signal line S3. When a change to "0" from "1" of the 1100 Hz detection result S14 is detected, the transmission controlling part 3 outputs information of 1100 Hz being not detected, to the opposite side apparatus through the signal line S3.

The receiving controller 7 identically operates with the one stated in Related Art with reference to FIG. 55 except for the following cases. The receiving controller 7 sets an output of the signal line S24 at "1" (1100 Hz detected at the receiving side) when the receiving controller 7 receives the information of 1100 Hz being detected, from the opposite side apparatus through the signal line S20. Besides, when the receiving controller 7 receives the information of 1100 Hz being not detected, from the opposite side apparatus through the signal line S20, the receiving controller 7 resets an output of the signal line S24 at "0" (1100 Hz not detected at the receiving side).

The reset signal generating part 13 generates the first reset signal RV and the second reset signal RD based on the 1100 Hz detection result S14 and the output S24 of the receiving controller 7.

When the reset signal generating part 13 detects a leading edge to "1" (detected) from "0" (not detected) of the 1100 Hz detection result S14, the reset signal generating part 13 sets an output of the first reset signal RV to be "1" and sets an output of the second reset signal RD to be "0". Then, when the specific time T3 has passed since the detection of the leading edge to "1" from "0" of the 1100 Hz detection result S14, the reset signal generating part 13 sets an output of the first reset signal RV at "0" and sets an output of the second reset signal RD at "1". Then, when the specific time T4 (T4>T3) has completely passed since the detection of the leading edge to "1" from "0" of the 1100 Hz detection result S14, the reset signal generating part 13 sets both the outputs of the first reset signal RV and the second reset signal RD to be "0".

When the reset signal generating part 13 detects a leading edge to "1" (1100 Hz detected at the receiving side) from "0" (1100 Hz not detected at the receiving side) of the output S24 of the receiving controller 7, the reset signal generating part 13 sets an output of the first reset signal RV at "1" and sets an output of the second reset signal RD at "0". Then, when a specific time T13 has passed since the detection of the leading edge to "1" from "0" of the output S24 of the receiving controller 7, the reset signal generating part 13 sets an output of the first reset signal RV at "0" and sets an output of the second reset signal RD at "1". Then, when a specific time T14 (T14>T13) has completely passed since the detection of the leading edge to "1" from "0" of the output S24 of the receiving controller 7, the reset signal generating part 13 sets both the outputs of the first reset signal RV and the second reset signal RD at "0".

In a case except the above cases, the reset signal generating part 13 sets both the outputs of the first reset signal RV and the second reset signal RD to be "0".

Figure 14:
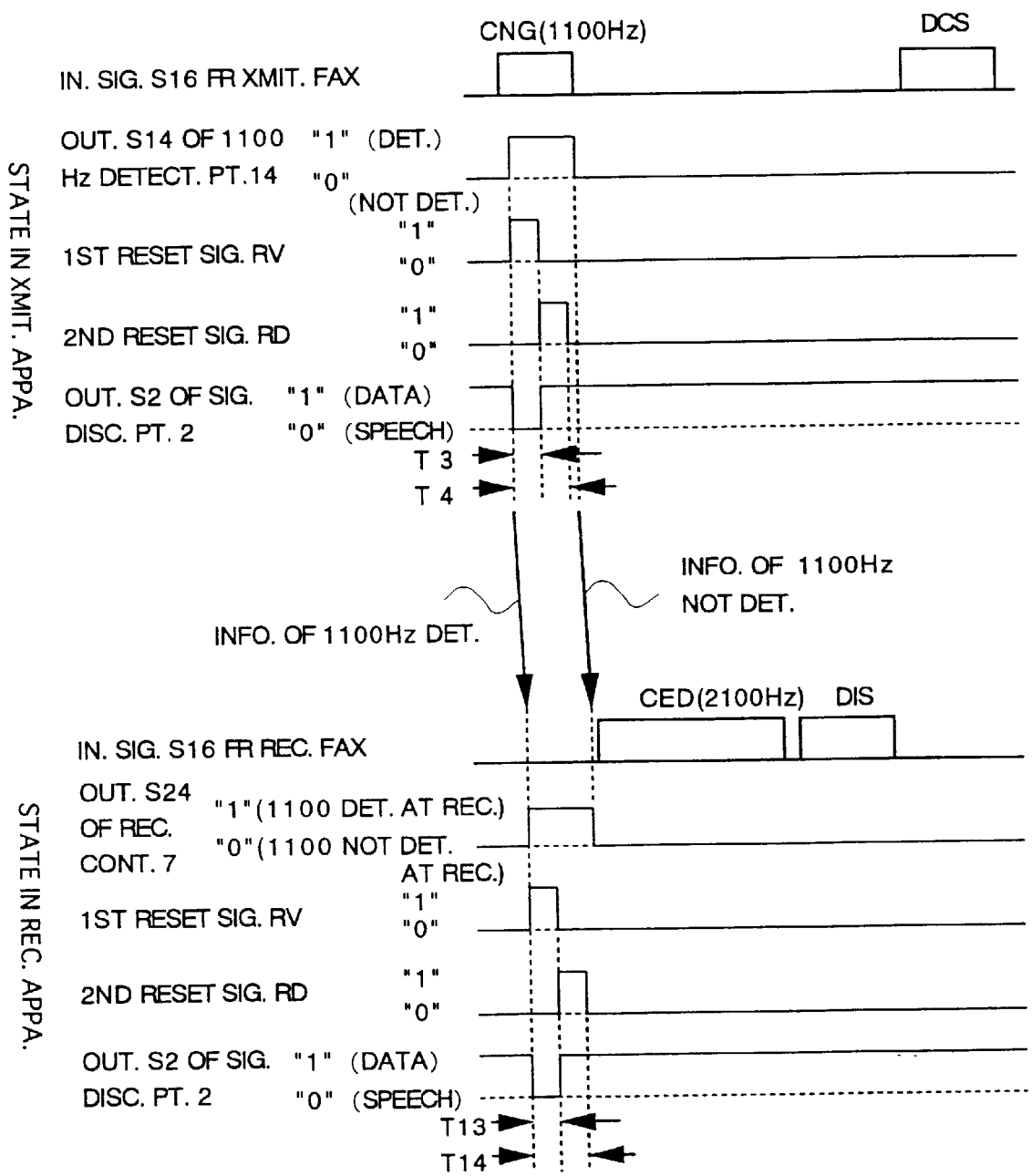
FIG. 14 illustrates operation of the signal transmitting apparatus for voiceband signals according to Embodiment 9 of the present invention.

Operation of discriminating signals in the case of a facsimile signal being input into the present signal transmitting apparatus for voiceband signals, will now be explained with reference to FIG. 14. In FIG. 14, each initial state of the outputs S2 of the signal discriminating parts 2 in the transmitting apparatus and the receiving apparatus is supposed to be "data".

In the transmitting apparatus, when a tone of 1100 Hz is output from the transmitting facsimile terminal, the 1100 Hz detecting part 14 detects the tone and changes its output S14 to "1" from "0".

Until the specific time T3 has completely passed since the change to "1" (detected) from "0" (not detected) of the output S14 of the 1100 Hz detecting part 14, the reset signal generating part 13 has set the first reset signal RV to be "1". Therefore, an output S2 of the signal discriminating part 2 has been reset at "0" (speech). Until the specific time T4 has completely passed since the time T3 having passed after the change to "1" from "0" of the output S14 of the 1100 Hz detecting part 14, the reset signal generating part 13 has set the second reset signal RD to be "1". Therefore, the output S2 of the signal discriminating part 2 has been set at "1" (data).

When the output S14 of the 1100 Hz detection part 14 changes to "1" (detected) from "0" (not detected), the transmission controlling part 3 outputs information of 1100 Hz being detected to the opposite side apparatus, that is the receiving apparatus, through the signal line S3.

In the receiving apparatus, when the receiving controller 7 receives information of 1100 Hz being detected from the opposite side apparatus, that is the transmitting apparatus, through the signal line S20, the receiving controller 7 sets an output of the signal line S24 at "1" (1100 Hz detected at the receiving side).

Until the specific time T13 has completely passed since the output of the signal line S24 changed to "1" (1100 Hz detected at the receiving side) from "0" (1100 Hz not detected at the receiving side), the reset signal generating part 13 has set the first reset signal RV to be "1". Therefore, the output S2 of the signal discriminating part 2 has been reset at "0" (speech). Until the specific time T14 has completely passed since the time T13 having passed after the change to "1" from "0" of the output of the signal line S24, the reset signal generating part 13 has set the second reset signal RD at "1". Therefore, the output S2 of the signal discriminating part 2 has been set at "1" (data).

By applying the above configuration, in the transmitting apparatus, when the 1100 Hz detecting part 14 detects a tone of 1100 Hz, the signal discriminating part 2 operates in order to set its output S2 at "data" after having reset the output S2 at "speech", based on designation from the reset signal generating part 13. Besides, in the receiving apparatus, when the receiving controller 7 sets an output of the signal line S24 at "1" (1100 Hz detected at the receiving side) by receiving information of 1100 Hz being detected from the transmitting apparatus, the signal discriminating part 2 operates in order to set its output S2 at "data" after having reset the output S2 at "speech", based on designation from the reset signal generating part 13. Accordingly, it is possible to set each discrimination state in the transmitting apparatus and in the receiving apparatus at "data", after the discrimination state having been once reset at "speech", at the beginning of a facsimile call, even when no call control information can be obtained. Therefore, channels of input facsimile signals can be assigned to modems in the facsimile signal demodulating part 5. Then, the facsimile signal can be correctly transmitted by demodulation.

Embodiment 10

Figure 15:
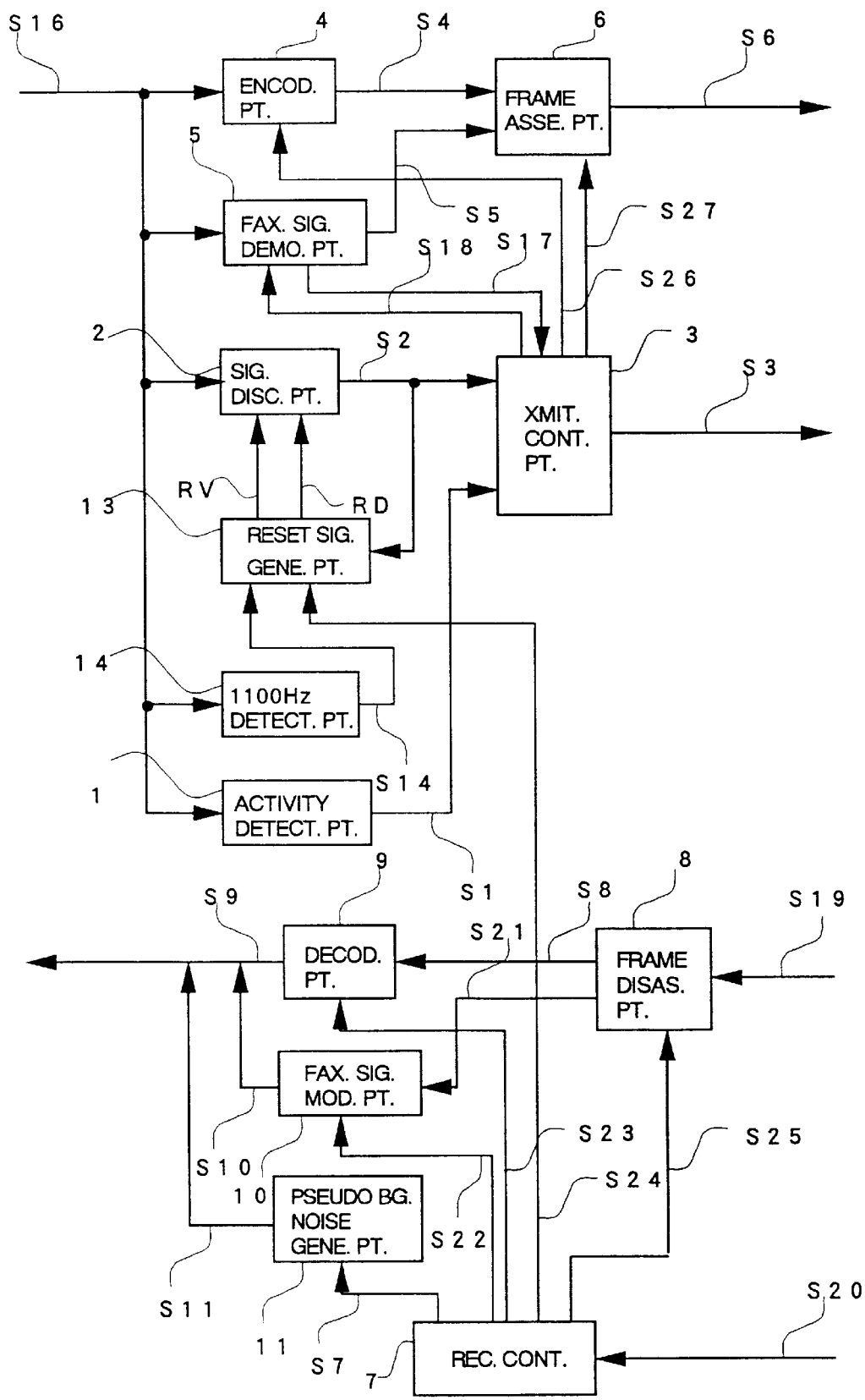
FIG. 15 is a block diagram showing a signal transmitting apparatus for voiceband signals according to Embodiment 10 or 11 of the present invention.

FIG. 15 shows a configuration of another embodiment of the signal transmitting apparatus for voiceband signals, according to the present invention. In FIG. 15, the input signal S16 of M channels input into the signal transmitting apparatus for voiceband signals, the activity detecting part 1, the signal discriminating part 2, the transmission controlling part 3, the encoding part 4, the facsimile signal demodulating part 5, the frame assembling part 6, the receiving controller 7, the frame disassembling part 8, the decoding part 9, the facsimile signal modulating part 10, the pseudo background noise generating part 11, the reset signal generating part 13 and the 1100 Hz detecting part 14 are shown.

Now, operation will be stated. Operations of the activity detecting part 1, the encoding part 4, the facsimile signal demodulating part 5, the frame assembling part 6, the frame disassembling part 8, the decoding part 9, the facsimile signal modulating part 10, and the pseudo background noise generating part 11 are the same as those described in Related Art with reference to FIG. 55.

The signal discriminating part 2 identically operates with the one stated in Embodiment 6 with reference to FIG. 8. The 1100 Hz detecting part 14 identically operates with the one stated in Embodiment 9 with reference to FIG. 13.

The transmission controlling part 3 identically operates with the one stated in Related Art with reference to FIG. 55 except for the following cases. The transmission controlling part 3 inputs a signal discrimination result S2. When information of a change to "0" (speech) from "1" (data) of the signal discrimination result S2 is detected, the transmission controlling part 3 outputs information of speech signal detection to the opposite side apparatus through the signal line S3. When a change to "1" (data) from "0" (speech) of the signal discrimination result S2 is detected, the transmission controlling part 3 outputs information of data signal detection to the opposite side apparatus through the signal line S3.

The receiving controller 7 identically operates with the one stated in Related Art with reference to FIG. 55 except for the following cases. The receiving controller 7 resets an output of the signal line S24 at "0" (speech at the receiving side) when the receiving controller 7 receives the information of speech signal detection from the opposite side apparatus through the signal line S20. Besides, when the receiving controller 7 receives the information of data signal detection from the opposite side apparatus through the signal line S20, the receiving controller 7 sets an output of the signal line S24 at "1" (data at the receiving side).

The reset signal generating part 13 generates the first reset signal RV and the second reset signal RD based on the 1100 Hz detection result S14 and the output S24 of the receiving controller 7.

When the reset signal generating part 13 detects a leading edge to "1" (detected) from "0" (not detected) of the 1100 Hz detection result S14, the reset signal generating part 13 operates identically with the one stated in Embodiment 9.

When the reset signal generating part 13 detects a trailing edge to "0" (speech at the receiving side) from "1" (data at the receiving side) of the output S24 of the receiving controller 7, the reset signal generating part 13 sets an output of the first reset signal RV to be "1" and sets an output of the second reset signal RD to be "0". Then, when a specific time T15 has passed since the detection of the trailing edge to "0" from "1" of the output S24 of the receiving controller 7, the reset signal generating part 13 sets both the outputs of the first reset signal RV and the second reset signal RD to be "0".

However, if the reset signal generating part 13 detects a trailing edge to "0" (speech at the receiving side) from "1" (data at the receiving side) of the output S24 of the receiving controller 7 within a specific time T42 after the detection of the trailing edge to "0" (speech) from "1" (data) of the output S2 of the signal discriminating part 2, the reset signal generating part 13 does not perform the above process. Therefore, the output of the first reset signal RV has been kept to be "0".

When the reset signal generating part 13 detects a leading edge to "1" (data at the receiving side) from "0" (speech at the receiving side) of the output S24 of the receiving controller 7, the reset signal generating part 13 sets an output of the first reset signal RV to be "0" and sets an output of the second reset signal RD to be "1". Then, when a specific time T16 has passed since the detection of the leading edge to "1" from "0" of the output S24 of the receiving controller 7, the reset signal generating part 13 sets both the outputs of the first reset signal RV and the second reset signal RD to be "0".

However, if the reset signal generating part 13 detects a leading edge to "1" (data at the receiving side) from "0" (speech at the receiving side) of the output S24 of the receiving controller 7 within the specific time T42 after the detection of the leading edge to "1" (data) from "0" (speech) of the output S2 of the signal discriminating part 2, the reset signal generating part 13 does not perform the above process. Therefore, the output of the second reset signal RD has been kept to be "0".

In a case except the above cases, the reset signal generating part 13 sets both the outputs of the first reset signal RV and the second reset signal RD to be "0".

Figure 16:
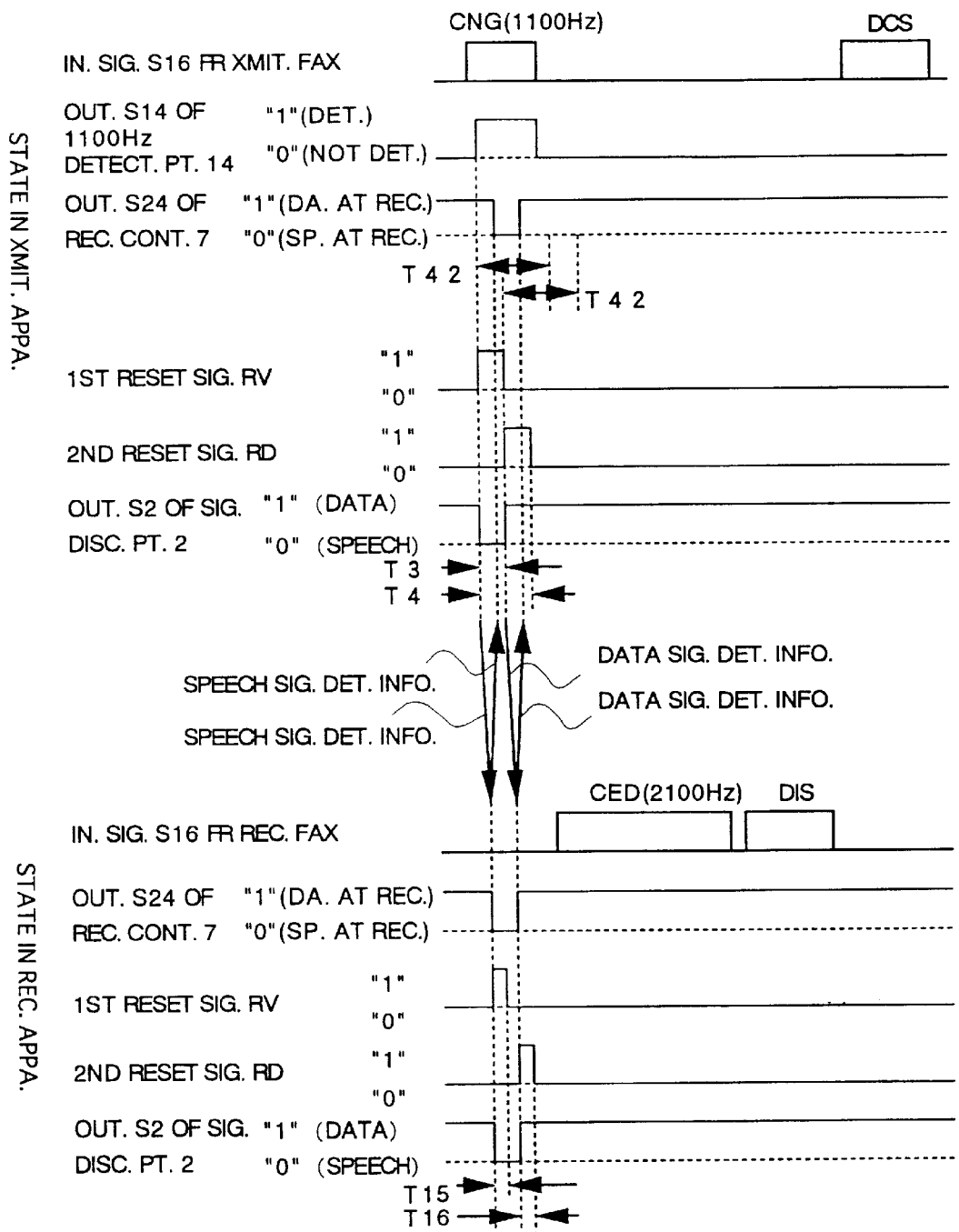
FIG. 16 illustrates operation of the signal transmitting apparatus for voiceband signals according to Embodiment 10 of the present invention.

Operation of discriminating signals In the case of a facsimile signal being input into the present signal transmitting apparatus for voiceband signals, will now be explained with reference to FIG. 16. In FIG. 16, each initial state of the outputs S2 of the signal discriminating parts 2 in the transmitting apparatus and the receiving apparatus is supposed to be "data".

A signal state in the transmitting apparatus is the same as the one stated with reference to FIG. 14 in Embodiment 9, whose configuration is shown in FIG. 13.

When the output S2 of the signal discriminating part 2 changes to "0" (speech) from "1" (data), the transmission controlling part 3 in the transmitting apparatus outputs information of speech signal detection to the opposite side apparatus, that is the receiving apparatus, through the signal line S3. Then, when the output S2 of the signal discriminating part 2 changes to "1" (data) from "0" (speech), the transmission controlling part 3 outputs information of data signal detection to the receiving apparatus, through the signal line S3.

In the receiving apparatus, when the receiving controller 7 receives information of speech signal detection from the opposite side apparatus, that is the transmitting apparatus, through the signal line S20, the receiving controller 7 resets an output of the signal line S24 at "0" (speech at the receiving side). Then, when the receiving controller 7 receives information of data signal detection from the transmitting apparatus through the signal line S20, the receiving controller 7 sets an output of the signal line S24 at "1" (data at the receiving side).

Until the specific time T15 has completely passed since the output of the signal line S24 changed to "0" (speech at the receiving side) from "1" (data at the receiving side), the reset signal generating part 13 has set the first reset signal RV to be "1". Therefore, the output S2 of the signal discriminating part 2 has been reset at "0" (speech). Until the specific time T16 has completely passed since the output of the signal line S24 changed to "1" (data at the receiving side) from "0" (speech at the receiving side), the reset signal generating part 13 has set the second reset signal RD at "1". Therefore, the output S2 of the signal discriminating part 2 has been set at "1" (data).

By applying the above configuration, in the transmitting apparatus, when the 1100 Hz detecting part 14 detects a tone of 1100 Hz, the signal discriminating part 2 operates in order to set its output S2 at "data" after having reset the output S2 at "speech", based on designation from the reset signal generating part 13. Besides, when information of speech signal detection is input into the receiving apparatus from the transmitting apparatus, the signal discriminating part 2 resets its output S2 at "speech" based on designation from the reset signal generating part 13. Then, when information of data signal detection is input into the receiving apparatus from the transmitting apparatus, the signal discriminating part 2 operates in order to set its output S2 at "data" based on designation from the reset signal generating part 13. Accordingly, it is possible to set each discrimination state in the transmitting apparatus and in the receiving apparatus at "data", after the discrimination state having been once reset at "speech", at the beginning of a facsimile call, even when no call control information can be obtained. Therefore, channels of input facsimile signals can be assigned to modems in the facsimile signal demodulating part 5. Then, the facsimile signal can be correctly transmitted by demodulation.

Embodiment 11

As have been stated, in Embodiment 10, the reset signal generating part 13 outputs the first reset signal RV and the second reset signal RD to the signal discriminating part 2 in order that the signal discriminating part 2 can set the discrimination state at "data" when the reset signal generating part 13 detects a leading edge to "1" (data at the receiving side) from "0" (speech at the receiving side) of the output S24 of the receiving controller 7. In addition, in Embodiment 10, the reset signal generating part 13 outputs the first reset signal RV and the second reset signal RD to the signal discriminating part 2 in order that the signal discriminating part 2 can set the discrimination state at "speech" when the reset signal generating part 13 detects a trailing edge to "0" (speech at the receiving side) from "1" (data at the receiving side) of the output S24 of the receiving controller 7.

However, with reference to the configuration of FIG. 15, it is acceptable for the reset signal generating part 13 to operate differently from the operation described in Embodiment 10.

In the configuration of FIG. 15, when the reset signal generating part 13 detects a leading edge to "1" (data at the receiving side) from "0" (speech at the receiving side) of the output S24 of the receiving controller 7, the reset signal generating part 13 sets an output of the first reset signal RV to be "1" and sets an output of the second reset signal RD to be "0". Then, when a specific time T17 has passed since the detection of the leading edge to "1" from "0" of the output S24 of the receiving controller 7, the reset signal generating part 13 sets an output of the first reset signal RV to be "0" and sets an output of the second reset signal RD to be "1". Then, when a specific time T18 (T18>T17) has passed since the detection of the leading edge to "1" from "0" of the output S24 of the receiving controller 7, the reset signal generating part 13 sets both the outputs of the first reset signal RV and the second reset signal RD to be "0".

However, if the reset signal generating part 13 detects a leading edge to "1" (data at the receiving side) from "0" (speech at the receiving side) of the output S24 of the receiving controller 7 within a specific time T43 after the detection of the leading edge to "1" (data) from "0" (speech) of the output S2 of the signal discriminating part 2, the reset signal generating part 13 does not perform the above process. Therefore, the outputs of the first reset signal RV and the second reset signal RD have been kept to be "0".

When the reset signal generating part 13 detects a leading edge to "1" (detected) from "0" (not detected) of the 1100 Hz detection result S14, the reset signal generating part 13 identically operates with the one in Embodiment 9.

In a case except the above cases, the reset signal generating part 13 sets both the outputs of the first reset signal RV and the second reset signal RD to be "0".

Figure 17:
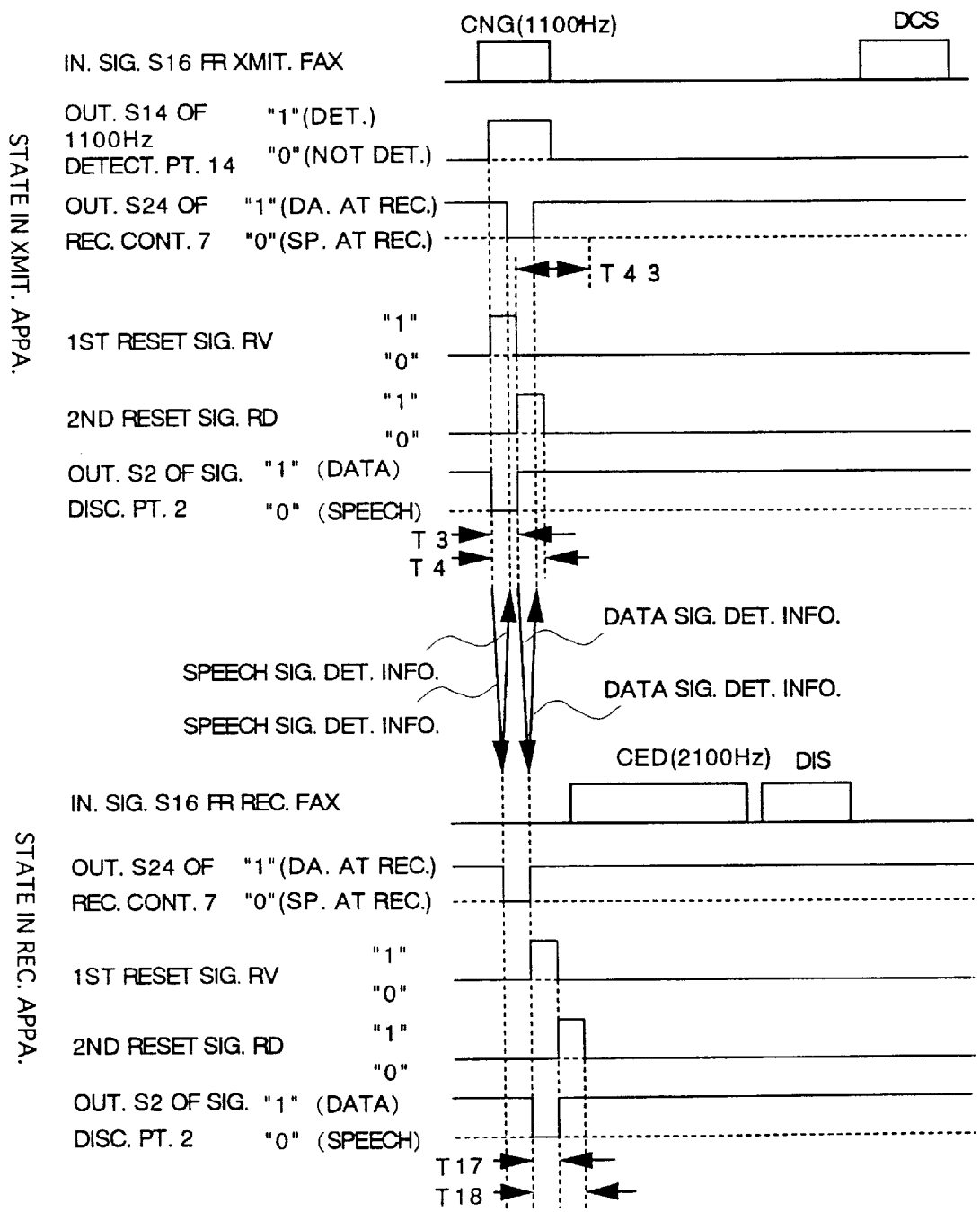
FIG. 17 illustrates operation of the signal transmitting apparatus for voiceband signals according to Embodiment 11 of the present invention.

Operation of discriminating signals in the case of a facsimile signal being input into the present signal transmitting apparatus for voiceband signals, will now be explained with reference to FIG. 17. In FIG. 17, each initial state of the outputs S2 of the signal discriminating parts 2 in the transmitting apparatus and the receiving apparatus is supposed to be "data".

A signal state in the transmitting apparatus is the same as the one stated with reference to FIG. 14 in Embodiment 9, whose configuration is shown in FIG. 13.

When the output S2 of the signal discriminating part 2 changes to "0" (speech) from "1" (data), the transmission controlling part 3 in the transmitting apparatus outputs information of speech signal detection to the opposite side apparatus, that is the receiving apparatus, through the signal line S3. Then, when the output S2 of the signal discriminating part 2 changes to "1" from "0", the transmission controlling part 3 outputs information of data signal detection to the receiving apparatus through the signal line S3.

In the receiving apparatus, when the receiving controller 7 receives information of speech signal detection from the opposite side apparatus, that is the transmitting apparatus, through the signal line S20, the receiving controller 7 resets an output of the signal line S24 at "0" (speech at the receiving side). Then, when the receiving controller 7 receives information of data signal detection from the transmitting apparatus through the signal line S20, the receiving controller 7 sets an output of the signal line S24 at "1" (data at the receiving side).

Until the specific time T17 has completely passed since the output of the signal line S24 changed to "1" (data at the receiving side) from "0" (speech at the receiving side), the reset signal generating part 13 has set the first reset signal RV to be "1". Therefore, the output S2 of the signal discriminating part 2 has been reset at "0" (speech). Until the specific time T18 has completely passed since the specific time T17 having passed after the change to "1" from "0" of the output of the signal line S24, the reset signal generating part 13 has set the second reset signal RD at "1". Therefore, the output S2 of the signal discriminating part 2 has been set at "1" (data).

By applying the above configuration, in the transmitting apparatus, when the 1100 Hz detecting part 14 detects a tone of 1100 Hz, the signal discriminating part 2 operates in order to set its output S2 at "data", after having reset the output S2 at "speech", based on designation from the reset signal generating part 13. Besides, when information of data signal detection is input into the receiving apparatus from the transmitting apparatus, the signal discriminating part 2 operates in order to set its output S2 at "data" after having reset the output S2 at "speech", based on designation from the reset signal generating part 13. Accordingly, it is possible to set each discrimination state in the transmitting apparatus and the receiving apparatus at "data", after the discrimination state having been once reset at "speech", at the beginning of a facsimile call, even when no call control information can be obtained. Therefore, channels of an input facsimile signal can be assigned to modems in the facsimile signal demodulating part 5. Then, the facsimile signal can be correctly transmitted by demodulation.

Embodiment 12

Figure 18:
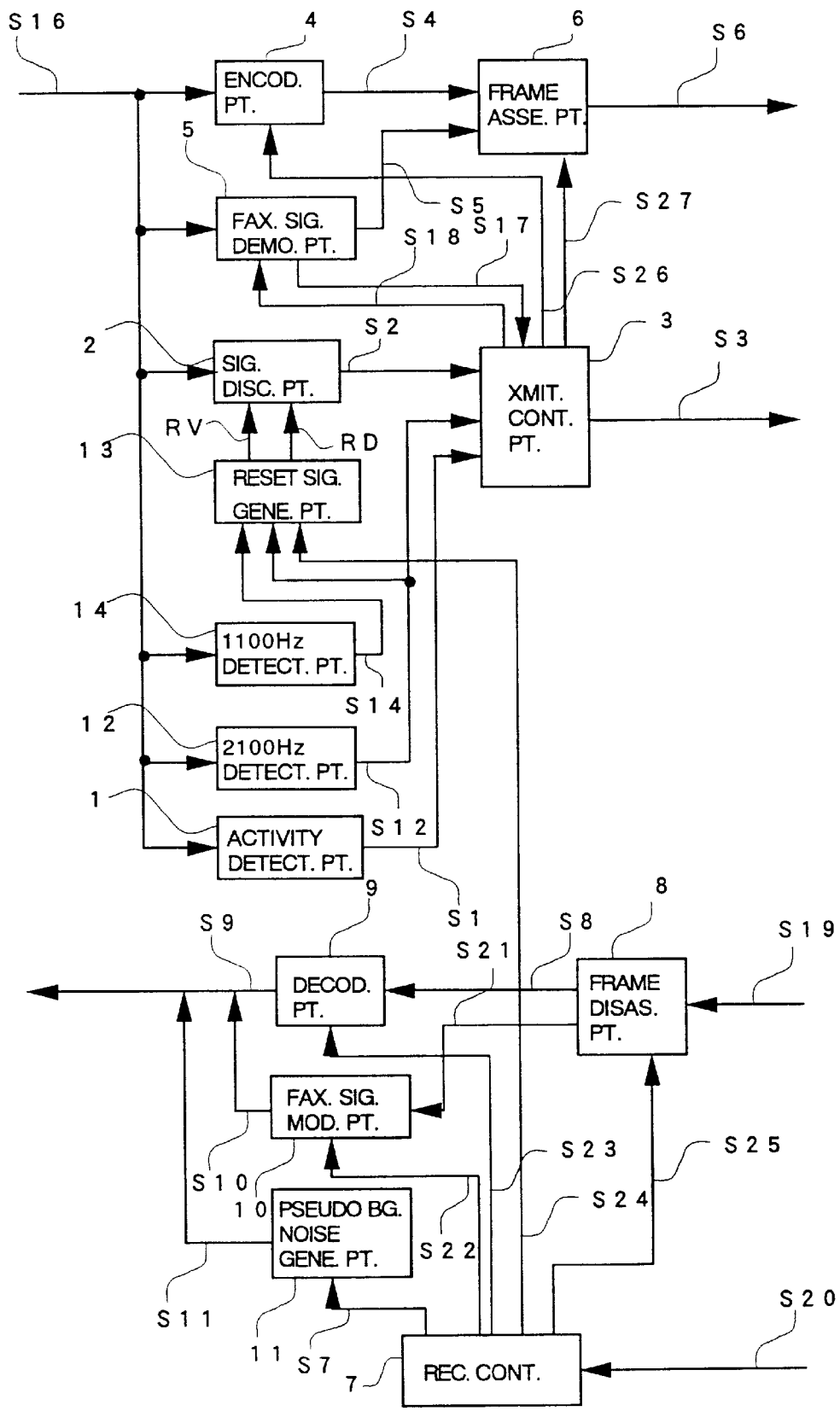
FIG. 18 is a block diagram showing a signal transmitting apparatus for voiceband signals according to Embodiment 12 of the present invention.

FIG. 18 shows a configuration of another embodiment of the signal transmitting apparatus for voiceband signals, according to the present invention. In FIG. 18, the input signal S16 of M channels input into the signal transmitting apparatus for voiceband signals, the activity detecting part 1, the signal discriminating part 2, the transmission controlling part 3, the encoding part 4, the facsimile signal demodulating part 5, the frame assembling part 6, the receiving controller 7, the frame disassembling part 8, the decoding part 9, the facsimile signal modulating part 10, and the pseudo background noise generating part 11 are shown.

In FIG. 18, the 2100 Hz detecting part 12 detects whether or not a tone of 2100 Hz exists in the input signal S16, and outputs a detection result S12. The 1100 Hz detecting part 14 detects whether or not a tone of 1100 Hz exists in the input signal S16, and outputs a detection result S14. The reset signal generating part 13 outputs the first reset signal RV and the second reset signal RD, based on the 2100 Hz detection result S12, 1100 Hz detection result S14, and the output S24 from the receiving controller 7. The first reset signal RV is for compulsorily resetting a judgement result S2 of the signal discriminating part 2 at "speech", and the second reset signal RD is for compulsorily setting a judgement result S2 of the signal discriminating part 2 at "data".

Now, operation will be stated. Operations of the activity detecting part 1, the encoding part 4, the facsimile signal demodulating part 5, the frame assembling part 6, the frame disassembling part 8, the decoding part 9, the facsimile signal modulating part 10, and the pseudo background noise generating part 11 are the same as those described in Related Art with reference to FIG. 55.

The 2100 Hz detecting part 12 and the signal discriminating part 2 identically operate with the ones stated in Embodiment 6 with reference to FIG. 8. The 1100 Hz detecting part 14 identically operates with the one stated in Embodiment 9 with reference to FIG. 13.

The transmission controlling part 3 identically operates with the one stated in Related Art with reference to FIG. 55 except for the following cases. The transmission controlling part 3 inputs a 2100 Hz detection result S12. When a change to "1" from "0" of the 2100 Hz detection result S12 is detected, the transmission controlling part 3 outputs information of 2100 Hz being detected, to the opposite side apparatus through the signal line S3. When a change to "0" from "1" of the 2100 Hz detection result S12 is detected, the transmission controlling part 3 outputs information of 2100 Hz being not detected, to the opposite side apparatus through the signal line S3.

The receiving controller 7 identically operates with the one stated in Related Art with reference to FIG. 55 except for the following cases. The receiving controller 7 sets an output of the signal line S24 at "1" (2100 Hz detected at the receiving side) when the receiving controller 7 receives the information of 2100 Hz being detected from the opposite side apparatus through the signal line S20, and resets an output of the signal line S24 at "0" (2100 Hz not detected at the receiving side) when the receiving controller 7 receives the information of 2100 Hz being not detected from the opposite side apparatus through the signal line S20.

The reset signal generating part 13 generates the first reset signal RV and the second reset signal RD based on the 2100 Hz detection result S12, the 1100 Hz detection result S14 and the output S24 of the receiving controller 7.

When the reset signal generating part 13 detects a leading edge to "1" (detected) from "0" (not detected) of the 2100 Hz detection result S12, the reset signal generating part 13 sets an output of the first reset signal RV to be "1" and sets an output of the second reset signal RD to be "0". Then, when the specific time T1 has passed since the detection of the leading edge to "1" from "0" of the 2100 Hz detection result S12, the reset signal generating part 13 sets an output of the first reset signal RV to be "0" and sets an output of the second reset signal RD to be "1". Then, when the specific time T2 (T2>T1) has passed since the detection of the leading edge to "1" from "0" of the 2100 Hz detection result S12, the reset signal generating part 13 sets both the outputs of the first reset signal RV and the second reset signal RD to be "0".

When the reset signal generating part 13 detects a leading edge to "1" (detected) from "0" (not detected) of the 1100 Hz detection result S14, the reset signal generating part 13 sets an output of the first reset signal RV to be "1" and sets an output of the second reset signal RD to be "0". When the specific time T5 has passed since the detection of the leading edge to "1" from "0" of the 1100 Hz detection result S14, the reset signal generating part 13 sets both the outputs of the first reset signal RV and the second reset signal RD to be "0".

When the reset signal generating part 13 detects a leading edge to "1" (2100 Hz detected at the receiving side) from "0" (2100 Hz not detected at the receiving side) of the output S24 of the receiving controller 7, the reset signal generating part 13 sets an output of the first reset signal RV to be "0" and sets an output of the second reset signal RD to be "1". Then, when a specific time T19 has passed since the detection of the leading edge to "1" from "0" of the output S24 of the receiving controller 7, the reset signal generating part 13 sets both the outputs of the first reset signal RV and the second reset signal RD to be "0".

In a case except the above cases, the reset signal generating part 13 sets both the outputs of the first reset signal RV and the second reset signal RD to be "0".

Figure 19:
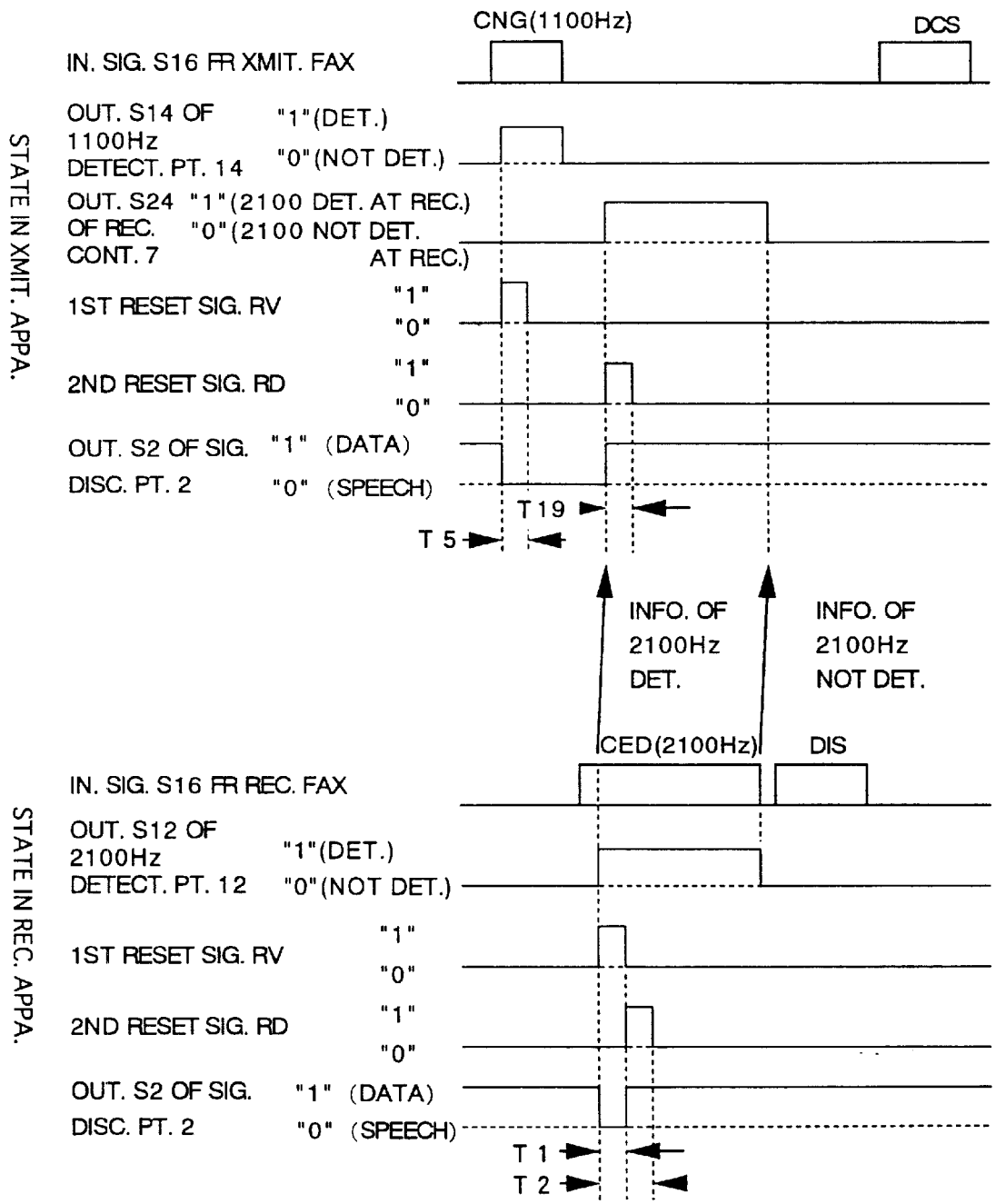
FIG. 19 illustrates operation of the signal transmitting apparatus for voiceband signals according to Embodiment 12 of the present invention.

Operation of discriminating signals in the case of a facsimile signal being input into the present signal transmitting apparatus for voiceband signals, will now be explained with reference to FIG. 19. In FIG. 19, each initial state of the outputs S2 of the signal discriminating parts 2 in the transmitting apparatus and the receiving apparatus is supposed to be "data".

In the transmitting apparatus, when a tone of 1100 Hz is output from the transmitting facsimile terminal, the 1100 Hz detecting part 14 detects the tone and changes its output S14 to "1" from "0". Until the specific time T5 has completely passed since the change to "1" (detected) from "0" (not detected) of the output S14 of the 1100 Hz detecting part 14, the reset signal generating part 13 has set the first reset signal RV to be "1". Therefore, an output S2 of the signal discriminating part 2 has been reset at "0" (speech).

In the receiving apparatus, when a tone of 2100 Hz is output from the receiving facsimile terminal, the 2100 Hz detecting part 12 detects the tone and changes its output S12 to "1" from "0". Until the specific time T1 has completely passed since the change to "1" (detected) from "0" (not detected) of the output S12 of the 2100 Hz detecting part 12, the reset signal generating part 13 has set the first reset signal RV to be "1". Therefore, an output S2 of the signal discriminating part 2 has been reset at "0" (speech). Until the specific time T2 has completely passed since the time T1 having passed after the change to "1" from "0" of the output S12 of the 2100 Hz detecting part 12, the reset signal generating part 13 has set the second reset signal RD at "1". Therefore, the output S2 of the signal discriminating part 2 has been set at "1" (data). When the output S12 of the 2100 Hz detection part 12 changes to "1" (detected) from "0" (not detected), the transmission controlling part 3 outputs information of 2100 Hz being detected to the opposite side apparatus, that is the transmitting apparatus, through the signal line S3.

In the transmitting apparatus, when the receiving controller 7 receives information of 2100 Hz being detected from the opposite side apparatus, that is the receiving apparatus, through the signal line S20, the receiving controller 7 sets an output of the signal line S24 at "1" (2100 Hz detected at the receiving side). Until the specific time T19 has completely passed since the output of the signal line S24 changed to "1" (2100 Hz detected at the receiving side) from "0" (2100 Hz not detected at the receiving side), the reset signal generating part 13 has set the second reset signal RD to be "1". Therefore, the output S2 of the signal discriminating part 2 has been set at "1" (data).

By applying the above configuration, in the receiving apparatus, when the 2100 Hz detecting part 12 detects a tone of 2100 Hz, the signal discriminating part 2 operates in order to set its output S2 at "data" after having reset the output S2 at "speech", based on designation from the reset signal generating part 13. Besides, in the transmitting apparatus, when the 1100 Hz detecting part 14 detects a tone of 1100 Hz, the signal discriminating part 2 resets its output S2 at "speech" based on designation of the reset signal generating part 13. Then, when the receiving controller 7 sets an output of the signal line S24 at "1" (2100 Hz detected at the receiving side) by receiving information of 2100 Hz being detected from the receiving apparatus, the signal discriminating part 2 operates in order to set its output S2 at "data", based on designation from the reset signal generating part 13. Accordingly, it is possible to set each discrimination state in the transmitting apparatus and in the receiving apparatus at "data", after the discrimination state having been once reset at "speech", at the beginning of a facsimile call even when no call control information can be obtained. Therefore, channels of input facsimile signals can be assigned to modems in the facsimile signal demodulating part 5. Then, the facsimile signal can be correctly transmitted by demodulation.

Embodiment 13

Figure 20:
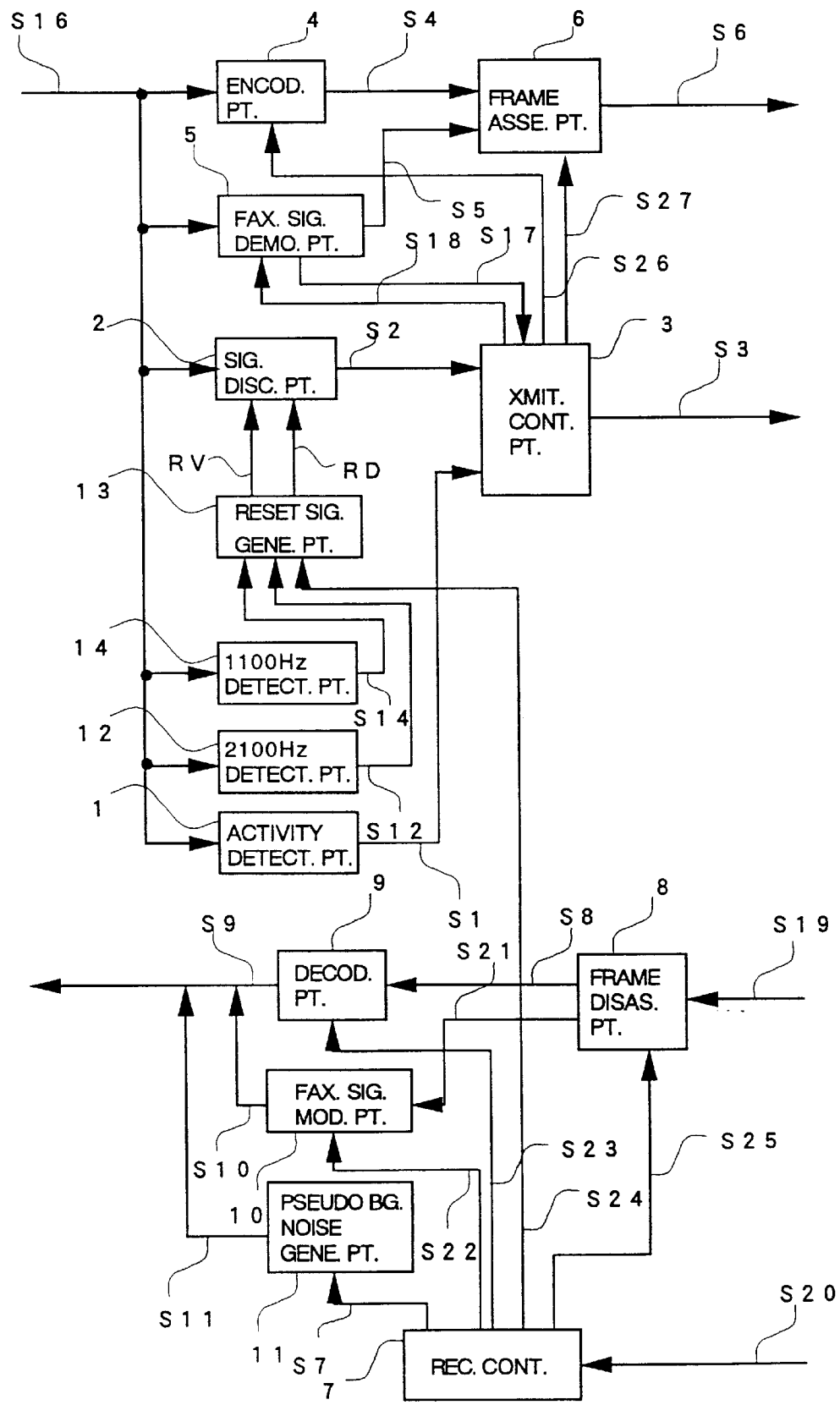
FIG. 20 is a block diagram showing a signal transmitting apparatus for voiceband signals according to Embodiment 13 or 16 of the present invention.

FIG. 20 shows a configuration of another embodiment of the signal transmitting apparatus for voiceband signals, according to the present invention. In FIG. 20, the input signal S16 of M channels input into the signal transmitting apparatus for voiceband signals, the activity detecting part 1, the signal discriminating part 2, the transmission controlling part 3, the encoding part 4, the facsimile signal demodulating part 5, the frame assembling part 6, the receiving controller 7, the frame disassembling part 8, the decoding part 9, the facsimile signal modulating part 10, the pseudo background noise generating part 11, the 2100 Hz detecting part 12, the reset signal generating part 13 and the 1100 Hz detecting part 14 are shown.

Now, operation will be stated. Operations of the activity detecting part 1, the encoding part 4, the facsimile signal demodulating part 5, the frame assembling part 6, the frame disassembling part 8, the decoding part 9, the facsimile signal modulating part 10, and the pseudo background noise generating part 11 are the same as those described in Related Art with reference to FIG. 55.

The 2100 Hz detecting part 12 and the signal discriminating part 2 identically operate with the ones stated in Embodiment 6 with reference to FIG. 8. The 1100 Hz detecting part 14 identically operates with the one stated in Embodiment 9 with reference to FIG. 13. The transmission controlling part 3 identically operates with the one stated in Related Art with reference to FIG. 55 except for the following cases. The transmission controlling part 3 inputs a signal discrimination result S2. When information of a change to "0" (speech) from "1" (data) of the signal discrimination result S2 is detected, the transmission controlling part 3 outputs information of speech signal detection to the opposite side apparatus through the signal line S3. When a change to "1" (data) from "0" (speech) of the signal discrimination result S2 is detected, the transmission controlling part 3 outputs information of data signal detection to the opposite side apparatus through the signal line S3.

The receiving controller 7 identically operates with the one stated in Related Art with reference to FIG. 55 except for the following cases. The receiving controller 7 resets an output of the signal line S24 at "0" (speech at the receiving side) when the receiving controller 7 receives the information of speech signal detection from the opposite side apparatus through the signal line S20. Besides, when the receiving controller 7 receives the information of data signal detection from the opposite side apparatus through the signal line S20, the receiving controller 7 sets an output of the signal line S24 at "1" (data at the receiving side).

The reset signal generating part 13 generates the first reset signal RV and the second reset signal RD based on the 2100 Hz detection result S12, 1100 Hz detection result S14 and the output S24 of the receiving controller 7.

When the reset signal generating part 13 detects a leading edge to "1" (detected) from "0" (not detected) of the 2100 Hz detection result S12, or a leading edge to "1" (detected) from "0" (not detected) of the 1100 Hz detection result S14, the reset signal generating part 13 identically operates with the one stated in Embodiment 12.

When the reset signal generating part 13 detects a leading edge to "1" (data at the receiving side) from "0" (speech at the receiving side) of the output S24 of the receiving controller 7, the reset signal generating part 13 sets an output of the first reset signal RV to be "0" and sets an output of the second reset signal RD to be "1". Then, when a specific time T20 has passed since the detection of the leading edge to "1" from "0" of the output S24 of the receiving controller 7, the reset signal generating part 13 sets both the outputs of the first reset signal RV and the second reset signal RD to be "0".

In a case except the above cases, the reset signal generating part 13 sets both the outputs of the first reset signal RV and the second reset signal RD to be "0".

Figure 21:
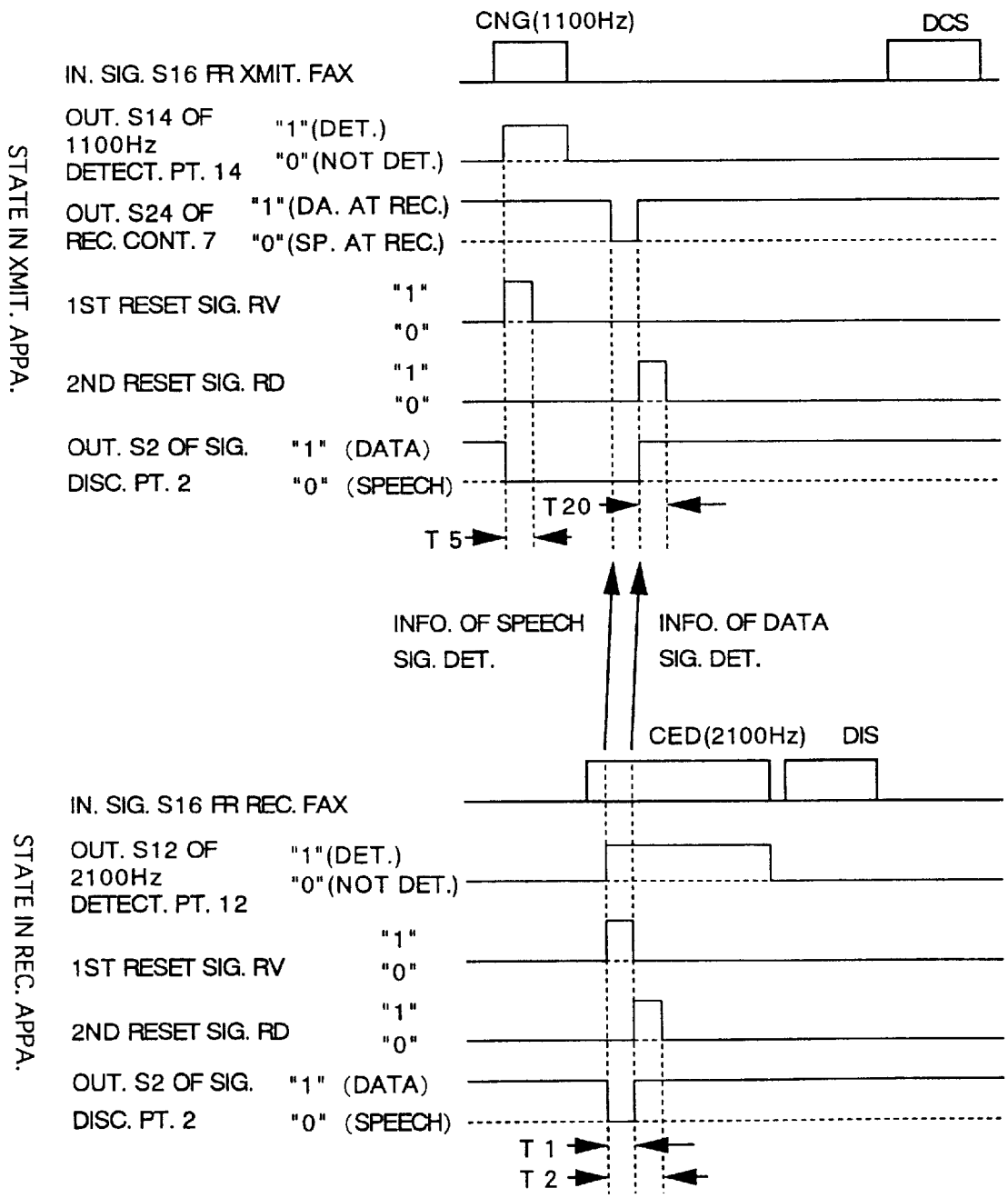
FIG. 21 illustrates operation of the signal transmitting apparatus for voiceband signals according to Embodiment 13 of the present invention.

Operation of discriminating signals in the case of a facsimile signal being input into the present signal transmitting apparatus for voiceband signals, will now be explained with reference to FIG. 21. In FIG. 21, each initial state of the outputs S2 of the signal discriminating parts 2 in the transmitting apparatus and the receiving apparatus is supposed to be "data".

A signal state in the receiving apparatus is the same as the one stated with reference to FIG. 19 in Embodiment 12, whose configuration is shown in FIG. 18.

When the output S2 of the signal discriminating part 2 changes to "0" (speech) from "1" (data), the transmission controlling part 3 in the receiving apparatus outputs information of speech signal detection to the opposite side apparatus, that is the transmitting apparatus, through the signal line S3. Then, when the output S2 of the signal discriminating part 2 changes to "1" (data) from "0" (speech), the transmission controlling part 3 outputs information of data signal detection to the transmitting apparatus, through the signal line S3.

In the transmitting apparatus, when a tone of 1100 Hz is output from the transmitting facsimile terminal, the 1100 Hz detecting part 14 detects the tone and changes its output S14 to "1" from "0". Until the specific time T5 has completely passed since the change to "1" (detected) from "0" (not detected) of the output S14 of the 1100 Hz detecting part 14, the reset signal generating part 13 has set the first reset signal RV to be "1". Therefore, an output S2 of the signal discriminating part 2 has been reset at "0" (speech).

In the transmitting apparatus, when the receiving controller 7 receives information of speech signal detection from the opposite side apparatus, that is the receiving apparatus, through the signal line S20, the receiving controller 7 resets an output of the signal line S24 at "0" (speech at the receiving side). Then, when the receiving controller 7 receives information of data signal detection from the receiving apparatus through the signal line S20, the receiving controller 7 sets an output of the signal line S24 at "1" (data at the receiving side). Until the specific time T20 has completely passed since the output of the signal line S24 changed to "1" (data at the receiving side) from "0" (speech at the receiving side), the reset signal generating part 13 has set the second reset signal RD to be "1". Therefore, the output S2 of the signal discriminating part 2 has been set at "1" (data).

By applying the above configuration, in the receiving apparatus, when the 2100 Hz detecting part 12 detects a tone of 2100 Hz, the signal discriminating part 2 operates in order to set its output S2 at "data" after having reset the output S2 at "speech", based on designation from the reset signal generating part 13. Besides, in the transmitting apparatus, when the 1100 Hz detecting part 14 detects a tone of 1100 Hz, the signal discriminating part 2 resets its output S2 at "speech" based on designation of the reset signal generating part 13. Then, when the receiving controller 7 sets an output of the signal line S24 at "1" (data at the receiving side) by receiving information of data signal detection from the receiving apparatus, the signal discriminating part 2 operates in order to set its output S2 at "data", based on designation from the reset signal generating part 13. Accordingly, it is possible to set each discrimination state in the transmitting apparatus and in the receiving apparatus at "data", after the discrimination state having been once reset at "speech", at the beginning of a facsimile call even when no call control information can be obtained. Therefore, channels of input facsimile signals can be assigned to modems in the facsimile signal demodulating part 5. Then, the facsimile signal can be correctly transmitted by demodulation.

Embodiment 14

Figure 22:
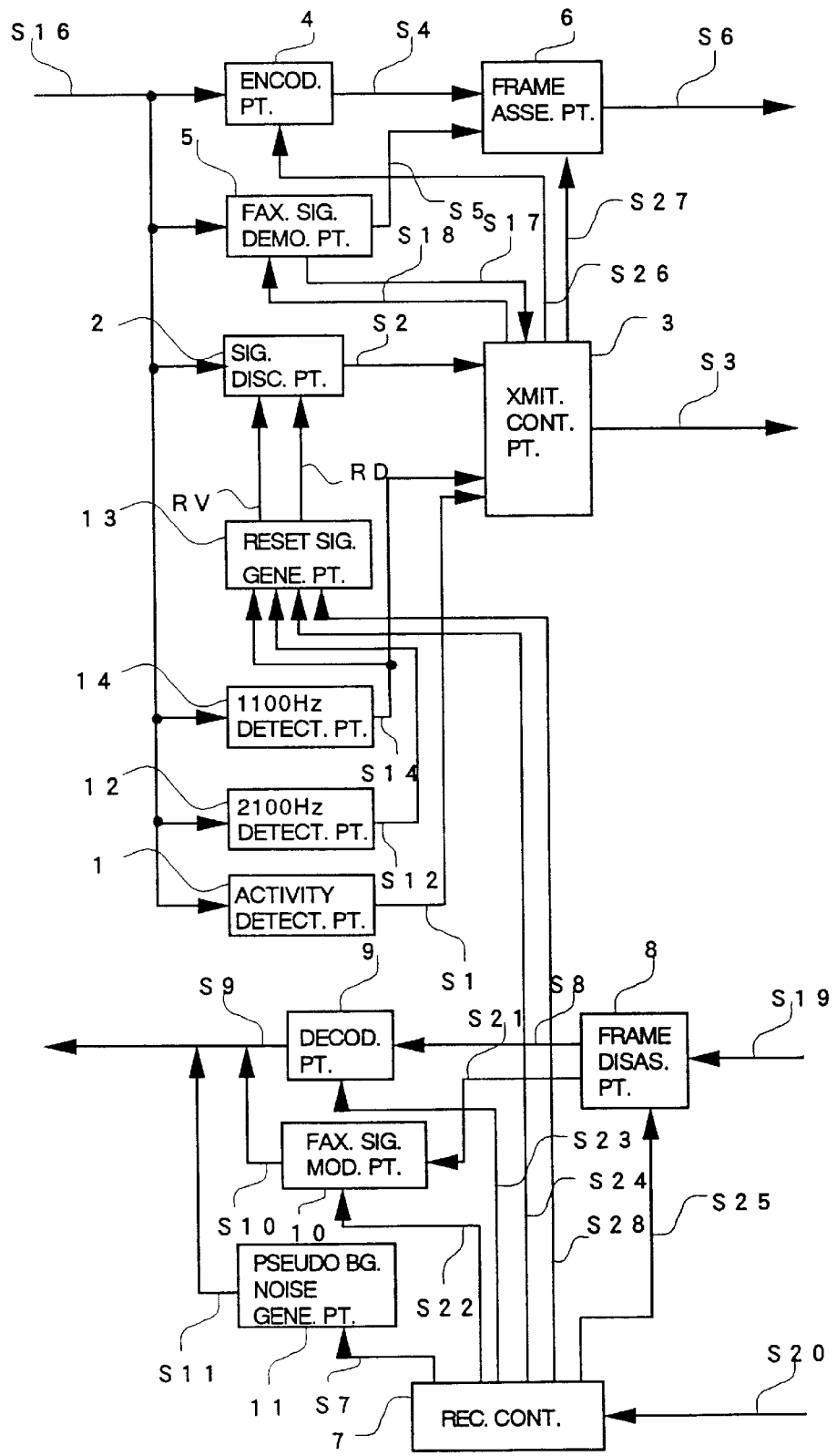
FIG. 22 is a block diagram showing a signal transmitting apparatus for voiceband signals according to Embodiment 14 of the present invention.

FIG. 22 shows a configuration of another embodiment of the signal transmitting apparatus for voiceband signals, according to the present invention. In FIG. 22, the input signal S16 of M channels input into the signal transmitting apparatus for voiceband signals, the activity detecting part 1, the signal discriminating part 2, the transmission controlling part 3, the encoding part 4, the facsimile signal demodulating part 5, the frame assembling part 6, the receiving controller 7, the frame disassembling part 8, the decoding part 9, the facsimile signal modulating part 10, and the pseudo background noise generating part 11 are shown.

In FIG. 22, the 2100 Hz detecting part 12 detects whether or not a tone of 2100 Hz exists in the input signal S16, and outputs a detection result S12. The 1100 Hz detecting part 14 detects whether or not a tone of 1100 Hz exists in the input signal S16, and outputs a detection result S14. The reset signal generating part 13 outputs the first reset signal RV and the second reset signal RD, based on the 2100 Hz detection result S12, 1100 Hz detection result S14, and the output S24 and an output S28 from the receiving controller 7. The first reset signal RV is for compulsorily resetting a judgement result S2 of the signal discriminating part 2 at "speech", and the second reset signal RD is for compulsorily setting a judgement result S2 of the signal discriminating part 2 at "data".

Now, operation will be stated. Operations of the activity detecting part 1, the encoding part 4, the facsimile signal demodulating part 5, the frame assembling part 6, the frame disassembling part 8, the decoding part 9, the facsimile signal modulating part 10, and the pseudo background noise generating part 11 are the same as those described in Related Art with reference to FIG. 55.

The 2100 Hz detecting part 12 and the signal discriminating part 2 identically operate with the ones stated in Embodiment 6 with reference to FIG. 8. The 1100 Hz detecting part 14 identically operates with the one stated in Embodiment 9 with reference to FIG. 13.

The transmission controlling part 3 identically operates with the one stated in Related Art with reference to FIG. 55 except for the following cases. The transmission controlling part 3 inputs a 1100 Hz detection result S14. When a change to "1" from "0" of the 1100 Hz detection result S14 is detected, the transmission controlling part 3 outputs information of 1100 Hz being detected, to the opposite side apparatus through the signal line S3. When a change to "0" from "1" of the 1100 Hz detection result S14 is detected, the transmission controlling part 3 outputs information of 1100 Hz being not detected to the opposite side apparatus through the signal line S3.

When information of a change to "0" (speech) from "1" (data) of the signal discrimination result S2 is detected, the transmission controlling part 3 outputs information of speech signal detection to the opposite side apparatus through the signal line S3. When a change to "1" (data) from "0" (speech) of the signal discrimination result S2 is detected, the transmission controlling part 3 outputs information of data signal detection to the opposite side apparatus through the signal line S3.

The receiving controller 7 identically operates with the one stated in Related Art with reference to FIG. 55 except for the following cases. The receiving controller 7 sets an output of the signal line S24 at "1" (1100 Hz detected at the receiving side) when the receiving controller 7 receives the information of 1100 Hz being detected from the opposite side apparatus through the signal line S20. The receiving controller 7 resets an output of the signal line S24 at "0" (1100 Hz not detected at the receiving side) when the receiving controller 7 receives the information of 1100 Hz being not detected from the opposite side apparatus through the signal line S20.

When the receiving controller 7 receives the information of speech signal detection from the opposite side apparatus through the signal line S20, the receiving controller 7 sets an output of a signal line S28 at "0" (speech at the receiving side). Besides, when the receiving controller 7 receives the information of data signal detection from the opposite side apparatus through the signal line S20, the receiving controller 7 sets an output of the signal line S28 at "1" (data at the receiving side).

The reset signal generating part 13 generates the first reset signal RV and the second reset signal RD based on the 2100 Hz detection result S12, the 1100 Hz detection result S14 and the outputs S24 and S28 of the receiving controller 7.

When the reset signal generating part 13 detects a leading edge to "1" (detected) from "0" (not detected) of the 2100 Hz detection result S12, the reset signal generating part 13 sets an output of the first reset signal RV to be "0" and sets an output of the second reset signal RD to be "1". Then, when the specific time T6 has passed since the detection of the leading edge to "1" from "0" of the 2100 Hz detection result S12, the reset signal generating part 13 sets both the outputs of the first reset signal RV and the second reset signal RD to be "0".

When the reset signal generating part 13 detects a leading edge to "1" (detected) from "0" (not detected) of the 1100 Hz detection result S14, the reset signal generating part 13 sets an output of the first reset signal RV to be "1" and sets an output of the second reset signal RD to be "0". When the specific time T5 has passed since the detection of the leading edge to "1" from "0" of the 1100 Hz detection result S14, the reset signal generating part 13 sets both the outputs of the first reset signal RV and the second reset signal RD to be "0".

When the reset signal generating part 13 detects a leading edge to "1" (1100 Hz detected at the receiving side) from "0" (1100 Hz not detected at the receiving side) of the output S24 of the receiving controller 7, the reset signal generating part 13 sets an output of the first reset signal RV to be "1" and sets an output of the second reset signal RD to be "0". Then, when a specific time T21 has passed since the detection of the leading edge to "1" from "0" of the output S24 of the receiving controller 7, the reset signal generating part 13 sets both the outputs of the first reset signal RV and the second reset signal RD to be "0".

When the reset signal generating part 13 detects a leading edge to "1" (data at the receiving side) from "0" (speech at the receiving side) of the output S28 of the receiving controller 7, the reset signal generating part 13 sets an output of the first reset signal RV to be "0" and sets an output of the second reset signal RD to be "1". Then, when a specific time T22 has passed since the detection of the leading edge to "1" from "0" of the output S28 of the receiving controller 7, the reset signal generating part 13 sets both the outputs of the first reset signal RV and the second reset signal RD to be "0".

In a case except the above cases, the reset signal generating part 13 sets both the outputs of the first reset signal RV and the second reset signal RD to be "0".

Figure 23:
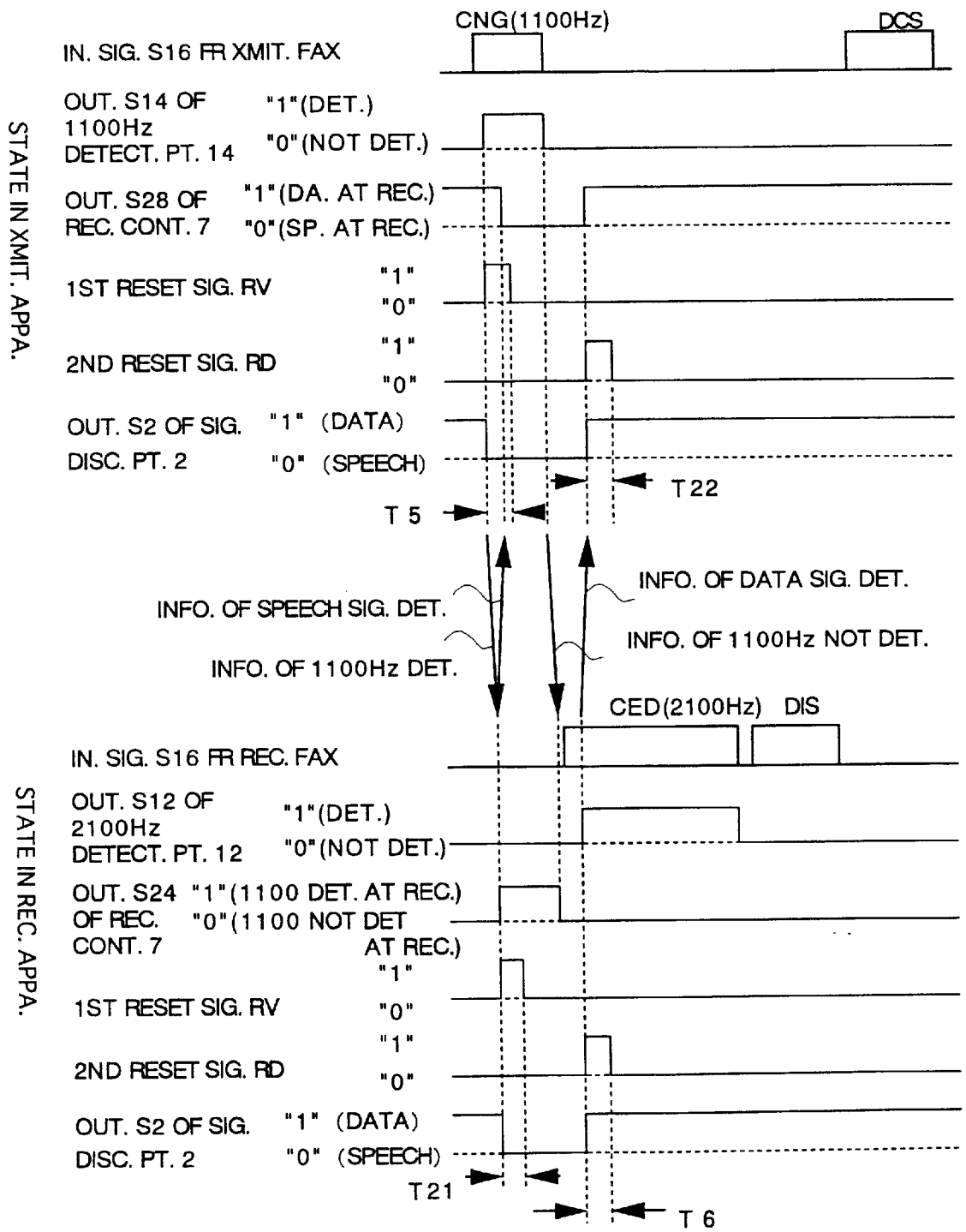
FIG. 23 illustrates operation of the signal transmitting apparatus for voiceband signals according to Embodiment 14 of the present invention.

Operation of discriminating signals in the case of a facsimile signal being input into the present signal transmitting apparatus for voiceband signals, will now be explained with reference to FIG. 23. In FIG. 23, each initial state of the outputs S2 of the signal discriminating parts 2 in the transmitting apparatus and the receiving apparatus is supposed to be "data".

In the transmitting apparatus, when a tone of 1100 Hz is output from the transmitting facsimile terminal, the 1100 Hz detecting part 14 detects the tone and changes its output S14 to "1" from "0". Until the specific time T5 has completely passed since the change to "1" (detected) from "0" (not detected) of the output S14 of the 1100 Hz detecting part 14, the reset signal generating part 13 has set the first reset signal RV to be "1". Therefore, an output S2 of the signal discriminating part 2 has been reset at "0" (speech). When the output S14 of the 1100 Hz detection part 14 changes to "1" (detected) from "0" (not detected), the transmission controlling part 3 outputs information of 1100 Hz being detected to the opposite side apparatus, that is the receiving apparatus, through the signal line S3.

In the receiving apparatus, when the receiving controller 7 receives information of 1100 Hz being detected from the opposite side apparatus, that is the transmitting apparatus, through the signal line S20, the receiving controller 7 sets an output of the signal line S24 at "1" (1100 Hz detected at the receiving side). Until the specific time T21 has completely passed since the output of the signal line S24 changed to "1" (1100 Hz detected at the receiving side) from "0" (1100 Hz not detected at the receiving side), the reset signal generating part 13 has set the first reset signal RV to be "1". Therefore, the output S2 of the signal discriminating part 2 has been reset at "0" (speech).

In the receiving apparatus, when a tone of 2100 Hz is output from the receiving facsimile terminal, the 2100 Hz detecting part 12 detects the tone and changes its output S12 to "1" from "0". Until the specific time T6 has completely passed since the change to "1" (detected) from "0" (not detected) of the output S12 of the 2100 Hz detecting part 12, the reset signal generating part 13 has set the second reset signal RD to be "1". Therefore, an output S2 of the signal discriminating part 2 has been set at "1" (data). When the signal discrimination state S2 changes to "1" (data) from "0" (speech), the transmission controlling part 3 outputs information of data signal detection to the opposite side apparatus, that is the transmitting apparatus, through the signal line S3.

In the transmitting apparatus, when the receiving controller 7 receives information of data signal detection from the opposite side apparatus, that is the receiving apparatus, through the signal line S20, the receiving controller 7 sets an output of the signal line S28 at "1" (data at the receiving side). Until the specific time T22 has completely passed since the output of the signal line S28 changed to "1" (data at the receiving side) from "0" (speech at the receiving side), the reset signal generating part 13 has set the second reset signal RD to be "1". Therefore, the output S2 of the signal discriminating part 2 has been set at "1" (data).

By applying the above configuration, in the receiving apparatus, when the receiving controller 7 sets an output S24 of the signal line S24 at "1" (1100 Hz detected at the receiving side) by receiving information of 1100 Hz being detected from the transmitting apparatus, the signal discriminating part 2 sets its output S2 at "speech" based on designation from the reset signal generating part 13. Then, in the receiving apparatus, when the 2100 Hz detecting part 12 detects a tone of 2100 Hz, the signal discriminating part 2 operates in order to set its output S2 at "data" based on designation from the reset signal generating part 13. Besides, in the transmitting apparatus, when the 1100 Hz detecting part 14 detects a tone of 1100 Hz, the signal discriminating part 2 resets its output S2 at "speech" based on designation of the reset signal generating part 13. Then, when the receiving controller 7 sets an output of the signal line S28 at "1" (data at the receiving side) by receiving information of data signal detection from the receiving apparatus, the signal discriminating part 2 operates in order to set its output S2 at "data", based on designation from the reset signal generating part 13. Accordingly, it is possible to set each discrimination state in the transmitting apparatus and in the receiving apparatus at "data", after the discrimination state having been once reset at "speech", at the beginning of a facsimile call even when no call control information can be obtained. Therefore, channels of an input facsimile signal can be assigned to modems in the facsimile signal demodulating part 5. Then, the facsimile signal can be correctly transmitted by demodulation.

Embodiment 15

Figure 24:
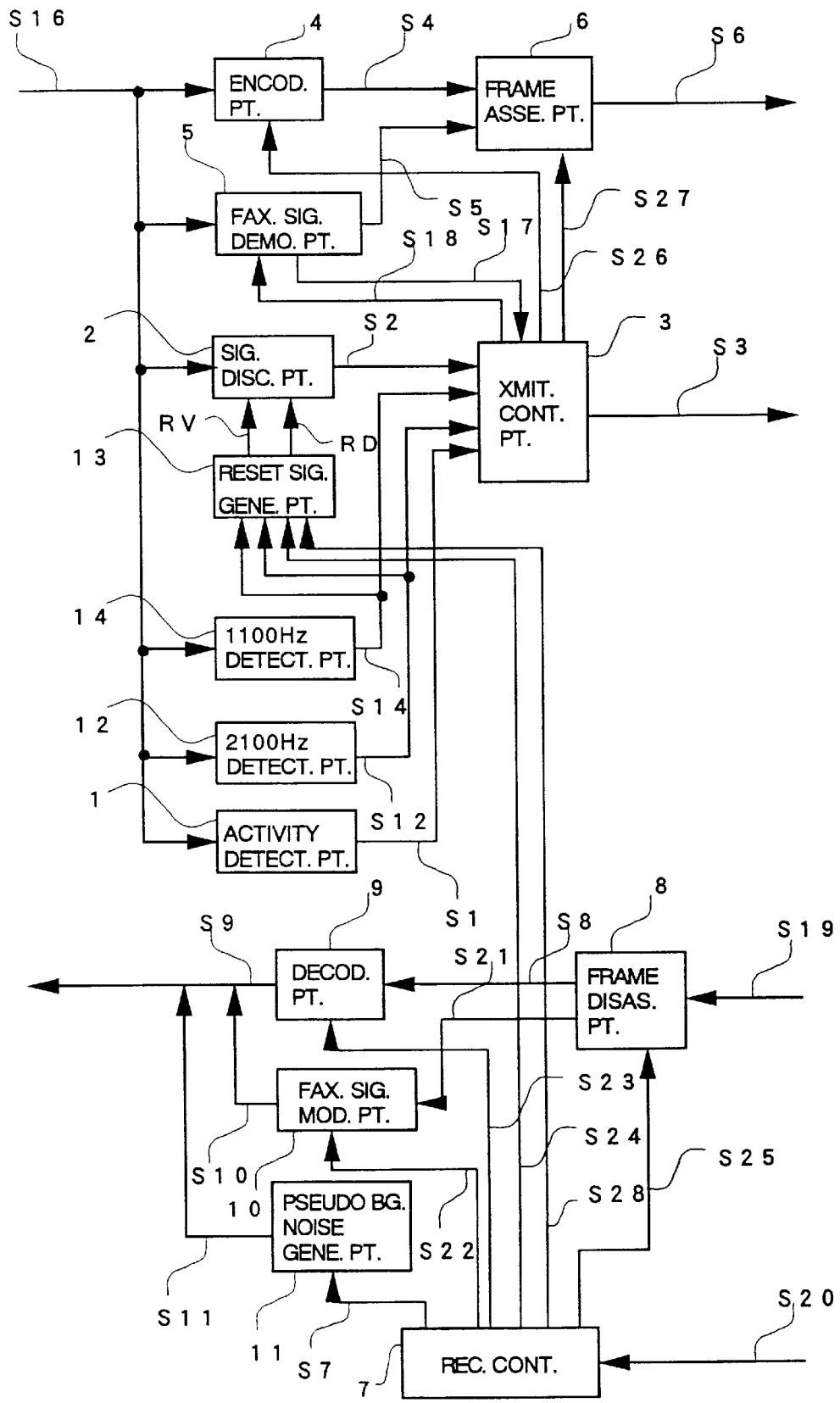
FIG. 24 is a block diagram showing a signal transmitting apparatus for voiceband signals according to Embodiment 15 or 19 of the present invention.

FIG. 24 shows a configuration of another embodiment of the signal transmitting apparatus for voiceband signals, according to the present invention. In FIG. 24, the input signal S16 of M channels input into the signal transmitting apparatus for voiceband signals, the activity detecting part 1, the signal discriminating part 2, the transmission controlling part 3, the encoding part 4, the facsimile signal demodulating part 5, the frame assembling part 6, the receiving controller 7, the frame disassembling part 8, the decoding part 9, the facsimile signal modulating part 10, the pseudo background noise generating part 11, the 2100 Hz detecting part 12, the reset signal generating part 13 and the 1100 Hz detecting part 14 are shown.

Now, operation will be stated. Operations of the activity detecting part 1, the encoding part 4, the facsimile signal demodulating part 5, the frame assembling part 6, the frame disassembling part 8, the decoding part 9, the facsimile signal modulating part 10, and the pseudo background noise generating part 11 are the same as those described in Related Art with reference to FIG. 55.

The 2100 Hz detecting part 12 and the signal discriminating part 2 identically operate with the ones stated in Embodiment 6 with reference to FIG. 8. The 1100 Hz detecting part 14 identically operates with the one stated in Embodiment 9 with reference to FIG. 13.

The transmission controlling part 3 identically operates with the one stated in Related Art with reference to FIG. 55 except for the following cases. The transmission controlling part 3 inputs a 2100 Hz detection result S12. When a change to "1" from "0" of the 2100 Hz detection result S12 is detected, the transmission controlling part 3 outputs information of 2100 Hz being detected to the opposite side apparatus through the signal line S3. When a change to "0" from "1" of the 2100 Hz detection result S12 is detected, the transmission controlling part 3 outputs information of 2100 Hz being not detected, to the opposite side apparatus through the signal line S3.

The transmission controlling part 3 inputs a 1100 Hz detection result S14. When a change to "1" from "0" of the 1100 Hz detection result S14 is detected, the transmission controlling part 3 outputs information of 1100 Hz being detected to the opposite side apparatus through the signal line S3. When a change to "0" from "1" of the 1100 Hz detection result S14 is detected, the transmission controlling part 3 outputs information of 1100 Hz being not detected to the opposite side apparatus through the signal line S3.

The receiving controller 7 identically operates with the one stated in Related Art with reference to FIG. 55 except for the following cases. The receiving controller 7 sets an output of the signal line S24 at "1" (2100 Hz detected at the receiving side) when the receiving controller 7 receives the information of 2100 Hz being detected from the opposite side apparatus through the signal line S20. Besides, when the receiving controller 7 receives the information of 2100 Hz being not detected from the opposite side apparatus through the signal line S20, the receiving controller 7 resets an output of the signal line S24 at "0" (2100 Hz not detected at the receiving side).

When the receiving controller 7 receives the information of 1100 Hz being detected from the opposite side apparatus through the signal line S20, the receiving controller 7 sets an output of the signal line S28 at "1" (1100 Hz detected at the receiving side). Besides, when the receiving controller 7 receives the information of 1100 Hz being not detected from the opposite side apparatus through the signal line S20, the receiving controller 7 resets an output of the signal line S28 at "0" (1100 Hz not detected at the receiving side).

The reset signal generating part 13 generates the first reset signal RV and the second reset signal RD based on the 2100 Hz detection result S12, the 1100 Hz detection result S14 and the outputs S24 and S28 of the receiving controller 7.

When the reset signal generating part 13 detects a leading edge to "1" (detected) from "0" (not detected) of the 2100 Hz detection result S12, a leading edge to "1" (detected) from "0" (not detected) of the 1100 Hz detection result S14, or a leading edge to "1" (1100 Hz detected at the receiving side) from "0" (1100 Hz not detected at the receiving side) of the output S28 of the receiving controller 7, the reset signal generating part 13 identically operates with the one stated in Embodiment 14.

When the reset signal generating part 13 detects a leading edge to "1" (2100 Hz detected at the receiving side) from "0" (2100 Hz not detected at the receiving side) of the output S24 of the receiving controller 7, the reset signal generating part 13 sets an output of the first reset signal RV to be "0" and sets an output of the second reset signal RD to be "1". Then, when a specific time T23 has passed since the detection of the leading edge to "1" from "0" of the output S24 of the receiving controller 7, the reset signal generating part 13 sets both the outputs of the first reset signal RV and the second reset signal RD to be "0".

In a case except the above cases, the reset signal generating part 13 sets both the outputs of the first reset signal RV and the second reset signal RD to be "0".

Figure 25:
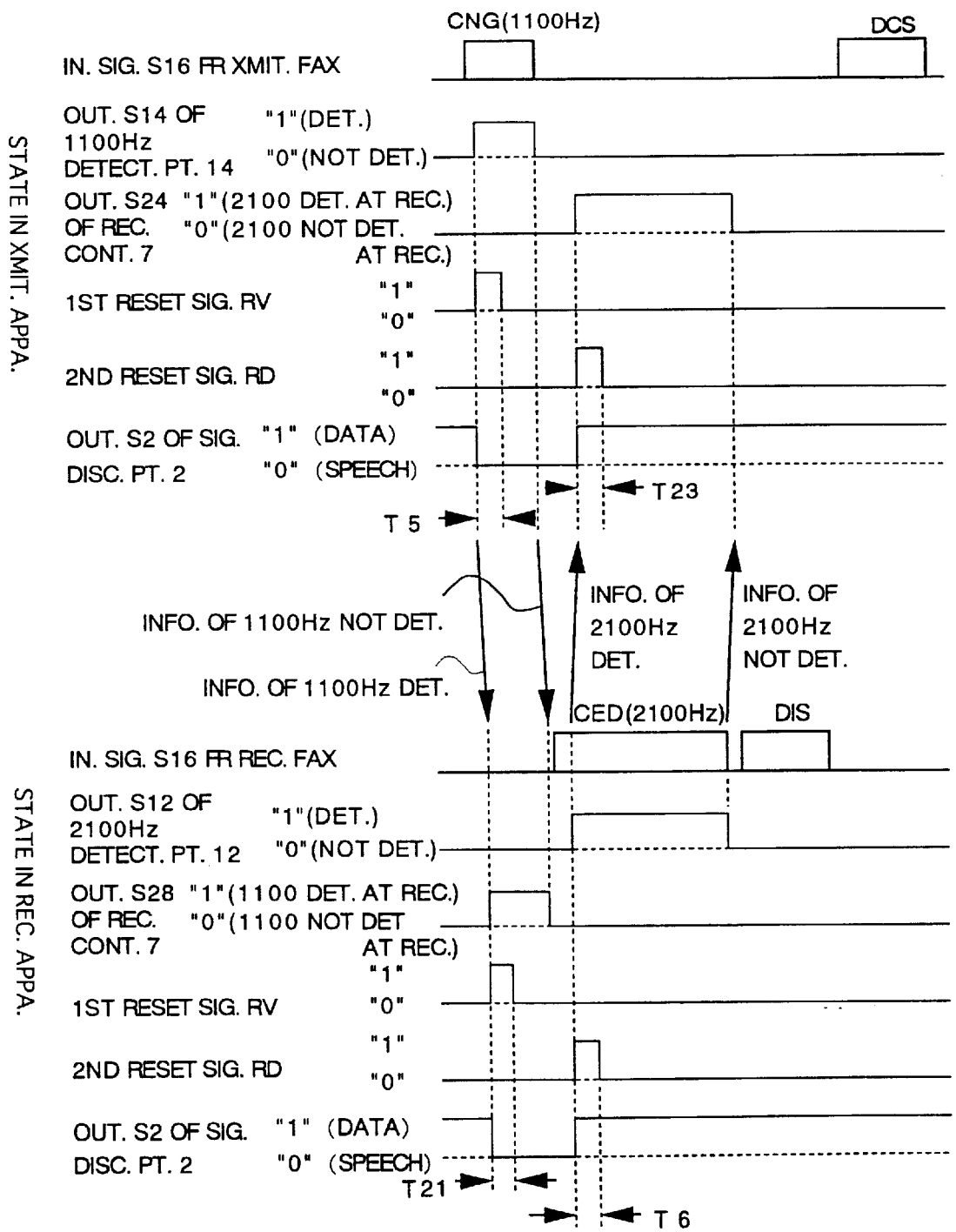
FIG. 25 illustrates operation of the signal transmitting apparatus for voiceband signals according to Embodiment 15 of the present invention.

Operation of discriminating signals in the case of a facsimile signal being input into the present signal transmitting apparatus for voiceband signals, will now be explained with reference to FIG. 25. In FIG. 25, each initial state of the outputs S2 of the signal discriminating parts 2 in the transmitting apparatus and the receiving apparatus is supposed to be "data".

A signal state in the receiving apparatus is the same as the one stated with reference to FIG. 23 in Embodiment 14, whose configuration is shown in FIG. 22.

When the output S12 of the 2100 Hz detecting part 12 changes to "1" (detected) from "0" (not detected), the transmission controlling part 3 in the receiving apparatus outputs information of 2100 Hz being detected to the opposite side apparatus, that is the transmitting apparatus, through the signal line S3.

In the transmitting apparatus, when a tone of 1100 Hz is output from the transmitting facsimile terminal, the 1100 Hz detecting part 14 detects the tone and changes its output S14 to "1" from "0". Until the specific time T5 has completely passed since the change to "1" (detected) from "0" (not detected) of the output S14 of the 1100 Hz detecting part 14, the reset signal generating part 13 has set the first reset signal RV to be "1". Therefore, an output S2 of the signal discriminating part 2 has been reset at "0" (speech).

In the transmitting apparatus, when the receiving controller 7 receives information of 2100 Hz being detected from the opposite side apparatus, that is the receiving apparatus, through the signal line S20, the receiving controller 7 sets an output of the signal line S24 at "1" (2100 Hz detected at the receiving side). Until the specific time T23 has completely passed since the output of the signal line S24 changed to "1" (2100 Hz detected at the receiving side) from "0" (2100 Hz not detected at the receiving side), the reset signal generating part 13 has set the second reset signal RD to be "1".

Therefore, the output S2 of the signal discriminating part 2 has been set at "1" (data).

By applying the above configuration, in the receiving apparatus, when the receiving controller 7 sets an output of the signal line S28 at "1" (1100 Hz detected at the receiving side) by receiving information of 1100 Hz being detected from the transmitting apparatus, the signal discriminating part 2 resets its output S2 at "speech" based on designation from the reset signal generating part 13. Then, in the receiving apparatus, when the 2100 Hz detecting part 12 detects a tone of 2100 Hz, the signal discriminating part 2 operates in order to set its output S2 at "data" based on designation from the reset signal generating part 13. Besides, in the transmitting apparatus, when the 1100 Hz detecting part 14 detects a tone of 1100 Hz, the signal discriminating part 2 resets its output S2 at "speech" based on designation of the reset signal generating part 13. Then, when the receiving controller 7 sets an output of the signal line S24 at "1" (2100 Hz detected at the receiving side) by receiving information of 2100 Hz being detected from the receiving apparatus, the signal discriminating part 2 operates in order to set its output S2 at "data" based on designation from the reset signal generating part 13. Accordingly, it is possible to set each discrimination state in the transmitting apparatus and in the receiving apparatus at "data", after the discrimination state having been once reset at "speech", at the beginning of a facsimile call even when no call control information can be obtained. Therefore, channels of input facsimile signals can be assigned to modems in the facsimile signal demodulating part 5. Then, the facsimile signal can be correctly transmitted by demodulation.

Embodiment 16

As have been stated, in Embodiment 13 whose configuration is shown in FIG. 20, the reset signal generating part 13 outputs the first reset signal RV and the second reset signal RD to the signal discriminating part 2 in order that the signal discriminating part 2 can set a discrimination state at "data" after having once set at "speech", when the reset signal generating part 13 detects a leading edge to "1" (detected) from "0" (not detected) of the 2100 Hz detection result S12.

However, with reference to the configuration of FIG. 20, it is acceptable for the reset signal generating part 13 to operate differently from the operation described in Embodiment 13.

In the configuration of FIG. 20, when the reset signal generating part 13 detects a leading edge to "1" (detected) from "0" (not detected) of the 2100 Hz detection result S12 or a leading edge to "1" (detected) from "0" (not detected) of the 1100 Hz detection result S14, the reset signal generating part 13 identically operates with the one stated in Embodiment 14.

However, if the reset signal generating part 13 detects a leading edge to "1" (data at the receiving side) from "0" (speech at the receiving side) of the output S24 of the receiving controller 7, the reset signal generating part 13 sets an output of the first reset signal RV at "0" and sets an output of the second reset signal RD at "1". Then, when a specific time T24 has completely passed since the detection of the leading edge to "1" from "0" of the output S24 of the receiving controller 7, the reset signal generating part 13 sets both the outputs of the first reset signal RV and the second reset signal RD at "0".

In addition, if the reset signal generating part 13 detects a trailing edge to "0" (speech at the receiving side) from "1" (data at the receiving side) of the output S24 of the receiving controller 7, the reset signal generating part 13 sets an output of the first reset signal RV at "1" and sets an output of the second reset signal RD at "0". Then, when a specific time T25 has completely passed since the detection of the trailing edge to "0" from "1" of the output S24 of the receiving controller 7, the reset signal generating part 13 sets both the outputs of the first reset signal RV and the second reset signal RD at "0".

In a case except the above cases, the reset signal generating part 13 sets both the outputs of the first reset signal RV and the second reset signal RD to be "0".

Figure 26:
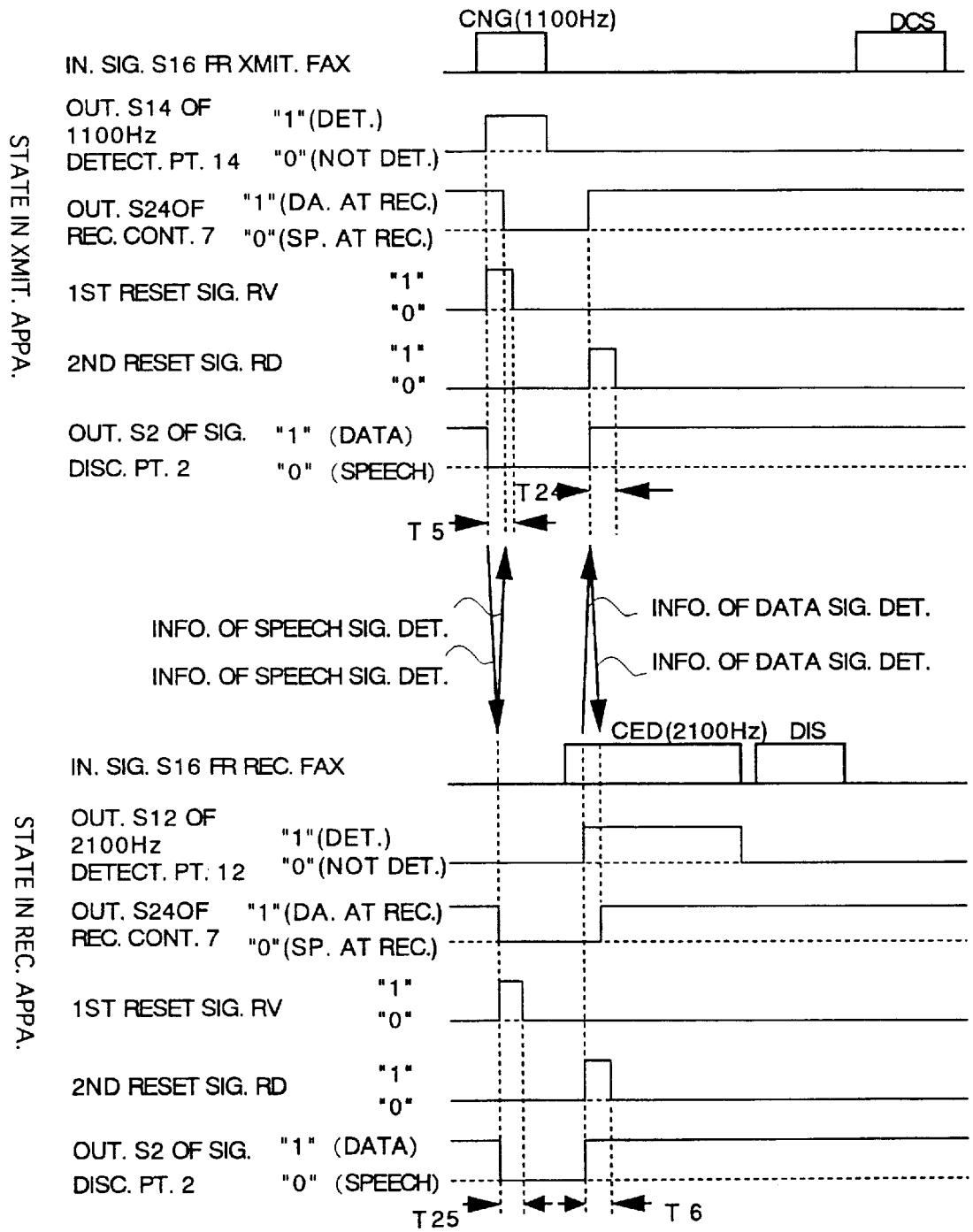
FIG. 26 illustrates operation of the signal transmitting apparatus for voiceband signals according to Embodiment 16 of the present invention.

Operation of discriminating signals in the case of a facsimile signal being input into the present signal transmitting apparatus for voiceband signals, will now be explained with reference to FIG. 26. In FIG. 26, each initial state of the outputs S2 of the signal discriminating parts 2 in the transmitting apparatus and the receiving apparatus is supposed to be "data".

In the transmitting apparatus, when a tone of 1100 Hz is output from the transmitting facsimile terminal, the 1100 Hz detecting part 14 detects the tone and changes its output S14 to "1" from "0". Until the specific time T5 has completely passed since the change to "1" (detected) from "0" (not detected) of the output S14 of the 1100 Hz detecting part 14, the reset signal generating part 13 has set the first reset signal RV to be "1". Therefore, an output S2 of the signal discriminating part 2 has been reset at "0" (speech). When the signal discrimination result S2 changes to "0" (speech) from "1" (data), the transmission controlling part 3 outputs information of speech signal detection to the opposite side apparatus, that is the receiving apparatus, through the signal line S3.

In the receiving apparatus, when the receiving controller 7 receives information of speech signal detection from the opposite side apparatus, that is the transmitting apparatus, through the signal line S20, the receiving controller 7 resets an output of the signal line S24 at "0" (speech at the receiving side). Until the specific time T25 has completely passed since the output of the signal line S24 changed to "0" (speech at 5 the receiving side) from "1" (data at the receiving side), the reset signal generating part 13 has set the first reset signal RV to be "1". Therefore, the output S2 of the signal discriminating part 2 has been reset at "0" (speech). When a tone of 2100 Hz is output from the receiving facsimile terminal, the 2100 Hz detecting part 12 detects the tone and changes its output S12 to "1" from "0". Until the specific time T6 has completely passed since the change to "1" (detected) from "0" (not detected) of the output S12 of the 2100 Hz detecting part 12, the reset signal generating part 13 has set the second reset signal RD to be "1". Therefore, an output S2 of the signal discriminating part 2 has been set at "1" (data). When the signal discrimination state S2 changes to "1" (data) from "0" (speech), the transmission controlling part 3 outputs information of data signal detection to the opposite side apparatus, that is the transmitting apparatus, through the signal line S3.

In the transmitting apparatus, when the receiving controller 7 receives information of data signal detection from the opposite side apparatus, that is the receiving apparatus, through the signal line S20, the receiving controller 7 sets an output of the signal line S24 at "1" (data at the receiving side). Until the specific time T24 has completely passed since the output of the signal line S24 changed to "1" (data at the receiving side) from "0" (speech at the receiving side), the reset signal generating part 13 has set the second reset signal RD to be "1". Therefore, the output S2 of the signal discriminating part 2 has been set at "1" (data).

By applying the above configuration, in the receiving apparatus, when the receiving controller 7 resets an output of the signal line S24 at "0" (speech at the receiving side) by receiving information of speech signal detection from the transmitting apparatus, the signal discriminating part 2 resets its output S2 at "speech" based on designation from the reset signal generating part 13. Then, when the 2100 Hz detecting part 12 detects a tone of 2100 Hz, the signal discriminating part 2 operates in order to set its output S2 at "data" based on designation from the reset signal generating part 13. Besides, in the transmitting apparatus, when the 1100 Hz detecting part 14 detects a tone of 1100 Hz, the signal discriminating part 2 resets its output S2 at "speech" based on designation of the reset signal generating part 13. Then, when the receiving controller 7 sets an output of the signal line S24 at "1" (data at the receiving side) by receiving information of data signal detection from the receiving apparatus, the signal discriminating part 2 operates in order to set its output S2 at "data" based on designation from the reset signal generating part 13. Accordingly, it is possible to set each discrimination state in the transmitting apparatus and in the receiving apparatus at "data", after having once reset the discrimination state at "speech", at the beginning of a facsimile call even when no call control information can be obtained. Therefore, channels of an input facsimile signal can be assigned to modems in the facsimile signal demodulating part 5. Then, the facsimile signal can be correctly transmitted by demodulation.

Embodiment 17

Figure 27:
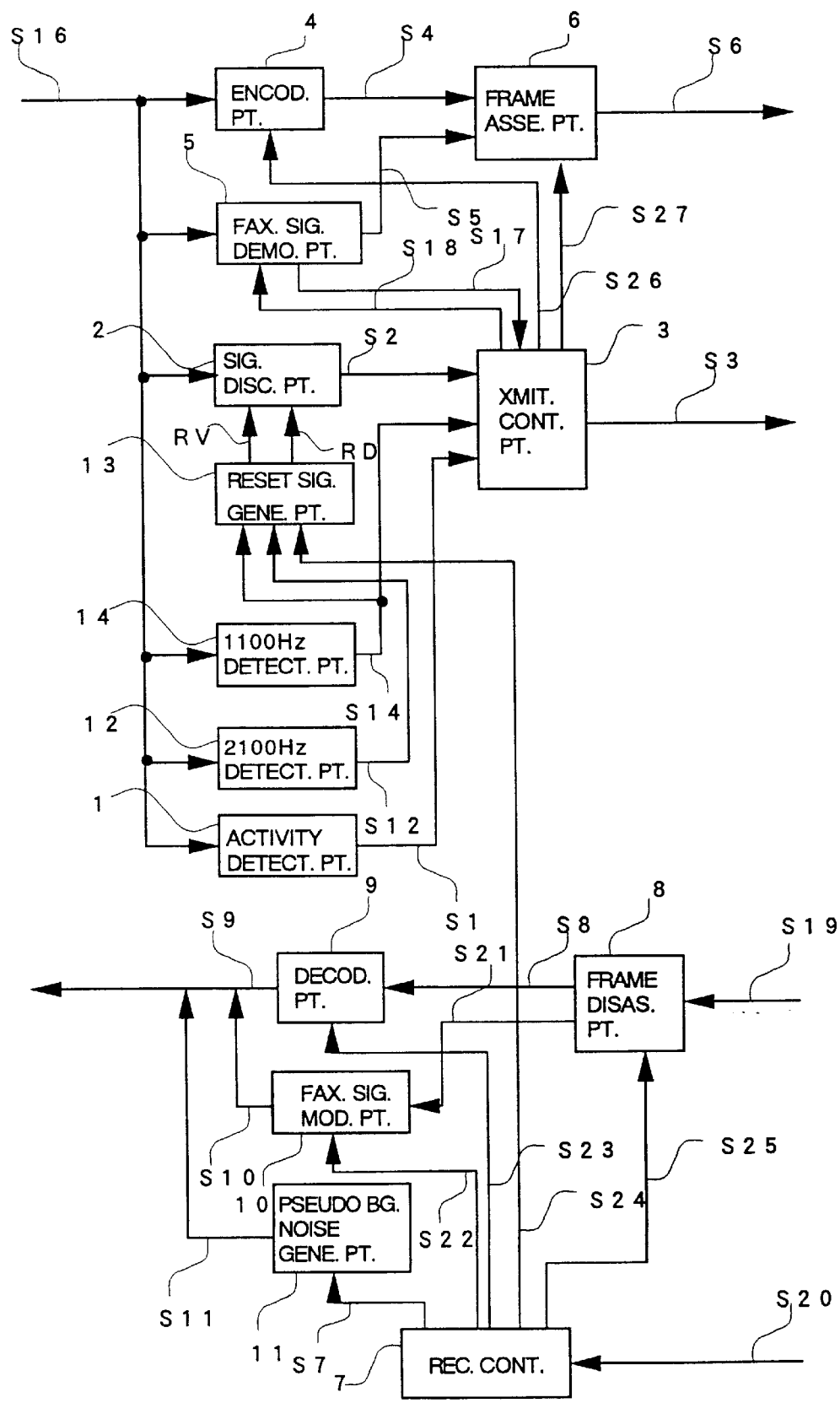
FIG. 27 is a block diagram showing a signal transmitting apparatus for voiceband signals according to Embodiment 17 of the present invention.

FIG. 27 shows a configuration of another embodiment of the signal transmitting apparatus for voiceband signals, according to the present invention. In FIG. 27, the input signal S16 of M channels input into the signal transmitting apparatus for voiceband signals, the activity detecting part 1, the signal discriminating part 2, the transmission controlling part 3, the encoding part 4, the facsimile signal demodulating part 5, the frame assembling part 6, the receiving controller 7, the frame disassembling part 8, the decoding part 9, the facsimile signal modulating part 10, and the pseudo background noise generating part 11 are shown.

In FIG. 27, the 2100 Hz detecting part 12 detects whether or not a tone of 2100 Hz exists in the input signal S16, and outputs a detection result S12. The 1100 Hz detecting part 14 detects whether or not a tone of 1100 Hz exists in the input signal S16, and outputs a detection result S14. The reset signal generating part 13 outputs the first reset signal RV and the second reset signal RD, based on the 2100 Hz detection result S12, 1100 Hz detection result S14, and the output S24 from the receiving controller 7. The first reset signal RV is for compulsorily resetting a judgement result S2 of the signal discriminating part 2 at "speech", and the second reset signal RD is for compulsorily setting the Judgement result S2 of the signal discriminating part 2 at "data".

Now, operation will be stated. Operations of the activity detecting part 1, the encoding part 4, the facsimile signal demodulating part 5, the frame assembling part 6, the frame disassembling part 8, the decoding part 9, the facsimile signal modulating part 10, and the pseudo background noise generating part 11 are the same as those described in Related Art with reference to FIG. 55.

The 2100 Hz detecting part 12 and the signal discriminating part 2 identically operate with the ones stated in Embodiment 6 with reference to FIG. 8. The 1100 Hz detecting part 14 identically operates with the one stated in Embodiment 9 with reference to FIG. 13.

The transmission controlling part 3 identically operates with the one stated in Related Art with reference to FIG. 55 except for the following cases. The transmission controlling part 3 inputs a 1100 Hz detection result S14. When a change to "1" from "0" of the 1100 Hz detection result S14 is detected, the transmission controlling part 3 outputs information of 1100 Hz being detected to the opposite side apparatus through the signal line S3. When a change to "0" from "1" of the 1100 Hz detection result S14 is detected, the transmission controlling part 3 outputs information of 1100 Hz being not detected, to the opposite side apparatus through the signal line S3.

The receiving controller 7 identically operates with the one stated in Related Art with reference to FIG. 55 except for the following cases. The receiving controller 7 sets an output of the signal line S24 at "1" (1100 Hz detected at the receiving side) when the receiving controller 7 receives the information of 1100 Hz being detected from the opposite side apparatus through the signal line S20. The receiving controller 7 resets an output of the signal line S24 at "0" (1100 Hz not detected at the receiving side) when the receiving controller 7 receives the information of 1100 Hz being not detected from the opposite side apparatus through the signal line S20.

The reset signal generating part 13 generates the first reset signal RV and the second reset signal RD based on the 2100 Hz detection result S12, the 1100 Hz detection result S14 and the outputs S24 of the receiving controller 7.

When the reset signal generating part 13 detects a leading edge to "1" (detected) from "0" (not detected) of the 2100 Hz detection result S12, the reset signal generating part 13 sets an output of the first reset signal RV to be "0" and sets an output of the second reset signal RD to be "1". Then, when the specific time T6 has passed since the detection of the leading edge to "1" from "0" of the 2100 Hz detection result S12, the reset signal generating part 13 sets both the outputs of the first reset signal RV and the second reset signal RD to be "0".

When the reset signal generating part 13 detects a leading edge to "1" (detected) from "0" (not detected) of the 1100 Hz detection result S14, the reset signal generating part 13 sets an output of the first reset signal RV to be "1" and sets an output of the second reset signal RD to be "0". When the specific time T3 has passed since the detection of the leading edge to "1" from "0" of the 1100 Hz detection result S14, the reset signal generating part 13 sets an output of the first reset signal RV at "0" and sets an output of the second reset signal RD to be "1". Then, when the specific time T4 (T4>T3) has completely passed since the detection of the leading edge to "1" from "0" of the 1100 Hz detection result S14, the reset signal generating part 13 sets both the outputs of the first reset signal RV and the second reset signal RD to be "0".

When the reset signal generating part 13 detects a leading edge to "1" (1100 Hz detected at the receiving side) from "0" (1100 Hz not detected at the receiving side) of the output S24 of the receiving controller 7, the reset signal generating part 13 sets an output of the first reset signal RV to be "1" and sets an output of the second reset signal RD to be "0". Then, when a specific time T26 has passed since the detection of the leading edge to "1" from "0" of the output S24 of the receiving controller 7, the reset signal generating part 13 sets both the outputs of the first reset signal RV and the second reset signal RD to be "0".

In a case except the above cases, the reset signal generating part 13 sets both the outputs of the first reset signal RV and the second reset signal RD to be "0".

Figure 28:
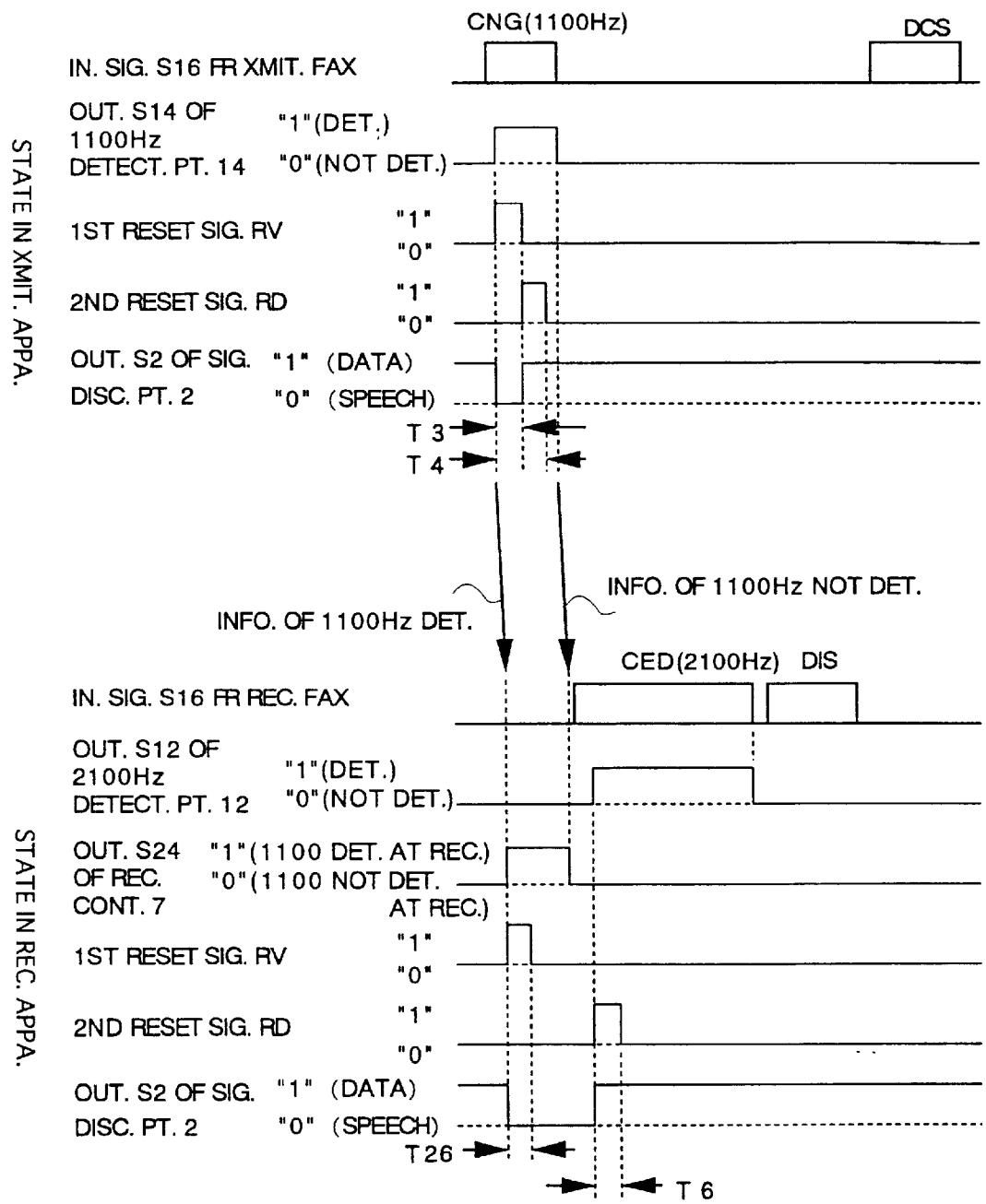
FIG. 28 illustrates operation of the signal transmitting apparatus for voiceband signals according to Embodiment 17 of the present invention.

Operation of discriminating signals in the case of a facsimile signal being input into the present signal transmitting apparatus for voiceband signals, will now be explained with reference to FIG. 28. In FIG. 28, each initial state of the outputs S2 of the signal discriminating parts 2 in the transmitting apparatus and the receiving apparatus is supposed to be "data".

In the transmitting apparatus, when a tone of 1100 Hz is output from the transmitting facsimile terminal, the 1100 Hz detecting part 14 detects the tone and changes its output S14 to "1" from "0". Until the specific time T3 has completely passed since the change to "1" (detected) from "0" (not detected) of the output S14 of the 1100 Hz detecting part 14, the reset signal 20 generating part 13 has set the first reset signal RV to be "1". Therefore, an output S2 of the signal discriminating part 2 has been reset at "0" (speech). In addition, until the specific time T4 has completely passed since T3 having passed after the change to "1" (detected) from "0" (not detected) of the output S14 of the 1100 Hz detecting part 14, the reset signal generating part 13 has set the second reset signal RD to be "1". Therefore, an output S2 of the signal discriminating part 2 has been reset at "1" (data). When the output S14 of the 1100 Hz detection part 14 changes to "1" (detected) from "0" (not detected), the transmission controlling part 3 outputs information of 1100 Hz being detected to the opposite side apparatus, that is the receiving apparatus, through the signal line S3.

In the receiving apparatus, when the receiving controller 7 receives the information of 1100 Hz being detected from the opposite side apparatus, that is the transmitting apparatus, through the signal line S20, the receiving controller 7 sets an output of the signal line S24 at "1" (1100 Hz detected at the receiving side). Until the specific time T26 has completely passed since the output of the signal line S24 changed to "1" (1100 Hz detected at the receiving side) from "0" (1100 Hz not detected at the receiving side), the reset signal generating part 13 has set the first reset signal RV to be "1". Therefore, the output S2 of the signal discriminating part 2 has been reset at "0" (speech).

In the receiving apparatus, when a tone of 2100 Hz is output from the receiving facsimile terminal, the 2100 Hz detecting part 12 detects the tone and changes its output S12 to "1" from "0". Until the specific time T6 has completely passed since the change to "1" (detected) from "0" (not detected) of the output S12 of the 2100 Hz detecting part 12, the reset signal generating part 13 has set the second reset signal RD to be "1". Therefore, an output S2 of the signal discriminating part 2 has been set at "1" (data).

By applying the above configuration, in the receiving apparatus, when the receiving controller 7 sets an output of the signal line S24 at "1" (1100 Hz detected at the receiving side) by receiving information of 1100 Hz being detected from the transmitting apparatus, the signal discriminating part 2 resets its output S2 at "speech" based on designation from the reset signal generating part 13. Then, when the 2100 Hz detecting part 12 detects a tone of 2100 Hz, the signal discriminating part 2 operates in order to set its output S2 at "data" based on designation from the reset signal generating part 13. Besides, in the transmitting apparatus, when the 1100 Hz detecting part 14 detects a tone of 1100 Hz, the signal discriminating part 2 operates in order to set its output S2 at "data", after having reset the output S2 at "speech", based on designation of the reset signal generating part 13. Accordingly, it is possible to set each discrimination state in the transmitting apparatus and in the receiving apparatus at "data", after once having reset the discrimination state at "speech", at the beginning of a facsimile call even when no call control information can be obtained. Therefore, channels of an input facsimile signal can be assigned to modems in the facsimile signal demodulating part 5. Then, the facsimile signal can be correctly transmitted by demodulation.

Embodiment 18

Figure 29A:
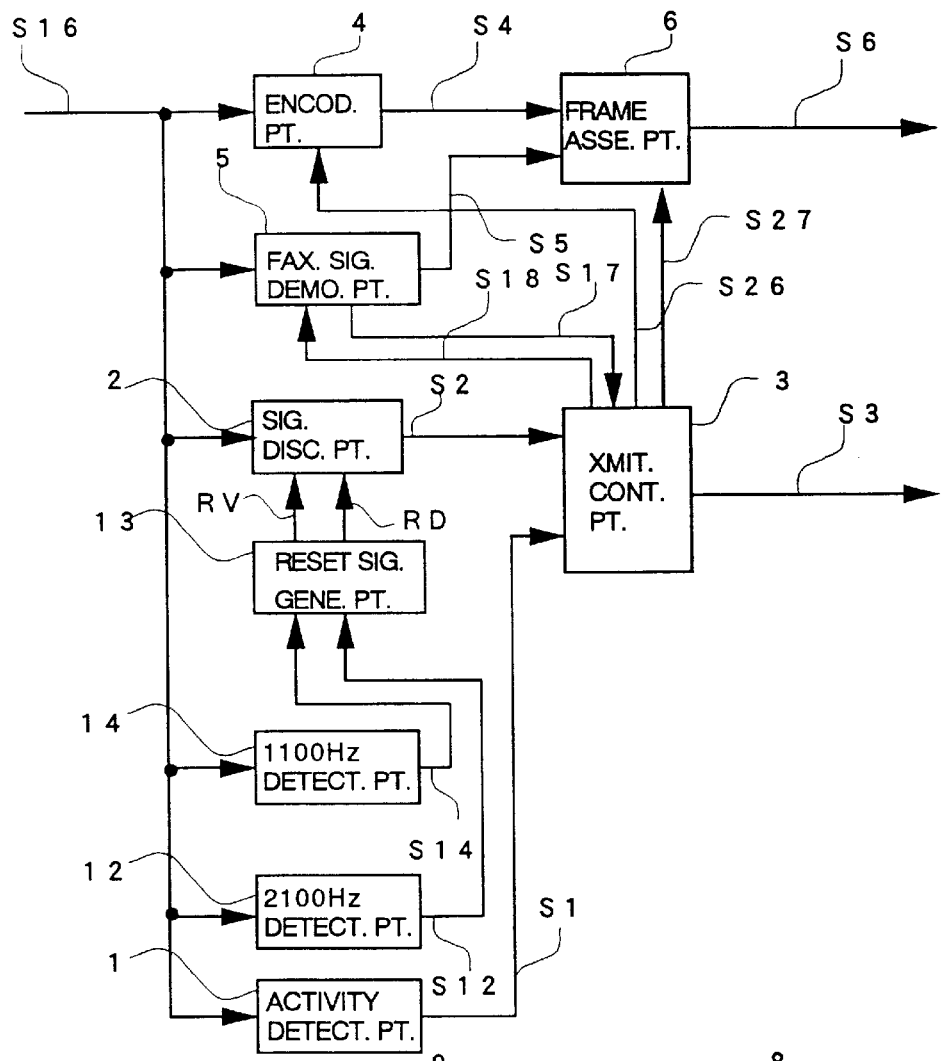
FIG. 29A is a block diagram showing a signal transmitting apparatus for voiceband signals according to Embodiment 18 of the present invention.
Figure 29B:
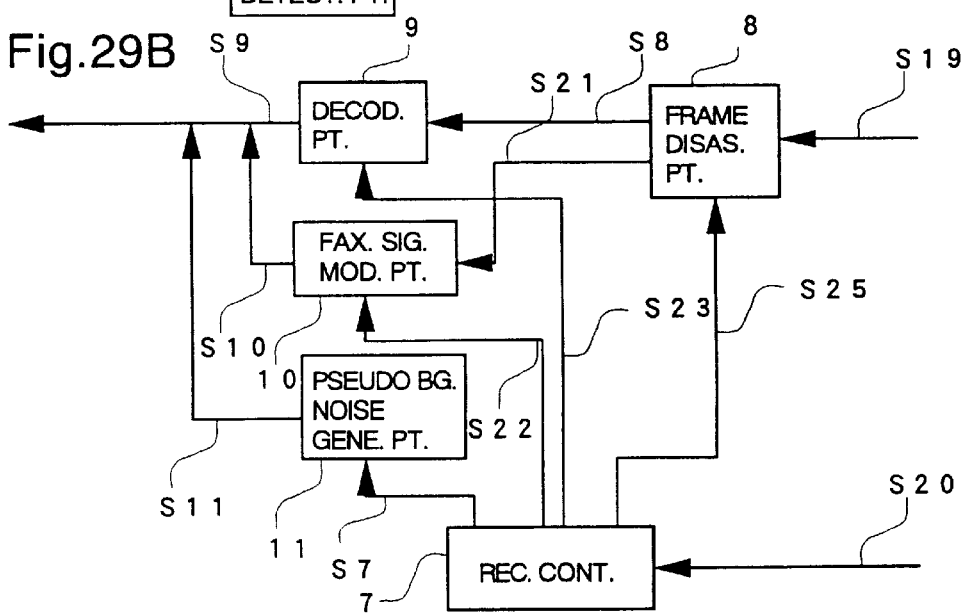
FIG. 29B is a block diagram showing the signal transmitting apparatus for voiceband signals according to Embodiment 18 of the present invention.

FIGS. 29A and 29B show a configuration of another embodiment of the signal transmitting apparatus for voiceband signals, according to the present invention. In FIGS. 29A and 29B, the input signal S16 of M channels input into the signal transmitting apparatus for voiceband signals, the activity detecting part 1, the signal discriminating part 2, the transmission controlling part 3, the encoding part 4, the facsimile signal demodulating part 5, the frame assembling part 6, the receiving controller 7, the frame disassembling part 8, the decoding part 9, the facsimile signal modulating part 10, and the pseudo background noise generating part 11 are shown.

In FIGS. 29A and 29B, the 2100 Hz detecting part 12 detects whether or not a tone of 2100 Hz exists in the input signal S16, and outputs a detection result S12. The 1100 Hz detecting part 14 detects whether or not a tone of 1100 Hz exists in the input signal S16, and outputs a detection result S14. The reset signal generating part 13 outputs the first reset signal RV and the second reset signal RD, based on the 2100 Hz detection result S12 and the 1100 Hz detection result S14. The first reset signal RV is for compulsorily resetting a judgement result S2 of the signal discriminating part 2 at "speech", and the second reset signal RD is for compulsorily setting the judgement result S2 of the signal discriminating part 2 at "data".

Now, operation will be stated. Operations of the activity detecting part 1, the transmission controlling part 3, the encoding part 4, the facsimile signal demodulating part 5, the frame assembling part 6, the receiving controller 7, the frame disassembling part 8, the decoding part 9, the facsimile signal modulating part 10, and the pseudo background noise generating part 11 are the same as those described in Related Art with reference to FIG. 55.

The 2100 Hz detecting part 12 and the signal discriminating part 2 identically operate with the ones stated in Embodiment 6 with reference to FIG. 8. The 1100 Hz detecting part 14 identically operates with the one stated in Embodiment 9 with reference to FIG. 13.

The reset signal generating part 13 generates the first reset signal RV and the second reset signal RD based on the 2100 Hz detection result S12 and the 1100 Hz detection result S14.

When the reset signal generating part 13 detects a leading edge to "1" (detected) from "0" (not detected) of the 2100 Hz detection result S12, the reset signal generating part 13 sets an output of the first reset signal RV to be "1" and sets an output of the second reset signal RD to be "0". When the specific time T1 has completely passed since the detection of the leading edge to "1" from "0" of the 2100 Hz detection result S12, the reset signal generating part 13 sets an output of the first reset signal RV to be "0" and sets an output of the second reset signal RD to be "1". Then, when the specific time T2 (T2>T1) has completely passed since the detection of the leading edge to "1" from "0" of the 2100 Hz detection result S12, the reset signal generating part 13 sets both the outputs of the first reset signal RV and the second reset signal RD to be "0".

When the reset signal generating part 13 detects a leading edge to "1" (detected) from "0" (not detected) of the 1100 Hz detection result S14, the reset signal generating part 13 sets an output of the first reset signal RV to be "1" and sets an output of the second reset signal RD to be "0". Then, when the specific time T3 has completely passed since the detection of the leading edge to "1" from "0" of the 1100 Hz detection result S14, the reset signal generating part 13 sets an output of the first reset signal RV at "0" and sets an output of the second reset signal RD to be "1". Then, when the specific time T4 (T4>T3) has completely passed since the detection of the leading edge to "1" from "0" of the 1100 Hz detection result S14, the reset signal generating part 13 sets both the outputs of the first reset signal RV and the second reset signal RD to be "0".

In a case except the above cases, the reset signal generating part 13 sets both the outputs of the first reset signal RV and the second reset signal RD to be "0".

Figure 30A:
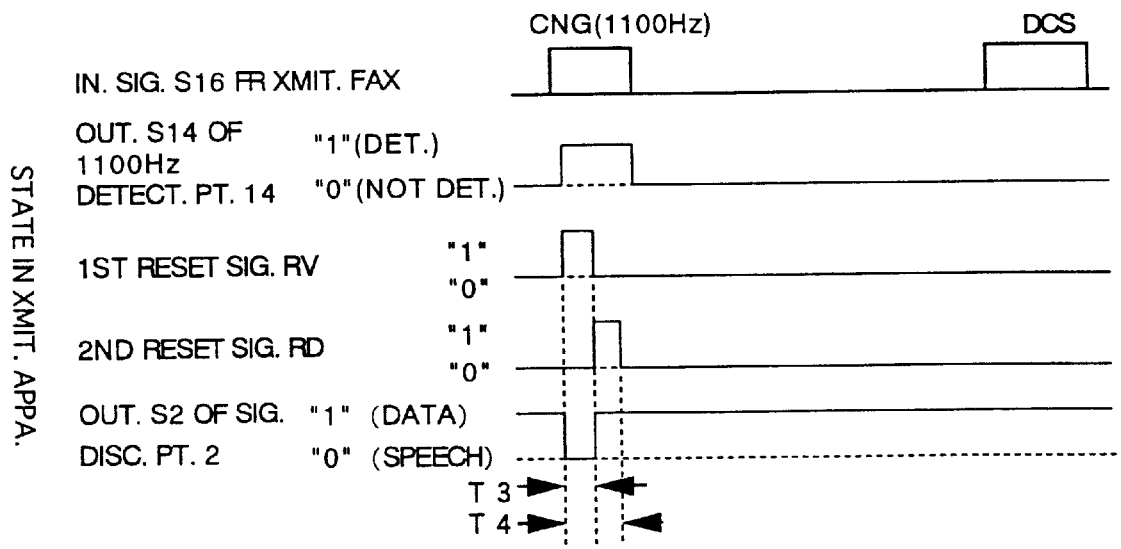
FIG. 30A illustrates operation of the signal transmitting apparatus for voiceband signals according to Embodiment 18 of the present invention.
Figure 30B:
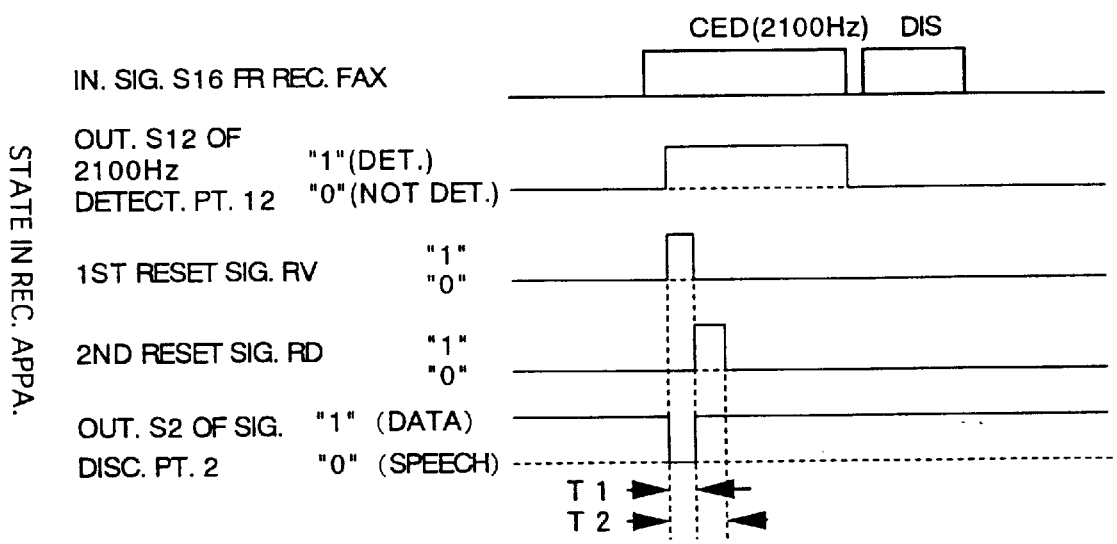
FIG. 30B illustrates operation of the signal transmitting apparatus for voiceband signals according to Embodiment 18 of the present invention.

Operation of discriminating signals in the case of a facsimile signal being input into the present signal transmitting apparatus for voiceband signals, will now be explained with reference to FIGS. 30A and 30B. In FIGS. 30A and 30B, each initial state of the outputs S2 of the signal discriminating parts 2 in the transmitting apparatus and the receiving apparatus is supposed to be "data".

In the transmitting apparatus, when a tone of 1100 Hz is output from a transmitting facsimile terminal, the 1100 Hz detecting part 14 detects the tone and changes its output S14 to "1" from "0". Until the specific time T3 has completely passed since the change to "1" (detected) from "0" (not detected) of the output S14 of the 1100 Hz detecting part 14, the reset signal generating part 13 has set the first reset signal RV to be "1". Therefore, an output S2 of the signal discriminating part 2 has been reset at "0" (speech). In addition, until the specific time T4 has completely passed since T3 having passed after the change to "1" (detected) from "0" (not detected) of the output S14 of the 1100 Hz detecting part 14, the reset signal generating part 13 has set the second reset signal RD to be "1". Therefore, an output S2 of the signal discriminating part 2 has been reset at "1" (data).

In the receiving apparatus, when a tone of 2100 Hz is output from the receiving facsimile terminal, the 2100 Hz detecting part 12 detects the tone and changes its output S12 to "1" from "0". Until the specific time T1 has completely passed since the change to "1" (detected) from "0" (not detected) of the output S12 of the 2100 Hz detecting part 12, the reset signal generating part 13 has set the first reset signal RV to be "1". Therefore, an output S2 of the signal discriminating part 2 has been set at "0" (speech). In addition, until the specific time T2 has completely passed since T1 having passed after the change to "1" from "0" of the output S12 of the 2100 Hz detecting part 12, the reset signal generating part 13 has set the second reset signal RD to be "1". Therefore, an output S2 of the signal discriminating part 2 has been set at "1" (data).

By applying the above configuration, in the receiving apparatus, when the 2100 Hz detecting part 12 detects a tone of 2100 Hz, the signal discriminating part 2 operates in order to set its output S2 at "data" after having reset the output S2 at "speech", based on designation from the reset signal generating part 13. Besides, in the transmitting apparatus, when the 1100 Hz detecting part 14 detects a tone of 1100 Hz, the signal discriminating part 2 operates to set its output S2 at "data" after having reset the output S2 at "speech", based on designation of the reset signal generating part 13. Accordingly, it is possible to set each discrimination state in the transmitting apparatus and in the receiving apparatus at "data", after once having reset the discrimination state at "speech", at the beginning of a facsimile call even when no call control information can be obtained. Therefore, channels of an input facsimile signal can be assigned to modems in the facsimile signal demodulating part 5. Then, the facsimile signal can be correctly transmitted by demodulation.

Embodiment 19

As have been stated, in Embodiment 15 whose configuration is shown in FIG. 24, the reset signal generating part 13 outputs the first reset signal RV and the second reset signal RD to the signal discriminating part 2 in order that the signal discriminating part 2 can set a discrimination state at "speech" when the reset signal generating part 13 detects a leading edge to "1" (detected) from "0" (not detected) of the 1100 Hz detection result S14. In addition, in Embodiment 15, the reset signal generating part 13 outputs the first reset signal RV and the second reset signal RD to the signal discriminating part 2 in order that the signal discriminating part 2 can set a discrimination state at "data" when the reset signal generating part 13 detects a leading edge to "1" (detected) from "0" (not detected) of the 2100 Hz detection result S12.

However, with reference to the configuration of FIG. 24, it is acceptable for the reset signal generating part 13 to operate differently from the operation described in Embodiment 15.

In the configuration of FIG. 24, when the reset signal generating part 13 detects a leading edge to "1" (detected) from "0" (not detected) of the 2100 Hz detection result S12 or a leading edge to "1" (detected) from "0" (not detected) of the 1100 Hz detection result S14, the reset signal generating part 13 identically operates with the one stated in Embodiment 18.

However, if the reset signal generating part 13 detects a leading edge to "1" (2100 being detected at the receiving side) from "0" (2100 being not detected at the receiving side) of the output S24 of the receiving controller 7, the reset signal generating part 13 sets an output of the first reset signal RV at "1" and sets an output of the second reset signal RD at "0". Then, when a specific time T27 has completely passed since the detection of the leading edge to "1" from "0" of the output S24 of the receiving controller 7, the reset signal generating part 13 sets an output of the first reset signal RV to be "0" and sets an output of the second reset signal RD at "1". Then, when a specific time T28 (T28>T27) has passed after the detection of the leading edge to "1" from "0" of the output S24 of the receiving controller 7, the reset signal generating part 13 sets both the outputs of the first reset signal and the second reset signal at "0".

In addition, if the reset signal generating part 13 detects a leading edge to "1" (1100 Hz detected at the receiving side) from "0" (1100 Hz not detected at the receiving side) of the output S28 of the receiving controller 7, the reset signal generating part 13 sets an output of the first reset signal RV at "1" and sets an output of the second reset signal RD at "0". Then, when a specific time T29 has completely passed since the detection of the leading edge to "1" from "0" of the output S28 of the receiving controller 7, the reset signal generating part 13 sets an output of the first reset signal RV to be "0" and sets an output of the second reset signal RD at "1". Then, when a specific time T30 (T30>T29) has passed after the detection of the leading edge to "1" from "0" of the output S28 of the receiving controller 7, the reset signal generating part 13 sets both the outputs of the first reset signal and the second reset signal at "0".

In a case except the above cases, the reset signal generating part 13 sets both the outputs of the first reset signal RV and the second reset signal RD to be "0".

Figure 31:
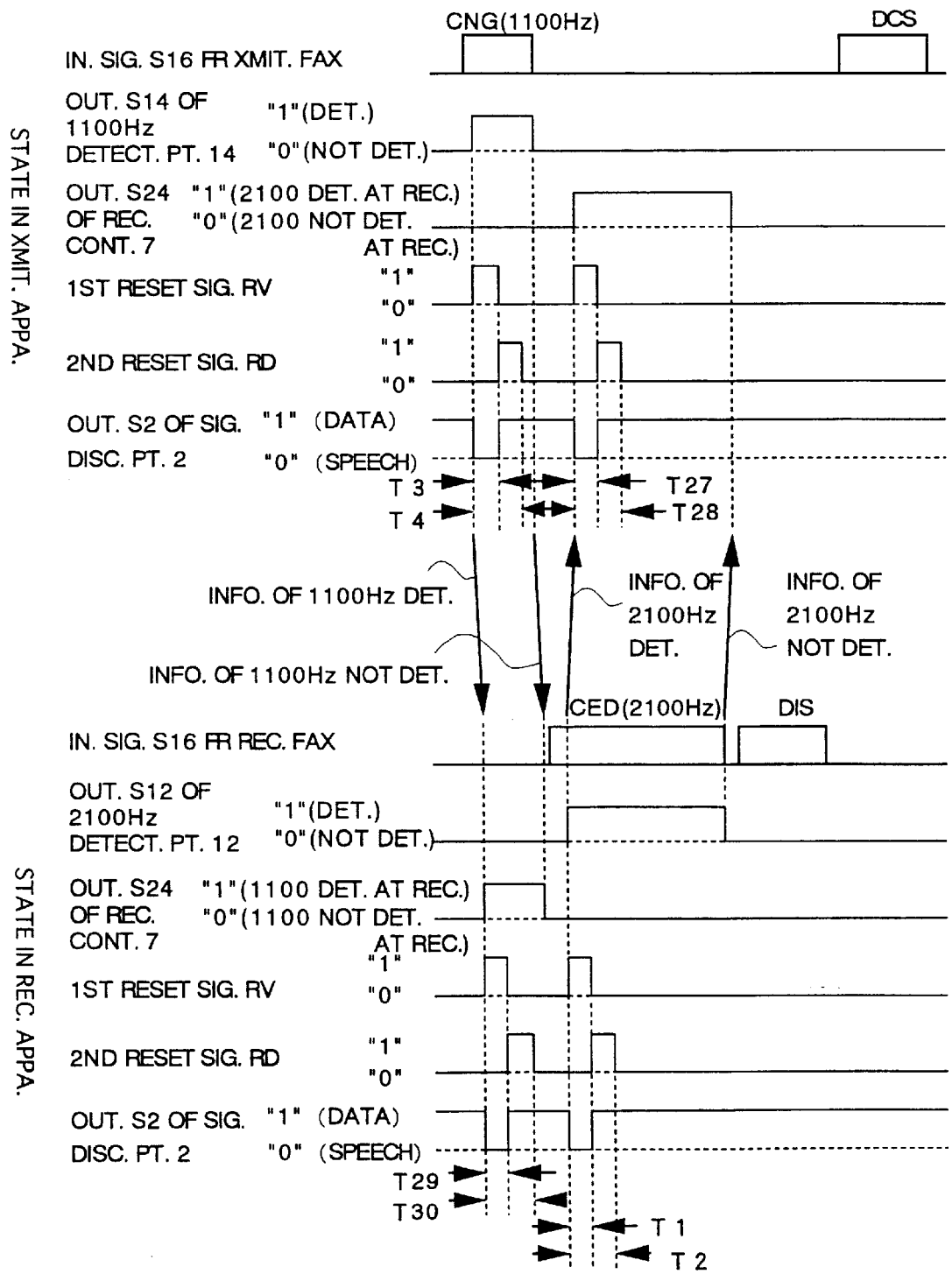
FIG. 31 illustrates operation of the signal transmitting apparatus for voiceband signals according to Embodiment 19 of the present invention.

Operation of discriminating signals in the case of a facsimile signal being input into the present signal transmitting apparatus for voiceband signals, will now be explained with reference to FIG. 31. In FIG. 31, each initial state of the outputs S2 of the signal discriminating parts 2 in the transmitting apparatus and the receiving apparatus is supposed to be "data".

In the transmitting apparatus, when a tone of 1100 Hz is output from the transmitting facsimile terminal, the 1100 Hz detecting part 14 detects the tone and changes its output S14 to "1" from "0". Until the specific time T3 has completely passed since the change to "1" (detected) from "0" (not detected) of the output S14 of the 1100 Hz detecting part 14, the reset signal generating part 13 has set the first reset signal RV to be "1". Therefore, an output S2 of the signal discriminating part 2 has been reset at "0" (speech). Until the specific time T4 has completely passed since T3 having passed after the change to "1" from "0" of the output S14 of the 1100 Hz detecting part 14, the reset signal generating part 13 has set the second reset signal RD to be "1". Therefore, an output S2 of the signal discriminating part 2 has been reset at "1" (data). When the output S14 of the 1100 Hz detecting part 14 changes to "1" (detected) from "0" (not detected), the transmission controlling part 3 outputs information of 1100 Hz being detected to the opposite side apparatus, that is the receiving apparatus, through the signal line S3.

In the receiving apparatus, when the receiving controller 7 receives information of 1100 Hz being detected from the opposite side apparatus, that is the transmitting apparatus, through the signal line S20, the receiving controller 7 sets an output of the signal line S28 at "1" (1100 Hz detected at the receiving side). Until the specific time T29 has completely passed since the output of the signal line S28 changed to "1" (1100 Hz detected at the receiving side) from "0" (1100 Hz not detected at the receiving side), the reset signal generating part 13 has set the first reset signal RV to be "1". Therefore, the output S2 of the signal discriminating part 2 has been reset at "0" (speech). Until the specific time T30 has completely passed since T29 having passed after the output of the signal line S28 changed to "1" from "0", the reset signal generating part 13 has set the second reset signal RD to be "1". Therefore, the output S2 of the signal discriminating part 2 has been set at "1" (data).

In the receiving apparatus, when a tone of 2100 Hz is output from the receiving facsimile terminal, the 2100 Hz detecting part 12 detects the tone and changes its output S12 to "1" from "0". Until the specific time T1 has completely passed since the change to "1" (detected) from "0" (not detected) of the output S12 of the 2100 Hz detecting part 12, the reset signal generating part 13 has set the first reset signal RV to be "1". Therefore, an output S2 of the signal discriminating part 2 has been reset at "0" (speech). In addition, until the specific time T2 has completely passed since T1 having passed after the change to "1" from "0" of the output S12 of the 2100 Hz detecting part 12, the reset signal generating part 13 has set the second reset signal RD to be "1". Therefore, an output S2 of the signal discriminating part 2 has been set at "1" (data). When the output S12 of the 2100 Hz detecting part 12 changes to "1" (detected) from "0" (not detected), the transmission controlling part 3 outputs information of 2100 Hz being detected to the opposite side apparatus, that is the transmitting apparatus, through the signal line S3.

In the transmitting apparatus, when the receiving controller 7 receives information of 2100 Hz being detected from the opposite side apparatus, that is the receiving apparatus, through the signal line S20, the receiving controller 7 sets an output of the signal line S24 at "1" (2100 Hz detected at the receiving side). Until the specific time T27 has completely passed since the output of the signal line S24 changed to "1" (2100 Hz detected at the receiving side) from "0" (2100 Hz not detected at the receiving side), the reset signal generating part 13 has set the first reset signal RV to be "1". Therefore, the output S2 of the signal discriminating part 2 has been reset at "0" (speech). In addition, until the specific time T28 has completely passed since T27 having passed after the output of the signal line S24 changed to "1" from "0", the reset signal generating part 13 has set the second reset signal RD to be "1". Therefore, the output S2 of the signal discriminating part 2 has been set at "1" (data).

By applying the above configuration, in the receiving apparatus, when the receiving controller 7 sets an output of the signal line S28 at "1" (1100 Hz detected at the receiving side) by receiving information of 1100 Hz being detected from the transmitting apparatus, the signal discriminating part 2 operates in order to set its output S2 at "data", after having reset the output S2 at "speech", based on designation from the reset signal generating part 13. Then, when the 2100 Hz detecting part 12 detects a tone of 2100 Hz, the signal discriminating part 2 operates in order to set its output S2 at "data", after having reset the output S2 at "speech", based on designation from the reset signal generating part 13. Besides, in the transmitting apparatus, when the 1100 Hz detecting part 14 detects a tone of 1100 Hz, the signal discriminating part 2 operates to set its output S2 at "data", after having reset the output S2 at "speech", based on designation of the reset signal generating part 13. Then, when the receiving controller 7 sets an output of the signal line S24 at "1" (2100 Hz detected at the receiving side) by receiving information of 2100 Hz being detected from the receiving apparatus, the signal discriminating part 2 operates in order to set its output S2 at "data", after having reset the output S2 at "speech", based on 10 designation from the reset signal generating part 13. Accordingly, it is possible to set each discrimination state in the transmitting apparatus and in the receiving apparatus at "data", after having once reset the discrimination state at "speech", at the beginning of a facsimile call even when no call control information can be obtained. Therefore, channels of an input facsimile signal can be assigned to modems in the facsimile signal demodulating part 5. Then, the facsimile signal can be correctly transmitted by demodulation.

Even when a 1100 Hz tone is not output from the transmitting facsimile terminal, it is possible to set each discrimination state in the transmitting apparatus and in the receiving apparatus at "data", after having once reset the discrimination state at "speech", by the 2100 Hz tone output from the receiving facsimile terminal. Therefore, the facsimile signal can be correctly transmitted by demodulation.

In addition, even when a 2100 Hz tone is not output from the receiving facsimile terminal, it is possible to set each discrimination state in the transmitting apparatus and in the receiving apparatus at "data", after having once reset the discrimination state at "speech", by the 1100 Hz tone output from the transmitting facsimile terminal. Therefore, the facsimile signal can be correctly transmitted by demodulation.

Embodiment 20

Figure 32:
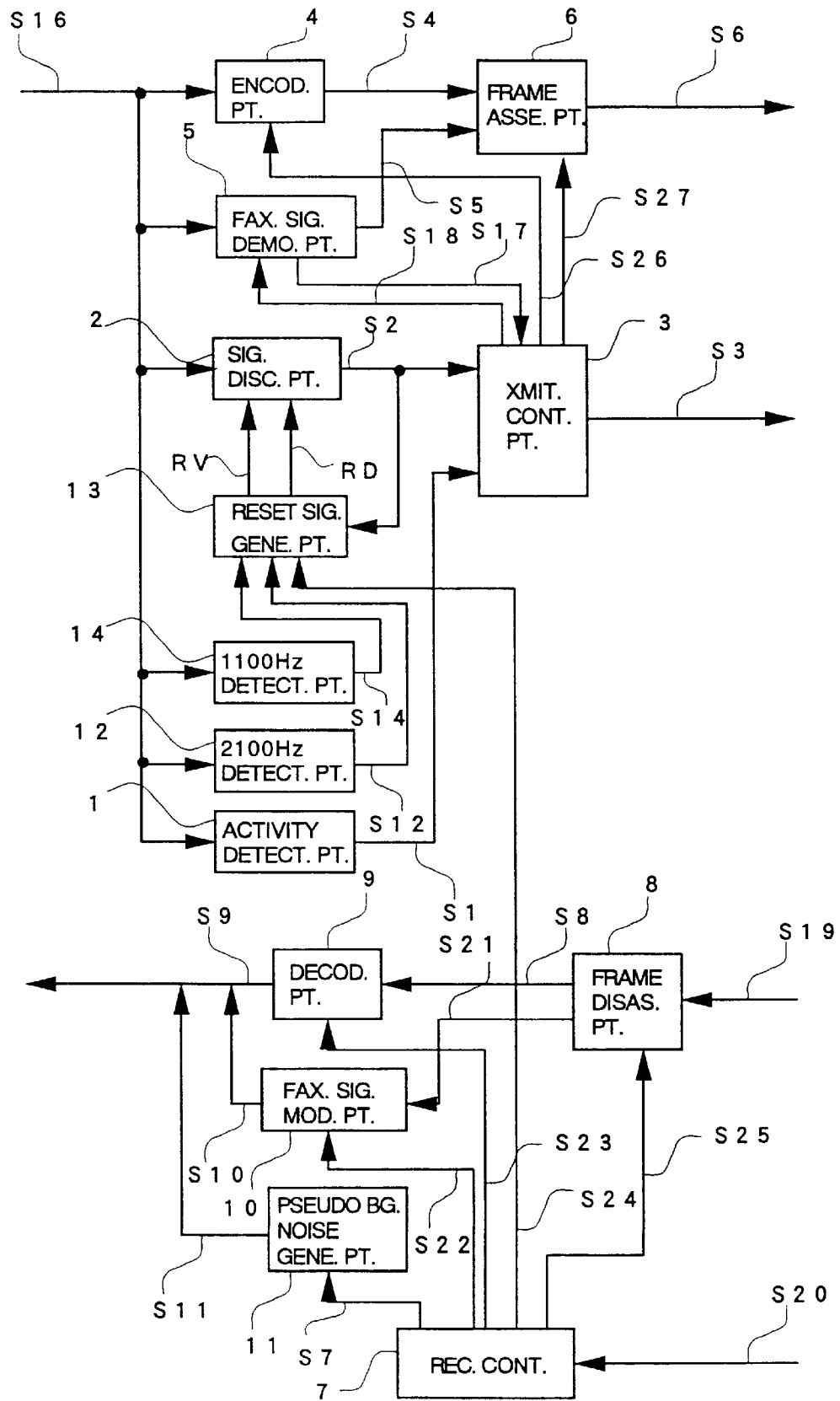
FIG. 32 is a block diagram showing a signal transmitting apparatus for voiceband signals according to Embodiment 20 or 21 of the present invention.

FIG. 32 shows a configuration of another embodiment of the signal transmitting apparatus for voiceband signals, according to the present invention. In FIG. 32, the input signal S16 of M channels input into the signal transmitting apparatus for voiceband signals, the activity detecting part 1, the signal discriminating part 2, the transmission controlling part 3, the encoding part 4, the facsimile signal demodulating part 5, the frame assembling part 6, the receiving controller 7, the frame disassembling part 8, the decoding part 9, the facsimile signal modulating part 10, the pseudo background noise generating part 11, the 2100 Hz detecting part 12, the reset signal generating part 13 and the 1100 Hz detecting part 14 are shown.

Now, operation will be stated. Operations of the activity detecting part 1, the encoding part 4, the facsimile signal demodulating part 5, the frame assembling part 6, the frame disassembling part 8, the decoding part 9, the facsimile signal modulating part 10, and the pseudo background noise generating part 11 are the same as those described in Related Art with reference to FIG. 55.

The 2100 Hz detecting part 12 and the signal discriminating part 2 identically operate with the ones stated in Embodiment 6 with reference to FIG. 8.

The 1100 Hz detecting part 14 identically operates with the one stated in Embodiment 9 with reference to FIG. 13. The transmission controlling part 3 identically operates with the one stated in Related Art with reference to FIG. 55 except for the following cases. The transmission controlling part 3 inputs a signal discrimination result S2. When information of a change to "0" (speech) from "1" (data) of the signal discrimination result S2 is detected, the transmission controlling part 3 outputs information of speech signal detection to the opposite side apparatus through the signal line S3. When a change to "1" (data) from "0" (speech) of the signal discrimination result S2 is detected, the transmission controlling part 3 outputs information of data signal detection to the opposite side apparatus through the signal line S3.

The receiving controller 7 identically operates with the one stated in Related Art with reference to FIG. 55 except for the following cases. The receiving controller 7 resets an output of the signal line S24 at "0" (speech at the receiving side) when the receiving controller 7 receives the information of speech signal detection from the opposite side apparatus through the signal line S20. Besides, when the receiving controller 7 receives the information of data signal detection from the opposite side apparatus through the signal line S20, the receiving controller 7 sets an output of the signal line S24 at "1" (data at the receiving side).

The reset signal generating part 13 generates the first reset signal RV and the second reset signal RD based on a 2100 Hz detection result S12, a 1100 Hz detection result S14 and the output S24 of the receiving controller 7.

When the reset signal generating part 13 detects a leading edge to "1" (detected) from "0" (not detected) of the 2100 Hz detection result S12 and a leading edge to "1" (detected) from "0" (not detected) of the 1100 Hz detection result S14, the reset signal generating part 13 identically operates with the one stated in Embodiment 18.

When the reset signal generating part 13 detects a trailing edge to "0" (speech at the receiving side) from "1" (data at the receiving side) of the output S24 of the receiving controller 7, the reset signal generating part 13 sets an output of the first reset signal RV to be "1" and sets an output of the second reset signal RD to be "0". When a specific time T31 has completely passed since the detection of the trailing edge to "0" from "1" of the output S24 of the receiving controller 7, the reset signal generating part 13 sets both the outputs of the first reset signal RV and the second reset signal RD to be "0".

However, if the reset signal generating part 13 detects a trailing edge to "0" (speech at the receiving side) from "1" (data at the receiving side) of the output S24 of the receiving controller 7 within a specific time T44 after the detection of the trailing edge to "0" (speech) from "1" (data) of the output S2 of the signal discriminating part 2, the reset signal generating part 13 does not perform the above process. Therefore, an output of the first reset signal RV is kept to be "0".

When the reset signal generating part 13 detects a leading edge to "1" (data at the receiving side) from "0" (speech at the receiving side) of the output S24 of the receiving controller 7, the reset signal generating part 13 sets an output of the first reset signal RV to be "0" and sets an output of the second reset signal RD to be "1". Then, when a specific time T32 has passed since the detection of the leading edge to "1" from "0" of the output S24 of the receiving controller 7, the reset signal generating part 13 sets both the outputs of the first reset signal RV and the second reset signal RD to be "0".

However, if the reset signal generating part 13 detects a leading edge to "1" (data at the receiving side) from "0" (speech at the receiving side) of the output S24 of the receiving controller 7 within the specific time T44 after the detection of the leading edge to "1" (data) from "0" (speech) of the output S2 of the signal discriminating part 2, the reset signal generating part 13 does not perform the above process. Therefore, an output of the second reset signal RD is kept to be "0".

In a case except the above cases, the reset signal generating part 13 sets both the outputs of the first reset signal RV and the second reset signal RD to be "0".

Figure 33:
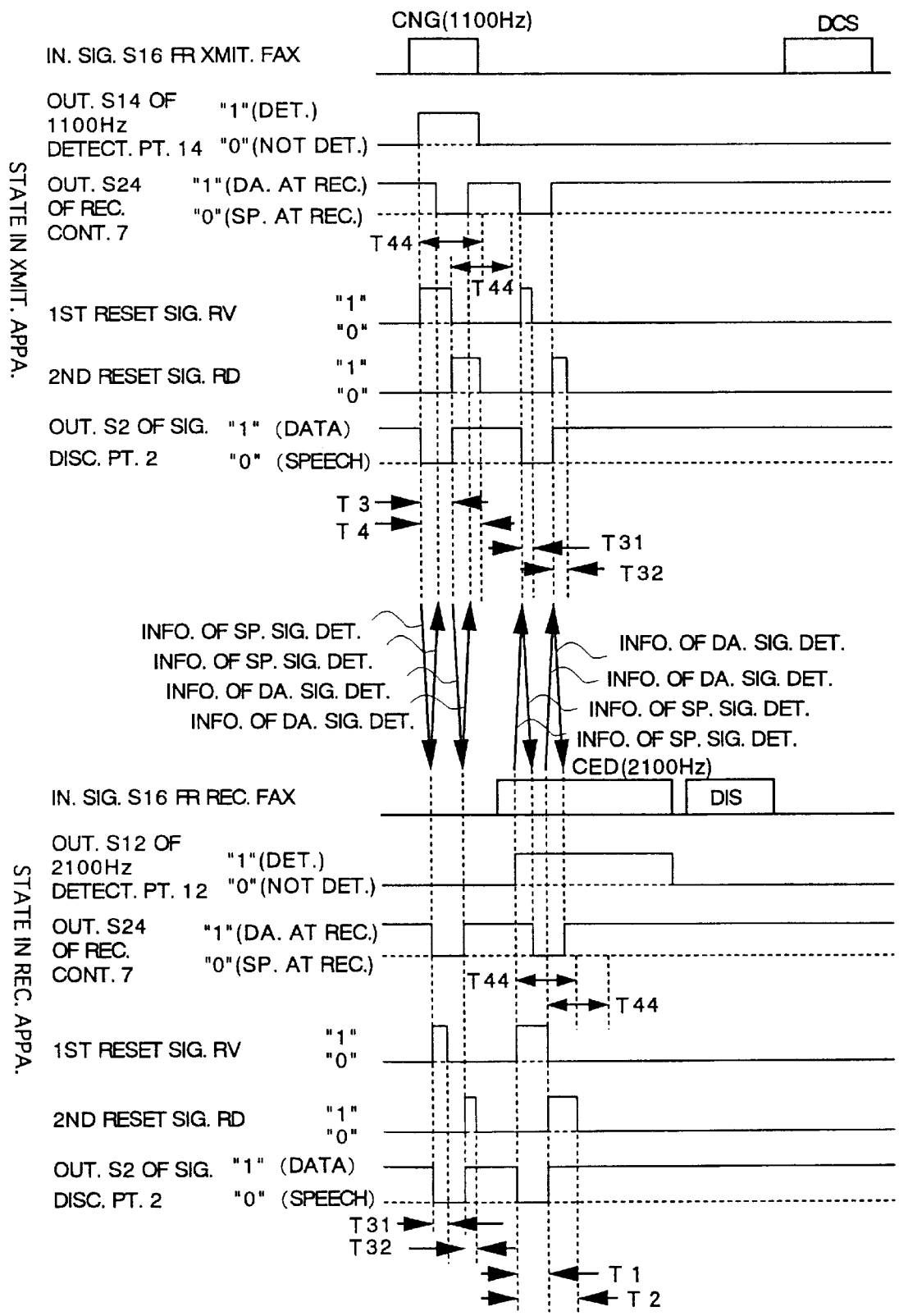
FIG. 33 illustrates operation of the signal transmitting apparatus for voiceband signals according to Embodiment 20 of the present invention.

Operation of discriminating signals in the case of a facsimile signal being input into the present signal transmitting apparatus for voiceband signals, will now be explained with reference to FIG. 33. In FIG. 33, each initial state of the outputs S2 of the signal discriminating parts 2 in the transmitting apparatus and the receiving apparatus is supposed to be "data".

In the transmitting apparatus, when a tone of 1100 Hz is output from the transmitting facsimile terminal, the 1100 Hz detecting part 14 detects the tone and changes its output S14 to "1" from "0". Until the specific time T3 has completely passed since the change to "1" (detected) from "0" (not detected) of the output S14 of the 1100 Hz detecting part 14, the reset signal generating part 13 has set the first reset signal RV to be "1". Therefore, an output S2 of the signal discriminating part 2 has been reset at "0" (speech). In addition, until the specific time T4 has completely passed since the time T3 having passed after the change to "1" from "0" of the output S14 of the 1100 Hz detecting part 14, the reset signal generating part 13 has set the second reset signal RD to be "1". Therefore, the output S2 of the signal discriminating part 2 has been set at "1" (data). When the output S2 of the signal discriminating part 2 changes to "0" (speech) from "1" (data), the transmission controlling part 3 outputs information of speech signal detection to the opposite side apparatus, that is the receiving apparatus, through the signal line S3. Then, when the output S2 of the signal discriminating part 2 changes to "1" (data) from "0" (speech), the transmission controlling part 3 outputs information of data signal detection to the opposite side apparatus, that is the receiving apparatus, through the signal line S3.

In the receiving apparatus, when the receiving controller 7 receives information of speech signal detection from the opposite side apparatus, that is the transmitting apparatus, through the signal line S20, the receiving controller 7 resets an output of the signal line S24 at "0" (speech at the receiving side). Then, when the receiving controller 7 receives information of data signal detection from the opposite side apparatus, that is the transmitting apparatus, through the signal line S20, the receiving controller 7 sets an output of the signal line S24 at "1" (data at the receiving side).

Until the specific time T31 has completely passed since the output of the signal line S24 changed to "0" (speech at the receiving side) from "1" (data at the receiving side), the reset signal generating part 13 has set the first reset signal RV to be "1". Therefore, the output S2 of the signal discriminating part 2 has been reset at "0" (speech). Then, until the specific time T32 has completely passed since the output of the signal line S24 changed to "1" (data at the receiving side) from "0" (speech at the receiving side), the reset signal generating part 13 has set the second reset signal RD to be "1". Therefore, the output S2 of the signal discriminating part 2 has been set at "1" (data).

In the receiving apparatus, when a tone of 2100 Hz is output from the receiving facsimile terminal, the 2100 Hz detecting part 12 detects the tone and changes its output S12 to "1" from "0". Until the specific time T1 has completely passed since the change to "1" (detected) from "0" (not detected) of the output S12 of the 2100 Hz detecting part 12, the reset signal generating part 13 has set the first reset signal RV to be "1". Therefore, an output S2 of the signal discriminating part 2 has been reset at "0" (speech). In addition, until the specific time T2 has completely passed since T1 having passed after the change to "1" from "0" of the output S12 of the 2100 Hz detecting part 12, the reset signal generating part 13 has set the second reset signal RD to be "1". Therefore, an output S2 of the signal discriminating part 2 has been set at "1" (data). When the output S2 of the signal discriminating part 2 changes to "0" (speech) from "1" (data), the transmission controlling part 3 outputs information of speech signal detection to the opposite side apparatus, that is the transmitting apparatus, through the signal line S3. Then, when the output S2 of the signal discriminating part 2 changes to "1" (data) from "0" (speech), the transmission controlling part 3 outputs information of data signal detection to the opposite side apparatus, that is the transmitting apparatus, through the signal line S3.

In the transmitting apparatus, when the receiving controller 7 receives information of speech signal detection from the opposite side apparatus, that is the receiving apparatus, through the signal line S20, the receiving controller 7 resets an output of the signal line S24 at "0" (speech at the receiving side). Then, when the receiving controller 7 receives information of data signal detection from the opposite side apparatus, that is the receiving apparatus, through the signal line S20, the receiving controller 7 sets an output of the signal line S24 at "1" (data at the receiving side). Until the specific time T31 has completely passed since the output of the signal line S24 changed to "0" (speech at the receiving side) from "1" (data at the receiving side), the reset signal generating part 13 has set the first reset signal RV to be "1". Therefore, the output S2 of the signal discriminating part 2 has been reset at "0" (speech). Then, until the specific time T32 has completely passed since the output of the signal line S24 changed to "1" (data at the receiving side) from "0" (speech at the receiving side), the reset signal generating part 13 has set the second reset signal RD to be "1". Therefore, the output S2 of the signal discriminating part 2 is set at "1" (data).

By applying the above configuration, when the receiving apparatus receives information of speech signal detection from the transmitting apparatus, the signal discriminating part 2 resets its output S2 at "speech" based on designation of the reset signal generating part 13. Then, when the receiving apparatus receives information of data signal detection from the transmitting apparatus, the signal discriminating part 2 operates in order to set its output S2 at "data" based on designation of the reset signal generating part 13. When the 2100 Hz detecting part 12 detects a tone of 2100 Hz, the signal discriminating part 2 operates in order to set its output S2 at "data" after having reset the output S2 at "speech", based on designation from the reset signal generating part 13. Besides, in the transmitting apparatus, when the 1100 Hz detecting part 14 detects a tone of 1100 Hz, the signal discriminating part 2 operates in order to set its output S2 at "data" after having reset the output S2 at "speech", based on designation from the reset signal generating part 13. In addition, when the transmitting apparatus receives information of speech signal detection from the receiving apparatus, the signal discriminating part 2 resets its output S2 at "speech" based on designation of the reset signal generating part 13. Then, when the transmitting apparatus receives information of data signal detection from the receiving apparatus, the signal discriminating part 2 operates in order to set its output S2 at "data", based on designation of the reset signal generating part 13. Accordingly, it is possible to set each discrimination state in the transmitting apparatus and in the receiving apparatus at "data", after once having reset at "speech", at the beginning of a facsimile call even when no call control information can be obtained. Therefore, channels of input facsimile signals can be assigned to modems in the facsimile signal demodulating part 5. Then, the facsimile signal can be correctly transmitted by demodulation.

Even when a 1100 Hz tone is not output from the transmitting facsimile terminal, it is possible to set each discrimination state in the transmitting apparatus and in the receiving apparatus at "data", after having once reset the discrimination state at "speech", by the 2100 Hz tone output from the receiving facsimile terminal. Therefore, the facsimile signal can be correctly transmitted by demodulation.

In addition, even when a 2100 Hz tone is not output from the receiving facsimile terminal, it is possible to set each discrimination state in the transmitting apparatus and in the receiving apparatus at "data", after having once reset the discrimination state at "speech", by the 1100 Hz tone output from the transmitting facsimile terminal. Therefore, the facsimile signal can be correctly transmitted by demodulation.

Embodiment 21

As have been stated in Embodiment 20, the reset signal generating part 13 outputs the first reset signal RV and the second reset signal RD to the signal discriminating part 2 in order that the signal discriminating part 2 can set a discrimination state at "data" when the reset signal generating part 13 detects a leading edge to "1" (data at the receiving side) from "0" (speech at the receiving side) of the output S24 of the receiving controller 7. In addition in Embodiment 20, the reset signal generating part 13 outputs the first reset signal RV and the second reset signal RD to the signal discriminating part 2 in order that the signal discriminating part 2 can set a discrimination state at "speech" when the reset signal generating part 13 detects a trailing edge to "0" (speech at the receiving side) from "1" (data at the receiving side) of the output S24 of the receiving controller 7.

However, with reference to the configuration of FIG. 32, it is acceptable for the reset signal generating part 13 to operate differently from the operation described in Embodiment 20. In the configuration of FIG. 32, when the reset signal generating part 13 detects a leading edge to "1" (detected) from "0" (not detected) of the 2100 Hz detection result S12 or a leading edge to "1" (detected) from "0" (not detected) of the 1100 Hz detection result S14, the reset signal generating part 13 identically operates with the one stated in Embodiment 18.

However, if the reset signal generating part 13 detects a leading edge to "1" (data at the receiving side) from "0" (speech at the receiving side) of the output S24 of the receiving controller 7, the reset signal generating part 13 sets an output of the first reset signal RV at "1" and an output of the second reset signal RD at "0". Then, when a specific time T33 has completely passed since the detection of the leading edge to "1" from "0" of the output S24 of the receiving controller 7, the reset signal generating part 13 sets an output of the first reset signal RV to be "0" and an output of the second reset signal RD to be "1". Then, when a specific time T34 (T34>T33) has passed since the detection of the leading edge to "1" from "0" of the output S24 of the receiving controller 7, the reset signal generating part 13 sets both the outputs of the first reset signal and the second reset signal at "0".

However, if the reset signal generating part 13 detects a leading edge to "1" (data at the receiving side) from "0" (speech at the receiving side) of the output S24 of the receiving controller 7 within a specific time T45 after the detection of the leading edge to "1" (data) from "0" (speech) of the output S2 of the signal discriminating part 2, the reset signal generating part 13 does not perform the above process. Therefore, the outputs of the first reset signal RV and the second reset signal RD are kept to be 0.

In a case except the above cases, the reset signal generating part 13 sets both the outputs of the first reset signal RV and the second reset signal RD to be "0".

Figure 34:
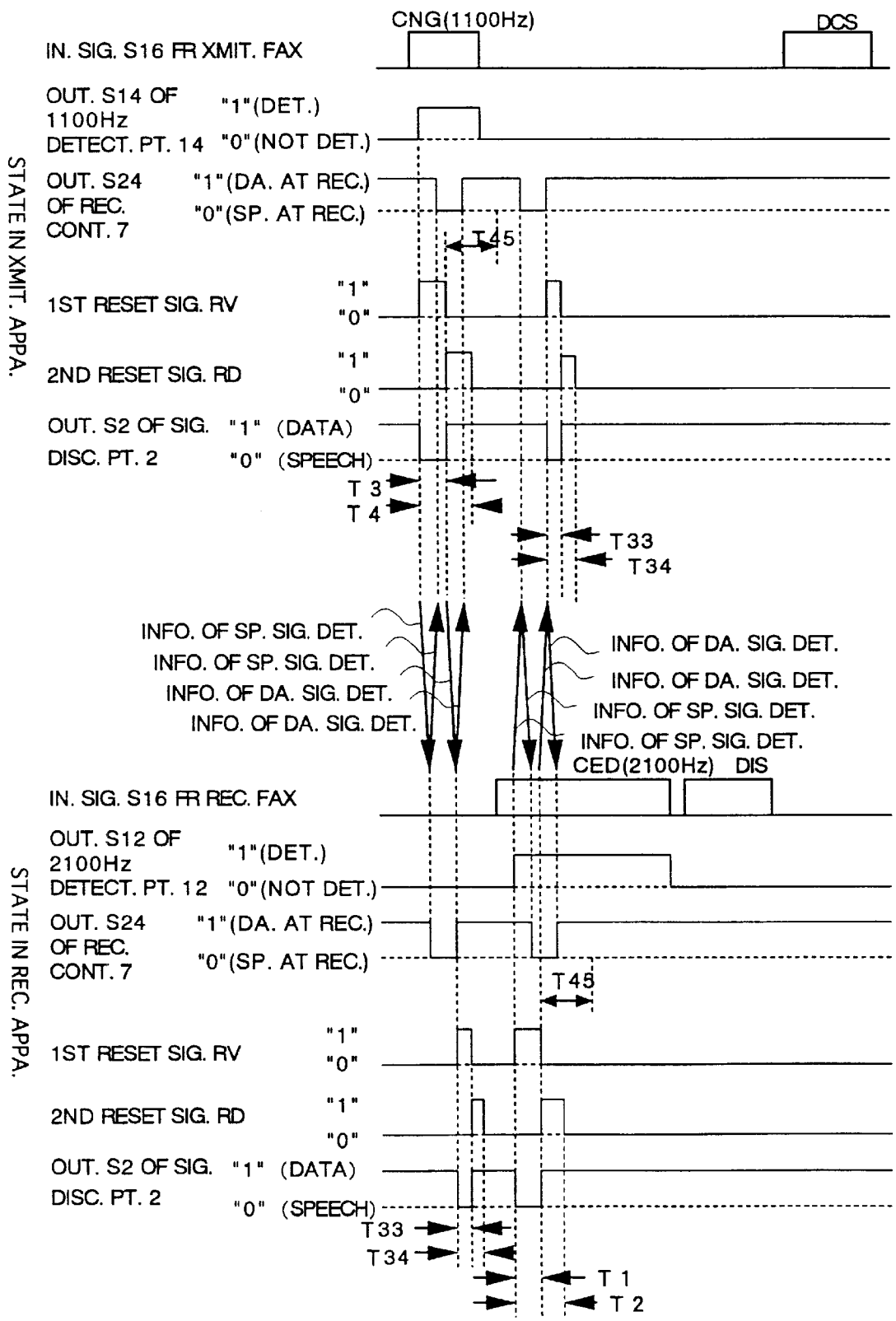
FIG. 34 illustrates operation of the signal transmitting apparatus for voiceband signals according to Embodiment 21 of the present invention.

Operation of identifying signals in the case of a facsimile signal being input into the present signal transmitting apparatus for voiceband signals, will now be explained with reference to FIG. 34. In FIG. 34, each initial state of the outputs S2 of the signal discriminating parts 2 in the transmitting apparatus and the receiving apparatus is supposed to be "data".

In the transmitting apparatus, when a tone of 1100 Hz is output from the transmitting facsimile terminal, the 1100 Hz detecting part 14 detects the tone and changes its output S14 to "1" from "0". Until the specific time T3 has completely passed since the change to "1" (detected) from "0" (not detected) of the output S14 of the 1100 Hz detecting part 14, the reset signal generating part 13 has set the first reset signal RV to be "1". Therefore, an output S2 of the signal discriminating part 2 has been reset at "0" (speech). In addition, until the specific time T4 has completely passed since the time T3 having passed after the change to "1" from "0" of the output S14 of the 1100 Hz detecting part 14, the reset signal generating part 13 has set the second reset signal RD at "1". Therefore, the output S2 of the signal discriminating part 2 has been set at "1" (data). When the output S2 of the signal discriminating part 2 changes to "0" (speech) from "1" (data), the transmission controlling part 3 outputs information of speech signal detection to the opposite side apparatus, that is the receiving apparatus, through the signal line S3. Then, when the output S2 of the signal discriminating part 2 changes to "1" (data) from "0" (speech), the transmission controlling part 3 outputs information of data signal detection to the opposite side apparatus, that is the receiving apparatus, through the signal line S3.

In the receiving apparatus, when the receiving controller 7 receives information of speech signal detection from the opposite side apparatus, that is the transmitting apparatus, through the signal line S20, the receiving controller 7 resets an output of the signal line S24 at "0" (speech at the receiving side). Then, when the receiving controller 7 receives information of data signal detection from the opposite side apparatus, that is the transmitting apparatus, through the signal line S20, the receiving controller 7 sets an output of the signal line S24 at "1" (data at the receiving side). Until the specific time T33 has completely passed since the output of the signal line S24 changed to "1" (data at the receiving side) from "0" (speech at the receiving side), the reset signal generating part 13 has set the first reset signal RV to be "1". Therefore, the output S2 of the signal discriminating part 2 has been reset at "0" (speech). Then, until the specific time T34 has completely passed since the time T33 having passed after the change to "1" from "0" of the output of the signal line S24, the reset signal generating part 13 has set the second reset signal RD to be "1". Therefore, an output S2 of the signal discriminating part 2 has been set at "1" (data).

In the receiving apparatus, when a tone of 2100 Hz is output from the receiving facsimile terminal, the 2100 Hz detecting part 12 detects the tone and changes its output S12 to "1" from "0". Until the specific time T1 has completely passed since the change to "1" (detected) from "0" (not detected) of the output S12 of the 2100 Hz detecting part 12, the reset signal generating part 13 has set the first reset signal RV to be "1". Therefore, an output S2 of the signal discriminating part 2 has been reset at "0" (speech). In addition, until the specific time T2 has completely passed since T1 having passed after the change to "1" from "0" of the output S12 of the 2100 Hz detecting part 12, the reset signal generating part 13 has set the second reset signal RD to be "1". Therefore, an output S2 of the signal discriminating part 2 has been set at "1" (data). When the output S2 of the signal discriminating part 2 changes to "0" (speech) from "1" (data), the transmission controlling part 3 outputs information of speech signal detection to the opposite side apparatus, that is the transmitting apparatus, through the signal line S3. Then, when the output S2 of the signal discriminating part 2 changes to "1" (data) from "0" (speech), the transmission controlling part 3 outputs information of data signal detection to the opposite side apparatus, that is the transmitting apparatus, through the signal line S3.

In the transmitting apparatus, when the receiving controller 7 receives information of speech signal detection from the opposite side apparatus, that is the receiving apparatus, through the signal line S20, the receiving controller 7 resets an output of the signal line S24 at "0" (speech at the receiving side). Then, when the receiving controller 7 receives information of data signal detection from the opposite side apparatus, that is the receiving apparatus, through the signal line S20, the receiving controller 7 sets an output of the signal line S24 at "1" (data at the receiving side). Until the specific time T33 has completely passed since the output of the signal line S24 changed to "1" (data at the receiving side) from "0" (speech at the receiving side), the reset signal generating part 13 has set the first reset signal RV to be "1". Therefore, the output S2 of the signal discriminating part 2 has been reset at "0" (speech). Then, until the specific time T34 has completely passed since the time T33 having passed after the change to "1" from "0" of the output of the signal line S24, the reset signal generating part 13 has set the second reset signal RD to be "1". Therefore, an output S2 of the signal discriminating part 2 is set to be "1" (data).

By applying the above configuration, in the receiving apparatus, when information of data signal detection is input from the transmitting apparatus and the receiving controller 7 sets an output of the signal line S24 at "1" (data at the receiving side), the signal discriminating part 2 operates in order to set its output S2 at "data" after having reset at "speech", based on designation of the reset signal generating part 13. In addition, when the 2100 Hz detecting part 12 detects a tone of 2100 Hz, the signal discriminating part 2 operates in order to set its output S2 at "data" after having reset the output S2 at "speech", based on designation from the reset signal generating part 13. Besides, in the transmitting apparatus, when the 1100 Hz detecting part 14 detects a tone of 1100 Hz, the signal discriminating part 2 operates in order to set its output S2 at "data" after having reset the output S2 at "speech", based on designation from the reset signal generating part 13. In addition, when the transmitting apparatus receives information of data signal detection from the receiving apparatus and the receiving controller 7 sets an output of the signal line S24 at "1" (data at the receiving side), the signal discriminating part 2 operates in order to set its output S2 at "data", after having reset the output S2 at "speech", based on designation of the reset signal generating part 13. Accordingly, it is possible to set each discrimination state in the transmitting apparatus and in the receiving apparatus at "data", after once having reset the discrimination state at "speech", at the beginning of a facsimile call even when no call control information can be obtained. Therefore, channels of input facsimile signals can be assigned to modems in the facsimile signal demodulating part 5. Then, the facsimile signal can be correctly transmitted by demodulation.

Even when a 1100 Hz tone is not output from the transmitting facsimile terminal, it is possible to set each discrimination state in the transmitting apparatus and in the receiving apparatus at "data", after having once reset the discrimination state at "speech", by the 2100 Hz tone output from the receiving facsimile terminal. Therefore, the facsimile signal can be correctly transmitted by demodulation.

In addition, even when a 2100 Hz tone is not output from the receiving facsimile terminal, it is possible to set each discrimination state in the transmitting apparatus and in the receiving apparatus at "data", after having once reset the discrimination state at "speech", by the 1100 Hz tone output from the transmitting facsimile terminal. Therefore, the facsimile signal can be correctly transmitted by demodulation.

Embodiment 22

In Embodiments 12 and 15, there exists a problem that if the transmitting facsimile terminal can not recognize a CED tone (2100 Hz) output from the receiving facsimile terminal and re-outputs a CNG tone (1100 Hz), it is not possible to transmit a facsimile signal by demodulation.

Figure 35:
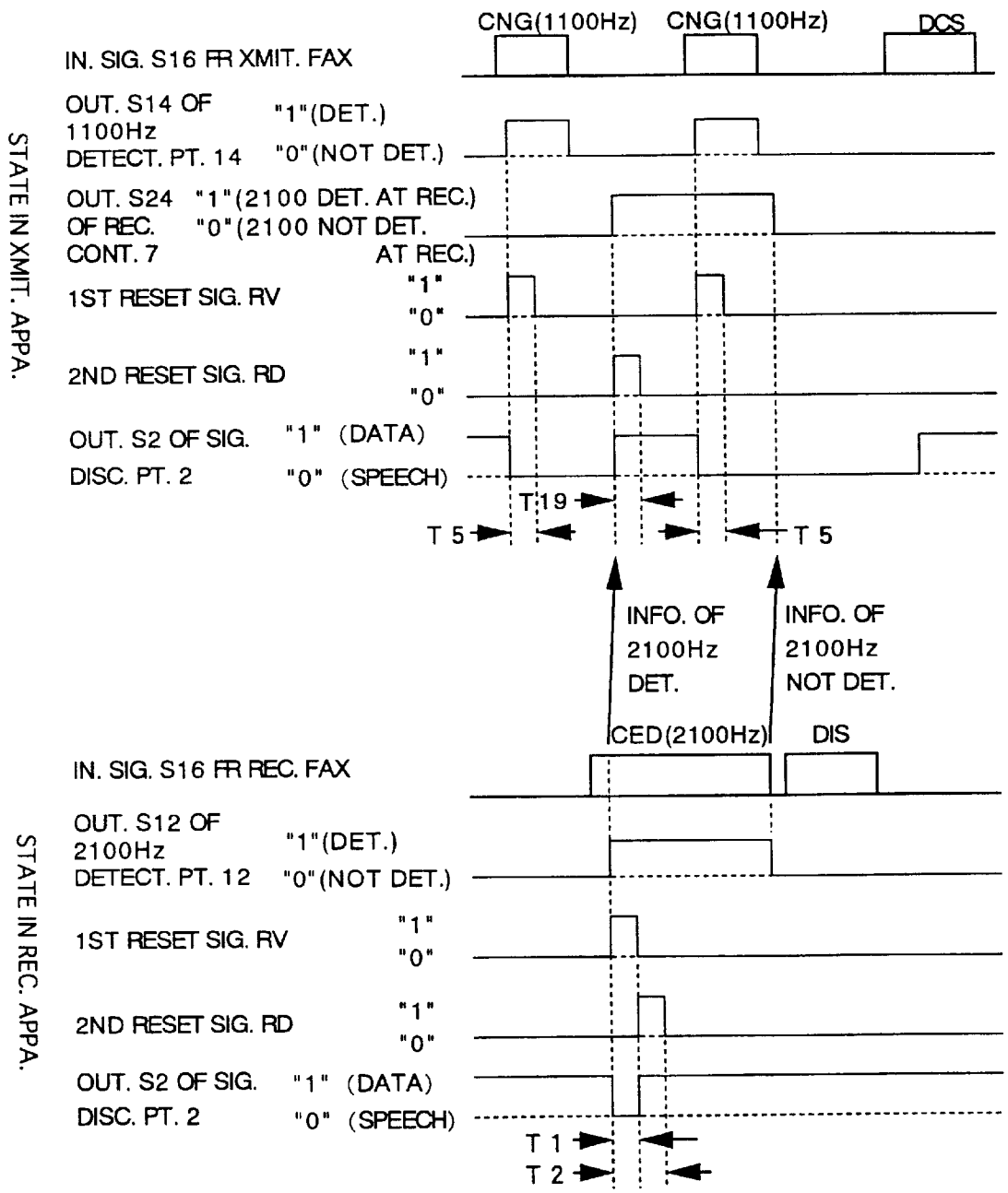
FIG. 35 illustrates operation of a signal transmitting apparatus for voiceband signals according to Embodiment 12 of the present invention.

FIG. 35 shows operation in the case that the transmitting facsimile terminal re-outputs a CNG tone (1100 Hz) after the receiving facsimile terminal outputs a CED tone (2100 Hz) in the configuration of FIG. 18 of Embodiment 12. In FIG. 35, each initial state of the outputs S2 of the signal discriminating parts 2 in the transmitting apparatus and the receiving apparatus is supposed to be "data".

In the transmitting apparatus, the output S2 of the signal discriminating part 2 is once reset at "speech" by detecting a 1100 Hz tone. Then, the output S2 of the signal discriminating part 2 is set at "data" by receiving information of 2100 Hz being detected from the receiving apparatus. On this change to "data" from "speech" of the discrimination state, modems are assigned at the facsimile signal demodulating part 5 in the transmitting apparatus.

Afterwards, however, when the transmitting facsimile terminal re-outputs a CNG tone (1100 Hz), the output S2 of the signal discriminating part 2 in the transmitting apparatus is reset at "speech" again. Therefore, the assignment of the modems in the facsimile signal demodulating part 5 is released.

When the transmitting facsimile terminal outputs a modem signal, called a DCS, which is modulated at a data rate of 300 bit/s by V. 21 channel No. 2 method, the signal discriminating part 2 judges the signal to be "data" again. However, there exists a delay-time between the instant of DCS being input and the instant of the DCS being Judged to be "data". Therefore, the discrimination state is "speech" at the time of the DCS being input. Accordingly, modems are not assigned in the facsimile signal demodulating part 5, so that the facsimile signal is not transmitted by demodulation, but transmitted by ADPCM encoding.

Figure 36:
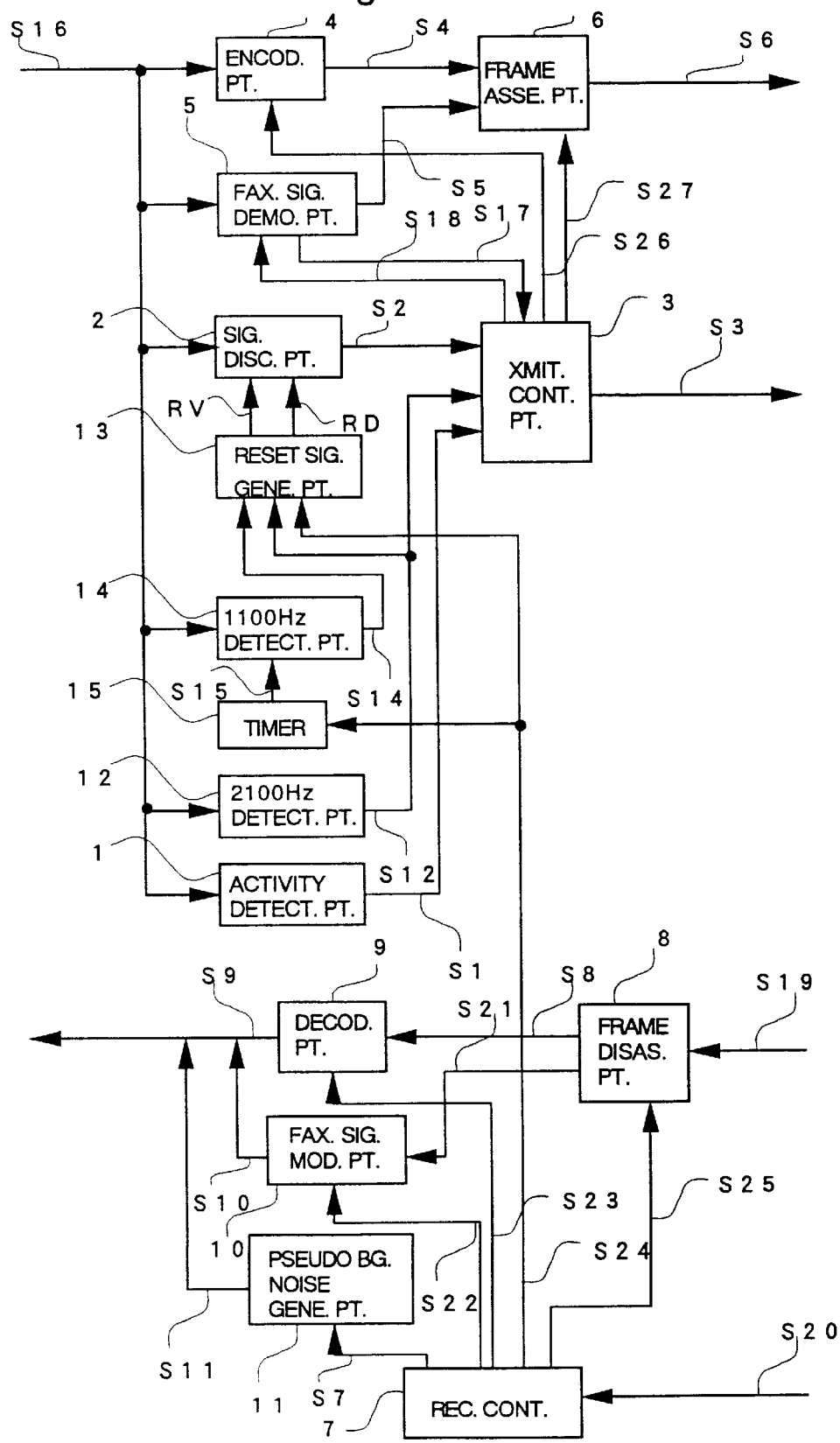
FIG. 36 is a block diagram showing a signal transmitting apparatus for voiceband signals according to Embodiment 22 of the present invention.

FIG. 36 shows a configuration of another embodiment of the signal transmitting apparatus for voiceband signals, according to the present invention. A timer 15 is added to the configuration of FIG. 18 in Embodiment 12.

Now, operation will be stated. Operations of the activity detecting part 1, the encoding part 4, the facsimile signal demodulating part 5, the frame assembling part 6, the frame disassembling part 8, the decoding part 9, the facsimile signal modulating part 10, and the pseudo background noise generating part 11 are the same as those described in Related Art with reference to FIG. 55.

The signal discriminating part 2, transmission controlling part 3, receiving controller 7, 2100 Hz detecting part 12 and reset signal generating part 13 identically operate with the ones in Embodiment 12 with reference to FIG. 18.

The timer 15 inputs the output S24 of the receiving controller 7. During the specific time T30 after the change to "1" (2100 Hz detected at the receiving side) from "0" (2100 Hz not detected at the receiving side) of the output S24 of the receiving controller 7, an output S15 of the timer 15 has been set at "1" (inhibited). In a case except the above, the timer 15 is set at "0" (allowed).

The 1100 Hz detecting part 14 inputs the output S15 of the timer 15. When the value of the S15 is "1" (inhibited), the output S14 of the 1100 Hz detecting part 14 is unconditionally set at "0" (not detected).

When the value of the S15 is "0" (allowed), the 1100 Hz detecting part 14 identically operates with the one in Embodiment 12. Namely, the ordinary operation of detecting 1100 Hz is performed.

Figure 37:
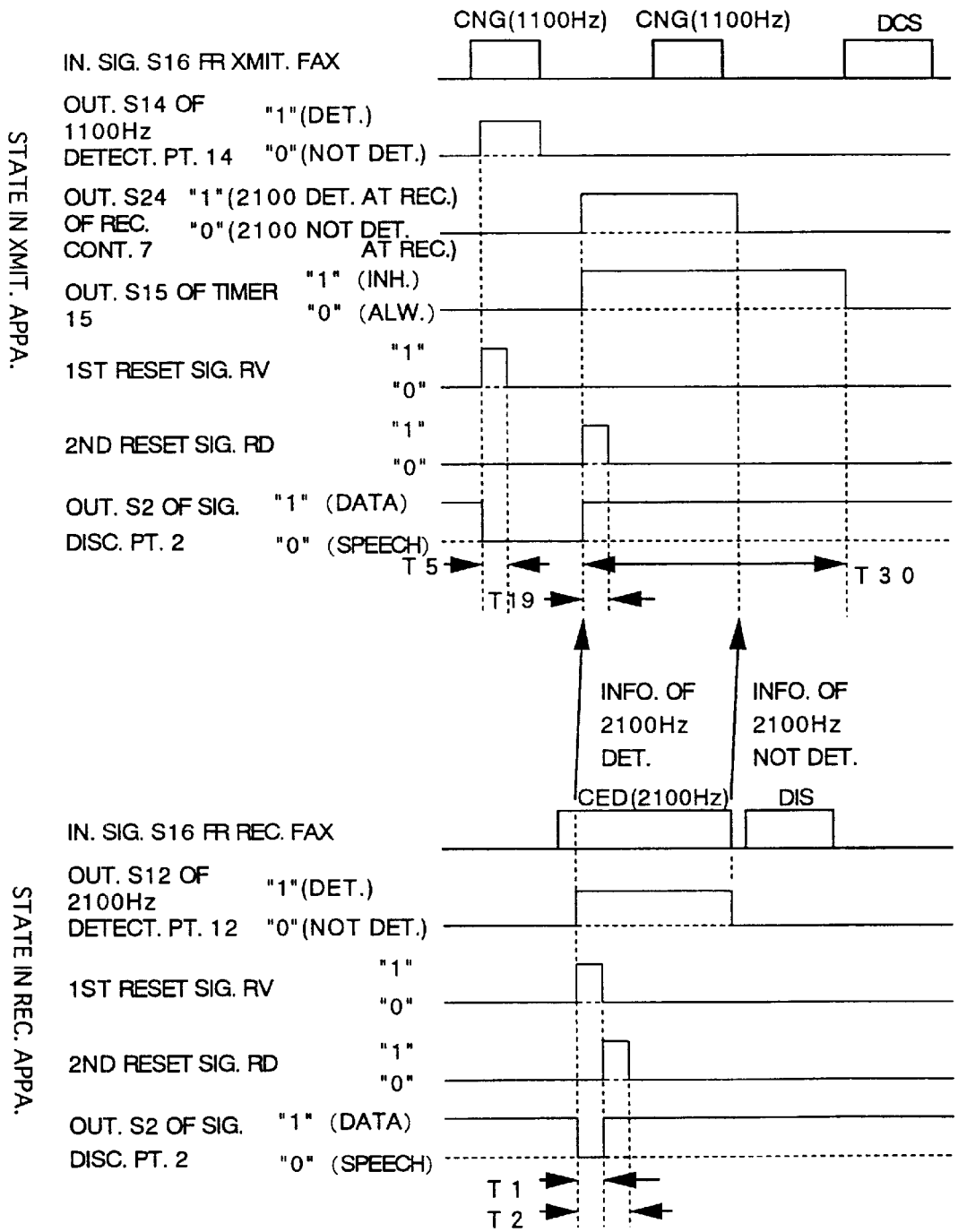
FIG. 37 illustrates operation of the signal transmitting apparatus for voiceband signals according to Embodiment 22 of the present invention.

Operation of identifying signals in the case of a facsimile signal being input into the present signal transmitting apparatus for voiceband signals, will now be explained with reference to FIG. 37. FIG. 37 shows operation in the case that the transmitting facsimile terminal re-outputs a CNG tone (1100 Hz) after the receiving facsimile terminal outputs a CED tone (2100 Hz tone). In FIG. 37, each initial state of the outputs S2 of the signal discriminating parts 2 in the transmitting apparatus and the receiving apparatus is supposed to be "data".

In the transmitting apparatus, the output S2 of the signal discriminating part 2 is once reset at "speech" by detecting a 1100 Hz tone. Then, the output S2 of the signal discriminating part 2 is set at "data" by receiving information of 2100 Hz being detected from the receiving apparatus. At this moment, the timer 15 starts counting the time T30 and sets its output S15 at "1" (inhibited). Besides, modems are assigned in the facsimile signal demodulating part 5 at this moment.

Even if the transmitting facsimile terminal re-outputs a CNG tone (1100 Hz) within the time T30, the output S14 of the 1100 Hz detecting part 14 has been "0" (not detected) because the output S15 of the timer 15 has been "1" (inhibited) and operation of the 1100 Hz detecting part 14 has been disabled. Therefore, the output S2 of the signal discriminating part 2 in the transmitting apparatus is not reset at "speech" again. Accordingly, the assignment of modems in the facsimile signal demodulating part 5 can be retained.

By applying the above configuration, even if a CNG tone (1100 Hz) is re-output from the transmitting facsimile terminal, the output S2 of the signal discriminating part 2 has been "data" state against the re-output 1100 Hz tone. The reason is that a process of detecting 1100 Hz has been disabled during a specific time after receiving 2100 Hz detection information from the opposite side apparatus. Therefore, the assignment of modems in the facsimile signal demodulating part 5 can be retained and the facsimile signal can be correctly transmitted by demodulation.

In the above explanation, the timer 15 is added to the configuration of FIG. 18 in Embodiment 12. The same effect can be obtained by adding the timer 15 to the configuration of FIG. 24 in Embodiment 15 and making the process of detecting 1100 Hz be disabled during a specific time after receiving 2100 Hz detection information from the opposite side apparatus.

Embodiment 23

In the Embodiments 13, 14 and 16, there is a problem that if the transmitting facsimile terminal can not recognize a CED tone (2100 Hz) output from the receiving facsimile terminal and re-outputs a CNG tone (1100 Hz), it is impossible to transmit a facsimile signal by demodulation.

Figure 38:
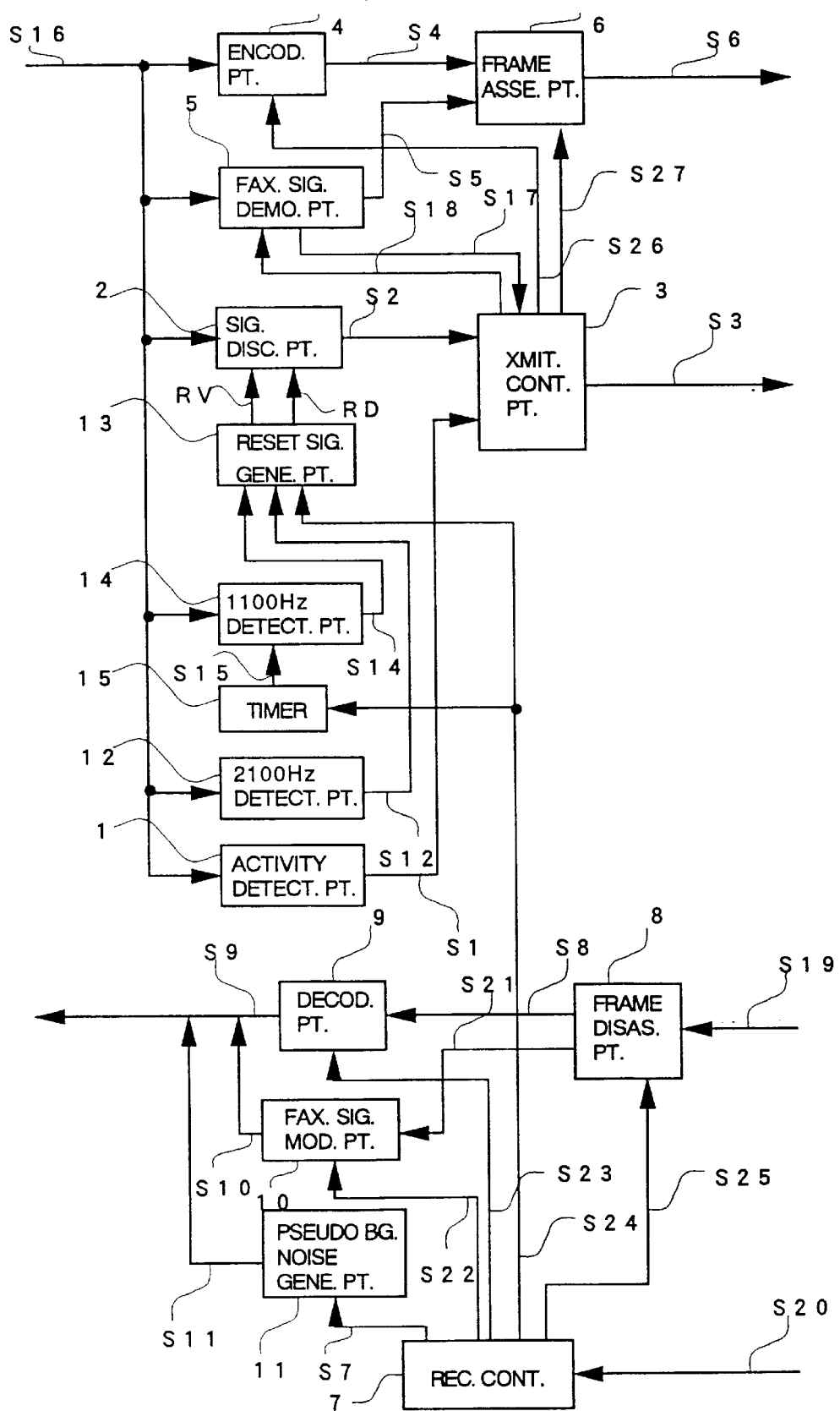
FIG. 38 is a block diagram showing a signal transmitting apparatus for voiceband signals according to Embodiment 23 of the present invention.

FIG. 38 shows a configuration of another embodiment of the signal transmitting apparatus for voiceband signals, according to the present invention. The configuration of FIG. 38 is the case that the timer 15 is added to the configuration of FIG. 20 in Embodiment 13.

Now, operation will be stated. Operations of the activity detecting part 1, the encoding part 4, the facsimile signal demodulating part 5, the frame assembling part 6, the frame disassembling part 8, the decoding part 9, the facsimile signal modulating part 10, and the pseudo background noise generating part 11 are the same as those described in Related Art with reference to FIG. 55.

The signal discriminating part 2, transmission controlling part 3, receiving controller 7, 2100 Hz detecting part 12, and reset signal generating part 13 identically operate with the ones in Embodiment 13 with reference to FIG. 20.

The timer 15 inputs the output S24 of the receiving controller 7. During the specific time T31 after the change to "1" (data at the receiving side) from "0" (speech at the receiving side) of the S24 of the receiving controller 7, an output S15 of the timer 15 has been set at "1" (inhibited). In a case except the above, the timer 15 is set at "0" (allowed).

The 1100 Hz detecting part 14 inputs the output S15 of the timer 15. When the value of the S15 is "1" (inhibited), the output S14 of the 1100 Hz detecting part 14 is unconditionally set at "0" (not detected).

When the value of the S15 is "0" (allowed), the 1100 Hz detecting part 14 identically operates with the one in Embodiment 13. Namely, the ordinary operation of detecting 1100 Hz is performed.

Figure 39:
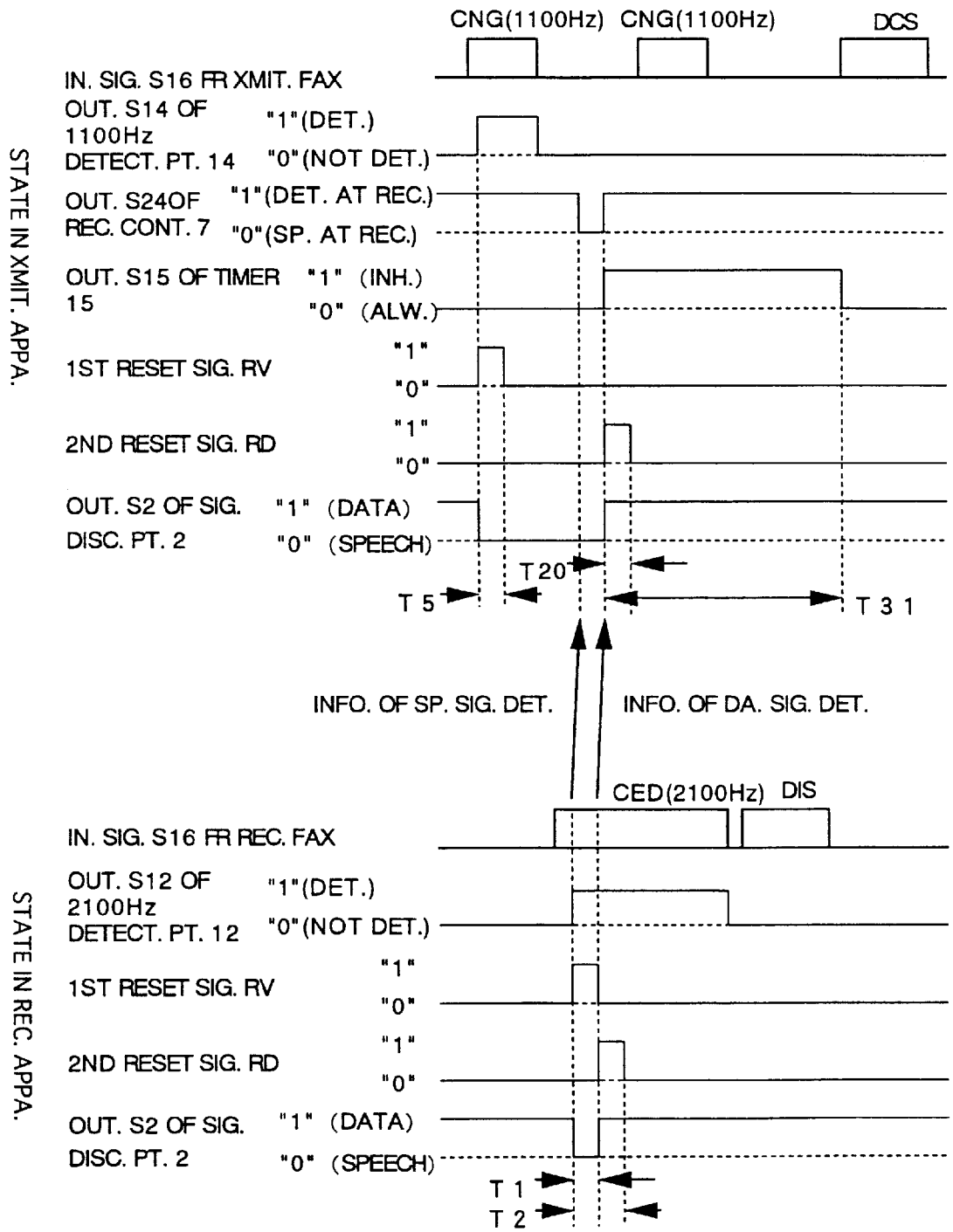
FIG. 39 illustrates operation of the signal transmitting apparatus for voiceband signals according to Embodiment 23 of the present invention.

Operation of identifying signals in the case of a facsimile signal being input into the present signal transmitting apparatus for voiceband signals, will now be explained with reference to FIG. 39. FIG. 39 shows operation in the case that the transmitting facsimile terminal re-outputs a CNG tone (1100 Hz) after the receiving facsimile terminal outputs a CED tone (2100 Hz tone). In FIG. 39, each initial state of the outputs S2 of the signal discriminating parts 2 in the transmitting apparatus and the receiving apparatus is supposed to be "data".

In the transmitting apparatus, the output S2 of the signal discriminating part 2 is once reset at "speech" by detecting a 1100 Hz tone. Then, the output S2 of the signal discriminating part 2 is set at "data" by receiving information of 2100 Hz being detected from the receiving apparatus. At this moment, the timer 15 starts counting the time T31 and sets its output S15 at "1" (inhibited). Besides, modems are assigned in the facsimile signal demodulating part 5 at this moment.

Even if the transmitting facsimile terminal re-outputs a CNG tone (1100 Hz) within the time T31, the output S14 of the 1100 Hz detecting part 14 has been "0" (not detected) because the output SIS of the timer 15 has been "1" (inhibited) and operation of the 1100 Hz detecting part 14 has been disabled. Therefore, the output S2 of the signal discriminating part 2 in the transmitting apparatus is not reset at "speech" again. Accordingly, the assignment of the modems in the facsimile signal demodulating part 5 can be retained.

By applying the above configuration, even if a CNG tone (1100 Hz) is re-output from the transmitting facsimile terminal, the output S2 of the signal discriminating part 2 has been "data" state against the re-output 1100 Hz tone. The reason is that a process of detecting 1100 Hz has been disabled during a specific time after receiving data signal detection information from the opposite side apparatus. Therefore, the assignment of modems in the facsimile signal demodulating part S can be retained and the facsimile signal can be correctly transmitted by demodulation.

In the above explanation, the timer 15 is added to the configuration of FIG. 20 in Embodiment 13. The same effect can be obtained by adding the timer 15 to the configuration of FIG. 22 in Embodiment 14 and making the process of detecting 1100 Hz be disabled during a specific time after receiving data signal detection information from the opposite side apparatus.

The same effect can be obtained by adding the timer 15 to the configuration of FIG. 20 in Embodiment 16 and making the process of detecting 1100 Hz be disabled during within a specific time after receiving data signal detection information from the opposite side apparatus.

Embodiment 24

In the Embodiment 17, there is a problem that if the transmitting facsimile terminal can not recognize a CED tone (2100 Hz) output from the receiving facsimile terminal and re-outputs a CNG tone (1100 Hz), it is impossible to transmit a facsimile signal by demodulation.

Figure 40:
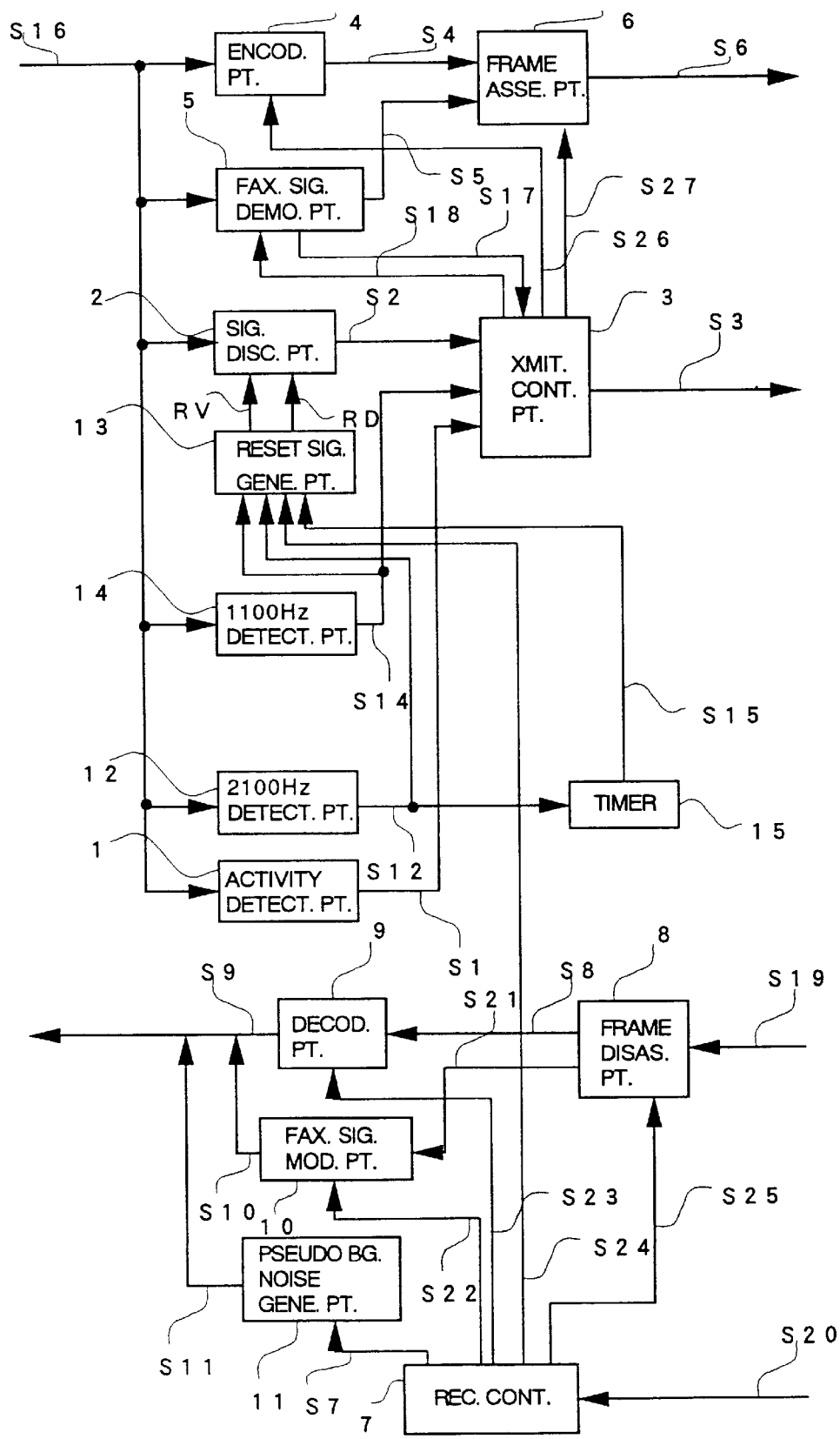
FIG. 40 is a block diagram showing a signal transmitting apparatus for voiceband signals according to Embodiment 24 of the present invention.

FIG. 40 shows a configuration of another embodiment of the signal transmitting apparatus for voiceband signals, according to the present invention. The configuration of FIG. 40 is the case that the timer 15 is added to the configuration of FIG. 27 in Embodiment 17.

Now, operation will be stated. Operations of the activity detecting part 1, the encoding part 4, the facsimile signal demodulating part 5, the frame assembling part 6, the frame disassembling part 8, the decoding part 9, the facsimile signal modulating part 10, and the pseudo background noise generating part 11 are the same as those described in Related Art with reference to FIG. 55.

The signal discriminating part 2, transmission controlling part 3, receiving controller 7, 2100 Hz detecting part 12, and 1100 Hz detecting part 14 identically operate with the ones in Embodiment 17 with reference to FIG. 27.

The timer 15 inputs the output S12 of the 2100 Hz detecting part 12. During the specific time T32 after the change to "1" from "0" of the output S12 of the 2100 Hz detecting part 12, an output S15 of the timer 15 has been set at "1" (inhibited). In a case except the above, the timer 15 is set at "0" (allowed).

The reset signal generating part 13 inputs the output S15 of the timer 15. When the value of the S15 is "1" (inhibited), the first reset signal RV output from the reset signal generating part 13 is unconditionally set at "0".

When the value of the S15 is "0" (allowed), the reset signal generating part 13 identically operates with the one in Embodiment 17.

Figure 41:
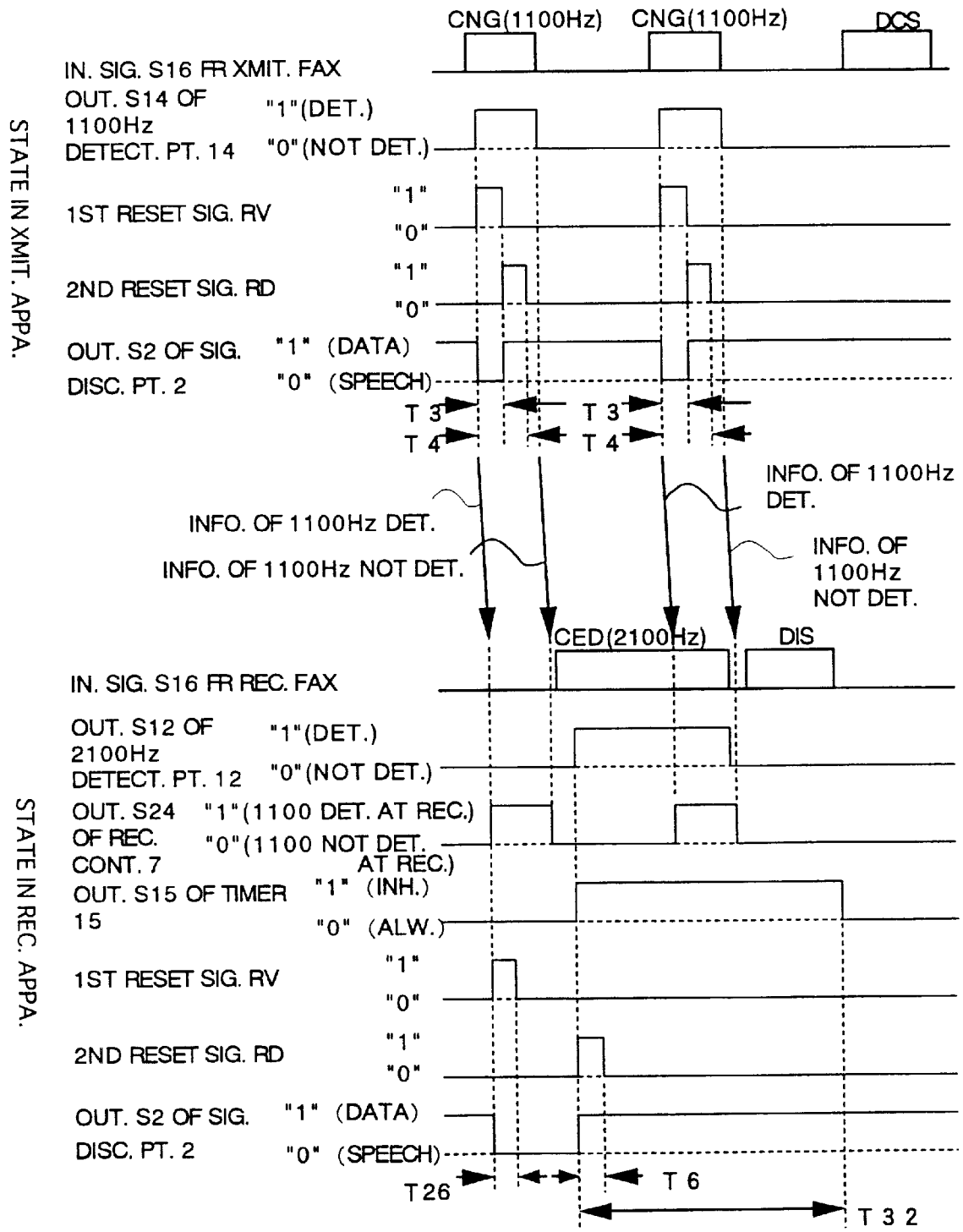
FIG. 41 illustrates operation of the signal transmitting apparatus for voiceband signals according to Embodiment 24 of the present invention.

Operation of identifying signals in the case of a facsimile signal being input into the present signal transmitting apparatus for voiceband signals, will now be explained with reference to FIG. 41. FIG. 41 shows operation in the case that the transmitting facsimile terminal re-outputs a CNG tone (1100 Hz) after the receiving facsimile terminal outputs a CED tone (2100 Hz tone). In FIG. 41, each initial state of the outputs S2 of the signal discriminating parts 2 in the transmitting apparatus and the receiving apparatus is supposed to be "data".

In the receiving apparatus, the output S2 of the signal discriminating part 2 is once reset at "speech" by receiving 1100 Hz detection information from the transmitting apparatus. Then, the output S2 of the signal discriminating part 2 is set at "data" by detecting 2100 Hz tone. At this moment, the timer 15 starts counting the time T32 and sets its output S15 at "1" (inhibited). Besides, modems are assigned in the facsimile signal demodulating part 5 at this moment.

Afterwards, if the transmitting facsimile terminal re-outputs a CNG tone (1100 Hz) within the time T32, the transmitting apparatus detects the 1100 Hz tone and outputs 1100 Hz detection information to the receiving apparatus. However, the first reset signal RV retains to be "0" even when the receiving apparatus receives the 1100 Hz detection information from the transmitting apparatus because the output S15 of the timer 15 in the receiving apparatus is "1" (inhibited).

Therefore, the output S2 of the signal discriminating part 2 in the receiving apparatus is not reset at "speech" again. Accordingly, the assignment of modems in the facsimile signal demodulating part 5 can be retained.

By applying the above configuration, even if a CNG tone (1100 Hz) is re-output from the transmitting facsimile terminal, the output S2 of the signal discriminating part 2 has been "data" state against the re-output 1100 Hz tone. The reason is that a process of resetting the signal discrimination state at "speech" in the case of receiving 1100 Hz detection information, has been disabled during a specific time after detecting a 2100 Hz tone in the receiving apparatus. Therefore, the assignment of modems in the facsimile signal demodulating part 5 can be retained and the facsimile signal can be correctly transmitted by demodulation.

Embodiment 25

In Embodiments 6 through 24, the configuration, wherein the reset signal generating part 13 is provided outside the signal discriminating part 2 and the reset signal generating part 13 resets an internal state of the signal discriminating part 2 at "speech" or sets the state at "data" based on at least one of outputs of the 1100 Hz detecting part 14, 2100 Hz detecting part 12 and the receiving controller 7, is applied for giving easy explanation. However, it is naturally acceptable to have other configuration such as providing a function of reset signal generation inside the signal discriminating part 2 or the transmission controlling part 3, as long as the same operation of assigning input signals to modems in the facsimile signal demodulating part 5 as that of Embodiments 6 through 24 is performed.

Figure 42A:
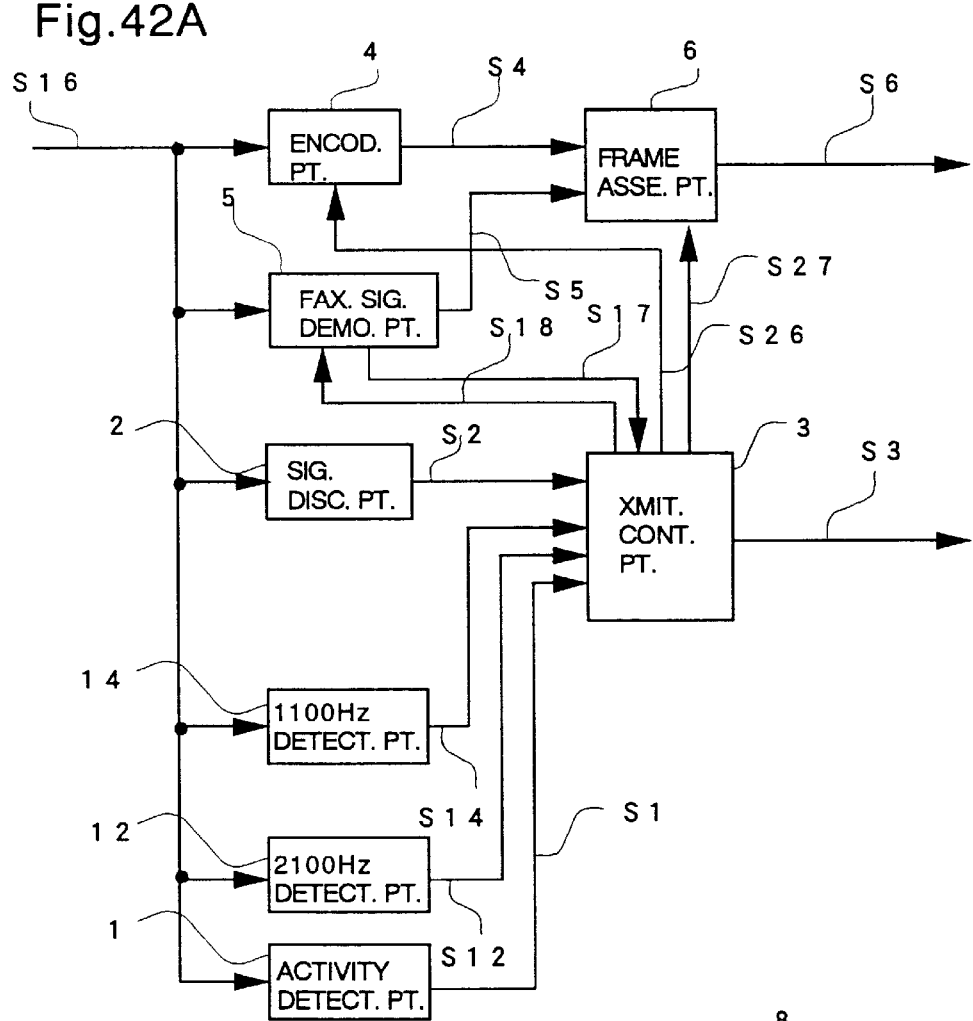
FIG. 42A is a block diagram showing a signal transmitting apparatus for voiceband signals according to Embodiment 25 of the present invention.
Figure 42B:
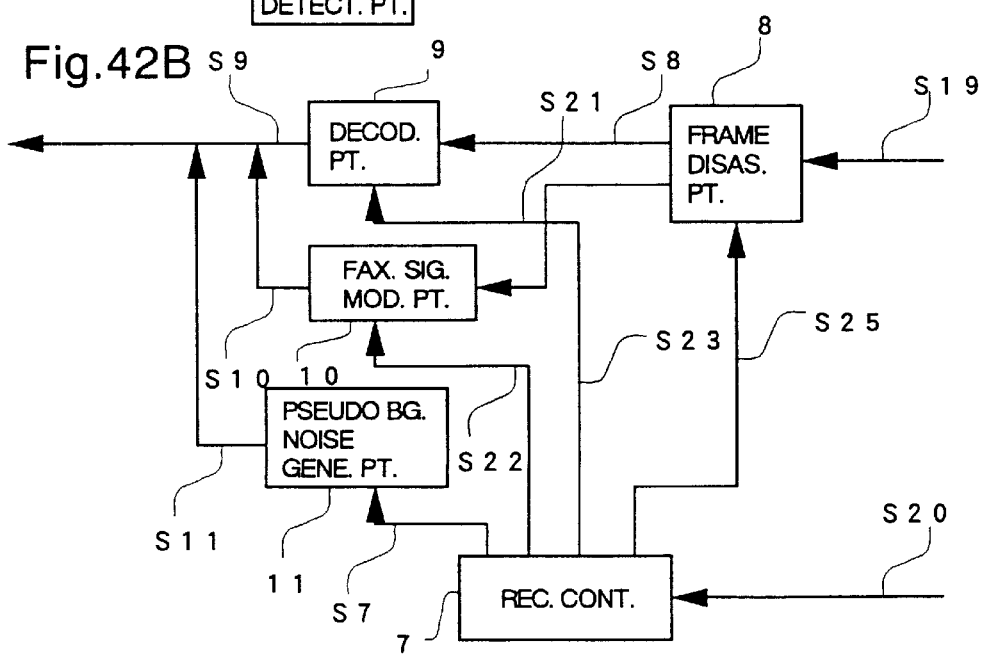
FIG. 42B is a block diagram showing the signal transmitting apparatus for voiceband signals according to Embodiment 25 of the present invention.

For instance, FIGS. 42A and 42B show one example of other configurations in which operation practically equivalent to that of FIGS. 29A and 29B in Embodiment 18 can be performed. In FIGS. 42A and 42B, the input signal S16 of M channels input into the signal transmitting apparatus for voiceband signals, the activity detecting part 1, the signal discriminating part 2, the transmission controlling part 3, the encoding part 4, the facsimile signal demodulating part 5, the frame assembling part 6, the receiving controller 7, the frame disassembling part 8, the decoding part 9, the facsimile signal modulating part 10, the pseudo background noise generating part 11, the 2100 Hz detecting part 12 and the 1100 Hz detecting part 14 are shown.

Now, operation will be stated. Operations of the activity detecting part 1, the encoding part 4, the frame assembling part 6, the receiving controller 7, the frame disassembling part 8, the decoding part 9, the facsimile signal modulating part 10, and the pseudo background noise generating part 11 are the same as those described in Embodiment 18 with reference to FIGS. 29A and 29B.

Operations of the 2100 Hz detecting part 12 and the 1100 Hz detecting part 14 are the same as those described in Embodiment 18 with reference to FIGS. 29A and 29B. However, the respect that the 2100 Hz detection result S12 and the 1100 Hz detection result S14 output from the parts 12 and 14 are sent to the transmission controlling part 3 differs from Embodiment 18.

The signal discriminating part 2 identifies the kind of input signals S16 to be "speech" or "data", by performing a process such as a zero-crossing number analysis and a power analysis. In the case the kind of the input signal is judged to be "speech", the signal discriminating part 2 sets its output S2 at "0", and in the case the kind of the input signal is judged to be "data", the signal discriminating part 2 sets its output S2 at "1".

The transmission controlling part 3 outputs control information S18 for the facsimile signal demodulating part 5, control information S26 for the encoding part 4, and control information S27 for the frame assembling part 6, based on an output S1 of the activity detecting part 1, output S2 of the signal discriminating part 2, output S12 of the 2100 Hz detecting part 12, output S14 of the 1100 Hz detecting part 14 and an output S17 of the facsimile signal demodulating part 5.

The difference between the operation of transmission controlling part 3 in this Embodiment 25 and that in Embodiment 18 is that the transmission controlling part in this embodiment includes the same function of the reset signal generating part 13 in Embodiment 18. Namely, the transmission controlling part 3 in this embodiment inputs 2100 Hz detection result S12 and the 1100 Hz detection result S14, and resets an internal state of the transmission controlling part 3 at "speech" or sets the state at "data" based on the detection results S12 and S14. Then, the facsimile signal demodulating part 5 is controlled depending upon the internal state of the transmission controlling part 3.

Since the operation of the transmission controlling part 3 outputting control information S26 for the encoding part 4 and control information S27 for the frame assembling part 6 is the same as the operation of the transmission controlling part 3 described in Embodiment 18, the explanation is omitted here. Outputting control information S18 for the facsimile signal demodulating part 5 will now be explained with reference to flowcharts.

Figure 44:
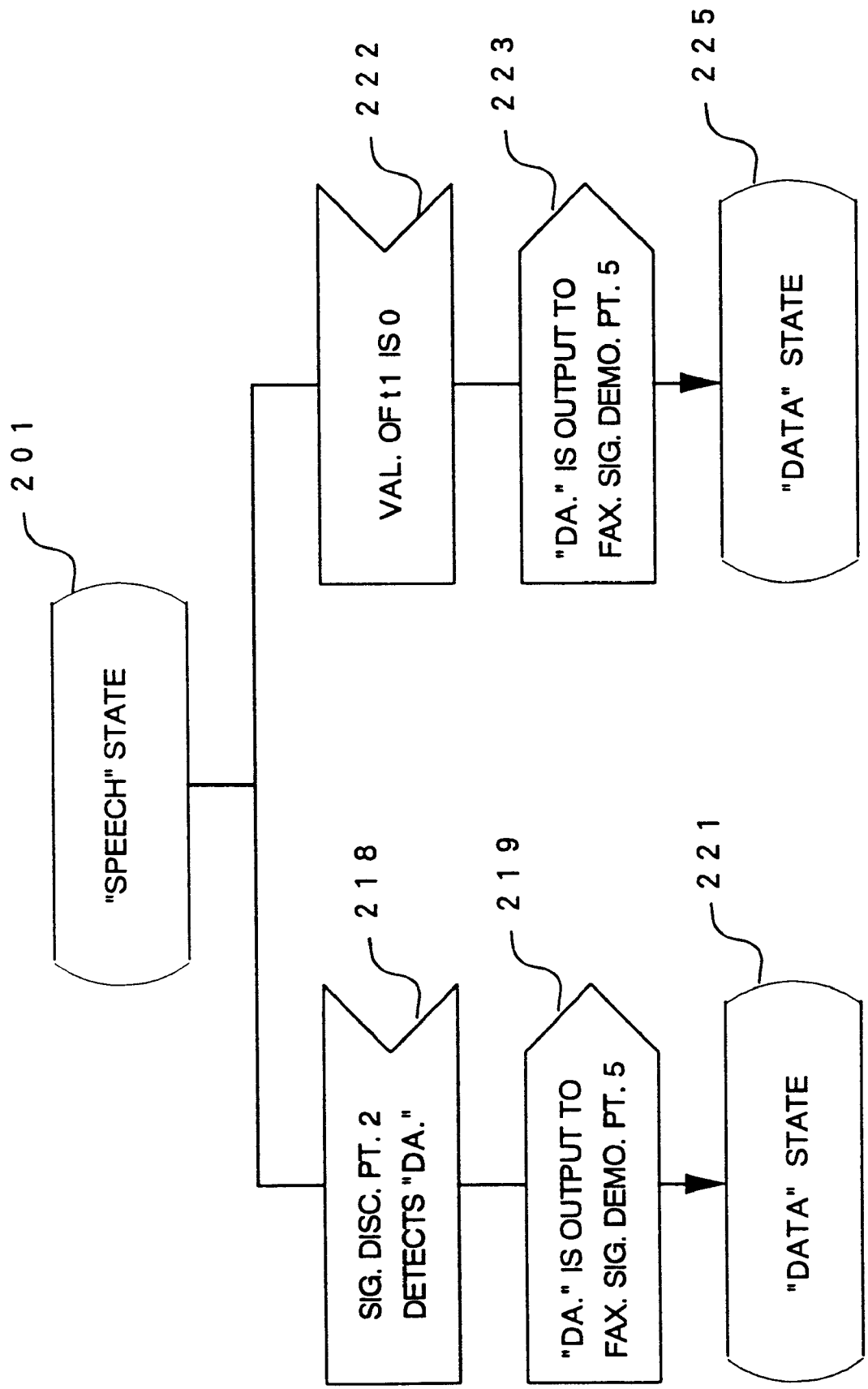
FIG. 44 is a flowchart illustrating operation of the signal transmitting apparatus for voiceband signals according to Embodiment 25 of the present invention.

FIGS. 43 and 44 are flowcharts for explaining operation of the transmission controlling part 3. The flowcharts are illustrated based on SDL (Functional Specification and Description Language) prescribed in ITU-T Recommendation Z. 100. FIG. 54 is a chart for showing symbols used in FIGS. 43 and 44.

As to the internal state of the transmission controlling part 3, there are two states of a "speech" state and a "data" state. State transition between the above two states is described in the SDL flowchart of FIGS. 43 and 44. Namely, the case of a signal expressed by an input symbol being input when the internal state of the transmission controlling part 3 is a "speech" state or a "data" state, will be followed by outputting a signal expressed by an output symbol and performing a task expressed by a task symbol. The internal state is transmitted to a next state in such a way.

It is important not to confuse internal states of the transmission controlling part 3 and the signal discriminating part 2, because the internal state ("speech" or "data") of transmission controlling part 3 does not necessarily correspond with the internal state ("speech" or "data") of the signal discriminating part 2.

Operation in the case of the present internal state of the transmission controlling part 3 being "data" will now be explained with reference to FIG. 43. If a change to "0" (speech) from "1" (data) of the discrimination state S2 is received from the signal discriminating part 2 as shown in a step 202 when the internal state is "data" as shown in a step 200, "speech" is output to the facsimile signal demodulating part 5 through a signal line S18 as shown in a step 203. Then, it is transmitted to a "speech" state as shown in a step 204.

If a change to "1" (detected) from "0" (not detected) of the 2100 Hz detection result S12 is received from the 2100 Hz detecting part 12 as shown in a step 205 when the internal state is "data" as shown in the step 200, "speech" is output to the facsimile signal demodulating part 5 through the signal line S18 as shown in a step 206. As shown in a step 207, the value of a tone detection timer t1 is initialized to be T46. Then, it is transmitted to a "speech" state as shown in a step 209.

If a change to "1" (detected) from "0" (not detected) of the 1100 Hz detection result S14 is received from the 1100 Hz detecting part 14 as shown in a step 210 when the internal state is "data" as shown in the step 200, "speech" is output to the facsimile signal demodulating part 5 through the signal line S18 as shown in a step 211. As shown in a step 212, the value of the tone detection timer t1 is initialized to be T46. Then, it is transmitted to a "speech" state as shown in a step 213. It is supposed that a value of the tone detection timer t1 keeps decreasing down to 0 after the value is set at an initial value.

Operation in the case of present internal state of the transmission controlling part 3 being "speech" will now be explained with reference to FIG. 44. If a change to "1" (data) from "0" (speech) of the discrimination state S2 is received from the signal discriminating part 2 as shown in a step 218 when the internal state is "speech" as shown in a step 201, "data" is output to the facsimile signal demodulating part 5 through the signal line S18 as shown in a step 219. Then, it is transmitted to a "data" state as shown in a step 221.

If a value of the tone detection timer t1 goes down to 0 as shown in a step 222 when the internal state is "speech" as shown in the step 201, "data" is output to the facsimile signal demodulating part 5 through the signal line S18 as shown in a step 223. Then, it is transmitted to a "data" state as shown in a step 225.

When the facsimile signal demodulating part 5 receives "data" from the transmission controlling part 3 through the signal line S18, an input channel is assigned to one of modems to the number of n in the facsimile signal demodulating part 5.

After the assigning has been performed, in the facsimile signal demodulating part 5, the modem to which the facsimile signal of the above channel is assigned keeps monitoring presence of a signal modulated at a data rate of 300 bit/s, by the ITU-T Recommendation V. 21 Channel No. 2 modulation system used in the ITU-T Recommendation T. 30 Protocol. When the signal modulated at the data rate 300 bit/s is detected, it is recognized that the modulated signal is a facsimile call to be transmitted by demodulation. Then, the facsimile signal demodulating part 5 demodulates the facsimile signal input into the above channel, by the above modem. The facsimile signal demodulating part 5 outputs a demodulated signal S5 to the frame assembling part 6, and outputs control information, which indicates a beginning of transmission by demodulation of the facsimile call, to the transmission controlling part 3 via a signal line S17.

If the facsimile signal demodulating part 5 has not detected a signal modulated at 300 bit/s within a specific time since assigning the input channel to the modem was made based on the control information S18 from the transmission controlling part 3, the facsimile signal demodulating part 5 judges that the facsimile call can not be transmitted by demodulation. Then, the facsimile signal demodulating part 5 releases the assignment of the input channel to the modem. In addition, if the facsimile signal demodulating part 5 is received "speech" from the transmission controlling part 3 through the signal line S18, the facsimile signal demodulating part 5 Judges that the facsimile call can not be transmitted by demodulation, and releases the assignment of the input channel to the modem.

Operation of identifying signals in the case of a facsimile signal being input into the present signal transmitting apparatus for voiceband signals, will now be explained with reference to FIGS. 43, 44 and 45.

Figure 45:
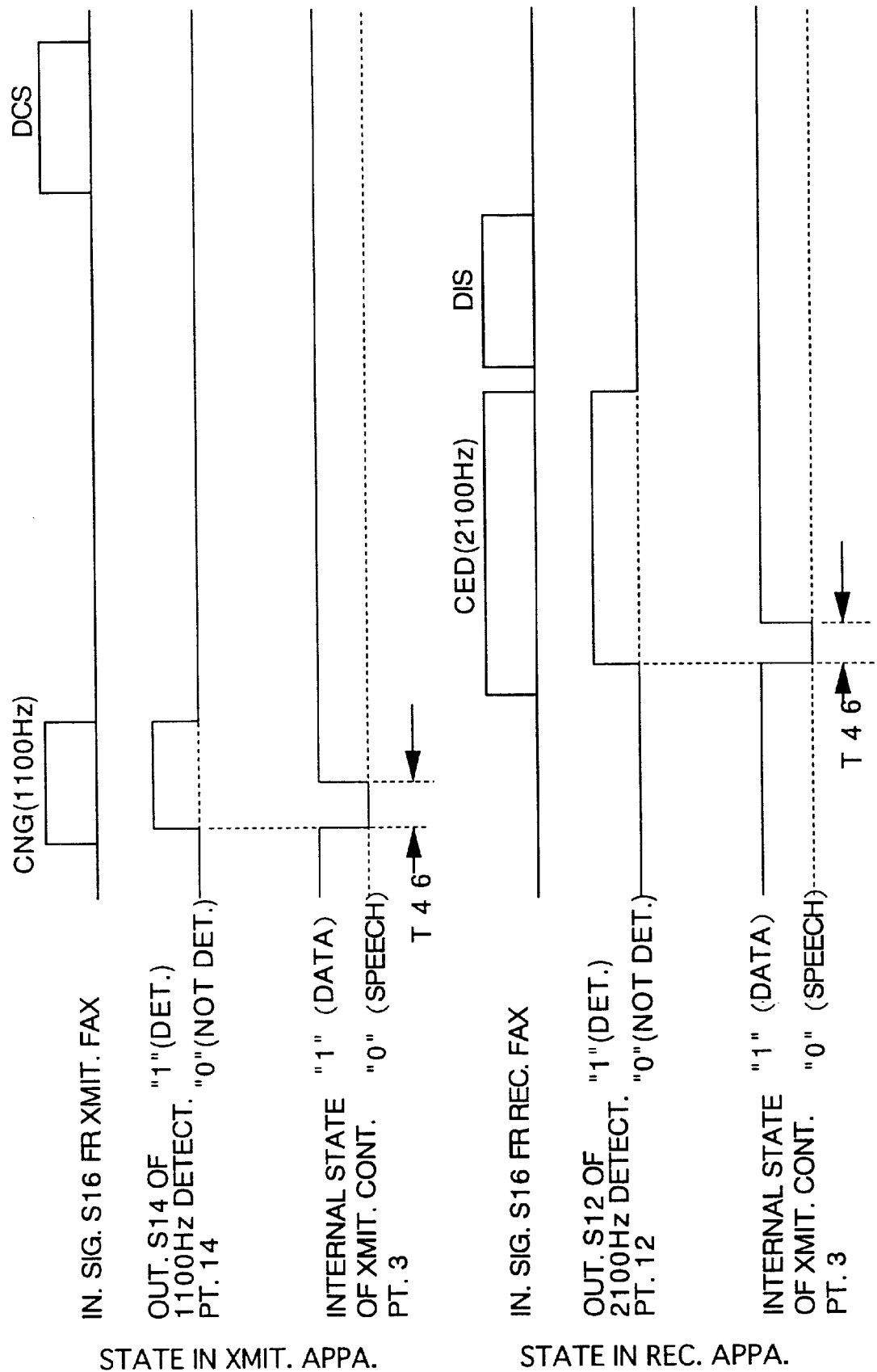
FIG. 45 illustrates operation of the signal transmitting apparatus for voiceband signals according to Embodiment 25 of the present invention.

In FIGS. 43, 44 and 45, each internal state of the transmission controlling parts 3 in the transmitting apparatus and the receiving apparatus is supposed to be "data", and each initial state of the outputs S2 of the signal discriminating parts 2 in the transmitting apparatus and the receiving apparatus is supposed to be "data" and to keep the "data" state during the period shown in the figures.

In the transmitting apparatus, when a 1100 Hz tone is output from the transmitting facsimile terminal, the 1100 Hz detecting part 14 detects the tone and changes its 1100 Hz detection result S14 to "1" from "0".

If the transmission controlling part 3 receives a change to "1" (detected) from "0" (not detected) of the 1100 Hz detection result S14 from the 1100 Hz detecting part 14 as shown in the step 210, "speech" is output to the facsimile signal demodulating part 5 through the signal line S18 as shown in the step 211. As shown in the step 212, the value of the tone detection timer t1 is initialized to be T46. Then, it is transmitted to a "speech" state as shown in the step 213.

Afterwards, when the time T46 has passed, a value of the tone detection timer t1 goes down to 0 as shown in the step 222, "data" is output to the facsimile signal demodulating part 5 from the transmission controlling part 3 through the signal line S18 as shown in the step 223. Then, it is transmitted to a "data" state as shown in the step 225.

When the facsimile signal demodulating part 5 receives "data" from the transmission controlling part 3 through the output S18, an input channel is assigned to one of modems to the number of n in the facsimile signal demodulating part 5.

In the receiving apparatus, when a tone of 2100 Hz is output from the receiving facsimile terminal, the 2100 Hz detecting part 12 detects the tone and changes its 2100 Hz detection result S12 to "1" from "0".

If the transmission controlling part 3 receives a change to "1" (detected) from "0" (not detected) of the 2100 Hz detection result S12 from the 2100 Hz detecting part 12 as shown in the step 205, "speech" is output to the facsimile signal demodulating part 5 through the signal line S18 as shown in the step 206. As shown in the step 207, the value of the tone detection timer t1 is initialized to be T46. Then, it is transmitted to a "speech" state as shown in the step 209.

Afterwards, when the time T46 has passed, a value of the tone detection timer t1 goes down to 0 as shown in the step 222, "data" is output to the facsimile signal demodulating part 5 from the transmission controlling part 3 through the signal line S18 as shown in the step 223. Then, it is transmitted to a "data" state as shown in the step 225.

When the facsimile signal demodulating part 5 receives "data" from the transmission controlling part 3 through the signal line S18, an input channel is assigned to one of modems to the number of n in the facsimile signal demodulating part 5.

By applying the above configuration, in the receiving apparatus, when the 2100 Hz detecting part 12 detects a tone of 2100 Hz, the transmission controlling part 3 operates in order to set its internal state at "data" after having reset the state at "speech". Besides, in the transmitting apparatus, when the 1100 Hz detecting part 14 detects a tone of 1100 Hz, the transmission controlling part 3 operates to set its internal state at "data" after having reset the state at "speech". Accordingly, it is possible to set each internal state of the transmission controlling parts 3 in the transmitting apparatus and in the receiving apparatus at "data", after once having reset the internal state at "speech", at the beginning of a facsimile call even when no call control information can be obtained. Therefore, channels of input facsimile signals can be assigned to modems in the facsimile signal demodulating part 5. Then, the facsimile signal can be correctly transmitted by demodulation.

In the above Embodiment with reference to FIGS. 42A and 42B, the transmission controlling part 3 inputs the 2100 Hz detection result S12 and the 1100 Hz detection result S14 and resets its internal state at "speech" or sets the state at "data" based on the input results. However, the same effect can be obtained by including a function of resetting the internal state at "speech" or setting the state at "data" based on the 2100 Hz detection result S12 and the 1100 Hz detection result S14, into the signal discriminating part 2 and by controlling the facsimile signal demodulating part 5 based on a signal discrimination state output from the signal discriminating part 2.

Embodiment 26

Figure 46:
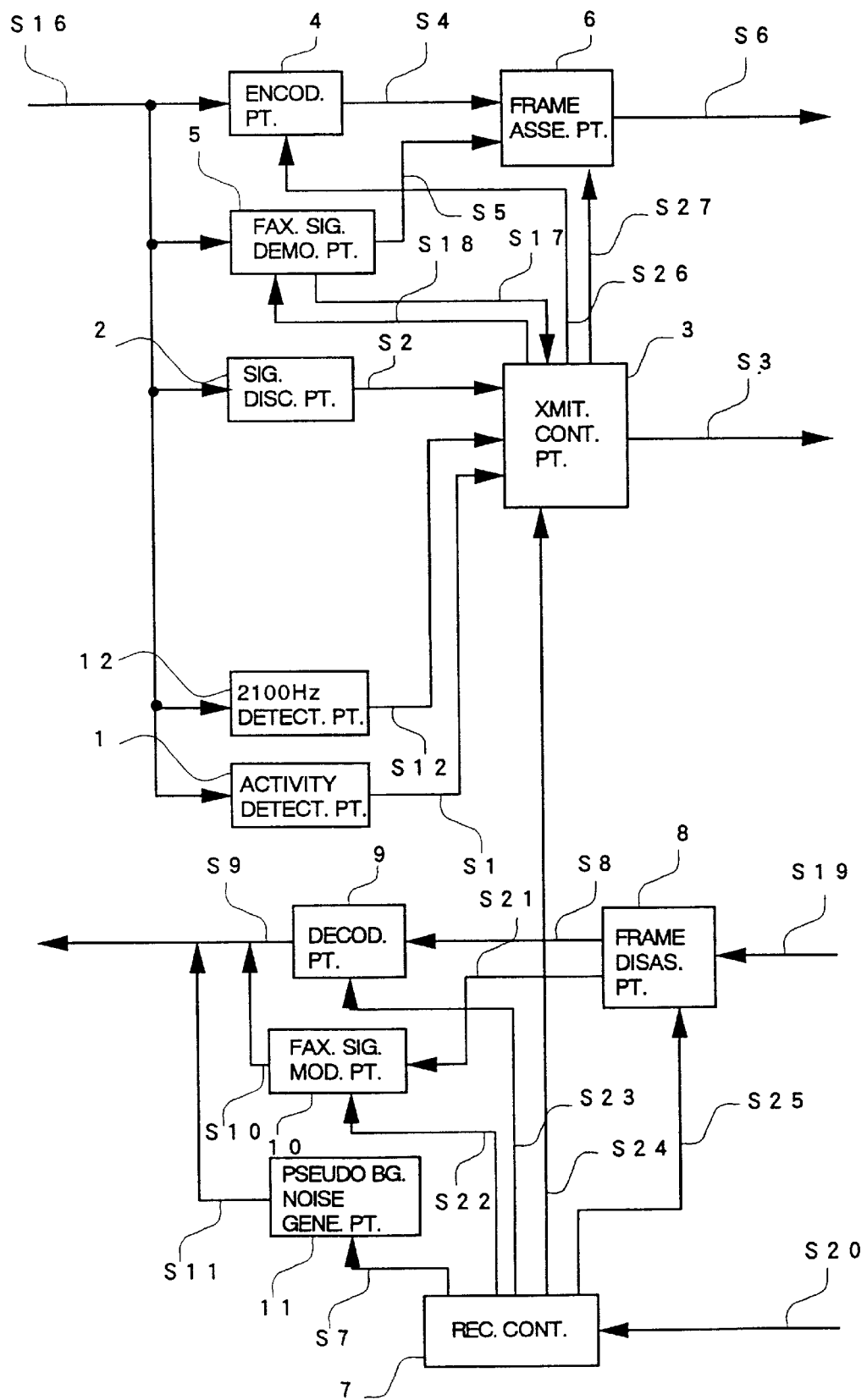
FIG. 46 is a block diagram showing a signal transmitting apparatus for voiceband signals according to Embodiment 26 or 27 of the present invention.

FIG. 46 shows one example of other configurations in which operation practically equivalent to that of FIG. 8 in Embodiment 6 can be performed. In FIG. 46, the input signal S16 of M channels input into the signal transmitting apparatus for voiceband signals, the activity detecting part 1, the signal discriminating part 2, the transmission controlling part 3, the encoding part 4, the facsimile signal demodulating part 5, the frame assembling part 6, the receiving controller 7, the frame disassembling part 8, the decoding part 9, the facsimile signal modulating part 10, the pseudo background noise generating part 11, and the 2100 Hz detecting part 12 are shown.

Now, operation will be stated. Operations of the activity detecting part 1, the encoding part 4, the frame assembling part 6, the receiving controller 7, the frame disassembling part 8, the decoding part 9, the facsimile signal modulating part 10, and the pseudo background noise generating part 11 are the same as those described in Embodiment 6 with reference to FIG. 8.

Operations of the signal discriminating part 2, facsimile signal demodulating part 5 and the 2100 Hz detecting part 12 are the same as those described in Embodiment 25 with reference to FIGS. 42A and 42B.

The receiving controller 7 identically operates with the one stated in Related Art with reference to FIG. 55. In addition, when the receiving controller 7 receives information of 2100 Hz being detected from the opposite side apparatus through the signal line S20, the receiving controller 7 outputs the information of 2100 Hz being detected to the transmission controlling part 3 through the signal line S24.

The transmission controlling part 3 outputs control information S18 for the facsimile signal demodulating part 5, control information S26 for the encoding part 4, control information S27 for the frame assembling part 6 and control information S3 for the opposite side apparatus, based on an output S1 of the activity detecting part 1, output S2 of the signal discriminating part 2, output S12 of the 2100 Hz detecting part 12, output S17 of the facsimile signal demodulating part 5 and output S24 of the receiving controller 7.

The difference between the operation of transmission controlling part 3 in this Embodiment and that in Embodiment 6 is that the transmission controlling part in this embodiment includes a function of the reset signal generating part 13 in Embodiment 6. Namely, the transmission controlling part 3 in this embodiment inputs 2100 Hz detection result S12 and resets an internal state of the transmission controlling part 3 at "speech" or sets the state at "data" based on the 2100 Hz detection result S12. Then, the facsimile signal demodulating part 5 is controlled depending upon the internal state of the transmission controlling part 3.

Since the operation of the transmission controlling part 3 outputting control information S26 for the encoding part 4 and control information S27 for the frame assembling part 6 is the same as the operation of the transmission controlling part 3 described in Embodiment 6, the explanation is omitted here. Outputting control information S18 for the facsimile signal demodulating part 5 and control information S3 for the opposite side apparatus will now be explained with reference to flowcharts.

Figure 47:
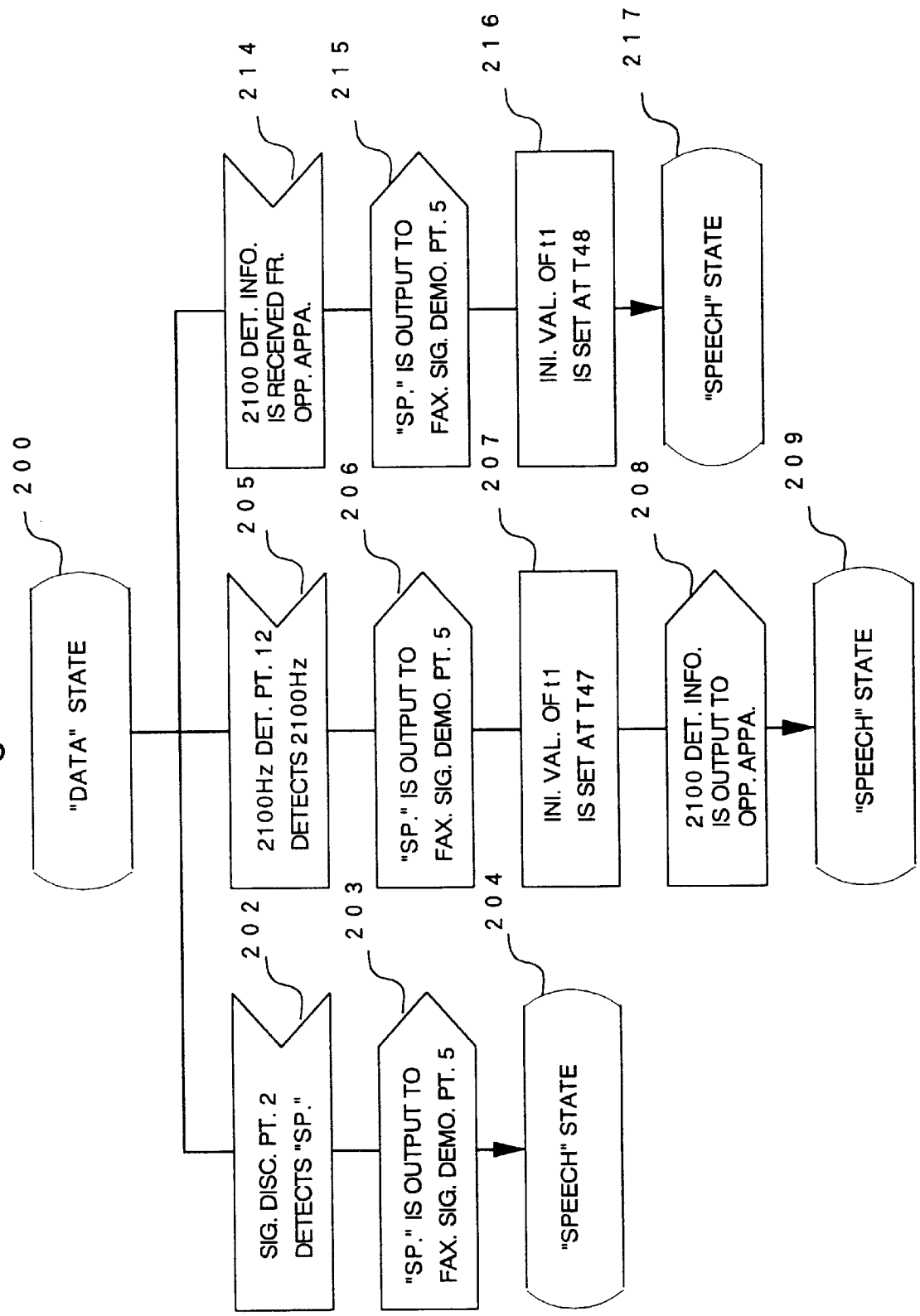
FIG. 47 is a flowchart illustrating operation of the signal transmitting apparatus for voiceband signals according to Embodiment 26 of the present invention.
Figure 48:
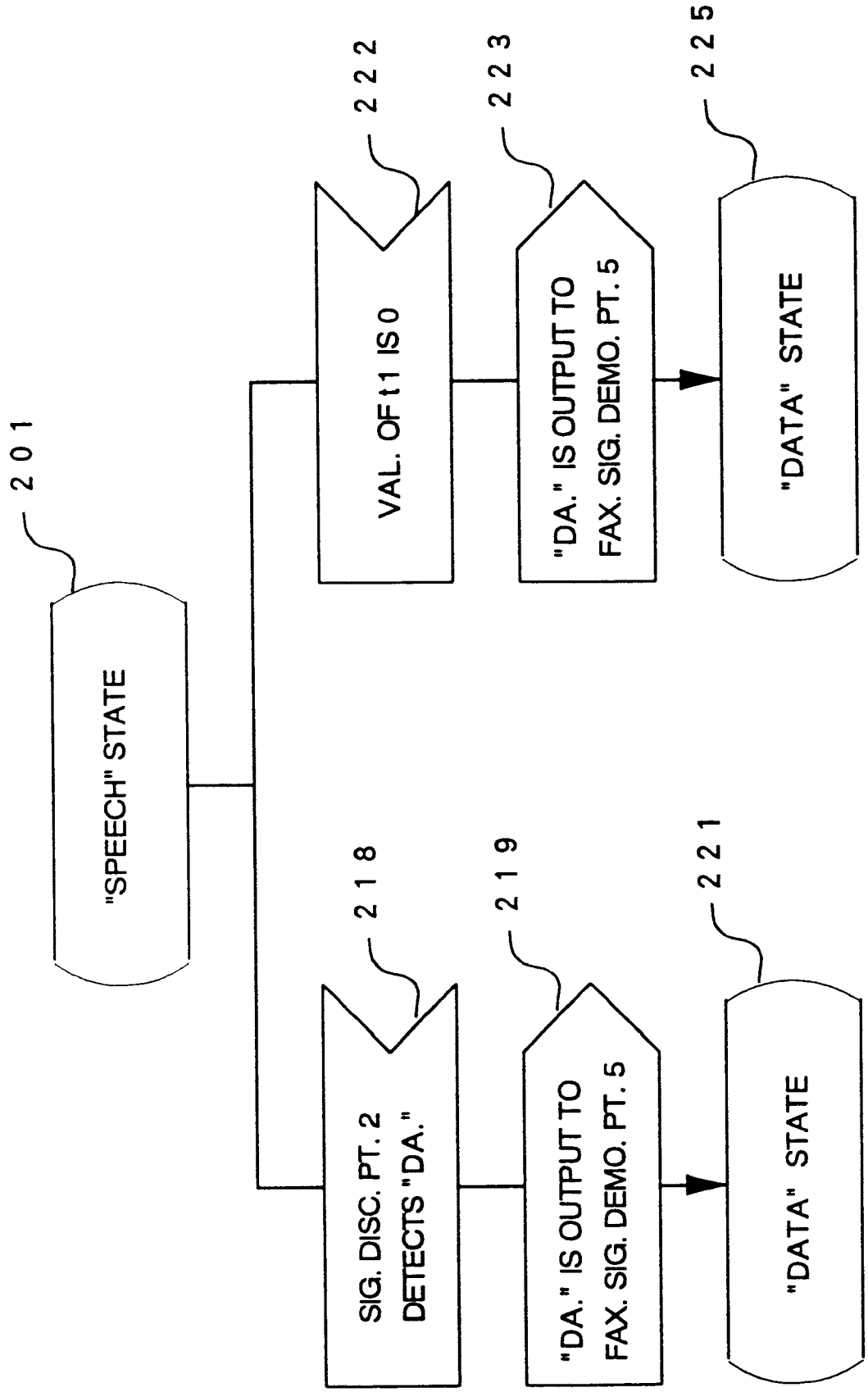
FIG. 48 is a flowchart illustrating operation of the signal transmitting apparatus for voiceband signals according to Embodiment 26 of the present invention.

FIGS. 47 and 48 are flowcharts for explaining the operation of the transmission controlling part 3. Operation in the case of the present internal state of the transmission controlling part 3 being "data" will now be explained with reference to FIG. 47. If a change to "0" (speech) from "1" (data) of the discrimination state S2 is received from the signal discriminating part 2 as shown in the step 202 when the internal state is "data" as shown in the step 200, "speech" is output to the facsimile signal demodulating part 5 through the signal line S18 as shown in the step 203. Then, it is transmitted to a "speech" state as shown in the step 204.

If a change to "1" (detected) from "0" (not detected) of the 2100 Hz detection result S12 is received from the 2100 Hz detecting part 12 as shown in the step 205 when the internal state is "data" as shown in the step 200, "speech" is output to the facsimile signal demodulating part 5 through the signal line S18 as shown in the step 206. As shown in the step 207, the value of a tone detection timer t1 is initialized to be T47. Then, after 2100 Hz detection information is output to the opposite side apparatus through the signal line S3 as shown in a step 208, it is transmitted to a "speech" state as shown in the step 209.

If 2100 Hz detection information is received from the receiving controller 7 through the signal line S24 as shown in a step 214 when the internal state is "data" as shown in the step 200, "speech" is output to the facsimile signal demodulating part 5 through the signal line S18 as shown in a step 215. As shown in a step 216, the value of the tone detection timer t1 is initialized to be T48. Then, it is transmitted to a "speech" state as shown in a step 217.

It is acceptable for the initial value T48 to be the same as the initial value T47 or to be different from the T47. It is supposed that a value of the tone detection timer t1 keeps decreasing down to 0 after the value is set at an initial value.

Operation in the case of present internal state of the transmission controlling part 3 being "speech" will now be explained with reference to FIG. 48. If a change to "1" (data) from "0" (speech) of the discrimination state S2 is received from the signal discriminating part 2 as shown in the step 218 when the internal state is "speech" as shown in the step 201, "data" is output to the facsimile signal demodulating part 5 through the signal line S18 as shown in the step 219. Then, it is transmitted to a "data" state as shown in the step 221.

If a value of the tone detection timer t1 goes down to 0 as shown in the step 222 when the internal state is "speech" as shown in the step 201, "data" is output to the facsimile signal demodulating part 5 through the signal line S18 as shown in the step 223. Then, it is transmitted to a "data" state as shown in the step 225.

Operation of identifying signals in the case of a facsimile signal being input into the present signal transmitting apparatus for voiceband signals, will now be explained with reference to FIGS. 47, 48 and 49.

Figure 49:
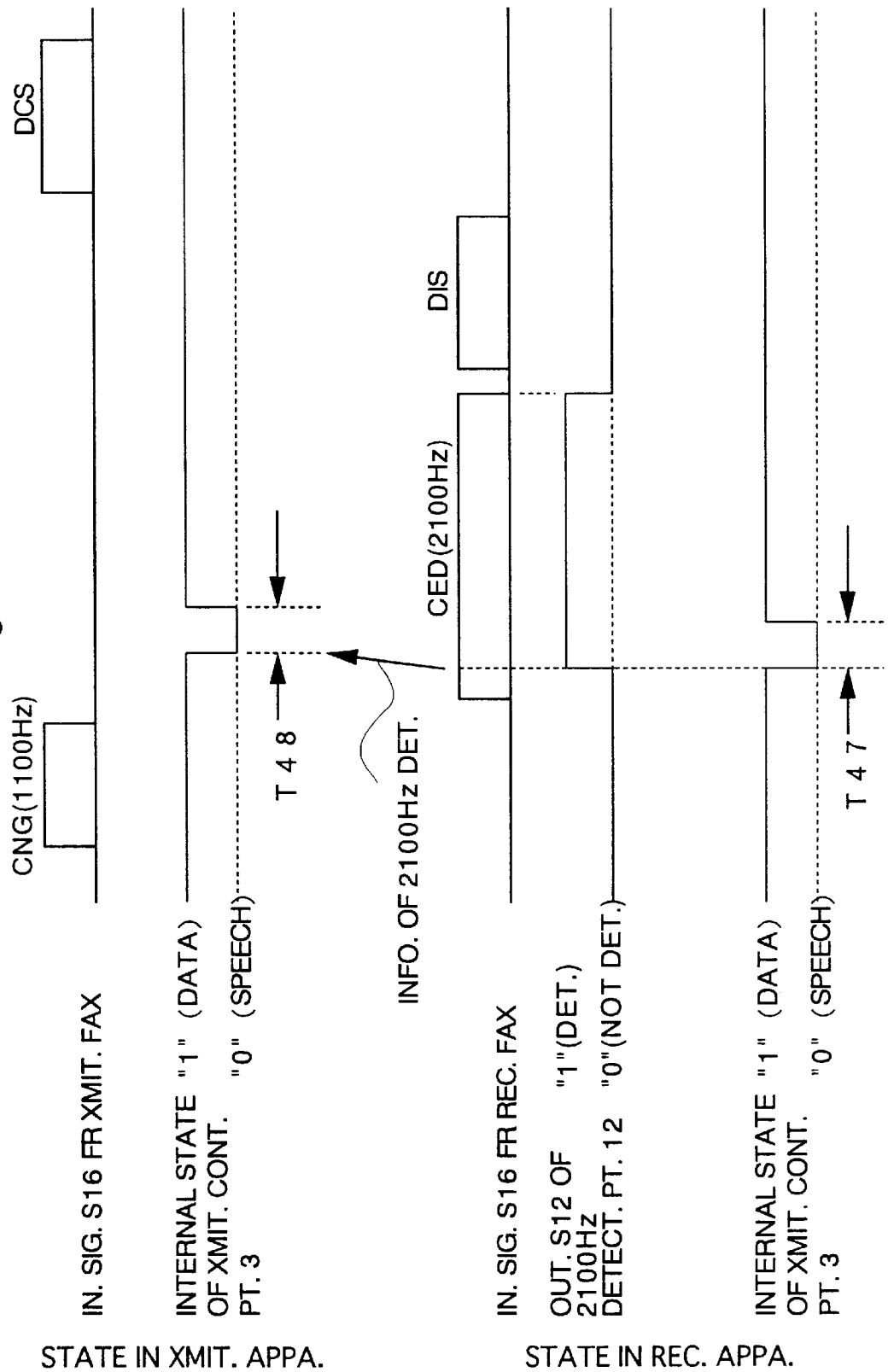
FIG. 49 illustrates operation of the signal transmitting apparatus for voiceband signals according to Embodiment 26 of the present invention.

In FIGS. 47, 48 and 49, each internal state of the transmission controlling parts 3 in the transmitting apparatus and the receiving apparatus is supposed to be "data", and each initial state of the outputs S2 of the signal discriminating parts 2 in the transmitting apparatus and the receiving apparatus is "data" and is supposed to keep the "data" state during the period shown in the figures.

In the receiving apparatus, when a 2100 Hz tone is output from the receiving facsimile terminal, the 2100 Hz detecting part 12 detects the tone and changes its 2100 Hz detection result S12 to "1" from "0".

If the transmission controlling part 3 receives a change to "1" (detected) from "0" (not detected) of the 2100 Hz detection result S12 is received from the 2100 Hz detecting part 12 as shown in the step 205, "speech" is output to the facsimile signal demodulating part 5 through the signal line S18 as shown in the step 206. As shown in the step 207, the value of the tone detection timer t1 is initialized to be T47. Then, after outputting 2100 Hz detection information to the opposite side apparatus through the signal line S3 as shown in the step 208, it is transmitted to a "speech" state as shown in the step 209.

Afterwards, when the time T47 has passed, a value of the tone detection timer t1 goes down to 0 as shown in the step 222, "data" is output to the facsimile signal demodulating part 5 from the transmission controlling part 3 through the signal line S18 as shown in the step 223. Then, it is transmitted to a "data" state as shown in the step 225.

When the facsimile signal demodulating part 5 receives "data" from the transmission controlling part 3 through the signal line S18, an input channel is assigned to one of modems to the number of n in the facsimile signal demodulating part 5.

In the transmitting apparatus, when the receiving controller 7 receives 2100 Hz detection information from the opposite side apparatus, the 2100 Hz detection information is output to the transmission controlling part 3 through the signal line S24.

If the transmission controlling part 3 receives 2100 Hz detection information from the receiving controller 7 as shown in the step 214, "speech" is output to the facsimile signal demodulating part 5 through the signal line S18 as shown in the step 215. As shown in the step 216, the value of the tone detection timer t1 is initialized to be T48. Then, it is transmitted to a "speech" state as shown in the step 217.

Afterwards, when the time T48 has passed, a value of the tone detection timer t1 goes down to 0 as shown in the step 222, "data" is output to the facsimile signal demodulating part 5 through the signal line S18 as shown in the step 223. Then, it is transmitted to a "data" state as shown in the step 225.

When the facsimile signal demodulating part 5 receives "data" from the transmission controlling part 3 through the signal line S18, an input channel is assigned to one of modems to the number of n in the facsimile signal demodulating part 5.

By applying the above configuration, in the receiving apparatus, when the 2100 Hz detecting part 12 detects a tone of 2100 Hz, the transmission controlling part 3 operates in order to set its internal state at "data" after having reset the state at "speech". Besides, in the transmitting apparatus, when 2100 Hz detection information is received from the opposite side apparatus, the transmission controlling part 3 operates to set its internal state at "data" after having reset the state at "speech". Accordingly, it is possible to set each internal state of the transmission controlling parts 3 in the transmitting apparatus and in the receiving apparatus at "data", after once having reset the discrimination state at "speech", at the beginning of a facsimile call even when no call control information can be obtained. Therefore, channels of input facsimile signals can be assigned to modems in the facsimile signal demodulating part 5. Then, the facsimile signal can be correctly transmitted by demodulation.

Resetting an internal state of the transmission controlling part 3 at "speech" or setting the state at "data" is performed based on a 2100 Hz detection result S12 in this embodiment. However, it is acceptable to perform the same operation by using a tone detection result for other frequency such as 1100 Hz, instead of using the 2100 Hz tone.

In the above embodiment, the transmission controlling part 3 inputs the 2100 Hz detection result S12 and 2100 Hz detection information S24 from the opposite side apparatus, and resets its internal state at "speech" or sets the state at "data" based on the input result and the input information. However, the same effect can be obtained by including a function of resetting the internal state at "speech" or setting the state at "data" based on the 2100 Hz detection result S12 and the 2100 Hz detection information S24 from the opposite side apparatus, into the signal discriminating part 2 and by controlling the facsimile signal demodulating part 5 based on a signal discrimination state output from the signal discriminating part 2.

Embodiment 27

Using the configuration shown in FIG. 46, it is possible to realize operation practically equivalent to that in Embodiment 8 with reference to FIG. 10.

Now, operation will be stated. Operations of the activity detecting part 1, the encoding part 4, the frame assembling part 6, the receiving controller 7, the frame disassembling part 8, the decoding part 9, the facsimile signal modulating part 10, and the pseudo background noise generating part 11 are the same as those described in Embodiment 8 with reference to FIG. 10.

Operations of the signal discriminating part 2, facsimile signal demodulating part 5 and the 2100 Hz detecting part 12 are the same as those described in Embodiment 25 with reference to FIGS. 42A and 42B.

The receiving controller 7 identically operates with the one stated in Related Art with reference to FIG. 55. In addition, when the receiving controller 7 receives data signal detection information from the opposite side apparatus through the signal line S20, the receiving controller 7 outputs the data signal detection information to the transmission controlling part 3 through the signal line S24.

The transmission controlling part 3 outputs control information S18 for the facsimile signal demodulating part 5, control information S26 for the encoding part 4, control information S27 for the frame assembling part 6 and control information S3 for the opposite side apparatus, based on an output S1 of the activity detecting part 1, output S2 of the signal discriminating part 2, output S12 of the 2100 Hz detecting part 12, output S17 of the facsimile signal demodulating part 5 and the output S24 of the receiving controller 7.

The difference between the operation of transmission controlling part 3 in this Embodiment and that in Embodiment 8 is that the transmission controlling part in this embodiment includes a function of the reset signal generating part 13 in Embodiment 8. Namely, the transmission controlling part 3 in this embodiment inputs 2100 Hz detection result S12 and resets an internal state of the transmission controlling part 3 at "speech" or sets the state at "data" based on the 2100 Hz detection result S12. Then, the facsimile signal demodulating part 5 is controlled depending upon the internal state of the transmission controlling part 3.

Since the operation of the transmission controlling part 3 outputting control information S26 for the encoding part 4 and control information S27 for the frame assembling part 6 is the same as the operation of the transmission controlling part 3 described in Embodiment 8, the explanation is omitted here. Outputting control information S18 for the facsimile signal demodulating part 5 and control information S3 for the opposite side apparatus will now be explained with reference to flowcharts.

Figure 50:
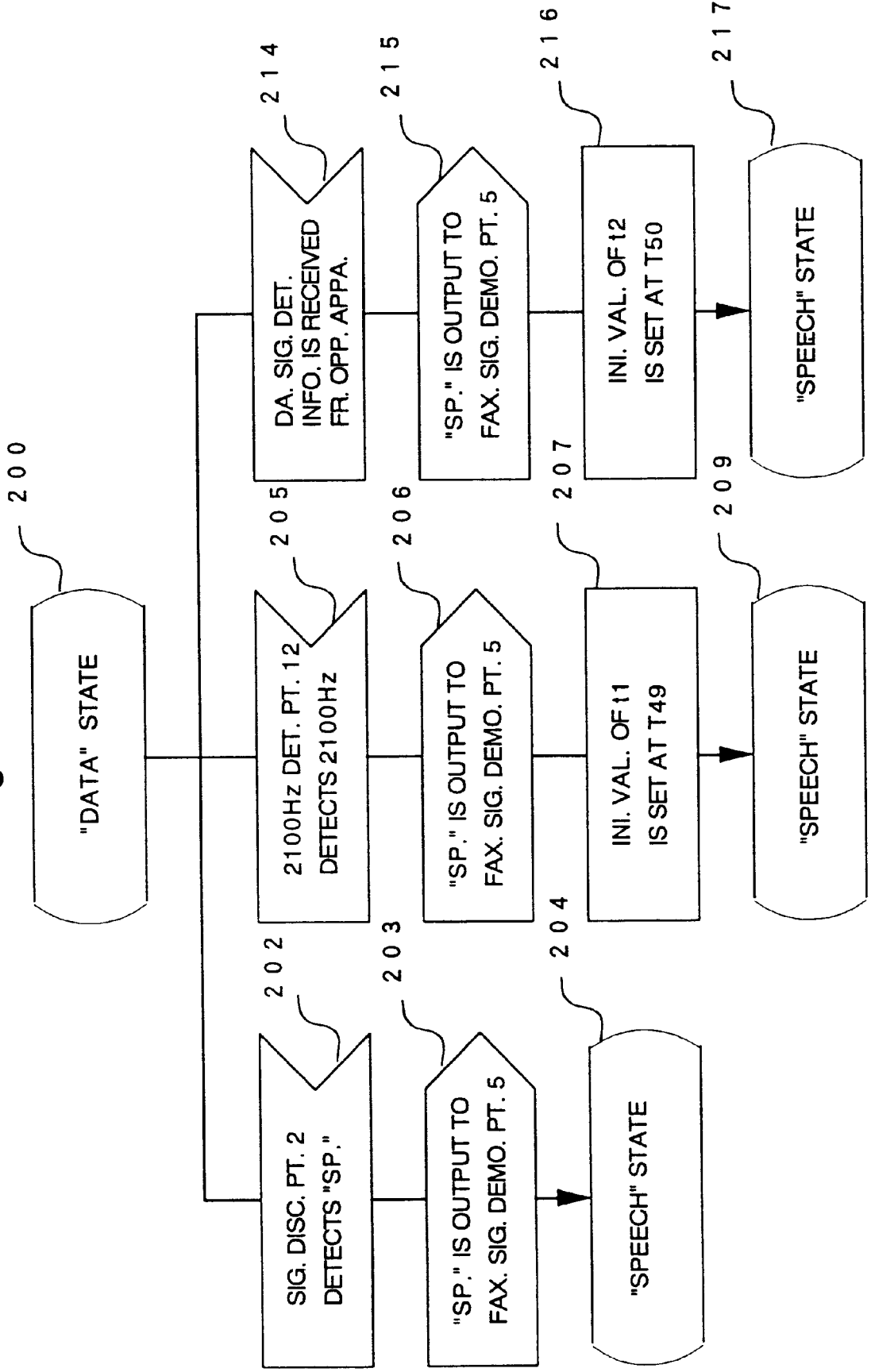
FIG. 50 is a flowchart illustrating operation of the signal transmitting apparatus for voiceband signals according to Embodiment 27 of the present invention.
Figure 51:
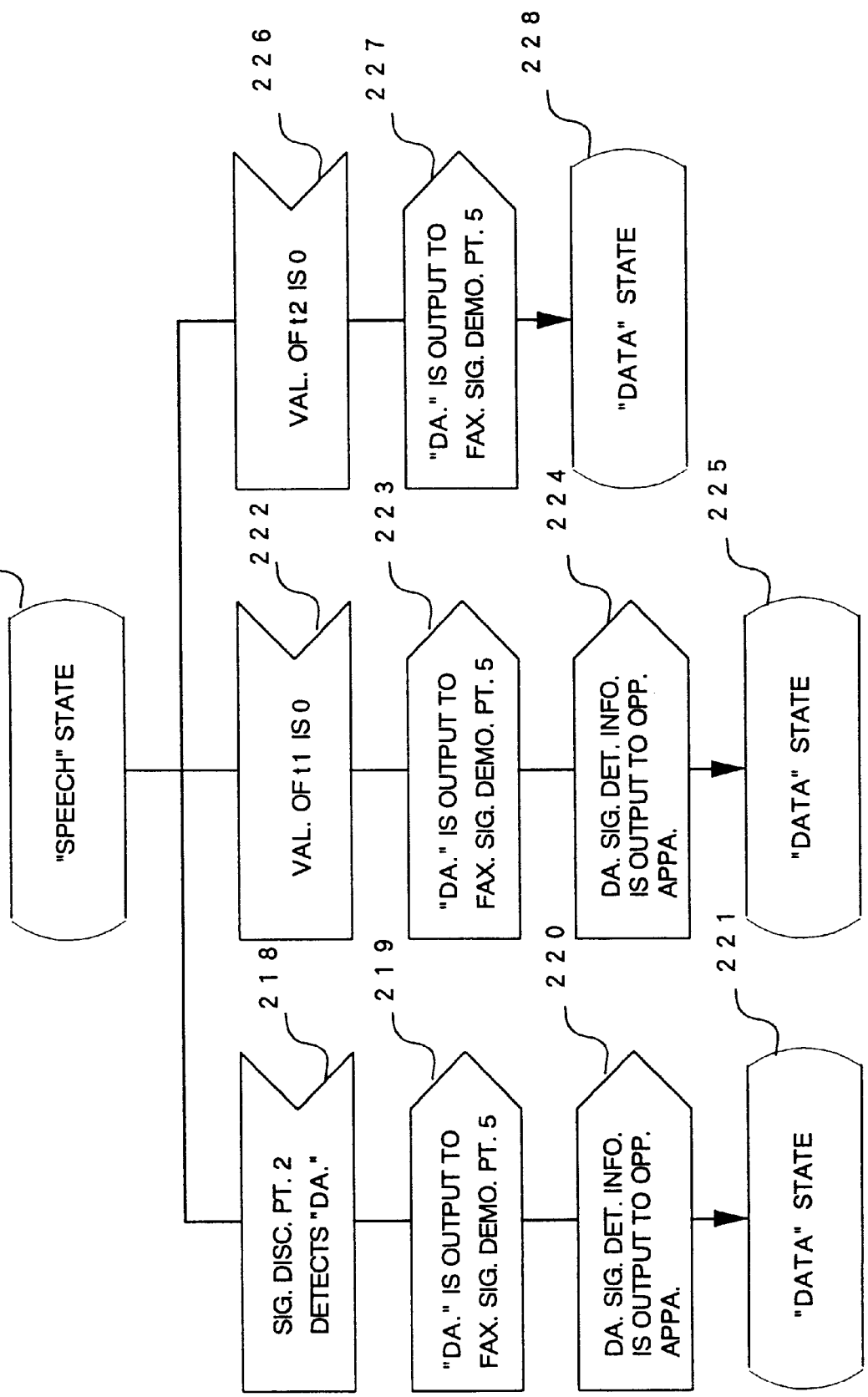
FIG. 51 is a flowchart illustrating operation of the signal transmitting apparatus for voiceband signals according to Embodiment 27 of the present invention.

FIGS. 50 and 51 are flowcharts for explaining the operation of the transmission controlling part 3. Operation in the case of present internal state of the transmission controlling part 3 being "data" will now be explained with reference to FIG. 50. If a change to "0" (speech) from "1" (data) of the discrimination state S2 is received from the signal discriminating part 2 as shown in the step 202 when the internal state is "data" as shown in the step 200, "speech" is output to the facsimile signal demodulating part 5 through a signal line S18 as shown in the step 203. Then, it is transmitted to a "speech" state as shown in the step 204.

If a change to "1" (detected) from "0" (not detected) of the 2100 Hz detection result S12 is received from the 2100 Hz detecting part 12 as shown in the step 205 when the internal state is "data" as shown in the step 200, "speech" is output to the facsimile signal demodulating part 5 through the signal line S18 as shown in the step 206. As shown in the step 207, the value of a tone detection timer t1 is initialized to be T49. Then, it is transmitted to a "speech" state as shown in the step 209.

If data signal detection information is received from the receiving controller 7 through the signal line S24 as shown in the step 214 when the internal state is "data" as shown in the step 200, "speech" is output to the facsimile signal demodulating part 5 through the signal line S18 as shown in the step 215. As shown in the step 216, the value of a data detection timer t2 at the receiving side is initialized to be T50. Then, it is transmitted to a "speech" state as shown in the step 217.

It is acceptable for the initial value T50 to be the same as the initial value T49 or to be different from the T49. It is supposed that values of the tone detection timers t1 and t2 keep decreasing down to 0 after the values are set at initial values.

Operation in the case of present internal state of the transmission controlling part 3 being "speech" will now be explained with reference to FIG. 51. If a change to "1" (data) from "0" (speech) of the discrimination state S2 is received from the signal discriminating part 2 as shown in the step 218 when the internal state is "speech" as shown in the step 201, "data" is output to the facsimile signal demodulating part 5 through the signal line S18 as shown in the step 219. Then, after outputting data signal detection information to the opposite side apparatus through the signal line S3 as shown in step a 220, it is transmitted to a "data" state as shown in the step 221.

If a value of the tone detection timer t1 goes down to 0 as shown in the step 222 when the internal state, is "speech" as shown in the step 201, "data" is output to the facsimile signal demodulating part 5 through the signal line S18 as shown in the step 223. Then, after outputting data signal detection information to the opposite side apparatus through the signal line S3 as shown in a step 224, it is transmitted to a "data" state as shown in the step 225.

If a value of the data detection timer t2 at the receiving side goes down to 0 as shown in a step 226 when the internal state is "speech" as shown in the step 201, "data" is output to the facsimile signal demodulating part 5 through the signal line S18 as shown in a step 227. Then, it is transmitted to a "data" state as shown in a step 228.

Operation of identifying signals in the case of a facsimile signal being input into the present signal transmitting apparatus for voiceband signals, will now be explained with reference to FIGS. 50, 51 and 52.

Figure 52:
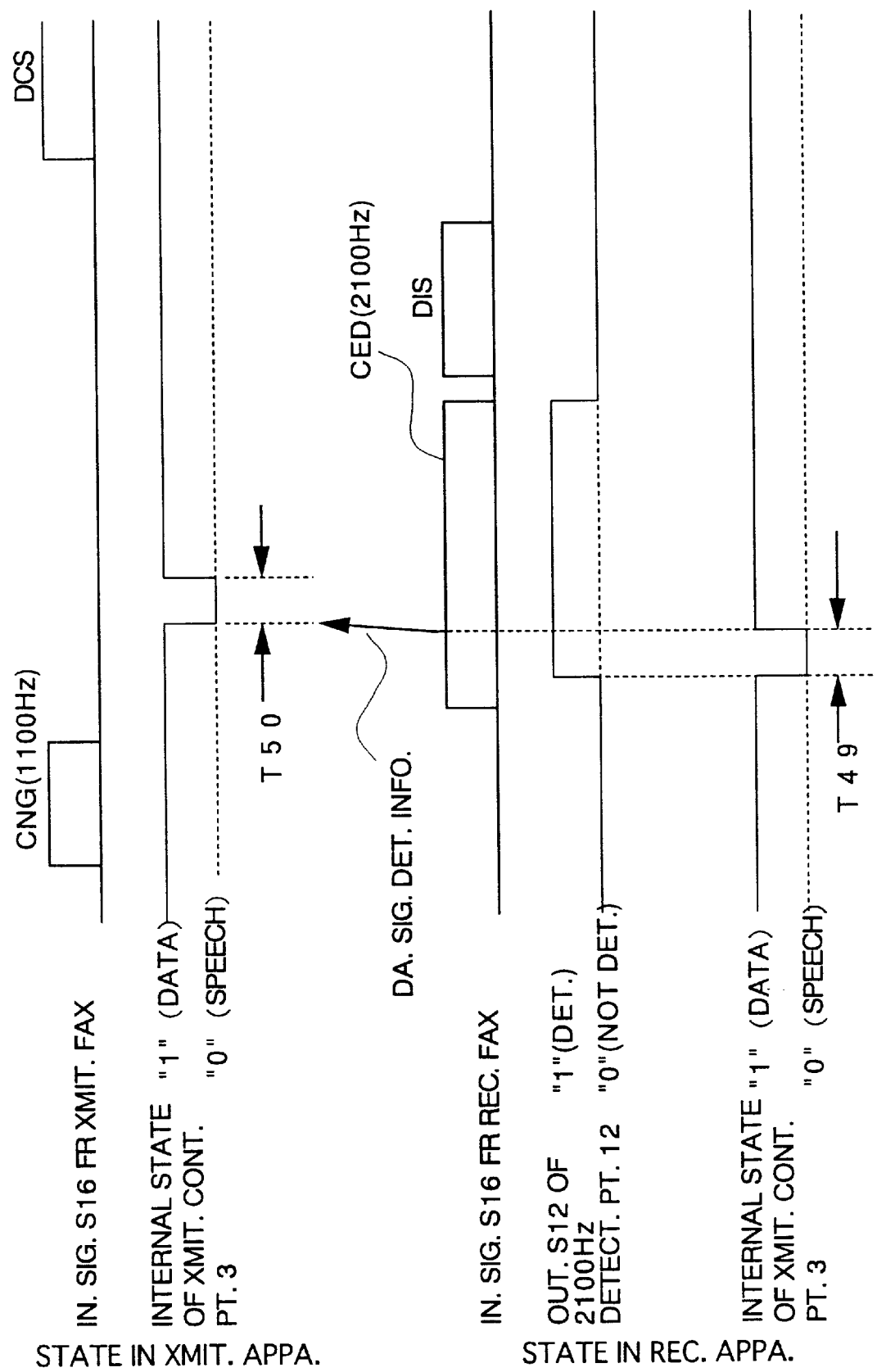
FIG. 52 illustrates operation of the signal transmitting apparatus for voiceband signals according to Embodiment 27 of the present invention.

In FIGS. 50, 51 and 52, each internal state of the transmission controlling parts 3 in the transmitting apparatus and the receiving apparatus is supposed to be "data", and each initial state of the outputs S2 of the signal discriminating parts 2 In the transmitting apparatus and the receiving apparatus is "data" and is supposed to keep the "data" state during the period shown in the figures.

In the receiving apparatus, when a 2100 Hz tone is output from the receiving facsimile terminal, the 2100 Hz detecting part 12 detects the tone and changes its 2100 Hz detection result S12 to "1" from "0".

If the transmission controlling part 3 receives a change to "1" (detected) from "0" (not detected) of the 2100 Hz detection result S12 from the 2100 Hz detecting part 12 as shown in the step 205, "speech" is output to the facsimile signal demodulating part 5 through the signal line S18 as shown in the step 206. As shown in the step 207, the value of the tone detection timer t1 is initialized to be T49. Then, it is transmitted to a "speech" state as shown in the step 209.

Afterwards, when the time T49 has passed, a value of the tone detection timer t1 goes down to 0 as shown in the step 222, "data" is output to the facsimile signal demodulating part 5 through the signal line S18 as shown in the step 223. Then, after outputting data signal detection information to the opposite side apparatus through the signal line S3 as shown in the step 224, it is transmitted to a "data" state as shown in the step 225.

When the facsimile signal demodulating part 5 receives "data" from the transmission controlling part 3 through the signal line S18, an input channel is assigned to one of modems to the number of n in the facsimile signal demodulating part 5.

In the transmitting apparatus, when the receiving controller 7 receives data signal detection information from the opposite side apparatus, the data signal detection information is output to the transmission controlling part 3 through the signal line S24.

If the transmission controlling part 3 receives data signal detection information from the receiving controller 7 as shown in the step 214, "speech" is output to the facsimile signal demodulating part 5 through the signal line S18 as shown in the step 215. As shown in the step 216, the value of the data detection timer t2 at the receiving side is initialized to be T50. Then, it is transmitted to a "speech" state as shown in the step 217.

Afterwards, when the time T50 has passed, a value of the data detection timer t2 at the receiving side goes down to 0 as shown in the step 226, "data" is output to the facsimile signal demodulating part 5 through the signal line S18 as shown in the step 227. Then, it is transmitted to a "data" state as shown in the step 228.

When the facsimile signal demodulating part 5 receives "data" from the transmission controlling part 3 through the signal line S18, an input channel is assigned to one of modems to the number of n in the facsimile signal demodulating part 5.

By applying the above configuration, in the receiving apparatus, when the 2100 Hz detecting part 12 detects a tone of 2100 Hz, the transmission controlling part 3 operates in order to set its internal state at "data" after having reset the state at "speech". Besides, in the transmitting apparatus, when data signal detection information is received from the opposite side apparatus, the transmission controlling part 3 operates to set its internal state at "data" after having reset the state at "speech". Accordingly, it is possible to set each internal state of the transmission controlling part 3 in the transmitting apparatus and in the receiving apparatus at "data", after once having reset the discrimination state at "speech", at the beginning of a facsimile call even when no call control information can be obtained. Therefore, channels of input facsimile signals can be assigned to modems in the facsimile signal demodulating part 5. Then, the facsimile signal can be correctly transmitted by demodulation.

Resetting an internal state of the transmission controlling part 3 at "speech" or setting the state at "data" is performed based on a 2100 Hz detection result S12 in this embodiment. However, it is acceptable to perform the same operation by using a tone detection result for other frequency such as 1100 Hz, instead of using the 2100 Hz tone.

In the above embodiment, the transmission controlling part 3 inputs 2100 Hz detection result S12 and data signal detection information S24 from the opposite side apparatus, and resets its internal state at "speech" or sets the state at "data" based on the input result and the input information. However, the same effect can be obtained by including a function of resetting the internal state at "speech" or setting the state at "data" based on the 2100 Hz detection result S12 and the data signal detection information S24 from the opposite side apparatus, into the signal discriminating part 2 and by controlling the facsimile signal demodulating part 5 based on a signal discrimination state output from the signal discriminating part 2.

Having thus described several particular embodiments of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only, and not intended to be limiting. The invention is limited only as defined in the following claims and the equivalents thereto.

What is claimed is:

1. A signal discrimination apparatus comprising:
    a signal discriminating part for inputting an input signal, identifying the input signal to be one of "speech" and "data", and outputting a result of the identifying as a discrimination state;
    a detecting part for detecting whether the input signal includes a specific tone, and outputting a detection result; and
    a reset signal generating part for outputting a reset signal to the signal discriminating part based on the detection result;
    wherein when the detecting part detects the specific tone, the signal discriminating part firstly resets the discrimination state to "speech" and secondly sets the discrimination state to "data" based on the reset signal.

2. The signal discrimination apparatus of claim 1, wherein the detecting part is one of a 2100 Hz detecting part for detecting a 2100 Hz tone and a 1100 Hz detecting part for detecting a 1100 Hz tone.

3. A signal discrimination apparatus comprising:
    a signal discriminating part for inputting an input signal, identifying the input signal to be one of "speech" and "data", and outputting a result of the identifying as a discrimination state;
    a first detecting part for detecting whether the input signal includes a first tone, and outputting first tone detection information;
    a second detecting part for detecting whether the input signal includes a second tone, and outputting second tone detection information; and
    a reset signal generating part for outputting a reset signal to the signal discriminating part based on the first tone detection information and the second tone detection information;
    wherein, based on the reset signal, the signal discriminating part firstly resets the discrimination state to "speech" and secondly sets the discrimination state to "data".

4. The signal discrimination apparatus of claim 3, wherein when the first detecting part detects the first tone, the signal discriminating part resets the discrimination state to "speech", and when the second detecting part detects the second tone, the signal discriminating part firstly resets the discrimination state to "speech" and secondly sets the discrimination state to "data".

5. The signal discrimination apparatus of claim 3, wherein when the first detecting part detects the first tone, the signal dicriminating part firstly resets the discrimination state to "speech" and secondly sets the discrimination state to "data", and when the second detecting part detects the second tone, the signal discriminating part firstly resets the discrimination state to "speech" and secondly sets the discrimination state to "data".

6. The signal discrimination apparatus of claim 3, wherein when the first detecting part detects the first tone, the signal discriminating part firstly resets the discrimination state to "speech" and secondly sets the discrimination state to "data", and when the second detecting part detects the second tone, the signal discriminating part sets the discrimination state to "data".

7. The signal discrimination apparatus of claim 3, wherein the first detecting part is a 1100 Hz detecting part for detecting a 1100 Hz tone and the second detecting part is a 2100 Hz detecting part for detecting a 2100 Hz tone.

8. A signal transmitting apparatus for voiceband signals comprising:

a signal discriminating part for inputting an input signal, identifying the input signal to be one of "speech" and "data", and outputting a result of the identifying as a discrimination state;

a detecting part for detecting whether the input signal includes a specific tone, and outputting a detection result as tone detection information;

a reset signal generating part for outputting a reset signal to the signal discriminating part based on at least the detection result output from the detecting part; and a facsimile signal demodulating part for demodulating a facsimile signal when the input signal is a facsimile signal;

wherein at least one of tone detection information detected by the detecting part and signal discrimination information is transmitted to an opposite side apparatus and received from the opposite side apparatus, wherein, based on tone detection information and at least one piece of information from the opposite side apparatus, the signal discriminating part firstly resets the discrimination state to "speech" and secondly sets the discrimination state to "data", and wherein operation of the facsimile signal demodulating part is controlled based on the discrimination state output from the signal discriminating part.

9. The signal transmitting apparatus for voiceband signals of claim 8, wherein the tone detection information detected by the detecting part is output to the opposite side apparatus and another piece of tone detection information is received from the opposite side apparatus, and wherein when the detecting part detects the specific tone, the signal discriminating part firstly resets the discrimination state to "speech" and secondly sets the discrimination state to "data", and when the signal discriminating part receives tone detection information from the opposite side apparatus, the signal discriminating part firstly resets the discrimination state to "speech" and secondly sets the discrimination state to "data".

10. The signal transmitting apparatus for voiceband signals of claim 8, wherein signal discrimination information is output to the opposite side apparatus and another piece of signal discrimination information is received from the opposite side apparatus, and wherein when the detecting part detects the specific tone, the signal discriminating part firstly resets the discrimination state to "speech" and secondly sets the discrimination state to "data", when a change to "speech" from "data" of signal discrimination information from the opposite side apparatus is detected, the signal discriminating part resets the discrimination state to "speech", and when a change to "data" from "speech" of signal discrimination information from the opposite side apparatus is detected, the signal discriminating part sets the discrimination state to "data".

11. The signal transmitting apparatus for voiceband signals of claim 8, wherein signal discrimination information is output to the opposite side apparatus and another piece of signal discrimination information is received from the opposite side apparatus, and wherein when the detecting part detects the specific tone, the signal discriminating part firstly resets the discrimination state to "speech" and secondly sets the discrimi-nation state to "data", and when a change to "data" from "speech" of signal discrimination information from the opposite side apparatus is detected, the signal discriminating part firstly resets the discrimination state to "speech" and secondly sets the discrimination state to "data" based on the reset signal.

12. The signal transmitting apparatus for voiceband signals of claim 8, wherein the detecting part is one of a 2100 Hz detecting part for detecting a 2100 Hz tone and a 1100 Hz detecting part for detecting a 1100 Hz tone.

13. A signal transmitting apparatus for voiceband signals comprising:

a signal discriminating part for inputting an input signal, identifying the input signal to be one of "speech" and "data", and outputting a result of the identifying as a discrimination state;

a first detecting part for detecting whether the input signal includes a first tone, and outputting first tone detection information;

a second detecting part for detecting whether the input signal includes a second tone, and outputting second tone detection information;

a reset signal generating part for outputting a reset signal to the signal discriminating part based on at least one of the first tone detection information and the second tone detection information; and a facsimile signal demodulating part for demodulating a facsimile signal when of the input signal is a facsimile signal;

wherein at least one of first tone detection information output from the first detecting part, second tone detection information output from the second detecting part and signal discrimination information output from the signal discriminating part is transmitted to an opposite side apparatus and received from the opposite side apparatus, wherein, based on first tone detection information from the first detecting part, second tone detection information from the second detecting part, and at least one piece of information from the opposite side apparatus, the signal discriminating part firstly resets the discrimination state to "speech" and secondly sets the discrimination state to "data", and wherein operation of the facsimile signal demodulating part is controlled based on the discrimination state output from the signal discriminating part.

14. The signal transmitting apparatus for voiceband signals of claim 13, wherein the signal discriminating part includes means for resetting the discrimination state to "speech" when the first detecting part detects the first tone, and means for setting the discrimination state to "data" when the second detecting part detects the second tone.

15. The signal transmitting apparatus for voiceband signals of claim 14, wherein second tone detection information is transmitted to the opposite side apparatus, another piece of second tone detection information is received from the opposite side apparatus, and wherein when the first detecting part detects the first tone, the signal discriminating part resets the discrimination state to "speech", when the second detecting part detects the second tone, the signal discriminating part firstly resets the discrimination state to "speech" and secondly sets the discrimination state to "data", and when second tone detection information is received from the opposite side apparatus, the signal discriminating part sets the discrimination state to "data".

16. The signal transmitting apparatus for voiceband signals of claim 14, wherein signal discrimination information output from the signal discriminating part is transmitted to the opposite side apparatus, and another piece of signal discrimination information is received from the opposite side apparatus, and wherein when the first detecting part detects the first tone, the signal discriminating part resets the discrimination state to "speech", when the second detecting part detects the second tone, the signal discriminating part firstly resets the discrimination state to "speech" and secondly sets the discrimination state to "data", and when a change to "data" from "speech" of signal discrimination information from the opposite side apparatus is detected, the signal discriminating part sets the discrimination state to "data".

17. The signal transmitting apparatus for voiceband signals of claim 14, wherein first tone detection information is transmitted to the opposite side apparatus, another piece of first tone detection information is received from the opposite side apparatus, signal discrimination information of the signal discriminating part is transmitted to the opposite side apparatus, and another piece of signal discrimination information from another signal discriminating part in the opposite side apparatus is received, and wherein the signal discriminating part resets the discrimination state to "speech" when the first detecting part detects the first tone, sets the discrimination state to "data" when the second detecting part detects the second tone, resets the discrimination state to "speech" when first tone detection information is received from the opposite side apparatus, and sets the discrimination state to "data" when a change to "data" from "speech" of signal discrimination information from the opposite side apparatus is detected.

18. The signal transmitting apparatus for voiceband signals of claim 14, wherein first tone detection information is transmitted to the opposite side apparatus, another piece of first tone detection information is received from the opposite side apparatus, second tone detection information is transmitted to the opposite side apparatus, and another piece of second tone detection information is received from the opposite side apparatus, and wherein the signal discriminating part resets the discrimination state to "speech" when the first detecting part detects the first tone, sets the discrimination state to "data" when the second detecting part detects the second tone, resets the discrimination state at "speech" when first tone detection information is received from the opposite side apparatus, and sets the discrimination state to "data" when second tone detection information is received from the opposite side apparatus.

19. The signal transmitting apparatus for voiceband signals of claim 14, wherein signal discrimination information output from the signal discriminating part is transmitted to the opposite side apparatus, and another piece of signal discrimination information is received from the opposite side apparatus, and wherein the signal discriminating part resets the discrimination state to "speech" when the first detecting part detects the first tone, sets the discrimination state to "data" when the second detecting part detects the second tone, resets the discrimination state to "speech" when a change to "speech" from "data" of signal discrimination information from the opposite side apparatus is detected, and sets the discrimination state to "data" when a change to "data" from "speech" of signal discrimination information from the opposite side apparatus is detected.

20. The signal transmitting apparatus for voiceband signals of claim 14, wherein first tone detection information is transmitted to the opposite side apparatus, and another piece of first tone detection information is received from the opposite side apparatus, and wherein when the first detecting part detects the first tone, the signal discriminating part firstly resets the discrimination state to "speech" and secondly sets the discrimination state to "data", when the second detecting part detects the second tone, the signal discriminating part sets the discrimination state to "data", and when first tone detection information is received from the opposite side apparatus, the signal discriminating part resets the discrimination state to "speech".

21. A signal transmitting apparatus for voiceband signals comprising:

a signal discriminating part for inputting an input signal, identifying the input signal to be one of "speech" and "data", and outputting a result of the identifying as a discrimination state;

a first detecting part for detecting whether the input signal includes a first tone, and outputting first tone detection information;

a second detecting part for detecting whether the input signal includes a second tone, and outputting second tone detection information;

a reset signal generating part for outputting a reset signal to the signal discriminating part based on the first tone detection information and the second tone detection information; and a facsimile signal demodulating part for demodulating a facsimile signal when the input signal is a facsimile signal;

wherein when the first detecting part detects the first tone, the signal discriminating part firstly resets the discrimination state to "speech" and secondly sets the discrimination state to "data", and when the second detecting part detects the second tone, the signal discriminating part firstly resets the discrimination state to "speech" and secondly sets the discrimination state to "data", and wherein operation of the facsimile signal demodulating part is controlled based on the discrimination state output from the signal discriminating part.

22. The signal transmitting apparatus for voiceband signals of claim 14, wherein first tone detection information is transmitted to the opposite side apparatus, another piece of first tone detection information is received from the opposite side apparatus, second tone detection information is transmitted to the opposite side apparatus, and another piece of second tone detection information is received from the opposite side apparatus, and wherein when the first detecting part detects the first tone, the signal discriminating part firstly resets the discrimination state to "speech" and secondly sets the discrimination state to "data", when the second detecting part detects the second tone, the signal discriminating part firstly resets the discrimination state to "speech" and secondly sets the discrimination state to "data", when first tone detection information is received from the opposite side apparatus, the signal discriminating part firstly resets the discrimination state to "speech" and secondly sets the discrimination state to "data", and when second tone detection information is received from the opposite side apparatus, the signal discriminating part firstly resets the discrimination state to "speech" and secondly sets the discrimination state to "data".

23. The signal transmitting apparatus for voiceband signals of claim 14, wherein signal discrimination information output from the signal discriminating part is transmitted to the opposite side apparatus, and another piece of signal discrimination information is received from the opposite side apparatus, and wherein when the first detecting part detects the first tone, the signal discriminating part firstly resets the discrimination state to "speech" and secondly sets the discrimination state to "data", when the second detecting part detects the second tone, the signal discriminating part firstly resets the discrimination state to "speech" and secondly sets the discrimination state to "data", when a change to "speech" from "data" of signal discrimination information from the opposite side apparatus is detected, the signal discriminating part resets the discrimination state to "speech", and when a change to "data" from "speech" of signal discrimination information from the opposite side apparatus is detected, the signal discriminating part sets the discrimination state to "data".

24. The signal transmitting apparatus for voiceband signals of claim 14, wherein signal discrimination information output from the signal discriminating part is transmitted to the opposite side apparatus, and another piece of signal discrimination information is received from the opposite side apparatus, and wherein when the first detecting part detects the first tone, the signal discriminating part firstly resets the discrimination state to "speech" and secondly sets the discrimination state to "data", when the second detecting part detects the second tone, the signal discriminating part firstly resets the discrimination state to "speech" and secondly sets the discrimination state to "data", and when a change to "data" from "speech" of signal discrimination information from the opposite side apparatus is detected, the signal discriminating part firstly resets the discrimination state to "speech" and secondly sets the discrimination state to "data".

25. The signal transmitting apparatus for voiceband signals of claim 13, wherein a process of detecting the first tone has been disabled during a specific time after receiving second tone detection information from the opposite side apparatus.

26. The signal transmitting apparatus for voiceband signals of claim 13, wherein a process of detecting the first tone has been disabled during a specific time after detecting a change to "data" from "speech" of signal discrimination information from the opposite side apparatus.

27. The signal transmitting apparatus for voiceband signals of claim 13, wherein a process of resetting the discrimination state to "speech" in a case of receiving first tone detection information from the opposite side apparatus has been disabled during a specific time after detecting the second tone.

28. The signal transmitting apparatus for voiceband signals of claim 13, wherein the first detecting part is a 1100 Hz detecting part for detecting a 1100 Hz tone and the second detecting part is a 2100 Hz detecting part for detecting a 2100 Hz tone.

29. A method for discriminating a signal comprising the steps of:

inputting a voiceband signal as an input signal;

discriminating the input signal to be one of "speech" and "data";

detecting a specific frequency tone in the input signal;

discriminating the input signal to be "speech", regardless of a result of the step of discriminating the input signal to be one of "speech" and "data", when the specific frequency tone is detected in the input signal;

setting a timer to an initial value when the specific frequency tone is detected in the input signal; and discriminating the input signal to be "data" when a specific time has passed after the timer is set to the initial value.

30. A method for discriminating a signal comprising the steps of:

inputting a voiceband signal as an input signal;

discriminating the input signal to be one of "speech" and "data";

detecting a specific frequency tone in the input signal;

discriminating the input signal to be "speech", regardless of a result of the step of discriminating the input signal to be one of "speech" and "data", when the specific frequency tone is detected in the input signal;

setting a timer to a first initial value when the specific frequency tone is detected in the input signal;

outputting tone detection information to an opposite side apparatus when the specific frequency tone is detected in the input signal;

discriminating the input signal to be "speech" when tone detection information is received from the opposite side apparatus;

setting the timer to a second initial value which is one of equivalent to the first initial value and different from the first initial value, when tone detection information is received from the opposite side apparatus; and discriminating the input signal to be "data" when a specific time has passed after the timer is set to one of the first initial value and the second initial value.

31. A method for discriminating a signal comprising the steps of:

inputting a voiceband signal as an input signal;

discriminating the input signal to be one of "speech" and "data";

detecting a specific frequency tone in the input signal;

discriminating the input signal to be "speech", regardless of a result of the step of discriminating the input signal to be one of "speech" and "data", when the specific frequency tone is detected in the input signal;

setting a first timer to a first initial value when the specific frequency tone is detected in the input signal;

discriminating the input signal to be "data" when a specific time has passed after the first timer is set to the first initial value;

outputting information of a discrimination state change to "data" from "speech" to an opposite side apparatus when a discrimination state change to "data" from "speech" is detected;

discriminating the input signal to be "speech" when information of a discrimination state change to "data" from "speech" is received from the opposite side apparatus;

setting a second timer to a second initial value which is one of equivalent to the first initial value and different from the first initial value, when information of a discrimination state change to "data" from "speech" is received from the opposite side apparatus; and discriminating the input signal to be "data" when a specific time has passed after the second timer is set to the second initial value.

32. The method for discriminating a signal of claim 29, wherein the step of detecting a specific frequency tone includes at least one of the step of detecting a 2100 Hz tone and the step of detecting a 1100 Hz tone.

* * * * *